United States Patent
Ko et al.

(10) Patent No.: US 10,904,379 B2
(45) Date of Patent: Jan. 26, 2021

(54) DEVICES AND METHODS FOR ADJUSTING THE PROVISION OF NOTIFICATIONS

(71) Applicant: Apple Inc., Cupertino, CA (US)

(72) Inventors: Heena Ko, San Francisco, CA (US); Jonathan R. Dascola, San Francisco, CA (US); Christopher P. Foss, San Francisco, CA (US); Corey K. Wang, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/142,599

(22) Filed: Sep. 26, 2018

(65) Prior Publication Data

US 2019/0342447 A1 Nov. 7, 2019

Related U.S. Application Data

(60) Provisional application No. 62/679,946, filed on Jun. 3, 2018, provisional application No. 62/668,168, filed on May 7, 2018.

(51) Int. Cl.
*H04M 1/725* (2006.01)
*G06F 9/54* (2006.01)
(Continued)

(52) U.S. Cl.
CPC ........ H04M 1/72586 (2013.01); G06F 9/542 (2013.01); H04M 1/72547 (2013.01);
(Continued)

(58) Field of Classification Search
CPC ......... H04M 1/72586; H04M 1/72566; H04M 1/72569; H04M 1/72572; G06F 9/542
See application file for complete search history.

(56) References Cited

U.S. PATENT DOCUMENTS

2014/0232671 A1* 8/2014 Chaudhri ............ G06F 3/04883
345/173
2014/0282174 A1 9/2014 Dempski
(Continued)

FOREIGN PATENT DOCUMENTS

EP 3 312 713 A1 4/2018
WO WO 2013/184530 A1 12/2013

OTHER PUBLICATIONS

Hill, Simon, From Oreo to Jelly Bean, here's how to turn off notifications in Android.*

(Continued)

*Primary Examiner* — Zhitong Chen
(74) *Attorney, Agent, or Firm* — Morgan, Lewis & Bockius LLP

(57) ABSTRACT

While an electronic device with a display is in a reduced notification mode, the device receives one or more communications. After receiving the one or more communications, the device detects an alert condition for the reduced notification mode. In response to detecting the alert condition for the reduced notification mode, the device displays a first user interface that includes a first affordance which, when activated, causes deactivation of the reduced notification mode of the electronic device. In response to detecting a first input that activates the first affordance, the device deactivates the reduced notification mode, and displays a second user interface. The second user interface does not display content from any one of the one or more communications. While the second user interface is displayed, in response to detecting a second input, the device displays notifications that include content for at least some of the one or more communications.

45 Claims, 91 Drawing Sheets

(51) Int. Cl.
    *G06F 3/0484* (2013.01)
    *G06F 3/0482* (2013.01)
    *G06F 3/048* (2013.01)

(52) U.S. Cl.
    CPC ... *H04M 1/72566* (2013.01); *H04M 1/72569* (2013.01); *H04M 1/72572* (2013.01); *G06F 3/048* (2013.01); *G06F 3/0482* (2013.01); *G06F 3/0484* (2013.01); *G06F 3/04847* (2013.01)

(56) References Cited

U.S. PATENT DOCUMENTS

| | | | | |
|---|---|---|---|---|
| 2014/0365919 | A1* | 12/2014 | Shaw | G06F 21/10 715/753 |
| 2016/0065708 | A1* | 3/2016 | Yang | H04M 1/6066 455/569.1 |
| 2016/0255188 | A1* | 9/2016 | Chaudhri | G06F 3/016 715/728 |
| 2017/0357439 | A1 | 12/2017 | Lemay et al. | |

OTHER PUBLICATIONS

Mediati, Nick, Master notifications in Android Lollipop with Notification Priority.*
And Hill, Simon, How to use Do Not Disturb mode in Android.*
Apple, "iPhone User Guide for iOS 7.1 Software", https://manuals.info.apple.com/en_US/iphone_ios7_user_guide.pdf, Mar. 10, 2014, 162 pages.
Black, "Samsung Galaxy S7 Silent Alarm Fix", https://www.youtube.com/watch?v=35LQtw7ucaw, Jan. 20, 2017, 4 pages.
Phandroid, "Do Not Disturb" mode will save you from notification hell, https://www.youtube.com/watch?v=R6A2As4VJpl, Jan. 16, 2017, 3 pages.
Sony Xperia Z, "How to turn off alarm when it sounds", https://www.youtube.com/watch?v=eerWJMN7e5s, May 14, 2015, 3 pages.
Office Action, dated May 14, 2019, received in Danish Patent Application No. 201870333, 6 pages.
Invitation to Pay Additional Fees, dated Jun. 17, 2019, received in International Patent Application No. PCT/US2019/026353, which corresponds with U.S. Appl. No. 16/142,599, 19 pages.
International Search Report and Written Opinion, dated Aug. 7, 2019, received in International Patent Application No. PCT/US2019/026353, which corresponds with U.S. Appl. No. 16/142,599, 26 pages.
Droid Life, "Android 5.0 Feature: Notification Access and Do Not Disturb", https://www.youtube.com/watch?v=SY2kAqCqOko, Oct. 17, 2014, 2 pages.
Hill, Here's How to Use Do Not Disturb Mode in Android, https://web.archive.org/web/20180313165228/https://www.digitaltrends.com/mobile/do-not-disturb-mode-in-android, Mar. 13, 2018, 6 pages.
MacRumors, "iOS 11: How to Use the Lock Screen and Notification Center", https://www.youtube.com/watch?v=BQDyGNO9oGc, 4 pages.
Tropical Tech, How to Set Up Do Not Disturb Mode Rules / Schedule in Android / 2018, http://www.youtube.com/watch?v=DLnGcpKHVyM, Sep. 4, 2017, 3 pages.
Office Action, dated Aug. 27, received in Danish Patent Application No. 201870333, 9 pages.
Office Action, dated Nov. 12, 2018, received in Danish Patent Application No. 201870333, 3 pages.
Notice of Allowance, dated Apr. 2, 2020, received in Danish Patent Application No. 201870333, 4 pages.
Office Action, dated Nov. 15, 2019, received in Danish Patent Application No. 201870333, 2 pages.
Intention to Grant, dated Dec. 19, 2019, received in Danish Patent Application No. 201870333, 2 pages.
Patent, dated May 15, 2020, received in Danish Patent Application No. 201870333, 5 pages.

* cited by examiner (C)

---

After detecting the increase in the characteristic intensity of the contact that exceeds the respective intensity threshold while the contact is at the location on the touch-sensitive surface that corresponds to the control affordance:

detect movement of the contact to a location on the touch-sensitive surface that does not correspond to the control affordance;

while the contact is at the location on the touch-sensitive surface that does not correspond to the control affordance, detect lift-off of the contact; and, in response to detecting lift-off of the contact while the contact is at the location on the touch-sensitive surface that does not correspond to the control affordance, forgo initiating the process for adjusting the alert settings of the device.

~626

---

After detecting the increase in the characteristic intensity of the contact that exceeds the respective intensity threshold while the contact is at the location on the touch-sensitive surface that corresponds to the control affordance:

detect movement of the contact to a location on the touch-sensitive surface that does not correspond to the control affordance;

while the contact is at the location on the touch-sensitive surface that does not correspond to the control affordance, detect a decrease in the characteristic intensity of the contact; and in response to detecting the decrease in the characteristic intensity of the contact while the contact is at the location on the touch-sensitive surface that does not correspond to the control affordance, forgo initiating the process for adjusting the alert settings of the device.

While displaying the first user interface that includes the control affordance, detect a third input that includes detecting a respective contact at a location on the touch-sensitive surface that corresponds to the control affordance.

In response to detecting the third input:

in accordance with a determination that the third input meets toggle criteria for the control affordance, wherein the toggle criteria do not include a requirement that the third input has an increase in a characteristic intensity of the respective contact that exceeds the intensity threshold while the respective contact is at the location on the touch-sensitive surface that corresponds to the control affordance in order for the toggle criteria to be met, toggle the alert settings of the device. ~630

The control affordance is a first control affordance of a plurality of control affordances in the first user interface.

For each control affordance of the plurality of control affordances:
a respective control affordance is activated when corresponding activation criteria are met.

The corresponding activation criteria include a requirement that an input directed to the respective control affordance includes an increase in characteristic intensity of a respective contact that exceeds the intensity threshold while the respective contact is at a location on the touch-sensitive surface that corresponds to the respective control affordance in order for the corresponding activation criteria to be met. ~632

Figure 6E

The first mode is associated with a first set of activation conditions. In response to detecting the first set of activation conditions, the device automatically, without user intervention, activates the first mode. —736

The second mode is associated with a second set of activation conditions, different from the first set of activation conditions. In response to detecting the second set of activation conditions, the device automatically, without user intervention, activates the second mode.

The first set of activation conditions for the first mode includes a condition that is met when a respective application in a predefined set of applications is running in a foreground of the device. —738

The first mode is associated with a first set of expiration conditions. In response to detecting the first set of expiration conditions, the device automatically, without user intervention, de-activates the first mode. —740

The second mode is associated with a second set of expiration conditions different from the first set of expiration conditions. In response to detecting the second set of expiration conditions, the device automatically, without user intervention, de-activates the second mode.

802 — Detect a plurality of manual activations of a first mode on an electronic device. The first mode, while active, prevents output of notifications when communications of a first type are received.

804 — After detecting the plurality of manual activations of the first mode:

automatically determine, based on the plurality of manual activations of the first mode, a set of conditions that correspond to manual activations of the first mode; and output, at the device, a suggestion for activation of the first mode at the electronic device.

806 — The set of conditions includes:
a time-of-day condition;
a location condition; and/or
a calendar condition

809 — After outputting the suggestion, receive a response that accepts the suggestion for activation of the first mode

808 — In response to receiving the response that accepts the suggestion, change settings at the device that are associated with the first mode

810 — The suggestion for activation of the first mode is a suggestion to automatically activate the first mode when the electronic device detects the set of conditions.

Changing the settings at the device that are associated with the first mode includes setting the device to automatically activate the first mode when the electronic device detects the set of conditions that correspond to the manual activations of the first mode.

```
┌─────────────────────────────────────────────────────────────────┐
│ The first user interface includes a second affordance which,    │
│ when activated, causes delay of the deactivation of the reduced │
│ notification mode of the electronic device.                     │
│ In response to detecting the activation of the reduced          │
│ notification mode, reduce a brightness of the display.          │──930
│ After detecting the alert condition for the reduced notification│
│ mode, maintain a reduced brightness of the display.             │
│ While displaying the first user interface that includes the     │
│ first affordance and the second affordance, detect a third      │
│ input that activates the second affordance.                     │
│ In response to detecting the third input, delay the             │
│ deactivation of the reduced notification mode, while            │
│ maintaining the reduced brightness of the display.              │
│ In response to detecting the first input that activates the     │
│ first affordance, increase the brightness of the display.       │
└─────────────────────────────────────────────────────────────────┘
┌─────────────────────────────────────────────────────────────────┐
│ The first user interface includes a second affordance which,    │
│ when activated, causes delay of the deactivation of the reduced │
│ notification mode of the electronic device.                     │
│ After detecting the alert condition for the reduced             │
│ notification mode, display the first user interface at a first  │
│ brightness level.                                               │
│ While displaying the first user interface that includes the     │──932
│ first affordance and the second affordance at the first         │
│ brightness level, detect a third input that activates the       │
│ second affordance.                                              │
│ In response to detecting the third input, reduce the brightness │
│ of the first user interface to a second brightness level that   │
│ is less than the first brightness level.                        │
│ Upon expiration of a predefined delay time, increase the        │
│ brightness of the first user interface to the first brightness  │
│ level.                                                          │
└─────────────────────────────────────────────────────────────────┘
┌─────────────────────────────────────────────────────────────────┐
│ In response to detecting the first input that activates the     │
│ first affordance:                                               │
│ Deactivate the reduced notification mode, and                   │──934
│ Display, on the display, the second user interface, wherein the │
│ second user interface does not display content from any of the  │
│ one or more communications.                                     │
├─────────────────────────────────────────────────────────────────┤
│ The second user interface includes a second affordance which,   │
│ when activated, causes display of notifications for at least    │──936
│ some of the one or more communications received while in the    │
│ reduced notification mode.                                      │
└─────────────────────────────────────────────────────────────────┘
```

Figure 9C

DEVICES AND METHODS FOR ADJUSTING THE PROVISION OF NOTIFICATIONS

RELATED APPLICATIONS

This application claims priority to U.S. Provisional Application Ser. No. 62/679,946, filed Jun. 3, 2018, and U.S. Provisional Application Ser. No. 62/668,168, filed May 7, 2018, which are incorporated by reference herein in their entireties

TECHNICAL FIELD

This relates generally to electronic devices with touch-sensitive surfaces, including but not limited to electronic devices with touch-sensitive surfaces that provide notifications, and more particularly, to devices and methods that adjust the provision of notifications.

BACKGROUND

The use of portable electronic devices has increased significantly in recent years, with many applications typically residing in the memory of such devices. Example applications include communications applications (e.g., messaging and telephone), calendar applications, news applications, media playback applications (e.g., podcast, music, and video), payment applications, reminder applications, social media applications, and service delivery applications. These applications generate events, which contain information of varying degrees of importance to users. Notifications that correspond to the generated events may be displayed. Example notifications include digital images, video, text, icons, control elements (such as buttons) and/or other graphics to notify users of events. Example applications that generate notifications include messaging applications (e.g., iMessage or Messages from Apple Inc. of Cupertino, Calif.), calendar applications (e.g., iCal or Calendar from Apple Inc. of Cupertino, Calif.), news applications (e.g., Apple News from Apple Inc. of Cupertino, Calif.), media playback applications (e.g., Podcasts, Apple Music and iTunes from Apple Inc. of Cupertino, Calif.), payment applications (e.g., Apple Pay from Apple Inc. of Cupertino, Calif.), reminder applications (e.g., Reminders from Apple Inc. of Cupertino, Calif.), social media applications, and service delivery applications.

The types of notifications that a user wants to receive while working, playing, or sleeping may be quite different. But current user interfaces for adjusting when alerts and other notifications are provided (and which notifications are provided) are cumbersome and inefficient. For example, to change alert settings, some devices require the user to navigate to obscure, hard-to-find settings user interfaces of the devices' operating systems. At present, there is no simple way for a user to easily adjust the provision of notifications in different contexts. Existing methods take longer than necessary, thereby wasting energy. This latter consideration is particularly important in battery-operated devices.

SUMMARY

Accordingly, there is a need for electronic devices with faster, more efficient methods and interfaces for adjusting the provision of notifications. Such methods and interfaces optionally complement or replace conventional methods for adjusting the provision of notifications. Such methods and interfaces reduce the number, extent, and/or nature of the inputs from a user and produce a more efficient human-machine interface. For battery-operated devices, such methods and interfaces conserve power and increase the time between battery charges.

The above deficiencies and other problems associated with interfaces that adjust the provision of notifications are reduced or eliminated by the disclosed electronic devices. In some embodiments, the device includes a desktop computer. In some embodiments, the device is portable (e.g., a notebook computer, tablet computer, or handheld device). In some embodiments, the device includes a personal electronic device (e.g., a wearable electronic device, such as a watch). In some embodiments, the device has (and/or is in communication with) a display generation component and one or more input devices. In some embodiments, the device has (and/or is in communication with) a touchpad. In some embodiments, the device has (and/or is in communication with) a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI in part through stylus and/or finger contacts and gestures on the touch-sensitive surface. In some embodiments, the functions optionally include game playing, image editing, drawing, presenting, word processing, spreadsheet making, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at an electronic device with a display, a touch-sensitive surface, and one or more sensors to detect intensities of contacts with the touch-sensitive surface. The method includes, while the electronic device is in a display-off state, detecting a first input. The method includes, in response to detecting the first input: activating the display of the device, and displaying, on the display, a first user interface that corresponds to a display-on state of the device. The first user interface is an initial user interface that is displayed when the device switches from the display-off state to the display-on state in response to detecting the first input. The first user interface includes a control affordance for controlling generation of alerts by the device. The first user interface is distinct from a home screen user interface that includes a plurality of application launch icons corresponding to a plurality of applications. The method includes, while displaying the first user interface that includes the control affordance, detecting a second input that includes a contact at a location on the touch-sensitive surface that corresponds to the control affordance. The method includes, in response to detecting the second input: in accordance with a determination that the second input meets activation criteria for the control affordance, wherein the activation criteria include a requirement that the second input includes an increase in a characteristic intensity of the contact that exceeds an intensity threshold while the contact is at the location on the touch-sensitive surface that corresponds to the control affordance in order for the activation criteria to be met, initiating a process for adjusting alert settings of the device; and, in accordance with a determination that the second input does not meet the activation criteria for the control affordance, forgoing initiating the process for adjusting alert settings of the device.

In accordance with some embodiments, a method is performed at an electronic device with a display. The method includes receiving a communication. The method includes, in response to receiving the communication: in accordance with a determination that a first mode is active on the electronic device: in accordance with a determination that the communication meets whitelisting criteria for the first mode, outputting, at the device, a notification that corresponds to the communication in a first manner; and, in accordance with a determination that the communication does not meet the whitelisting criteria for the first mode, forgoing outputting the notification that corresponds to the communication in the first manner. The method includes, in response to receiving the communication, in accordance with a determination that a second mode is active on the electronic device: in accordance with a determination that the communication meets whitelisting criteria for the second mode, wherein the whitelisting criteria for the second mode are different from the whitelisting criteria for the first mode, outputting, at the device, the notification that corresponds to the communication in the first manner; and, in accordance with a determination that the communication does not meet the whitelisting criteria for the second mode, forgoing outputting the notification that corresponds to the communication in the first manner.

In accordance with some embodiments, a method is performed at an electronic device with a display. The method includes detecting a plurality of manual activations of a first mode on the electronic device. The first mode, while active, prevents output of notifications when communications of a first type are received. The method includes, after detecting the plurality of manual activations of the first mode: automatically determining, based on the plurality of manual activations of the first mode, a set of conditions that correspond to manual activations of the first mode and outputting, at the device, a suggestion for activation of the first mode at the electronic device. The method includes, after outputting the suggestion, receiving a response that accepts the suggestion for activation of the first mode. The method includes, in response to receiving the response that accepts the suggestion, changing settings at the device that are associated with the first mode.

In accordance with some embodiments, a method is performed at an electronic device with a display. The method includes, while the electronic device is in a reduced notification mode, receiving one or more communications. The method includes, after receiving the one or more communications, detecting an alert condition for the reduced notification mode. The method includes, in response to detecting the alert condition for the reduced notification mode, displaying a first user interface that includes a first affordance which, when activated, causes deactivation of the reduced notification mode of the electronic device. The method includes, while displaying the first user interface, detecting a first input that activates the first affordance. The method includes, in response to detecting the first input that activates the first affordance: deactivating the reduced notification mode, and displaying, on the display, a second user interface, wherein the second user interface does not display, on the display, content from any one of the one or more communications. The method includes, while the second user interface is displayed, detecting a second input and in response to detecting the second input, displaying notifications that include content for at least some of the one or more communications received while the electronic device was in the reduced notification mode.

In accordance with some embodiments, an electronic device includes a display, an optional touch-sensitive surface, one or more optional sensors to detect intensities of contacts with the touch-sensitive surface, one or more processors, memory, and one or more programs. The one or more programs are stored in the memory and configured to be executed by the one or more processors. The one or more programs include instructions for performing the operations of any of the methods described herein. In accordance with some embodiments, a computer readable storage medium has stored therein instructions which when executed by an electronic device with a display, an optional touch-sensitive surface, and one or more optional sensors to detect intensities of contacts with the touch-sensitive surface, cause the device to perform the operations of any of the methods described herein. In accordance with some embodiments, a graphical user interface on an electronic device that includes memory and one or more processors to execute one or more programs stored in the memory includes one or more of the elements displayed in any of the methods described herein, which are updated in response to inputs, as described in any of the methods described herein. In accordance with some embodiments, an electronic device includes a display, an optional touch-sensitive surface, one or more optional sensors to detect intensities of contacts with the touch-sensitive surface, and means for performing the operations of any of the methods described herein. In accordance with some embodiments, an information processing apparatus, for use in an electronic device that includes a display, an optional touch-sensitive surface, and one or more optional sensors to detect intensities of contacts with the touch-sensitive surface, includes means for performing the operations of any of the methods described herein.

Thus, electronic devices are provided with faster, more efficient methods and interfaces for adjusting the provision of notifications, thereby increasing the effectiveness, efficiency, and user satisfaction with such devices. Such methods and interfaces may complement or replace conventional methods for adjusting the provision of notifications.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 6A-6E are flow diagrams illustrating a method of adjusting alert settings on an electronic device, in accordance with some embodiments.

FIGS. 7A-7C are flow diagrams illustrating a method of providing alerts (e.g., notifications) on an electronic device, in accordance with some embodiments.

FIGS. 8A-8E are flow diagrams illustrating a method of activating a reduced notification mode (e.g., a "do-not-disturb" mode) of an electronic device, in accordance with some embodiments.

FIGS. 9A-9D are flow diagrams illustrating a method of providing notifications when a reduced notification mode of an electronic device is deactivated, in accordance with some embodiments.

DESCRIPTION OF EMBODIMENTS

Figure 1A:
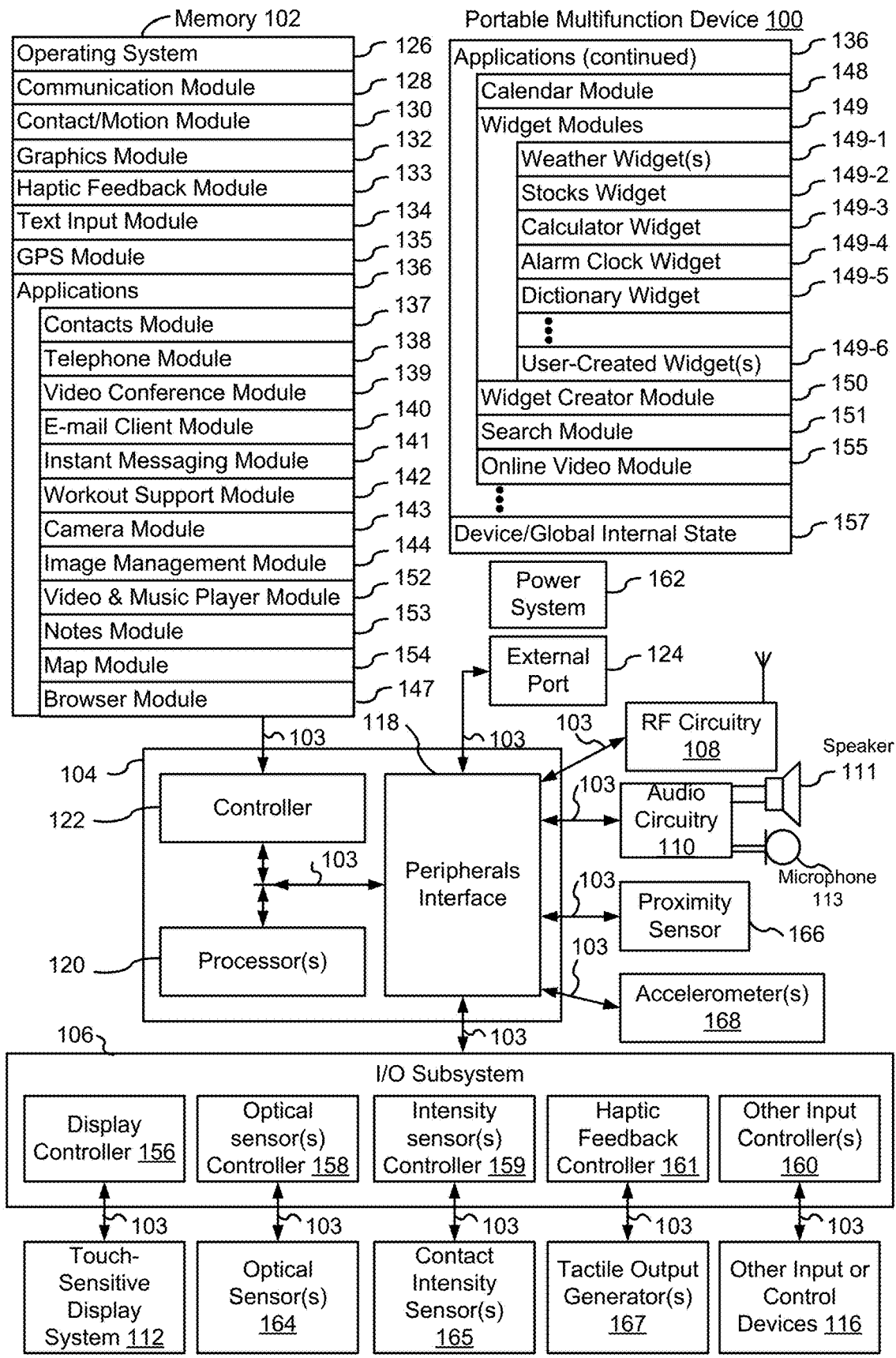
FIG. 1A is a block diagram illustrating a portable multifunction device with a touch-sensitive display in accordance with some embodiments.

The methods, devices, and GUIs described herein improve user interface interactions that adjust the provision of notifications in multiple ways.

Some embodiments described below provide devices and methods for adjusting settings for controlling generation of alerts (e.g., notifications) by a device. More specifically, in some embodiments, a device displays of a virtual button (e.g., a control affordance on a touch-sensitive display) for controlling generation of alerts by the device (e.g., for controlling a reduced notification mode of the device, such as a "do-not-disturb" mode). The virtual button is displayed in an initial user interface that appears when the device wakes up from a display-off state (e.g., the virtual button is displayed on a wake screen). After an intensity of a contact at the virtual button exceeds an intensity threshold, the device initiates a process for adjusting alert settings of the device (e.g., the device displays a menu with user-selectable auto-expiration options for the reduced notification mode, or displays a menu with user-selectable options for switching to a different reduced notification mode). In some embodiments, the virtual button toggles the reduced notification mode in response to a light press (e.g., a contact with a characteristic intensity above a first intensity threshold, such as $IT_L$, but below a second intensity threshold, such as $IT_D$) and initiates the process for adjusting the alert settings in response to a deep press (e.g., a contact with a characteristic intensity above a second intensity threshold, such as $IT_D$). In some embodiments, the virtual button is unresponsive to contacts with an intensity below the first intensity threshold, which reduces the risk of accidental activation of the button.

Some embodiments described below provide devices and methods with different reduced notification modes (e.g., different "do-not-disturb" modes) for different contexts (e.g., a productivity mode, a social mode, a sleep mode, and an exercise mode). The different reduced notification modes have different whitelists (e.g., lists of applications from which notifications are allowed to "break through" the reduced notification mode). An active reduced notification mode causes the device to at least partially block notifications that are not whitelisted for that particular reduced notification mode. For example, a notification that is whitelisted for an active reduced notification mode will be displayed and the user will be notified of its arrival by a sound and/or a haptic alert. In contrast, a notification that is not whitelisted for the active reduced notification mode will be displayed without a sound or haptic alert (or will not be provided at all while the particular reduced notification mode is active). Thus, a user can, for example, set the device to a productivity mode at work and not be distracted by social media, then can go home and set the device to a social mode to avoid being bothered by work emails.

Some embodiments described below provide devices and methods for automatically suggesting activation of a reduced notification mode based on a plurality of prior manual activations of the reduced notification mode. In some embodiments, a device associates a set of conditions with individual manual activations of a reduced notification mode. For example, a device will detect that the user has often manually activated a productivity mode around the time when the user arrives at work around 9 AM. Based on the plurality of prior manual activations, the device outputs an activation suggestion for the reduced notification mode. In some embodiments, the activation suggestion is a suggestion, provided upon a respective manual activation of the reduced notification mode, to automatically activate the reduced notification mode whenever the device detects a similar set of conditions (e.g., "Would you like to automatically activate productivity mode whenever you arrive at work in the morning?"). In some embodiments, the activation suggestion is a suggestion, provided when the device detects a similar set of conditions, to activate the reduced notification mode at that time (e.g., "You've arrived at work! Would you like to activate productivity mode?")

Some embodiments described below include devices and methods for provision of notifications when a reduced notification mode is deactivated (e.g., a reduced notification mode such as a sleep mode, that is associated with a wake-up alarm). These methods and devices provide a gradual "wake-up" that avoids overwhelming the user with notifications immediately upon waking up and turning off their alarm. To that end, when a user turns off their alarm (which also disables the reduced notification mode), a user interface forgoes displaying content from communications received by the device while the device was in the reduced notification mode. Instead, the user interface displays a small amount of information, such as the weather and/or a "Good Morning" message. The user can then navigate to his/her notifications when he/she is ready.

Figure 5A:
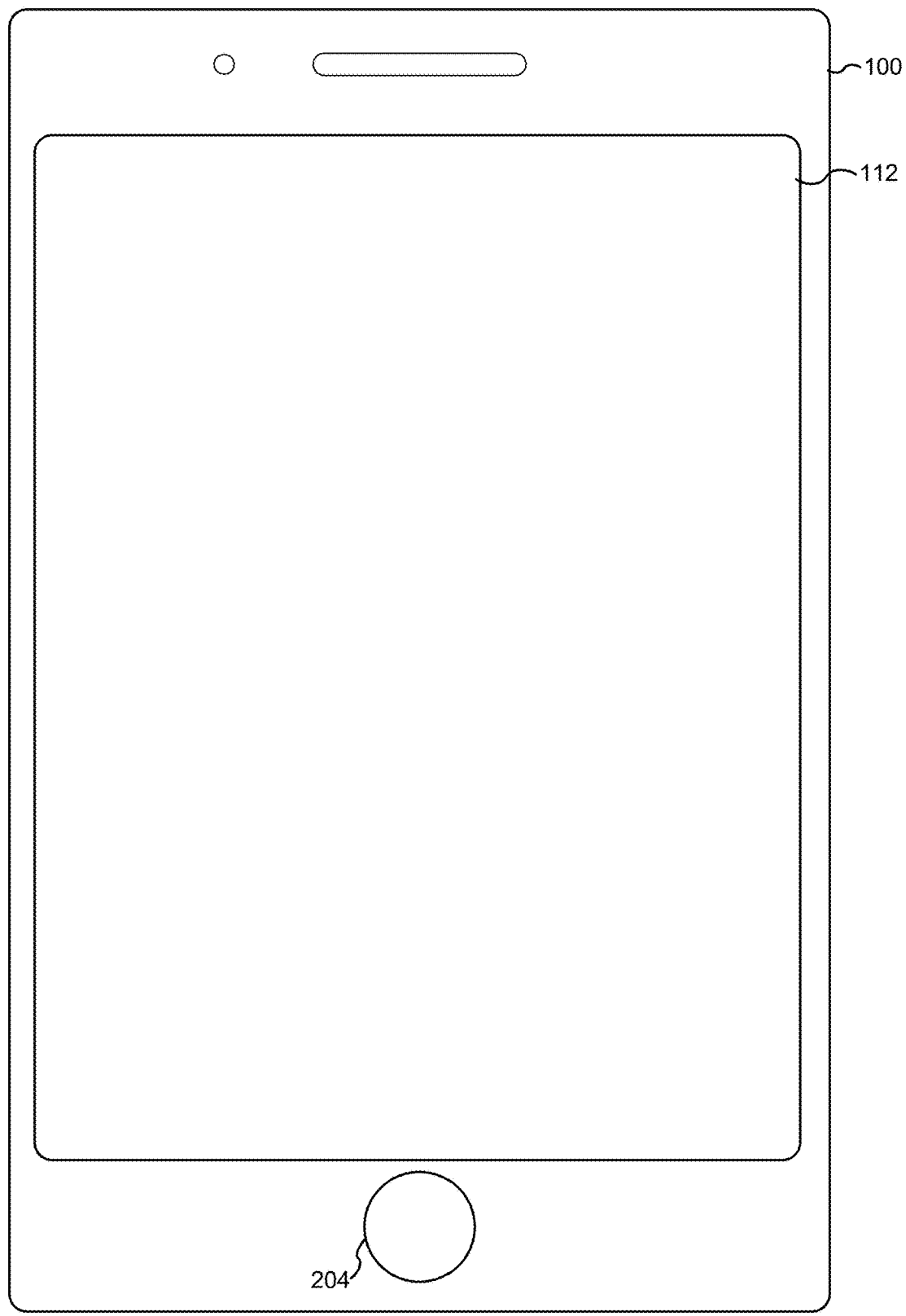
FIGS. 5A-5BM illustrate example user interfaces for providing notifications and adjusting settings for providing notifications, in accordance with some embodiments.
Figure 5B:
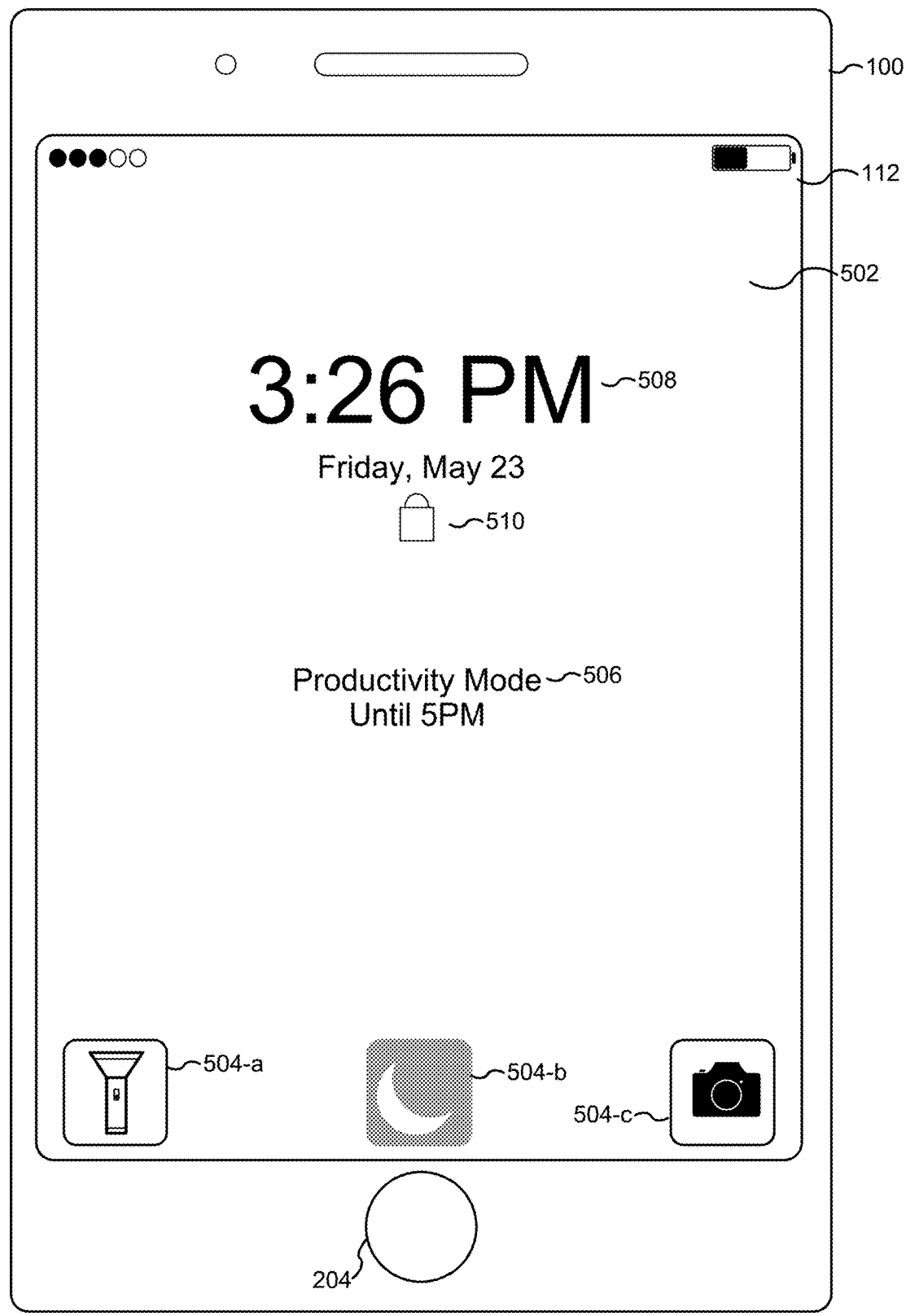
Figure 7A:
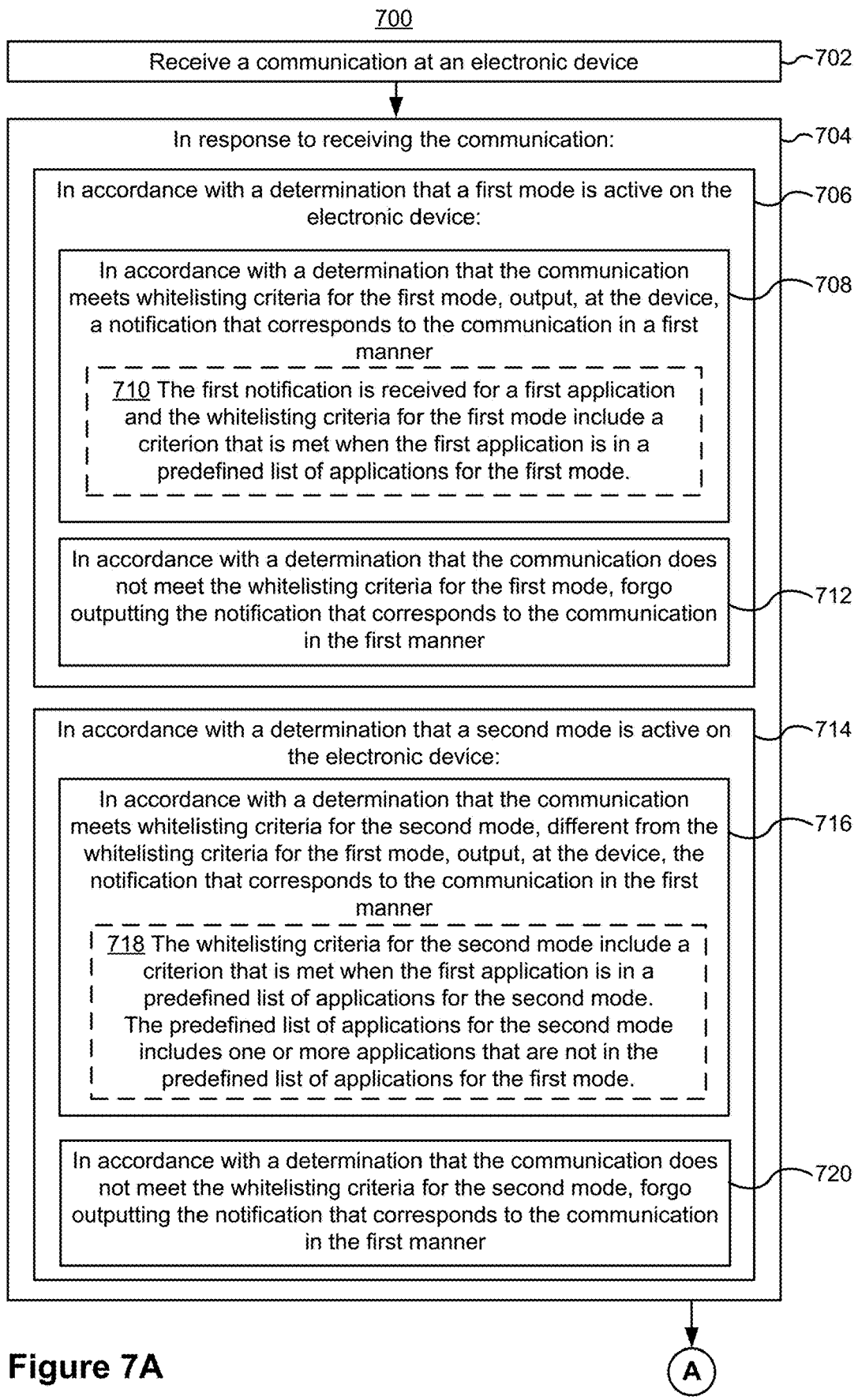
Figure 7B:
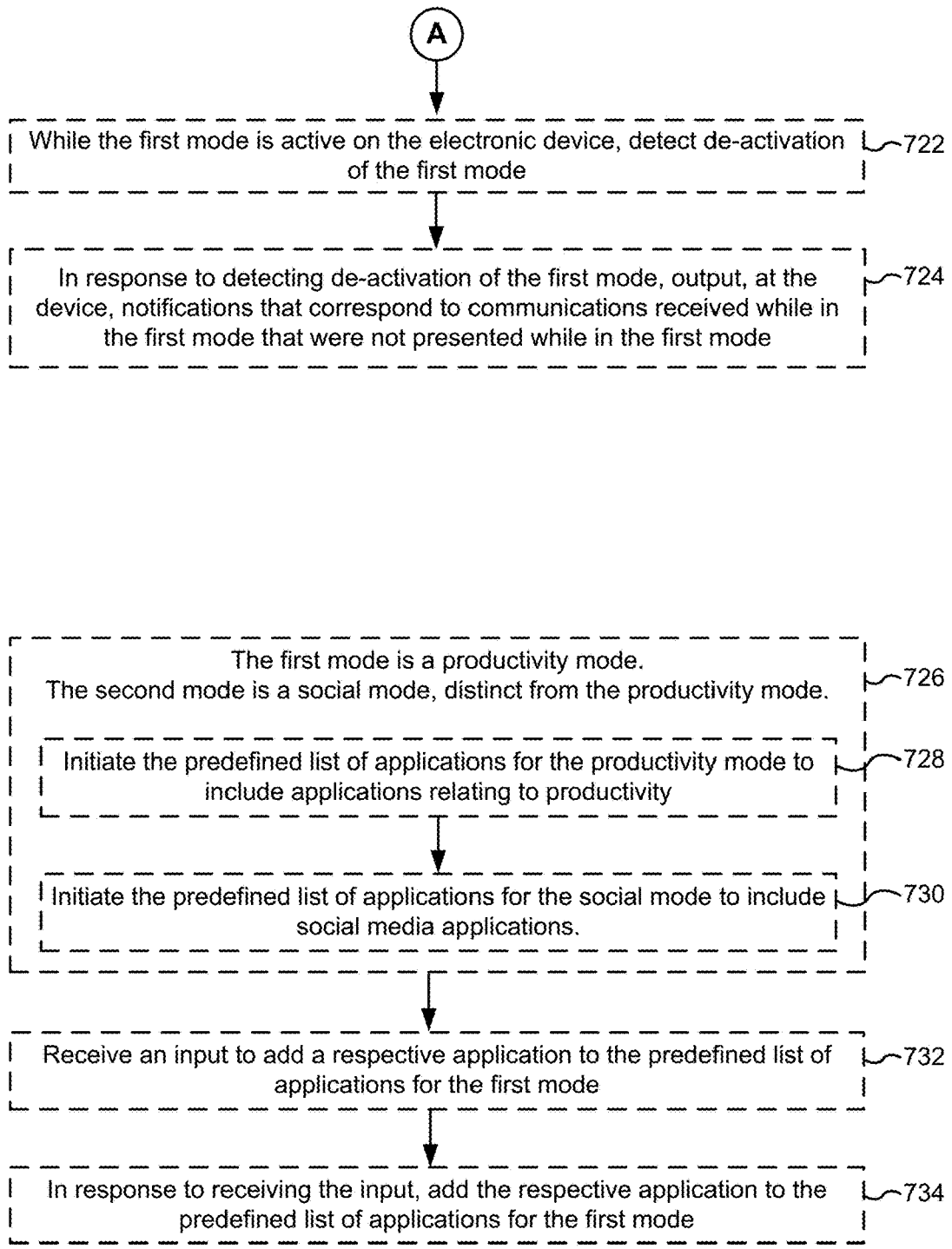
Figure 8B:
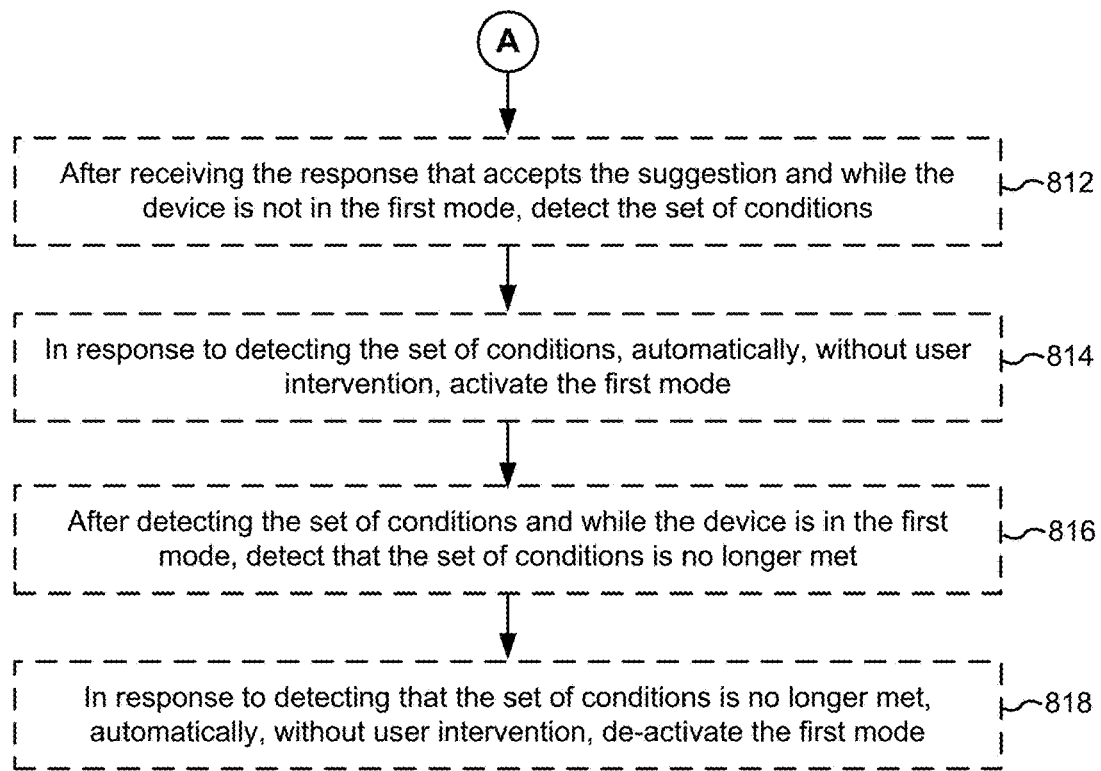
Figure 8C:
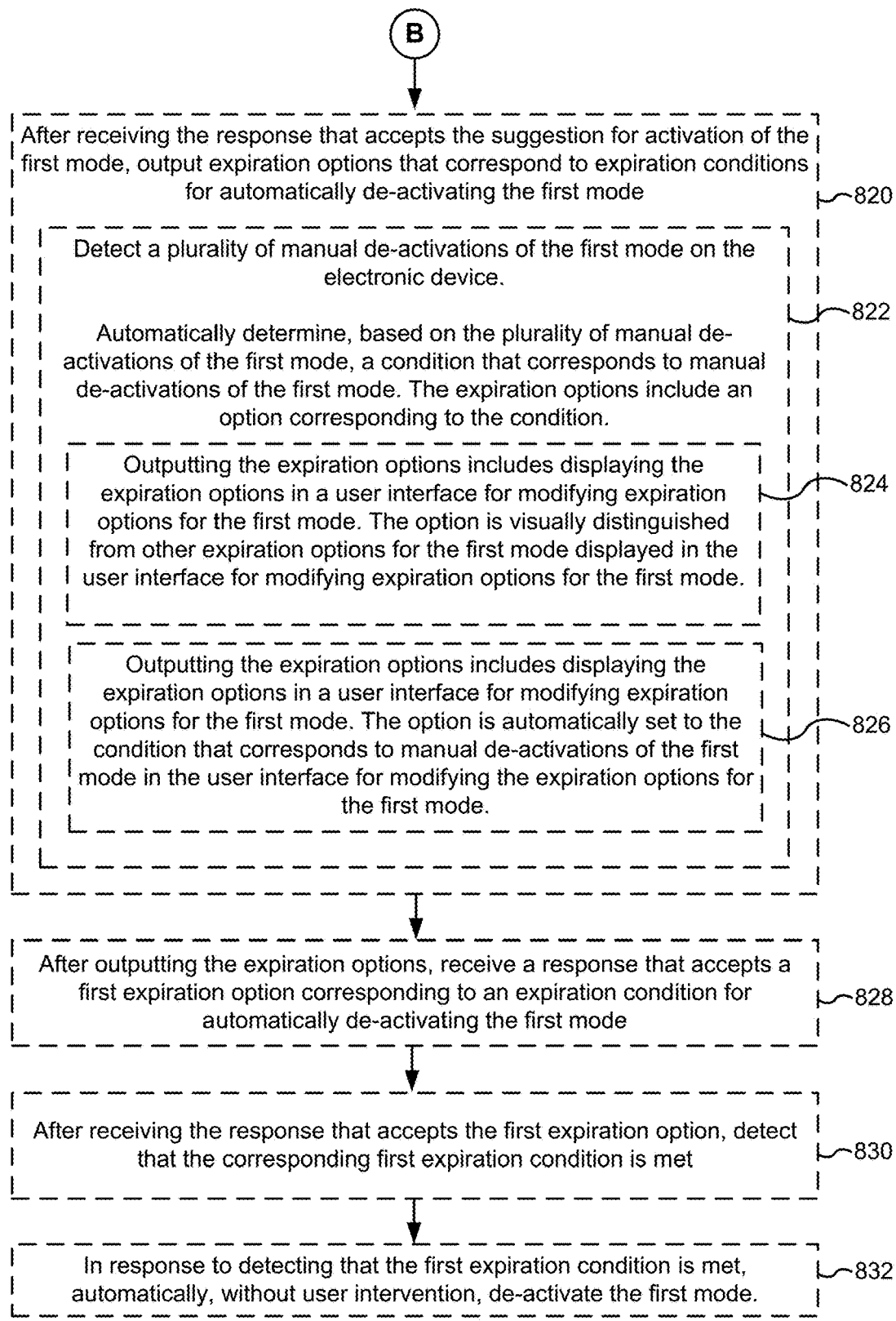
Figure 8D:
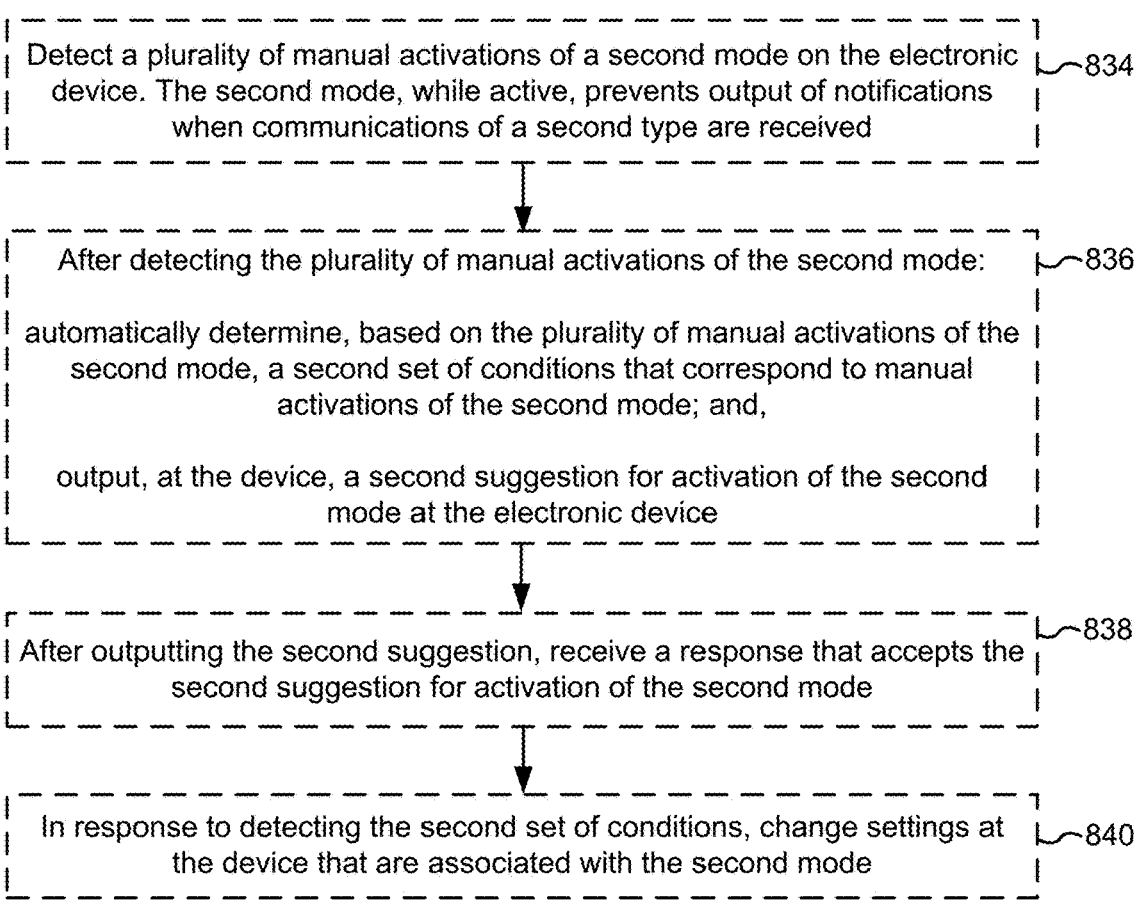
Figure 8E:
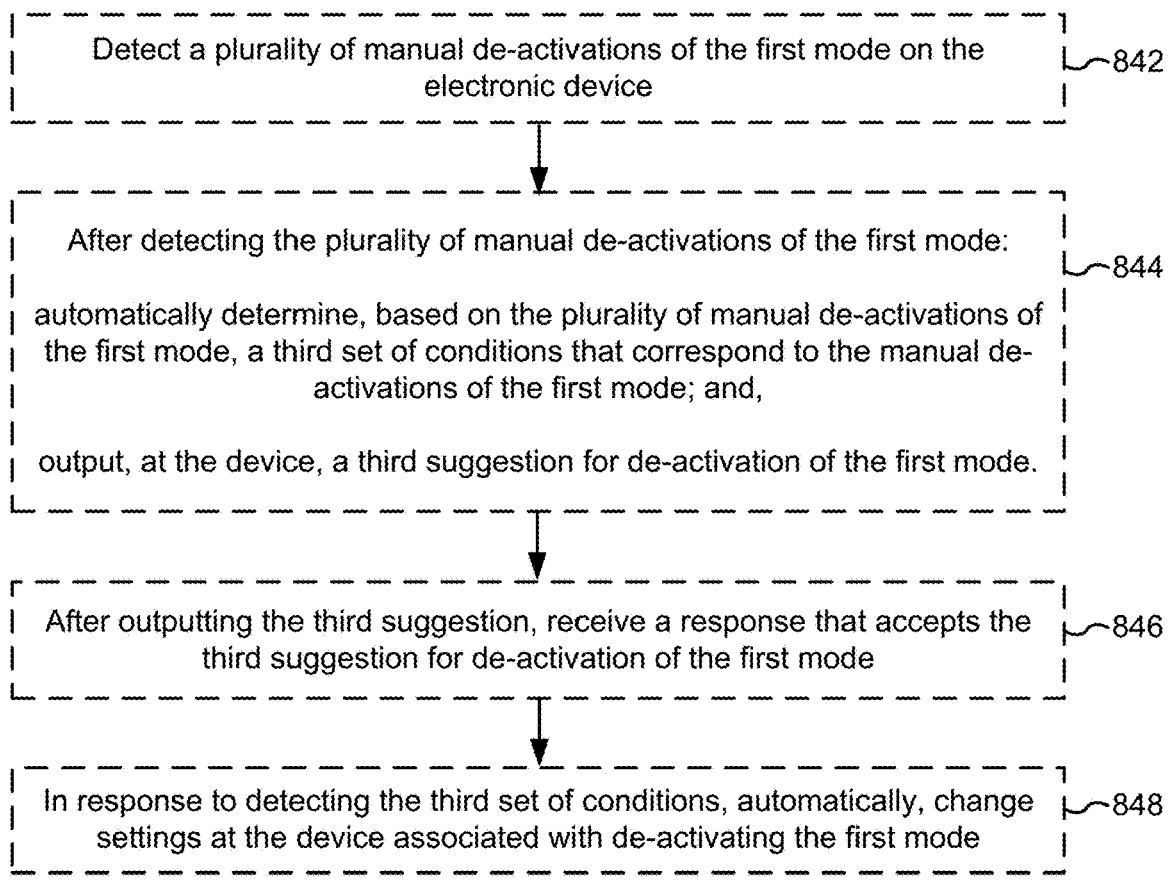
Figure 9A:
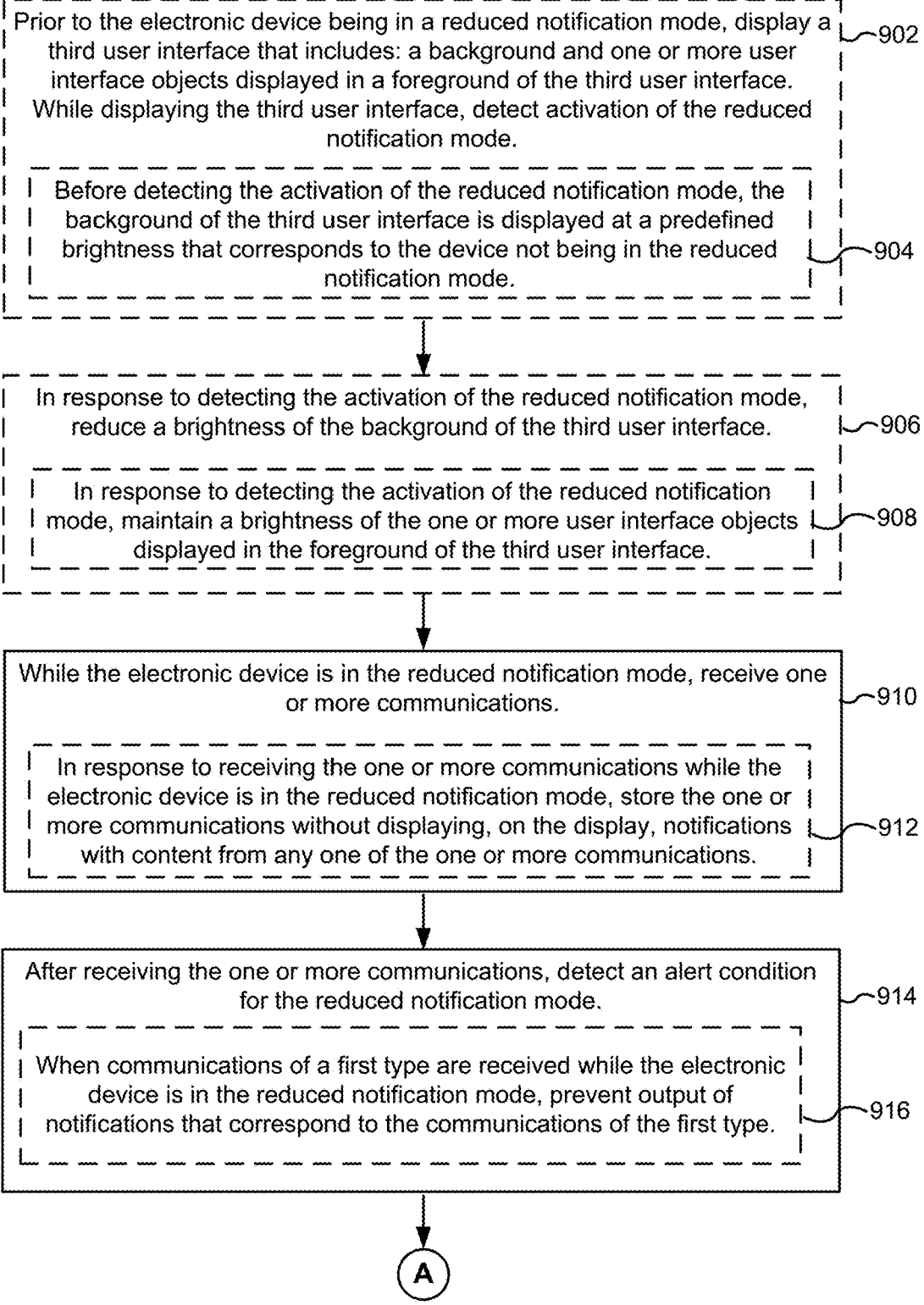
Figure 9B:
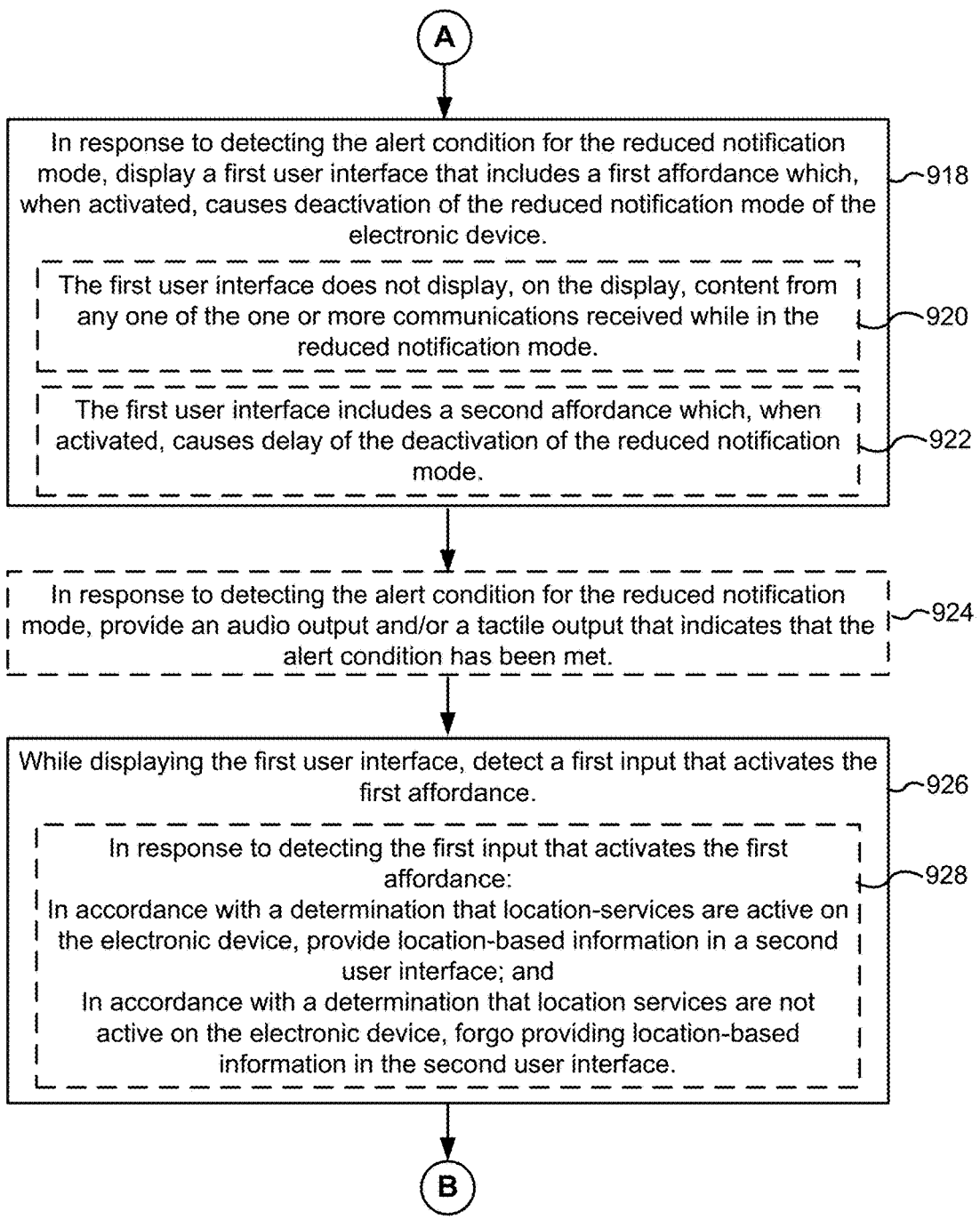
Figure 9D:
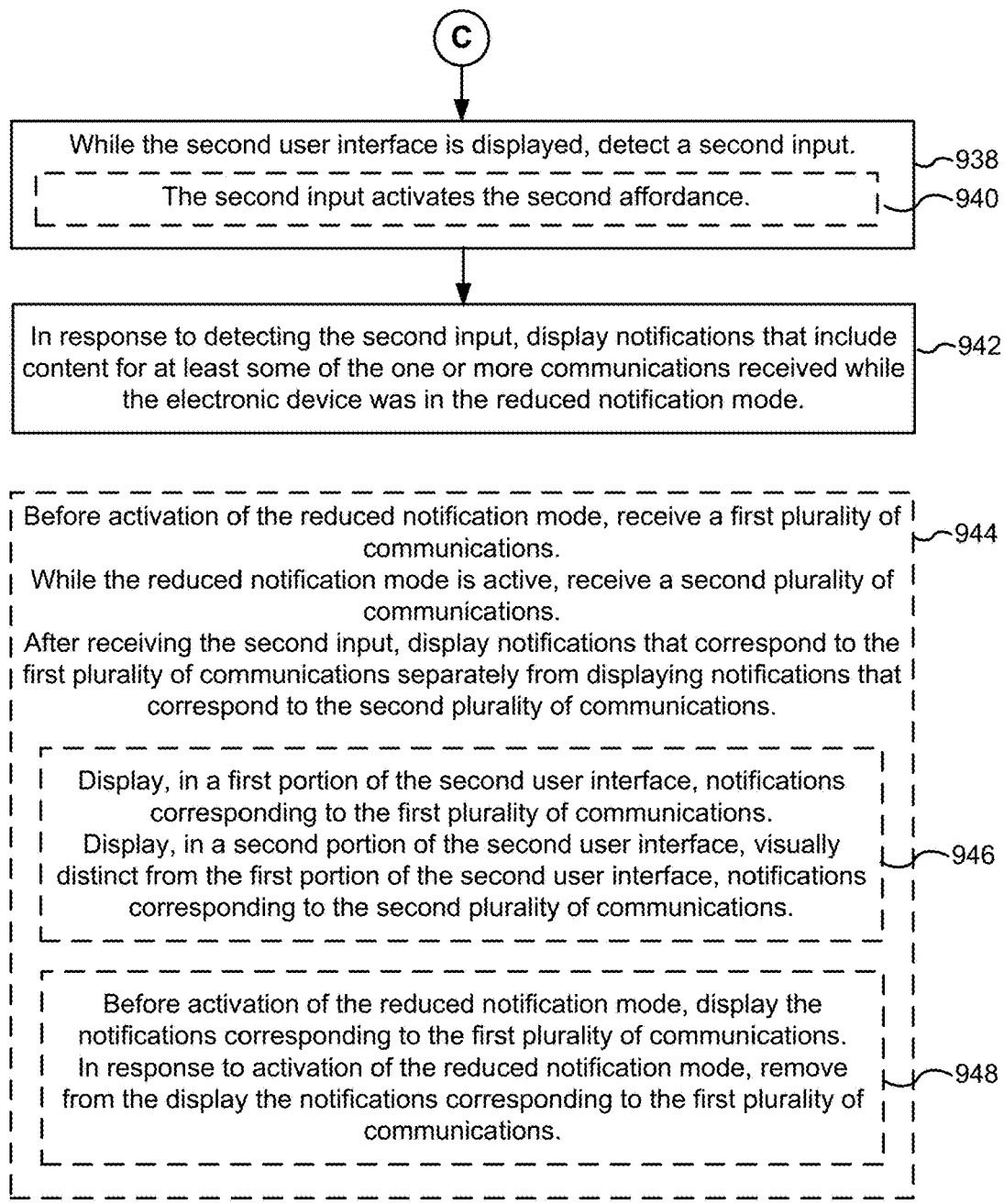

Below, FIGS. 1A-1B, 2, and 3 provide a description of example devices. FIGS. 5A-5BM illustrate example user interfaces for providing alerts (e.g., notifications) and adjusting alert settings on a device. FIGS. 6A-6E are flow diagrams illustrating a method of adjusting alert settings on an electronic device. FIGS. 7A-7C are flow diagrams illustrating a method of providing alerts (e.g., notifications) on an electronic device. FIGS. 8A-8E are flow diagrams illustrating a method of activating a reduced notification mode (e.g., a "do-not-disturb" mode) of an electronic device. FIGS. 9A-9D are flow diagrams illustrating a method of deactivating a first mode. The user interfaces in FIGS. 5A-5BM are used to illustrate the processes in FIGS. 6A-6E, 7A-7C, 8A-8E, and 9A-9D.

EXAMPLE DEVICES

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensities of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. In some embodiments, tactile output generator(s) 167 include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
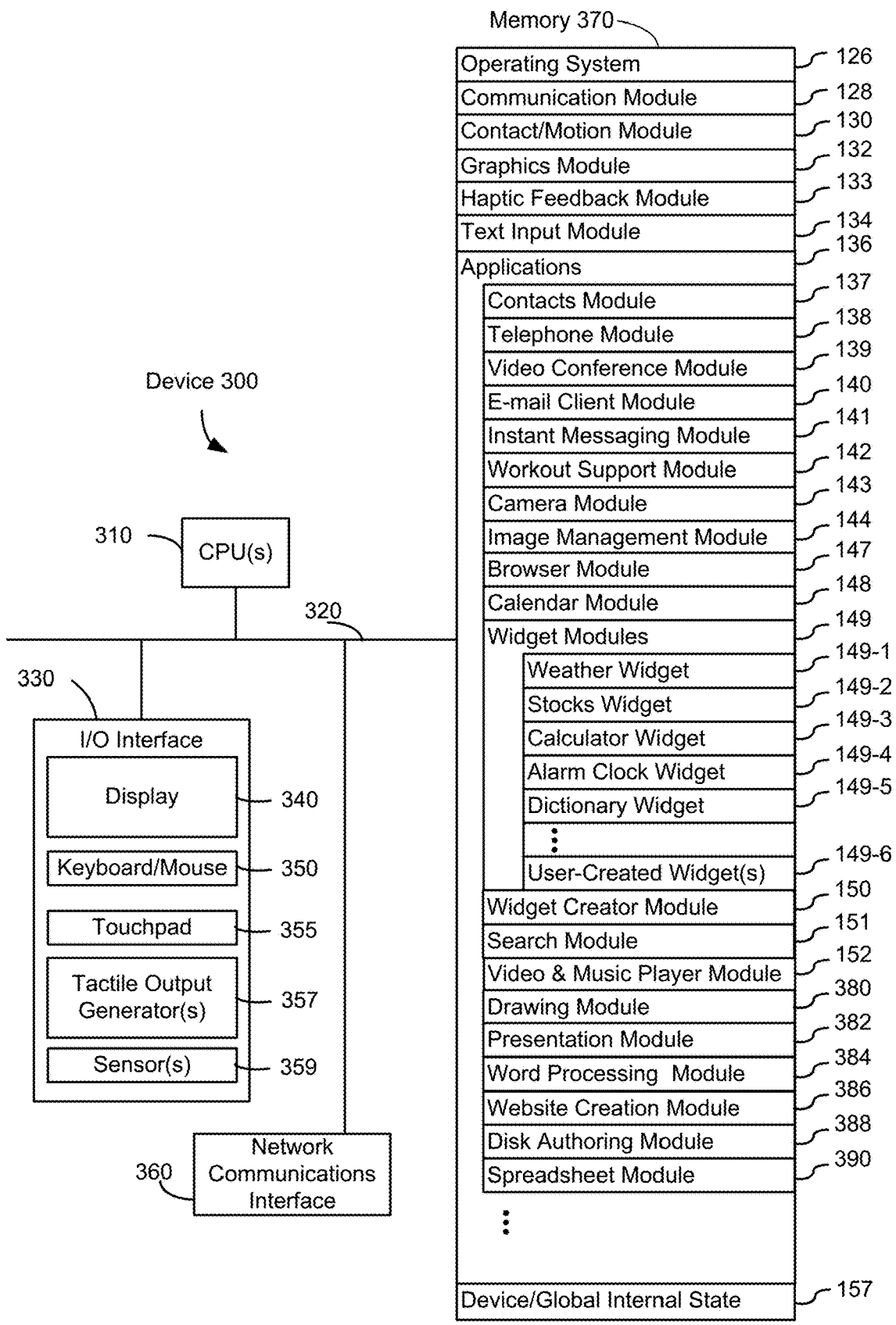
FIG. 3 is a block diagram of an example multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensity of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have criteria that are met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions (e.g., instructions used by haptic feedback controller 161) to produce tactile outputs using tactile output generator(s) 167 at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which is, optionally, made up of a video player module and a music player module;
  notes module 153;
  map module 154; and/or
  online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages, and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
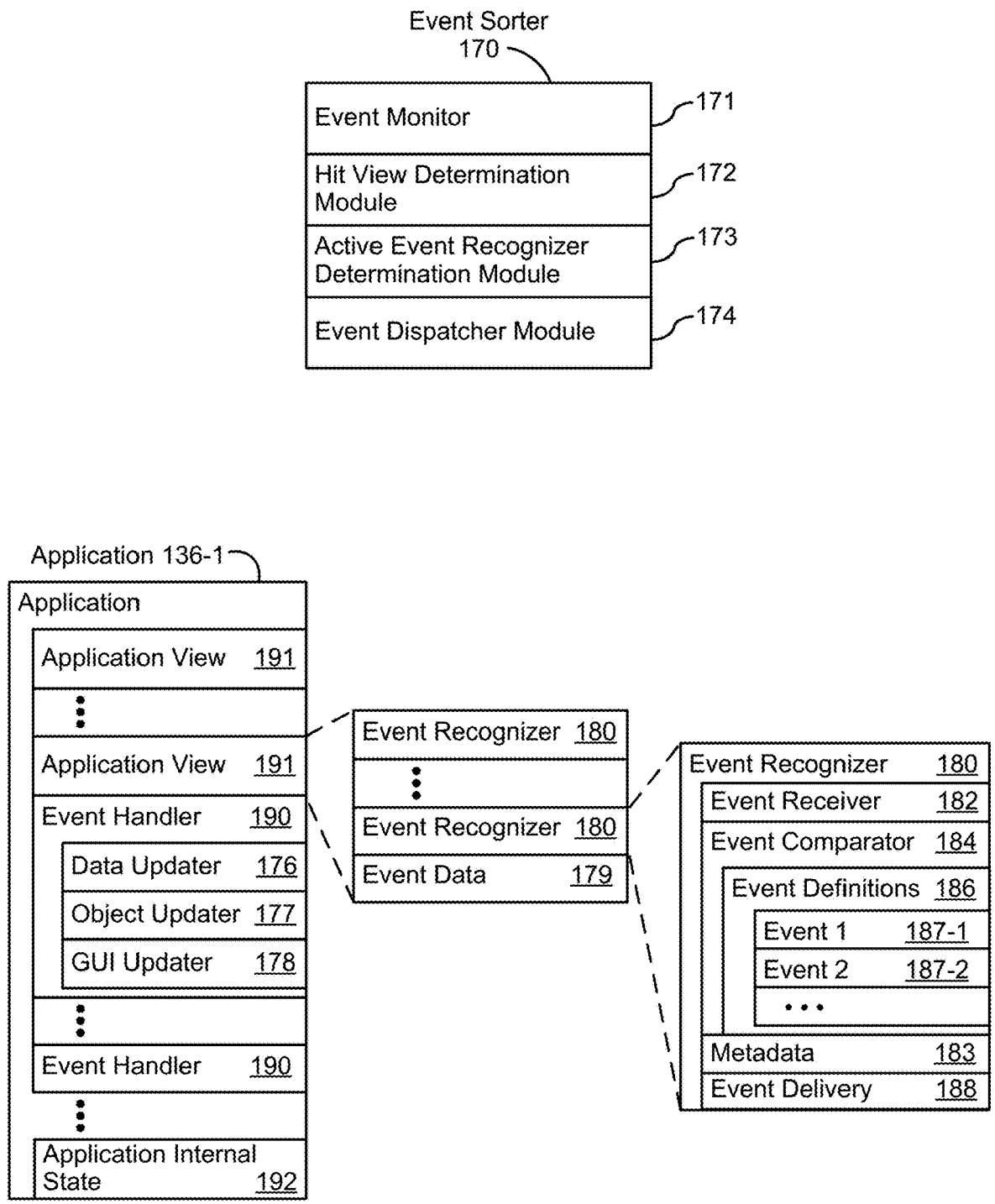
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video and music player module 152. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
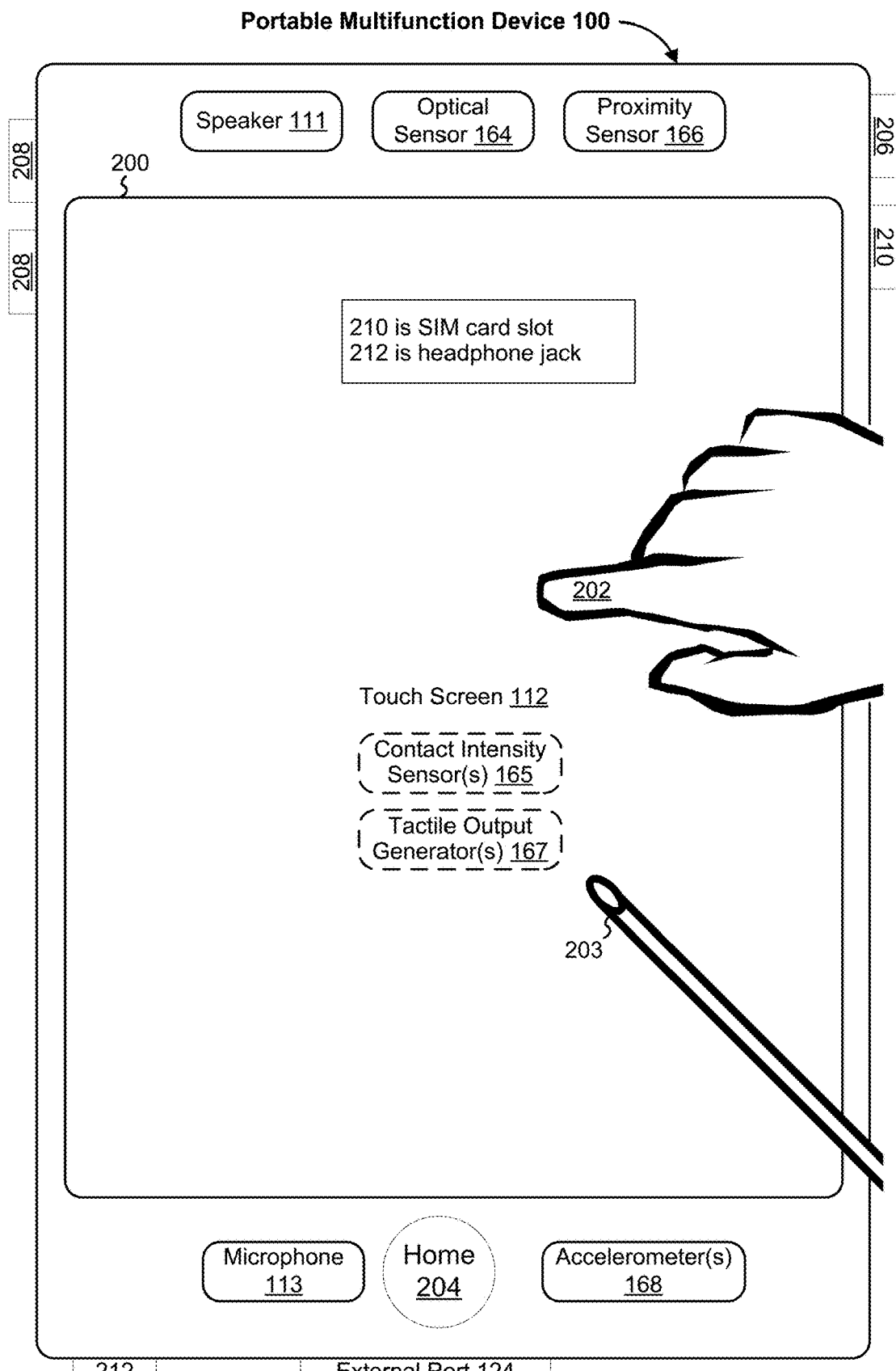
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on the touch screen display.

In some embodiments, device 100 includes the touch screen display, menu button 204 (sometimes called home button 204), push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensities of contacts on touch-sensitive display system 112 and/or one or more tactile output generators 167 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

Figure 4A:
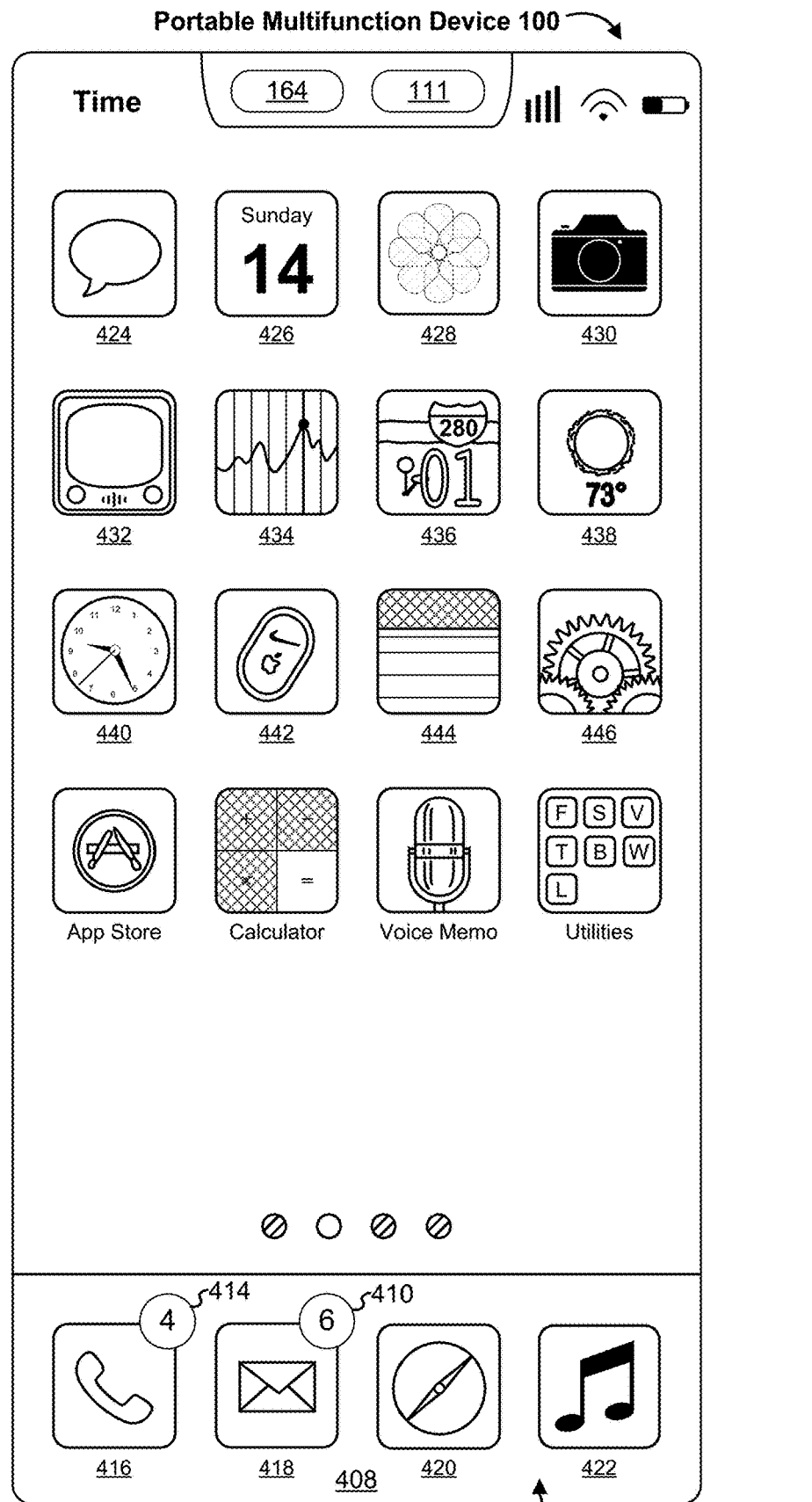
FIG. 4A illustrates an example user interface for a menu of applications on a portable multifunction device in accordance with some embodiments.

FIG. 4A illustrates an example user interface 400 for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) for wireless communication(s), such as cellular and Wi-Fi signals;
Time;
a Bluetooth indicator;
a Battery status indicator;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, labeled "Music;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, which provides access to settings for device 100 and its various applications 136.

It should be noted that the icon labels illustrated in FIG. 4A are merely examples. For example, other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
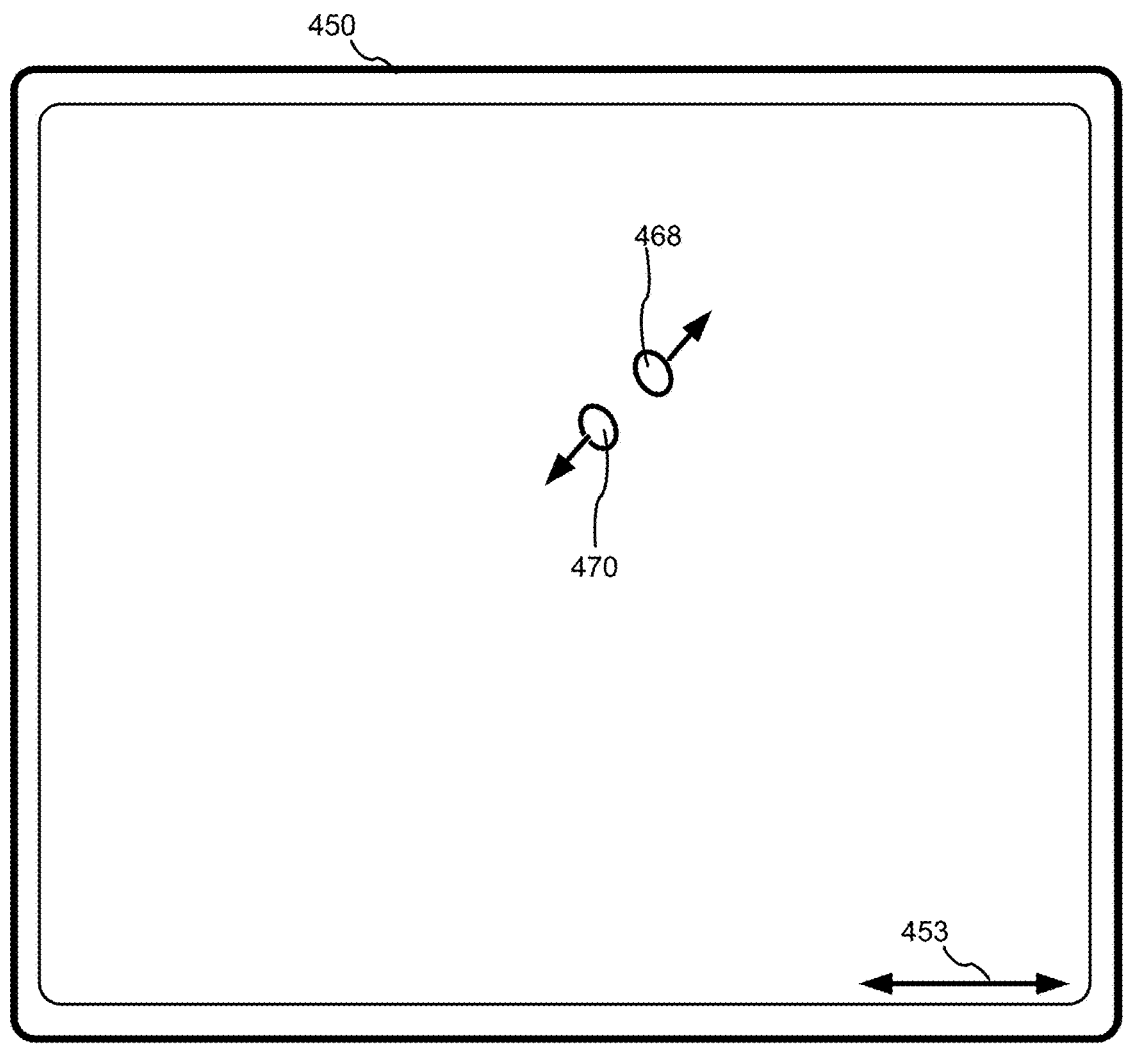
FIG. 4B illustrates an example user interface for a multifunction device with a touch-sensitive surface that is separate from the display in accordance with some embodiments.
Figure 4B:
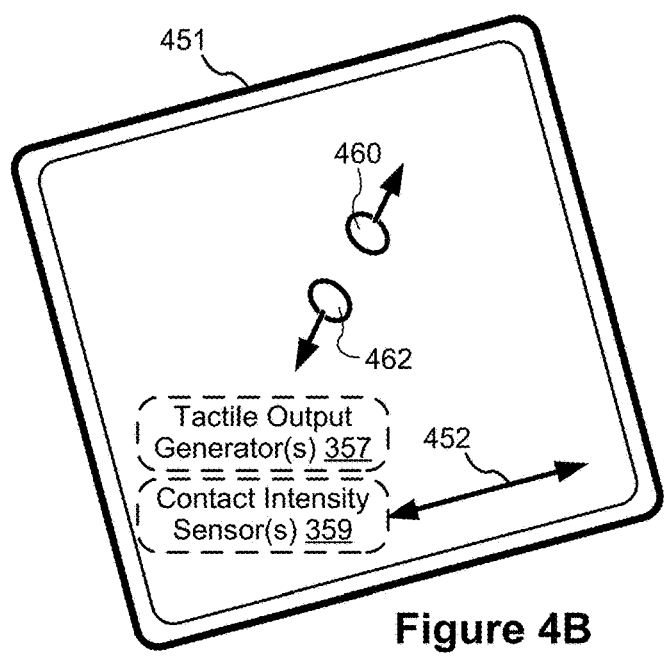

FIG. 4B illustrates an example user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch screen display (e.g., touch-sensitive display system 112 in FIG. 1A or the touch screen in FIG. 4A) that enables direct interaction with user interface elements on the touch screen display, a detected contact on the touch screen acts as a "focus selector," so that when an input (e.g., a press input by the contact) is detected on the touch screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds is determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, a value produced by low-pass filtering the intensity of the contact over a predefined period or starting at a predefined time, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds includes a first intensity threshold and a second intensity threshold. In this example, a contact with a characteristic intensity that does not exceed the first intensity threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface receives a continuous swipe contact transitioning from a start location and reaching an end location (e.g., a drag gesture), at which point the intensity of the contact increases. In this example, the characteristic intensity of the contact at the end location is based on only a portion of the continuous swipe contact, and not the entire swipe contact (e.g., only the portion of the swipe contact at the end location). In some embodiments, a smoothing algorithm is applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures described herein optionally include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$ (e.g., that is at least initially higher than $IT_L$), and/or one or more other intensity thresholds (e.g., an intensity threshold $IT_H$ that is lower than $IT_L$)). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms (milliseconds) in duration (e.g., 40, 100, or 120 ms, depending on the magnitude of the second intensity threshold, with the delay time increasing as the second intensity threshold increases). This delay time helps to avoid accidental recognition of deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

Figure 4C:
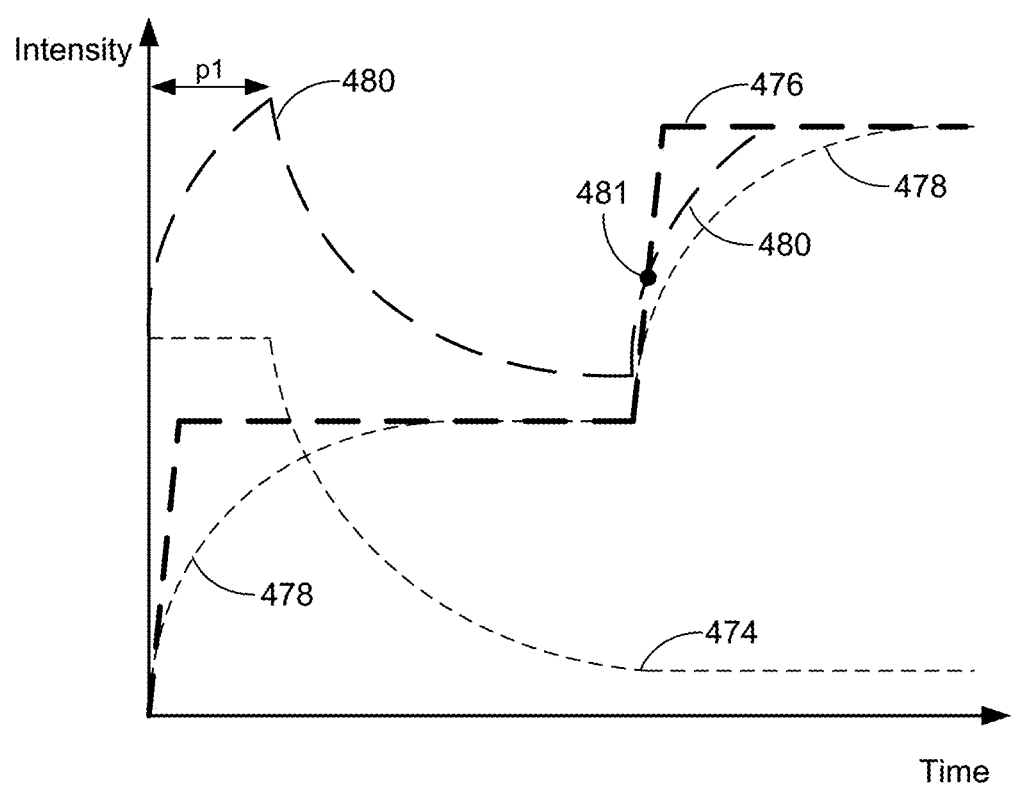
FIGS. 4C-4E illustrate examples of dynamic intensity thresholds in accordance with some embodiments.

For example, FIG. 4C illustrates a dynamic intensity threshold 480 that changes over time based in part on the intensity of touch input 476 over time. Dynamic intensity threshold 480 is a sum of two components, first component 474 that decays over time after a predefined delay time p1 from when touch input 476 is initially detected, and second component 478 that trails the intensity of touch input 476 over time. The initial high intensity threshold of first component 474 reduces accidental triggering of a "deep press" response, while still allowing an immediate "deep press" response if touch input 476 provides sufficient intensity. Second component 478 reduces unintentional triggering of a "deep press" response by gradual intensity fluctuations of in a touch input. In some embodiments, when touch input 476 satisfies dynamic intensity threshold 480 (e.g., at point 481 in FIG. 4C), the "deep press" response is triggered.

Figure 4D:
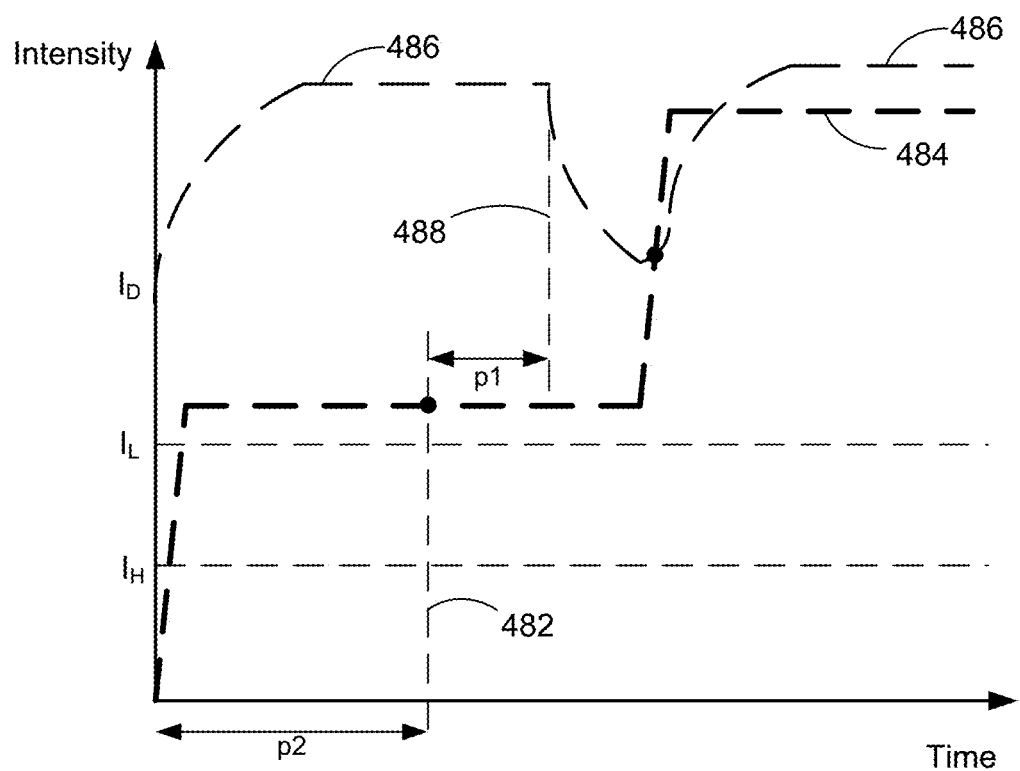

FIG. 4D illustrates another dynamic intensity threshold 486 (e.g., intensity threshold $I_D$). FIG. 4D also illustrates two other intensity thresholds: a first intensity threshold $I_H$ and a second intensity threshold $I_L$. In FIG. 4D, although touch input 484 satisfies the first intensity threshold $I_H$ and the second intensity threshold $I_L$ prior to time p2, no response is provided until delay time p2 has elapsed at time 482. Also in FIG. 4D, dynamic intensity threshold 486 decays over time, with the decay starting at time 488 after a predefined delay time p1 has elapsed from time 482 (when the response associated with the second intensity threshold $I_L$ was triggered). This type of dynamic intensity threshold reduces accidental triggering of a response associated with the dynamic intensity threshold $I_D$ immediately after, or concurrently with, triggering a response associated with a lower intensity threshold, such as the first intensity threshold $I_H$ or the second intensity threshold $I_L$.

Figure 4E:
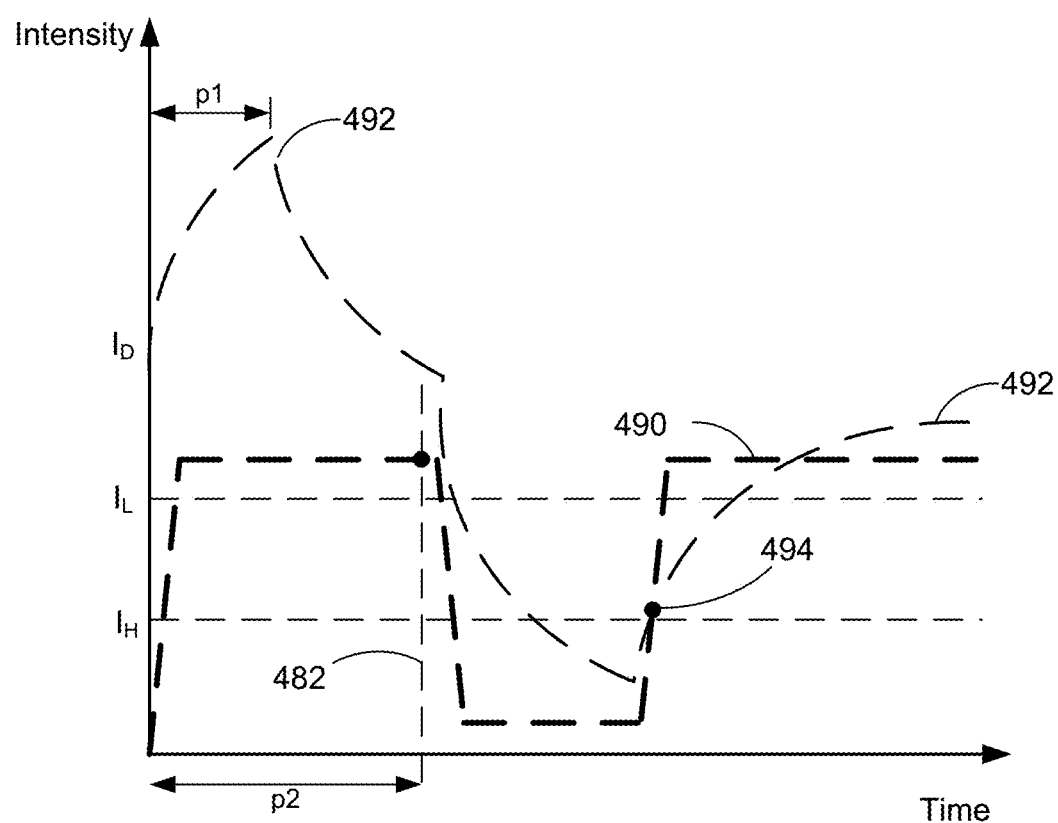

FIG. 4E illustrate yet another dynamic intensity threshold 492 (e.g., intensity threshold $I_D$). In FIG. 4E, a response associated with the intensity threshold $I_L$ is triggered after the delay time p2 has elapsed from when touch input 490 is initially detected. Concurrently, dynamic intensity threshold 492 decays after the predefined delay time p1 has elapsed from when touch input 490 is initially detected. So a decrease in intensity of touch input 490 after triggering the response associated with the intensity threshold $I_L$, followed by an increase in the intensity of touch input 490, without releasing touch input 490, can trigger a response associated with the intensity threshold $IT_D$ (e.g., at time 494) even when the intensity of touch input 490 is below another intensity threshold, for example, the intensity threshold $I_L$.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a tactile output pattern specifies characteristics of a tactile output, such as the amplitude of the tactile output, the shape of a movement waveform of the tactile output, the frequency of the tactile output, and/or the duration of the tactile output.

When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device. Thus, the waveform, frequency and amplitude can be adjusted to indicate to the user that different operations have been performed. As such, tactile outputs with tactile output patterns that are designed, selected, and/or engineered to simulate characteristics (e.g., size, material, weight, stiffness, smoothness, etc.); behaviors (e.g., oscillation, displacement, acceleration, rotation, expansion, etc.); and/or interactions (e.g., collision, adhesion, repulsion, attraction, friction, etc.) of objects in a given environment (e.g., a user interface that includes graphical features and objects, a simulated physical environment with virtual boundaries and virtual objects, a real physical environment with physical boundaries and physical objects, and/or a combination of any of the above) will, in some circumstances, provide helpful feedback to users that reduces input errors and increases the efficiency of the user's operation of the device. Additionally, tactile outputs are, optionally, generated to correspond to feedback that is unrelated to a simulated physical characteristic, such as an input threshold or a selection of an object. Such tactile outputs will, in some circumstances, provide helpful feedback to users that reduces input errors and increases the efficiency of the user's operation of the device.

In some embodiments, a tactile output with a suitable tactile output pattern serves as a cue for the occurrence of an event of interest in a user interface or behind the scenes in a device. Examples of the events of interest include activation of an affordance (e.g., a real or virtual button, or toggle switch) provided on the device or in a user interface, success or failure of a requested operation, reaching or crossing a boundary in a user interface, entry into a new state, switching of input focus between objects, activation of a new mode, reaching or crossing an input threshold, detection or recognition of a type of input or gesture, etc. In some embodiments, tactile outputs are provided to serve as a warning or an alert for an impending event or outcome that would occur unless a redirection or interruption input is timely detected. Tactile outputs are also used in other contexts to enrich the user experience, improve the accessibility of the device to users with visual or motor difficulties or other accessibility needs, and/or improve efficiency and functionality of the user interface and/or the device. Tactile outputs are optionally accompanied with audio outputs and/or visible user interface changes, which further enhance a user's experience when the user interacts with a user interface and/or the device, and facilitate better conveyance of information regarding the state of the user interface and/or the device, and which reduce input errors and increase the efficiency of the user's operation of the device.

USER INTERFACES AND ASSOCIATED PROCESSES

Attention is now directed towards embodiments of user interfaces ("UI") and associated processes that are implemented on an electronic device, such as portable multifunction device 100 or device 300, with a display, a touch-sensitive surface, (optionally) one or more tactile output generators for generating tactile outputs, and (optionally) one or more sensors to detect intensities of contacts with the touch-sensitive surface.

FIGS. 5A-5AY illustrate example user interfaces for providing alerts (e.g., notifications) and adjusting alert settings on a device, in accordance with some embodiments. The user interfaces in these figures are used to illustrate the processes described below, including the processes in FIGS. 6A-6E, 7A-7C, and 8A-8E. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

Figure 5C:
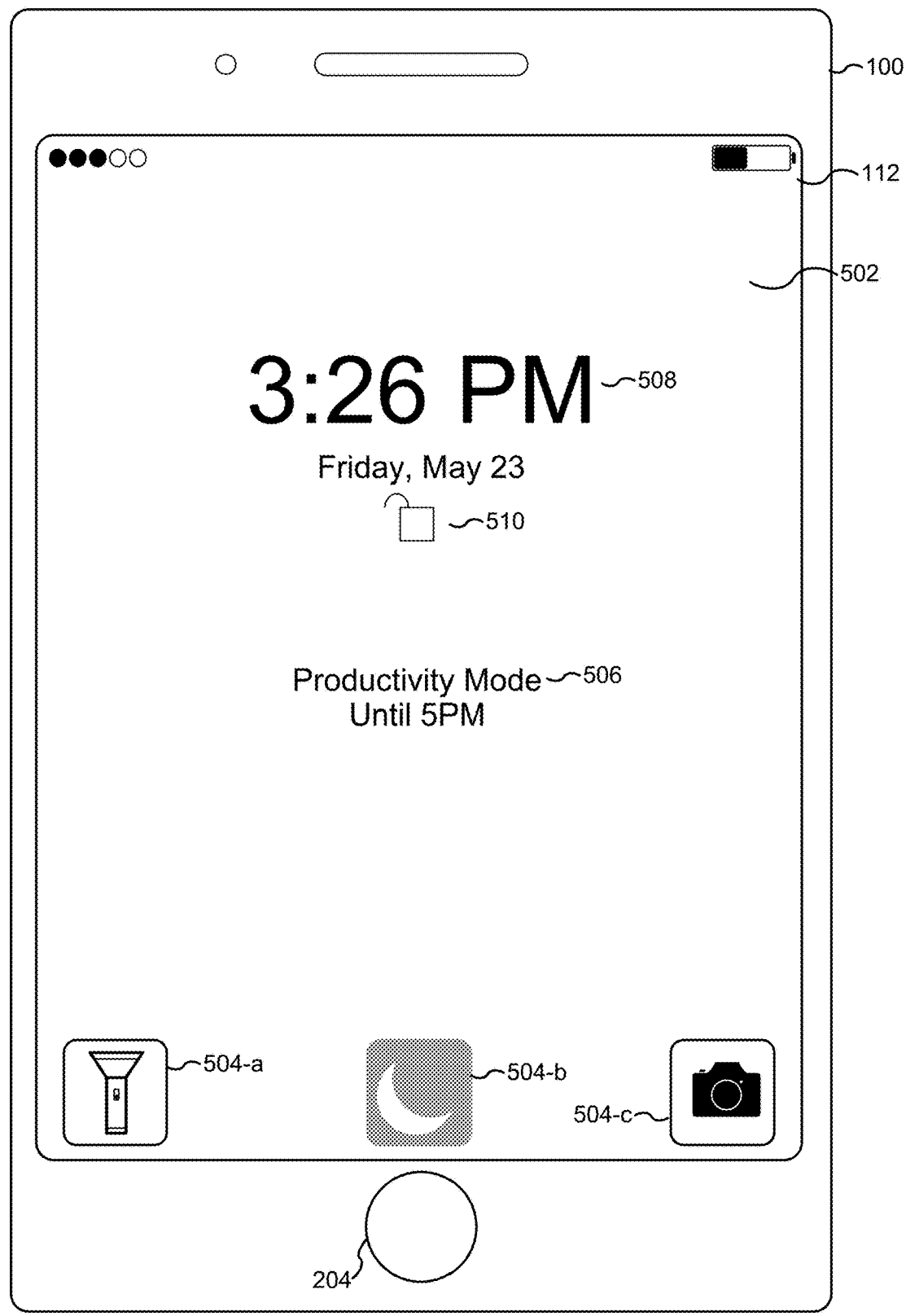
Figure 5D:
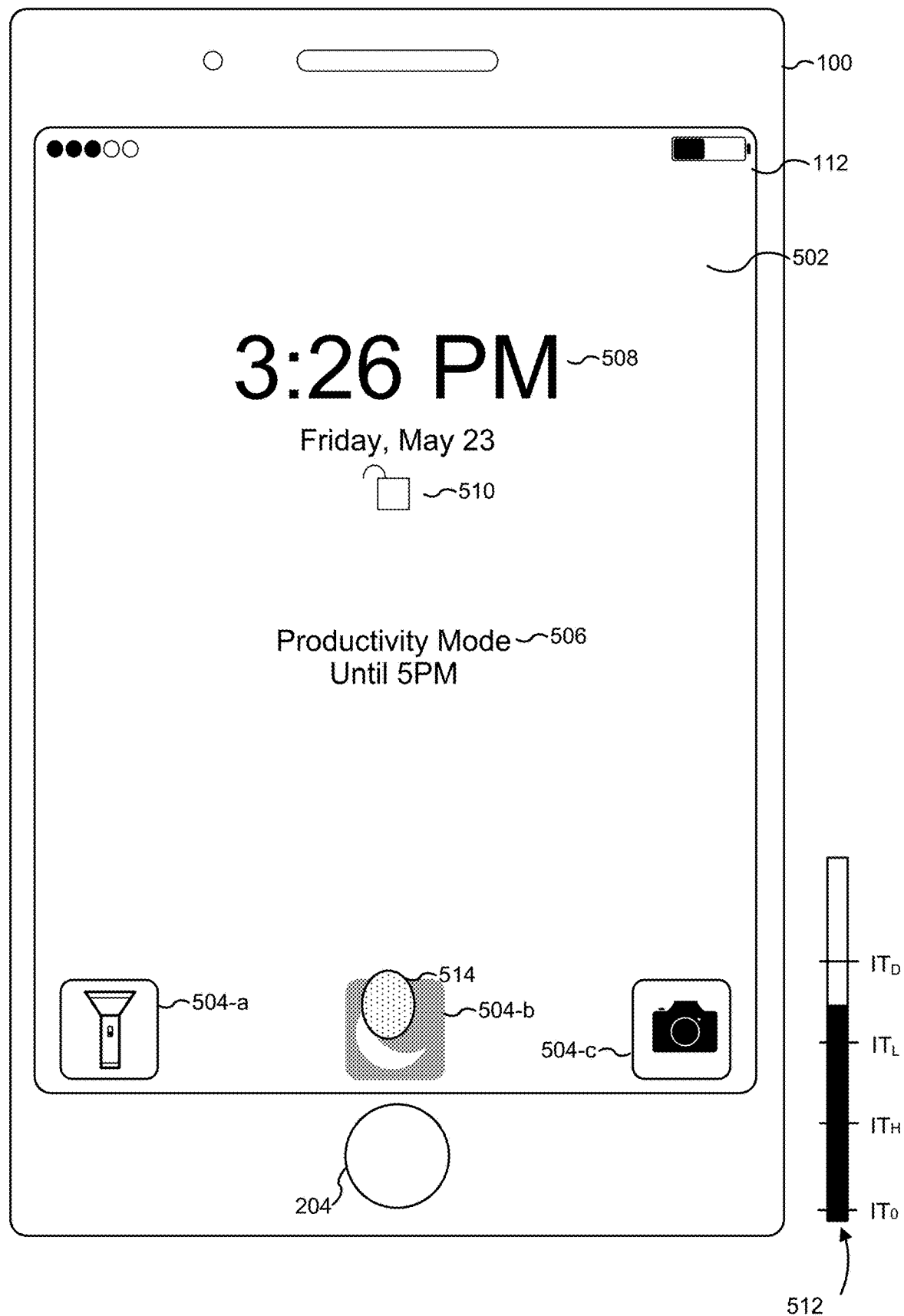
Figure 5E:
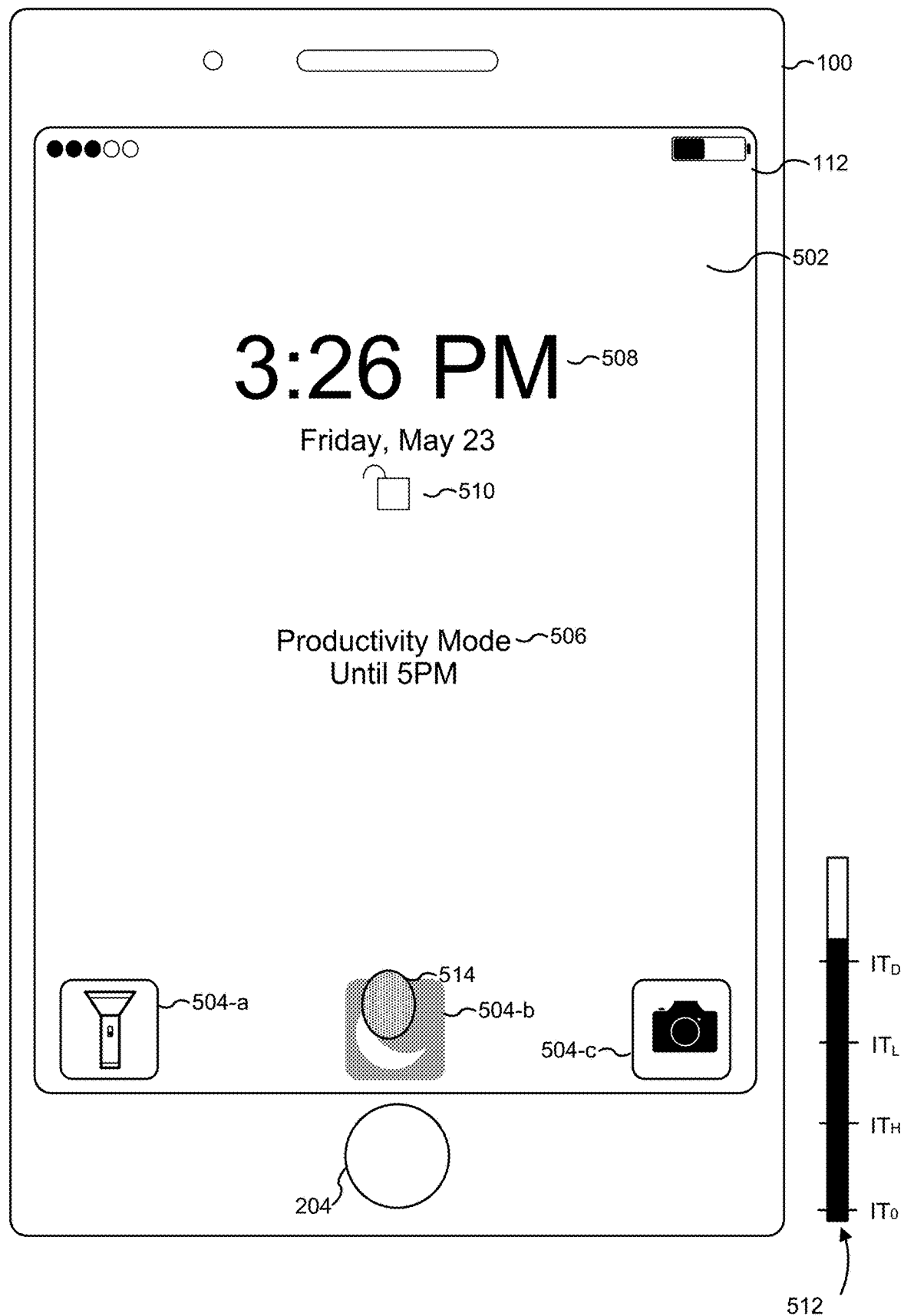
Figure 5F:
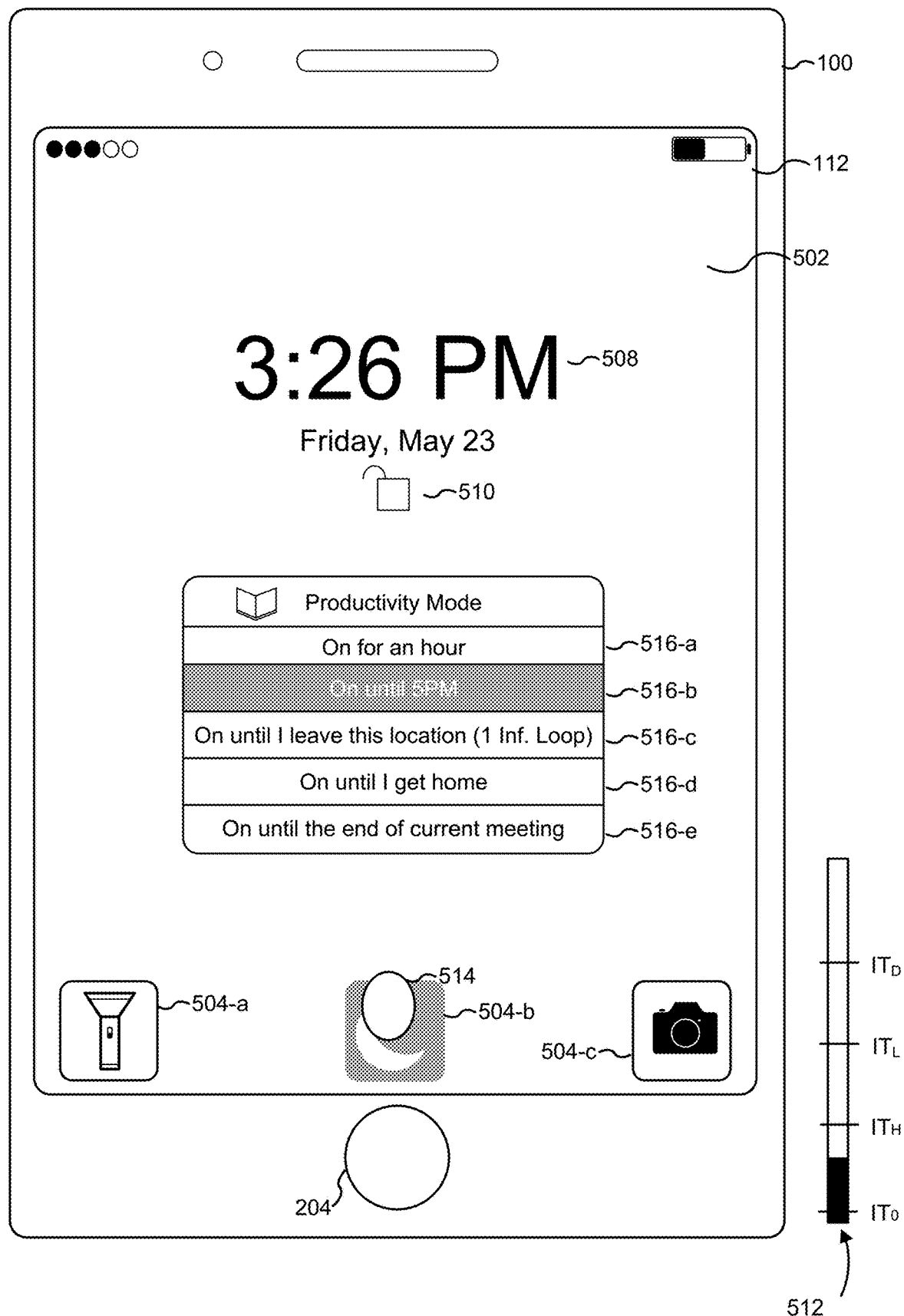
Figure 5G:
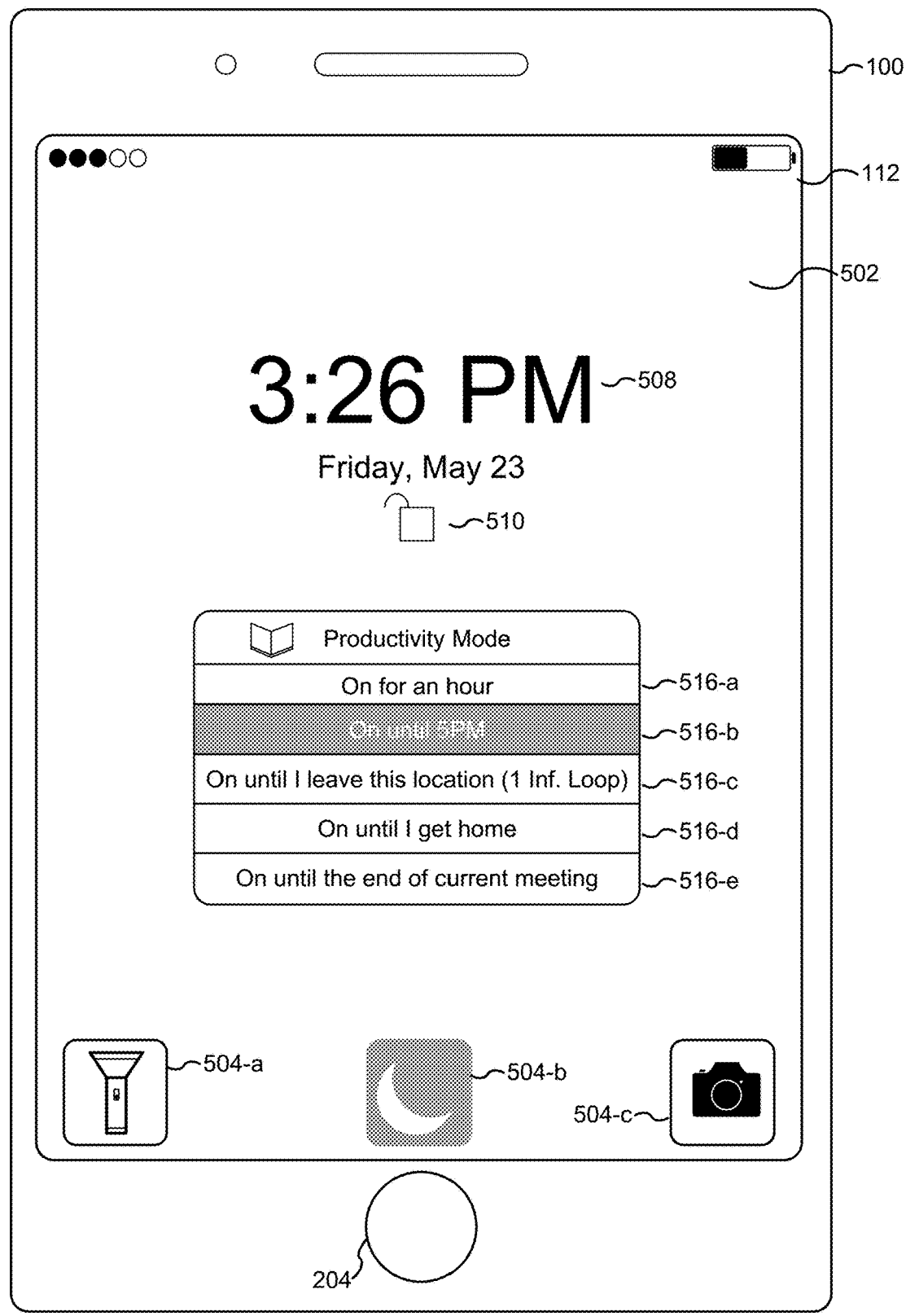
Figure 5H:
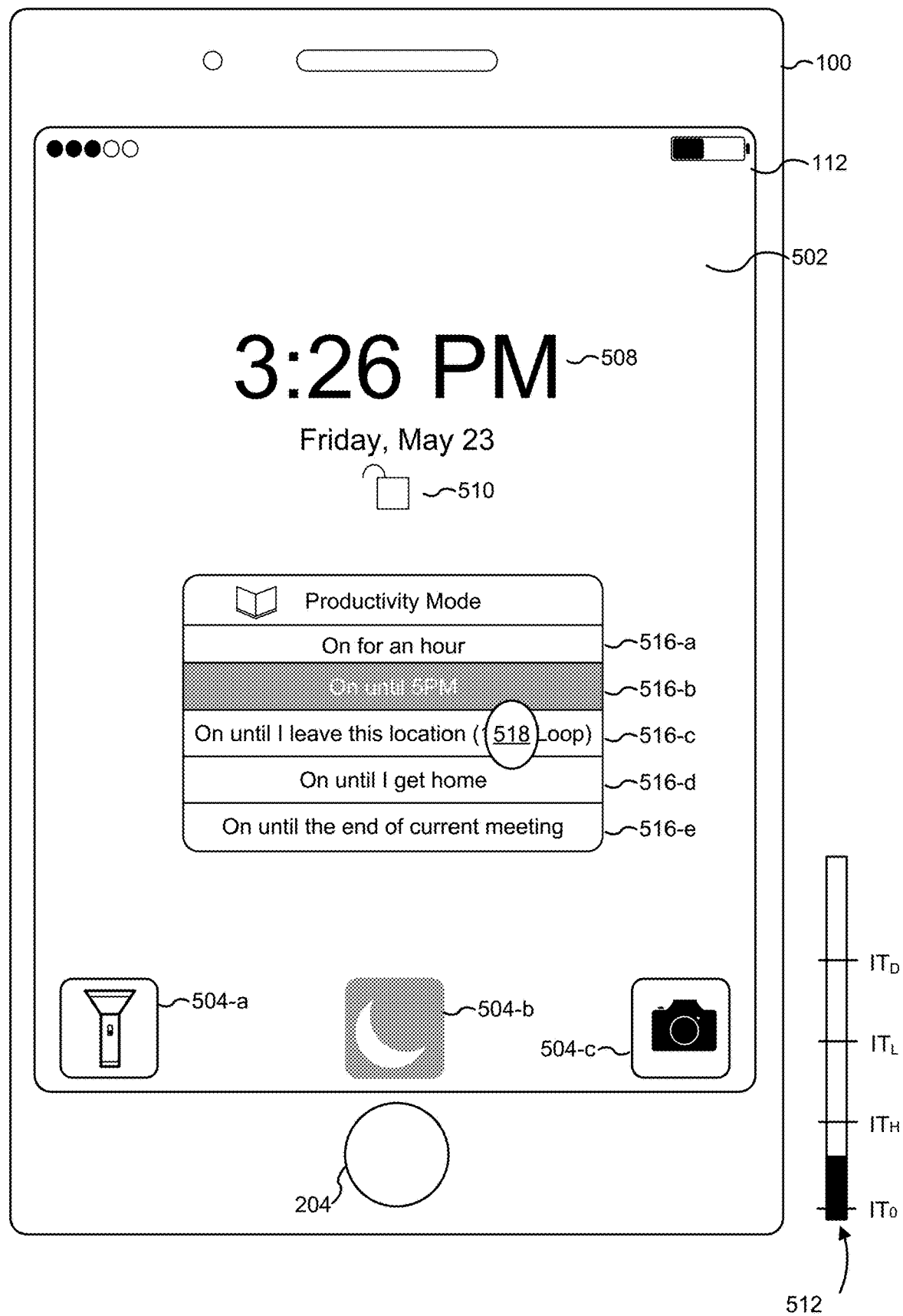
Figure 5I:
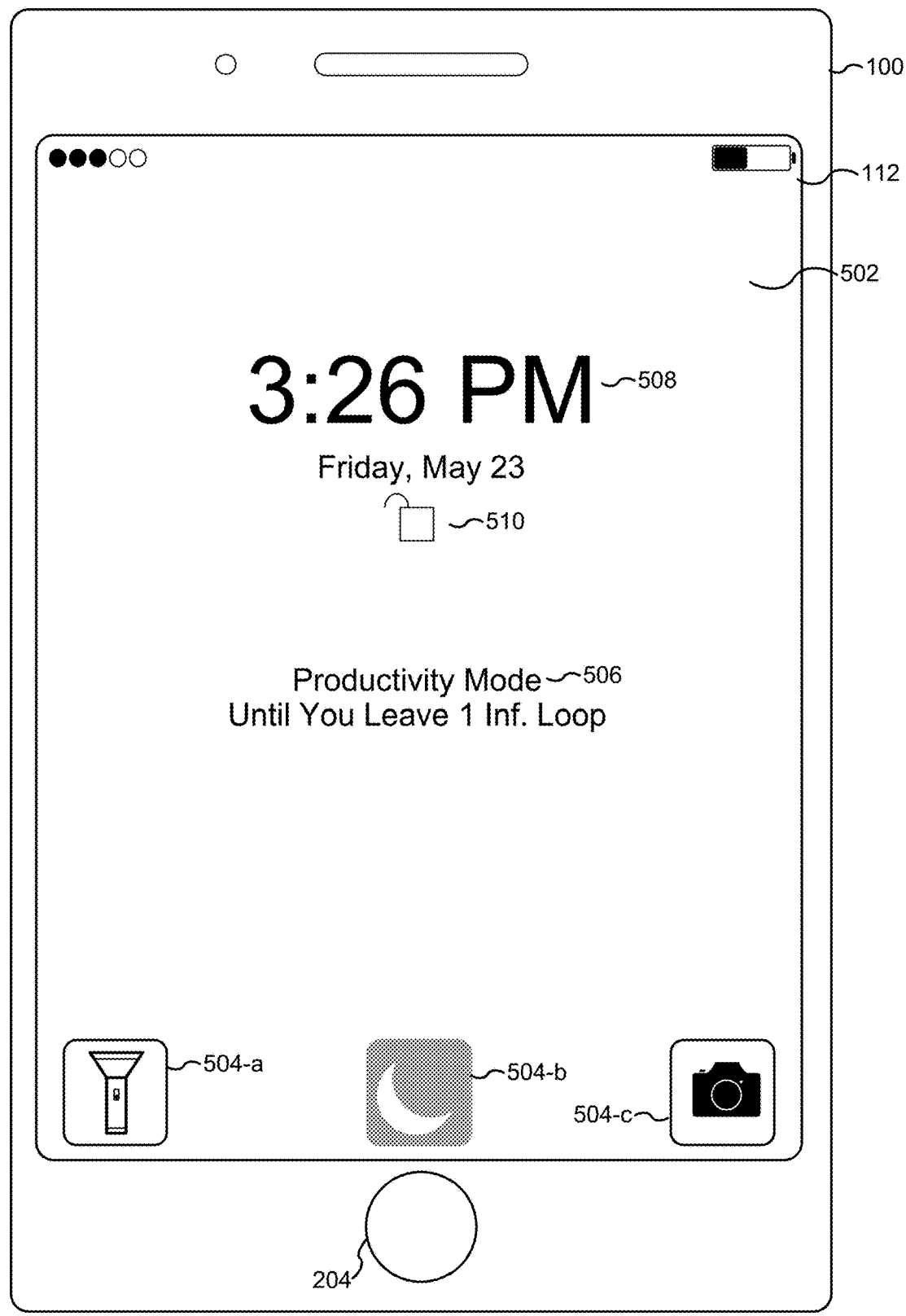
Figure 5J:
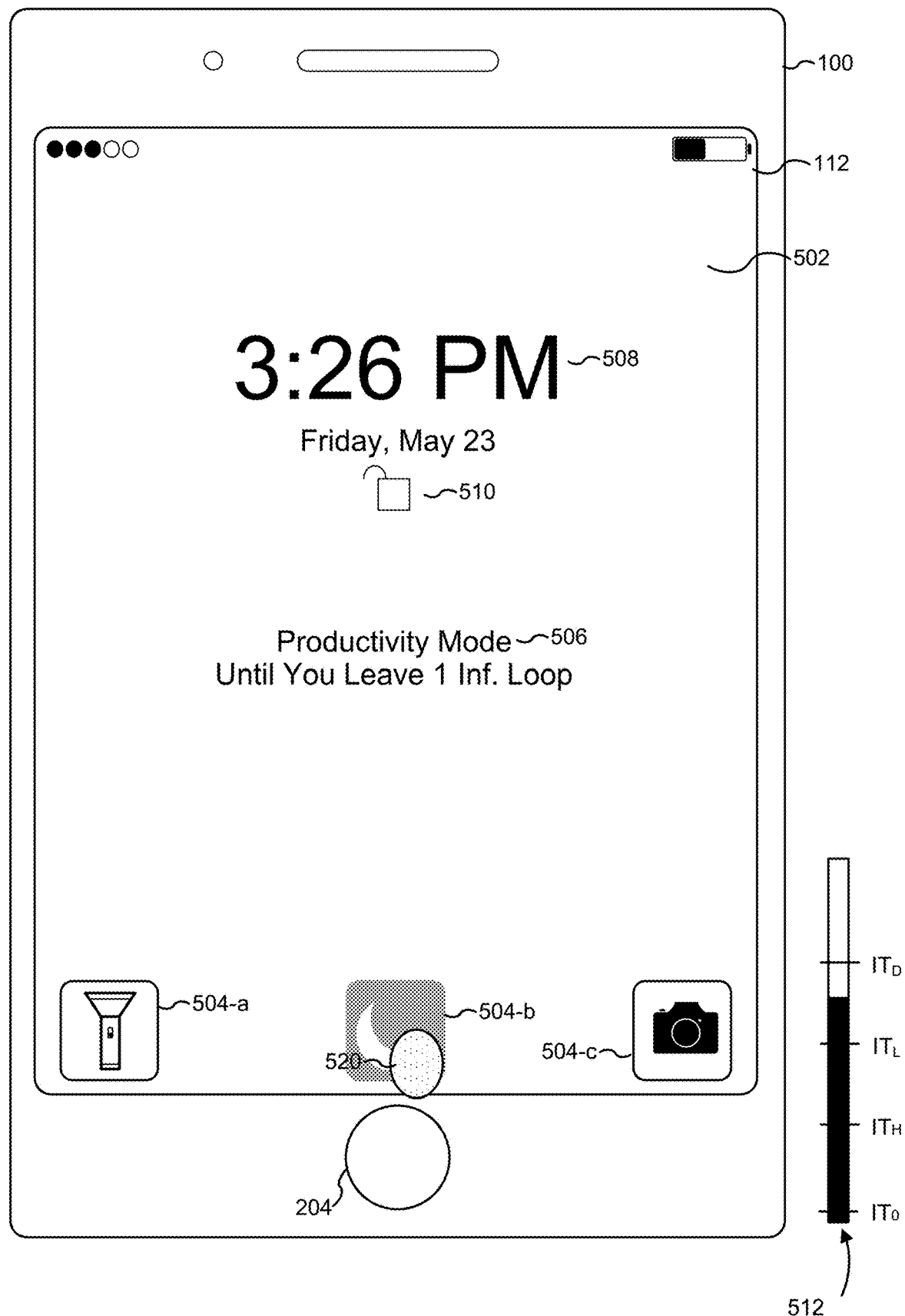
Figure 5K:
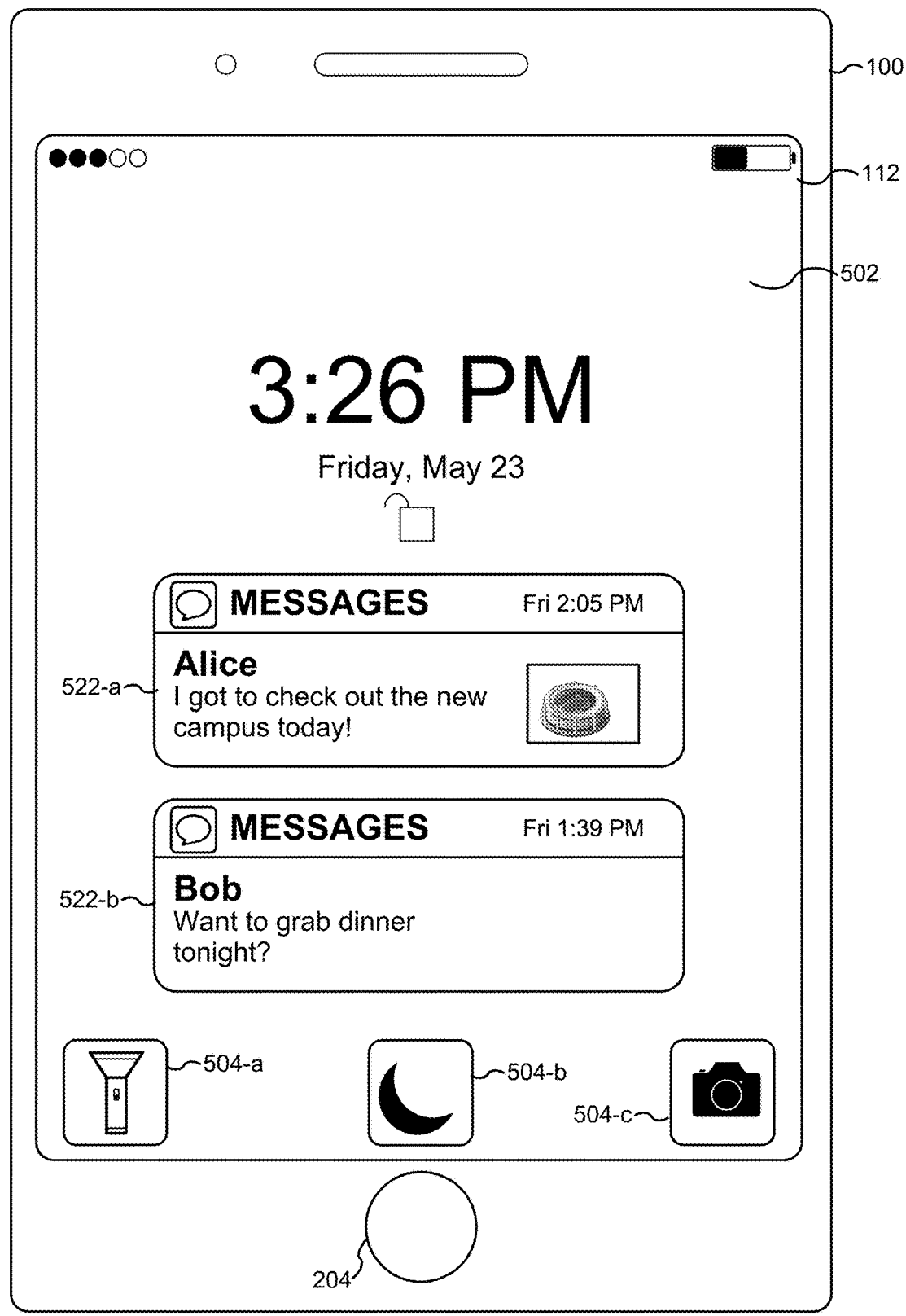
Figure 5L:
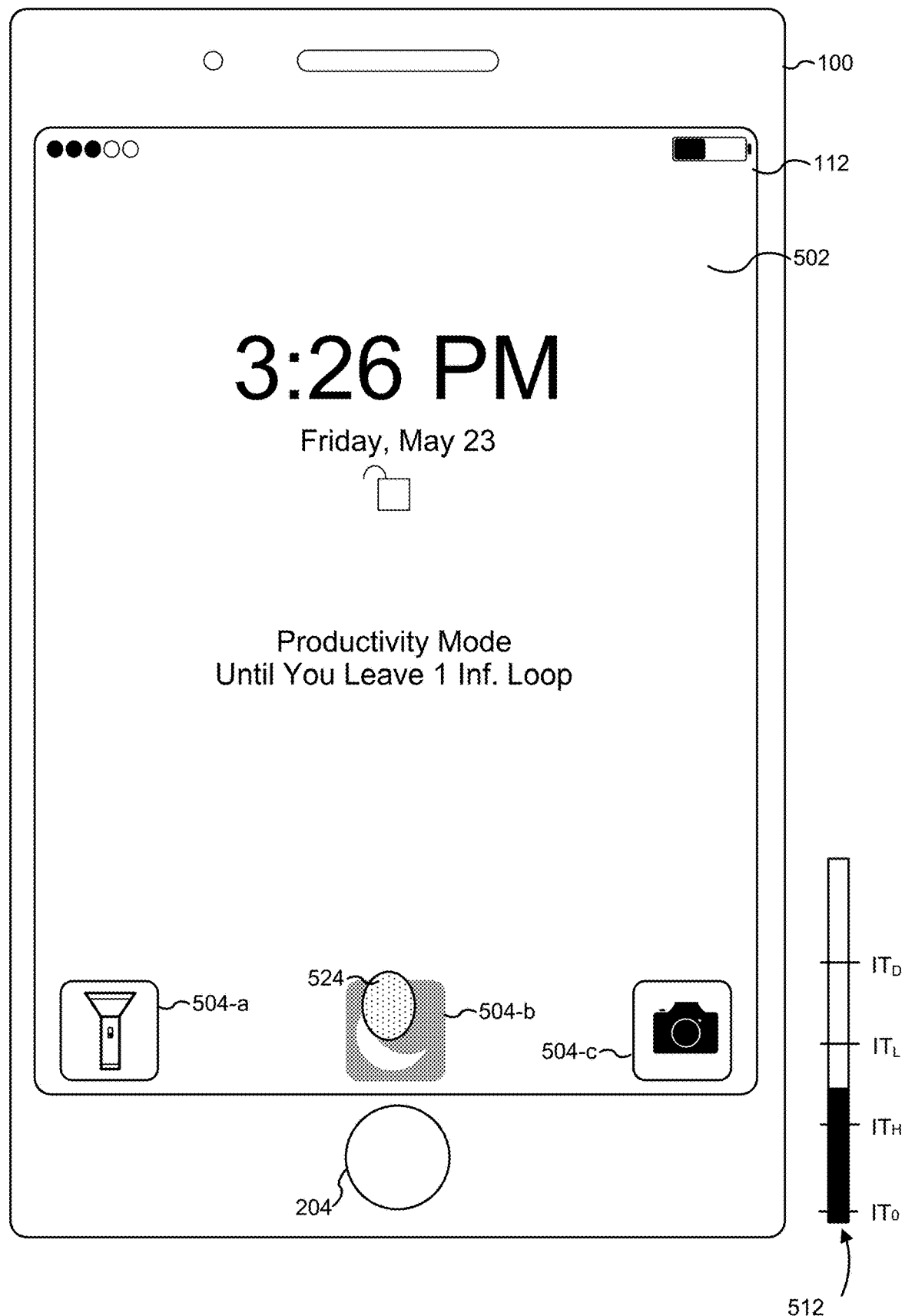
Figure 5M:
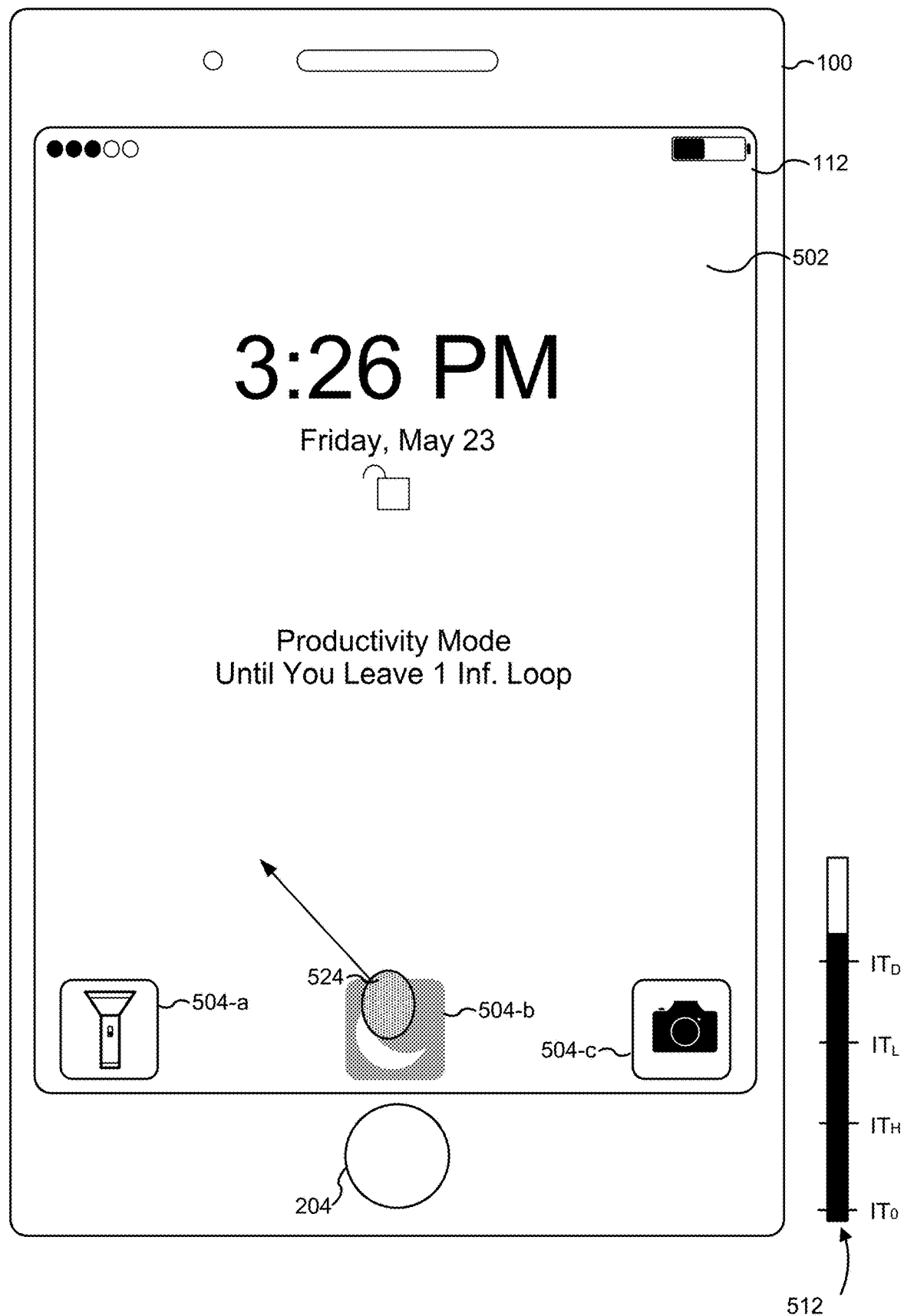
Figure 5N:
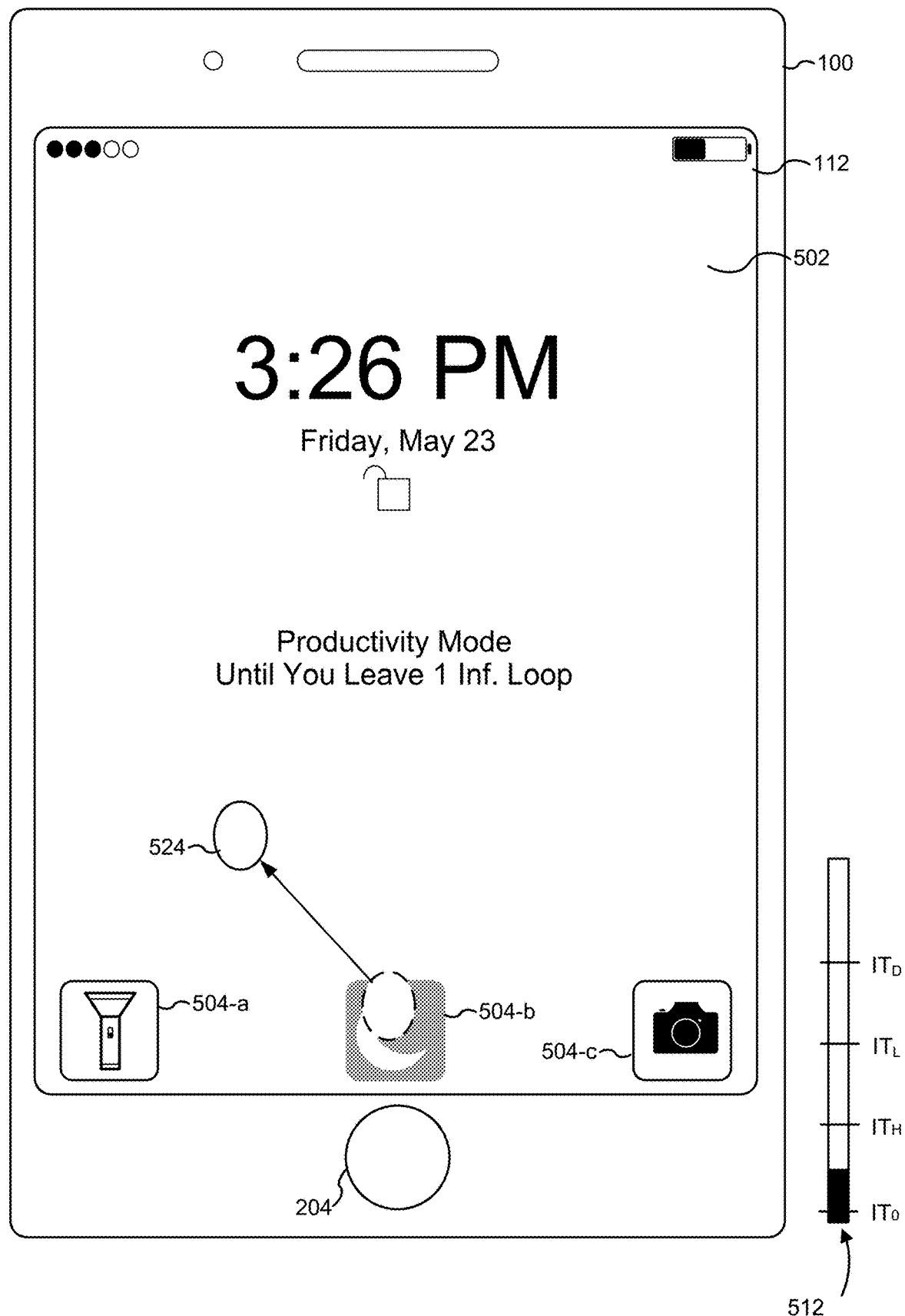
Figure 5O:
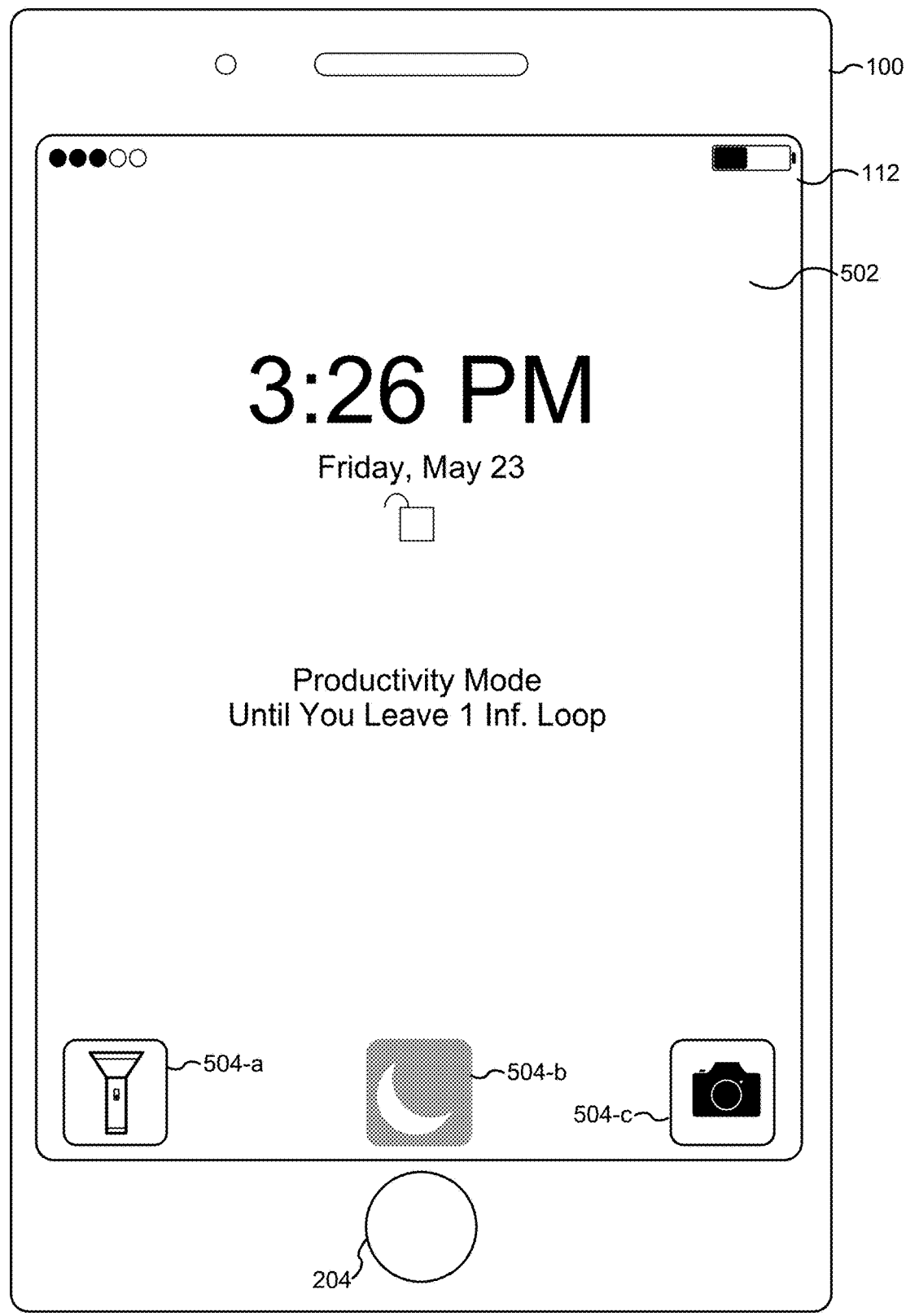
Figure 5P:
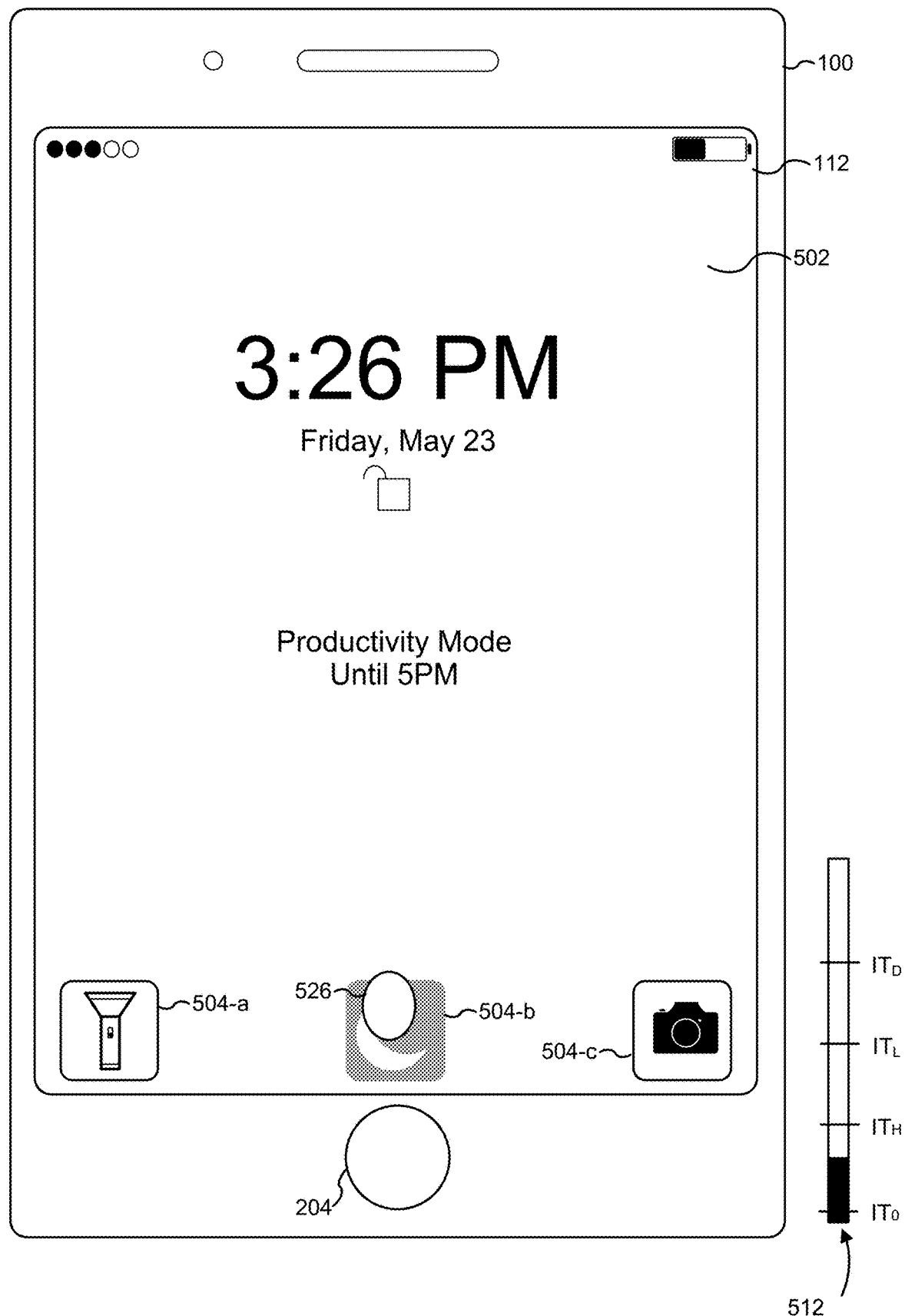
Figure 5Q:
Figure 5R:
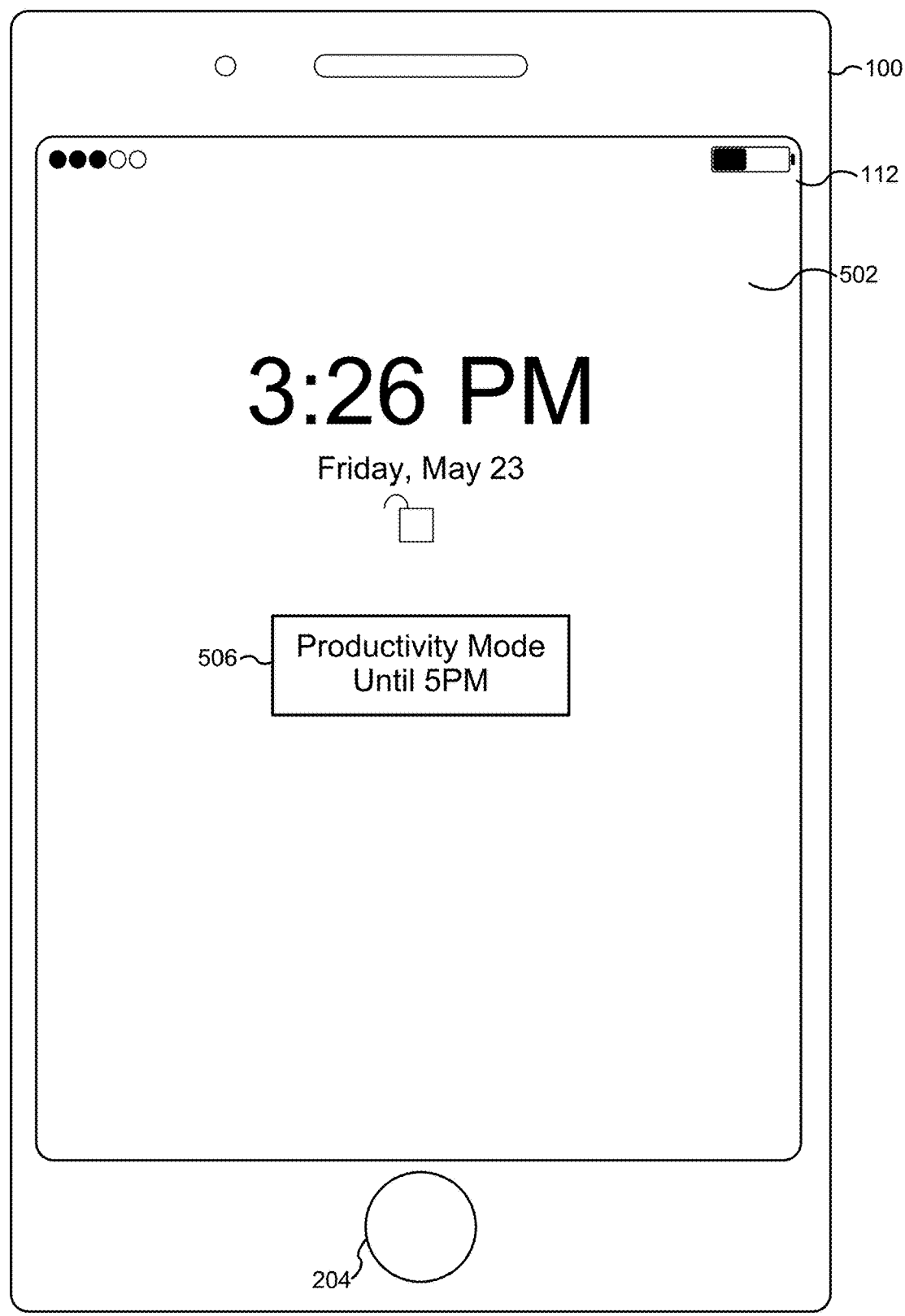

FIGS. 5A-5R illustrate example user interfaces for adjusting alert settings of a device (e.g., referred to as device 100 for simplicity), in accordance with some embodiments. More specifically, FIGS. 5A-5R illustrate the operation of a virtual button (e.g., a control affordance on a touch-sensitive display) for controlling generation of alerts by the device (e.g., for controlling a reduced notification mode of the device). The virtual button is displayed on an initial user interface that appears after the device wakes up from a display-off state (e.g., the virtual button is displayed on a wake screen). After an intensity of a contact at the virtual button exceeds an intensity threshold, the device initiates a process for adjusting alert settings of the device (e.g., the device displays a menu with user-selectable auto-expiration options for the reduced notification mode, or displays a menu with user-selectable options for switching to a different reduced notification mode). In some embodiments, the virtual button toggles the reduced notification mode in response to a light press (e.g., a contact with a characteristic intensity above a first intensity threshold, such as $IT_L$, but below a second intensity threshold, such as $IT_D$) and initiates the process for adjusting the alert settings in response to a deep press (e.g., a contact with a characteristic intensity above a second intensity threshold, such as $IT_D$). In the examples described below, $IT_L$ is used as a button toggle threshold and $IT_D$ is used as a settings activation threshold. In some embodiments, the virtual button is unresponsive to contacts with an intensity below $IT_L$, reducing the risk that the user accidentally activates the button.

FIG. 5A illustrates device 100 in a display-off state. For example, in the display-off state, device 100 is still on, but touchscreen 112 is not illuminated or activated. In some embodiments, device 100 enters the display-off state when a user presses a lock button (e.g., a physical button on device 100) or device 100 remains idle for a predefined amount of time (e.g., 30 seconds or a minute without device 100 detecting an input that prevents device 100 from entering the display-off state, such as a user input to perform operations on device 100 or a wake input, as described below).

FIG. 5B illustrates an initial user interface 502 (e.g., a wake screen) displayed in response to an input for waking up device 100. Note that the initial user interface 502 is distinct from a home screen user interface that includes a plurality of application launch icons corresponding to a plurality of applications (e.g., as shown in FIG. 4A). In some embodiments, the input for waking up device 100 is a user input. For example, device 100 detects movement of the device (e.g., device 100 detects vertical movement or shaking of the device using one or more accelerometers), detects actuation of any physical button on the device, or detects a voice command asking the device to wake up). In some embodiments, the device wakes up in response to an event that occurs within the device (e.g., an alarm going off, a communication being received).

The initial user interface 502 includes a virtual button (e.g., a control affordance) 504-a for accessing a flashlight on the device 100, a virtual button 504-b for controlling provision of alerts by device 100, and a virtual button 504-c for accessing a camera on the device 100. In FIG. 5B, the virtual button 504-b is shaded, providing a visual indication that a reduced notification mode of the device is activated.

In some embodiments, device 100 includes a plurality of reduced notification modes (e.g., "do-not-disturb" modes) including a productivity mode, a social mode, an exercise mode, and a sleep mode. The initial user interface 502 includes a visual indication 506 (e.g., displayed text) informing the user of which reduced notification mode is active (e.g., the productivity mode) and an optional auto-expiration condition for the active reduced notification mode (e.g., "Until 5 PM").

The initial user interface 502 also includes a date and time indicator 508 of the current date and time as well as a lock indicator 510 showing whether the device is in a locked state (e.g., in FIG. 5B, device 100 is in the locked state, so the lock icon is shown as locked).

FIG. 5C illustrates the initial user interface 502 after receiving an input to unlock device 100. To that end, FIG. 5C is the same as FIG. 5B, except the lock indicator 510 is unlocked in FIG. 5C. In some embodiments, the input to unlock the device is a contact on a fingerprint sensor on home button 204 and successful recognition of a known-user's fingerprint. In some embodiments, the input to unlock the device is successful recognition of a known-user's face (e.g., without the user taking any action besides holding touchscreen 112 towards his or her face).

FIG. 5D is analogous to FIG. 5C except that in FIG. 5D a contact 514 is detected on the virtual button 504-b for controlling generation of alerts by device 100.

In some embodiments, an increase of the intensity of contact 514 above $IT_D$ (or some other intensity threshold) is required to enable the device to display options for adjusting alert settings of the device. In some embodiments, the display of the options for adjusting the alert settings of the device is triggered (e.g., initiated) upon detecting a subsequent decrease in intensity of contact 514 (e.g., either detecting lift-off or detecting a decrease in intensity of contact 514 below a predefined threshold). To that end, FIG. 5D and some subsequent figures include intensity diagrams 512 (corresponding to the intensity of contact 514) that have intensity thresholds $IT_H$, $IT_L$, and $IT_D$. FIGS. 5D-5F, which are in chronological order, illustrate the intensity of contact 514 increasing above $IT_L$ (FIG. 5D), then increasing above $IT_D$ (FIG. 5E), and then dropping below $IT_H$ (FIG. 5F).

FIG. 5F illustrates display of a menu of modification options 516 for adjusting the alert settings of the device. FIG. 5G illustrates that, in some embodiments, the modification options 516 remain displayed after the contact 514 ends.

In this example, the modification options 516 are auto-expiration options for changing an auto-expiration condition for a currently active reduced notification mode (e.g., productivity mode). Modification option 516-b, which when active automatically de-activates productivity mode at a user-settable time (e.g., 5 PM), is currently active and, for that reason, visually distinguished (e.g., highlighted) from the other modification options 516. The displayed modification options 516 also include: a modification option 516-a which, when active, automatically de-activates productivity mode after a user-settable duration; modification option 516-c which, when active, automatically de-activates productivity mode when the device leaves a user-settable geo-fenced location; modification option 516-d which, when active, automatically de-activates productivity mode when the device enters a user-settable geo-fenced location; and modification option 516-e which, when active, automatically de-activates productivity mode when a calendar meeting ends.

FIG. 5H illustrates a contact 518 selecting modification option 516-c. In some embodiments, contact 518 is a separate and distinct contact from contact 514, which triggered display of the modification options 516. In some embodiments, contact 518 is a continuation of contact 514 (e.g., contact 514/518 is continuously detected on touchscreen 112)

FIG. 5I illustrates the device 100 responding by updating the visual indication 506 to show that device 100 will remain in productivity mode until device 100 leaves the geographical location "1 Inf. Loop" (e.g., leaves a geo-fenced area corresponding to 1 Inf. Loop).

FIG. 5J illustrates a contact 520 over virtual button 504-b. Contact 520 has a characteristic intensity above $IT_L$. For the purposes of this example, it is assumed that contact 520 does not experience an increase in intensity above $IT_D$, which would enable display of modification options 516, as discussed previously. Instead, for example, FIG. 5J illustrates the maximum intensity of contact 520. As illustrated in this example, in some embodiments, a contact over virtual button 504-b having a characteristic intensity (e.g., maximum intensity) between $IT_L$ and $IT_D$ toggles the reduced notification mode on and off.

To that end, FIG. 5K illustrates the result of contact 520. The reduced notification mode is disabled (as indicated by the fact that virtual button 504-b is no longer shaded). In addition, in response to de-activating the reduced notification mode, device 100 provides notifications 522 (e.g., messages) that were received while the device was in the reduced notification mode. For example, message 522-a was received by the device at 2:05 PM but not provided to the user until 3:26 PM, the time at which the reduced notification mode was de-activated. Likewise, message 522-b was received by the device at 1:39 PM but not provided to the user until 3:26 PM.

FIGS. 5L-5O illustrate a manner in which a user can cancel an input (e.g., a contact) that would otherwise trigger display of modification options 516, described above. To that end, FIG. 5L returns to an example starting with the reduced notification mode (e.g., productivity mode) activated (e.g., as indicated by the shaded virtual button 504-b). A contact 524 over virtual button 504-b is detected in FIG. 5L, and experiences an increase in intensity above $IT_D$ as shown in FIG. 5M. However, as shown in FIG. 5M, contact 524 moves to a location away from (e.g., not over) virtual button 504-b, and, as shown in FIG. 5N, the intensity of contact 524 decreases below $IT_H$ (e.g., or lifts off) while at the location away from virtual button 504-b. As shown in FIG. 5O, device 100 does not perform an operation (e.g., does not display modification options 516) in response to contact 524, because the input to display the modification options 516 is considered by the device to be canceled. Thus, in some embodiments, even though a user input (e.g., a contact) enables display of modification options 516, modification options 516 are not displayed unless a triggering condition (e.g., a decrease in contact intensity) is detected while the input is over the virtual button 504-b.

FIGS. 5P-5Q illustrate that, in some embodiments, virtual button is unresponsive to contacts having an intensity below a predetermined threshold (e.g., below button toggle threshold $IT_L$). To that end, device detects a contact 526. The maximum intensity of contact 526 is shown in FIG. 5P. That is, the maximum intensity of contact 526 is above a minimum detection threshold $IT_0$ (at which device 100 detects the presence of contact 526) but below $IT_H$ (or $IT_L$). As shown in FIG. 5Q, device 100 does not perform an operation (e.g., does not display modification options 516 and does not toggle virtual button 504-b) in response to contact 526. Requiring that contact 526 have a characteristic intensity above a predefined threshold prevents accidental toggling of the reduced notification mode on and off or changing alert settings (e.g., while device 100 is in the user's pocket).

FIG. 5R illustrates an example in which the visual indication 506 of the active reduced notification mode (and, optionally, an active auto-expiration condition) is itself a control affordance. Thus, in some embodiments, device 100 performs any of the operations described with reference to FIGS. 5A-5Q, but with respect to a contact over visual indication/virtual button 506 instead of virtual button 504-b.

Figure 5S:
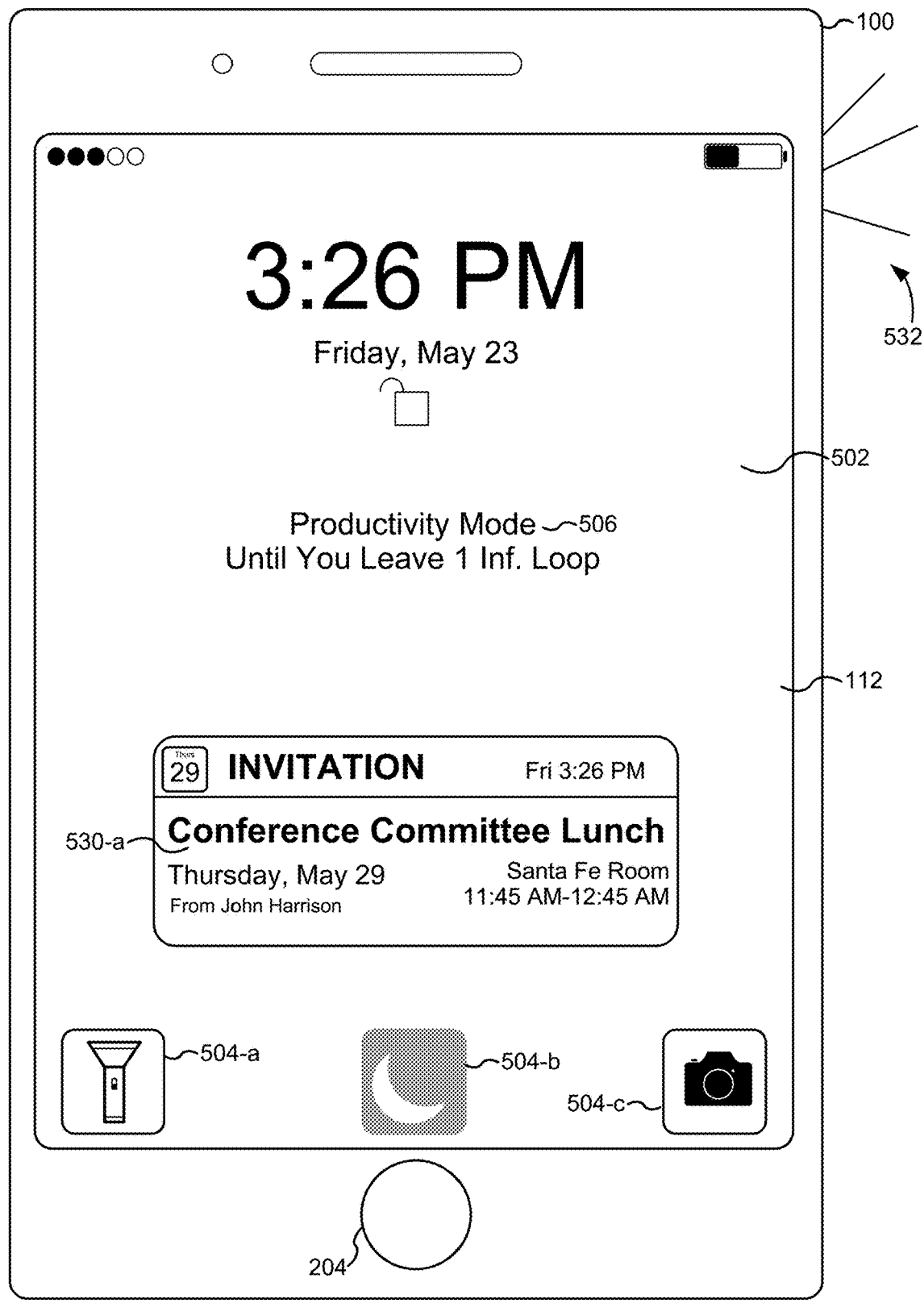

FIGS. 5S-5AI illustrate example user interfaces for devices that provide different reduced notification modes (e.g., different "do-not-disturb" modes) for different contexts. For example, the devices shown in FIGS. 5S-5AI provide a productivity mode, a social mode, a sleep mode, and an exercise mode. The different reduced notification modes have different whitelists (e.g., lists of applications from which notifications are allowed to "breakthrough" the reduced notification mode). An active reduced notification mode causes the device to at least partially block notifications that are not whitelisted for that particular reduced notification mode. For example, a notification that is whitelisted for an active reduced notification mode will be displayed and the user will be notified of its arrival by a sound and/or a haptic alert. In contrast, a notification that is not whitelisted for the active reduced notification mode will be displayed without a sound or haptic alert (or not provided at all while the particular reduced notification mode is active). Thus, a user can, for example, set the device to a productivity mode at work and not be distracted by social media, then can go home and set the device to a social mode to avoid being bothered by work emails.

Figure 5T:
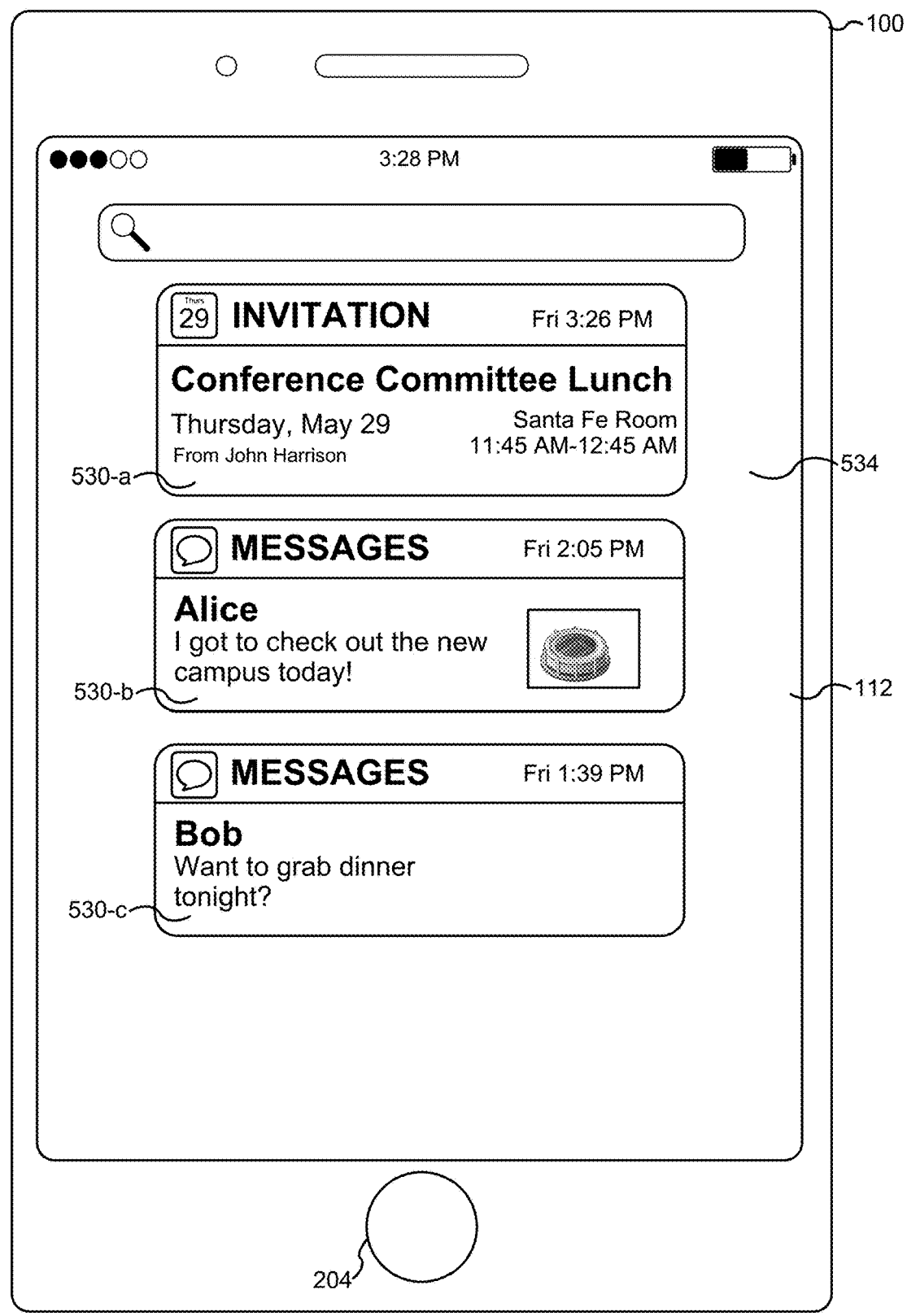

As an example, FIGS. 5S-5T illustrate provision of notifications from initial user interface 502 (e.g., the wake screen) while device 100 is in a productivity mode. In some embodiments, the productivity mode is initialized with a default whitelist of applications. The whitelist for the productivity mode can include, for example, applications that are tagged by their developers, by users in an application store as relating to productivity, or by any group of keywords relating to productivity. As described later, in some embodiments, a user can modify the default whitelist. In this example, it is assumed that the calendar application is whitelisted in the productivity mode and that a messages (e.g., "text messaging") application is not whitelisted.

As shown in FIG. 5S, device 100 receives a calendar invitation (e.g., a communication) while in the productivity mode. In response to receiving the calendar invitation, device 100 determines that the communication is received from a whitelisted application for the productivity mode and provides a corresponding notification that includes a displayed notification 530-a and a sound alert 532.

FIG. 5T illustrates a notifications user interface 534. In some embodiments, a user can access the notifications user interface 534 by swiping length-wise (e.g., vertically) on touchscreen 112 from the wake screen 502 when device 100 is unlocked. For the purposes of this example, notification user interface 534 in FIG. 5T shows notifications corresponding to all of the communications received while device 100 has been in the productivity mode. In particular, in addition to displayed notification 530-a, notification user interface 534 shows a displayed notification 530-b corresponding to a message received from a user Alice and a displayed notification 530-c corresponding to a message received from a user Bob. Displayed notifications 530-b and 530-c were not whitelisted in the productivity mode and thus not provided on the wake screen 502 while device 100 was in the productivity mode. In addition, in some embodiments, no sound or haptic alert was provided when the communications corresponding to displayed notifications 530-b and 530-c were received.

Figure 5U:
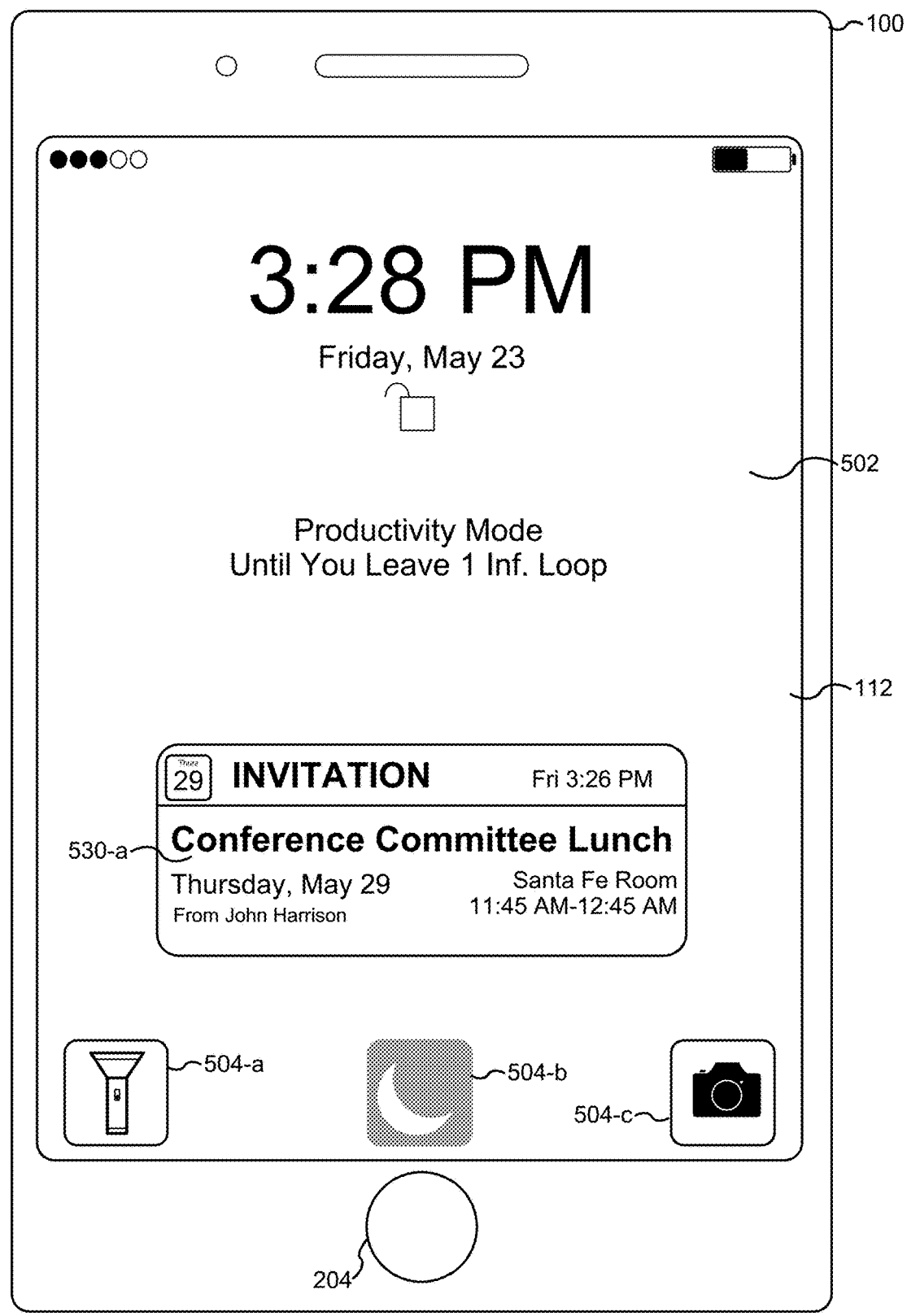
Figure 5V:
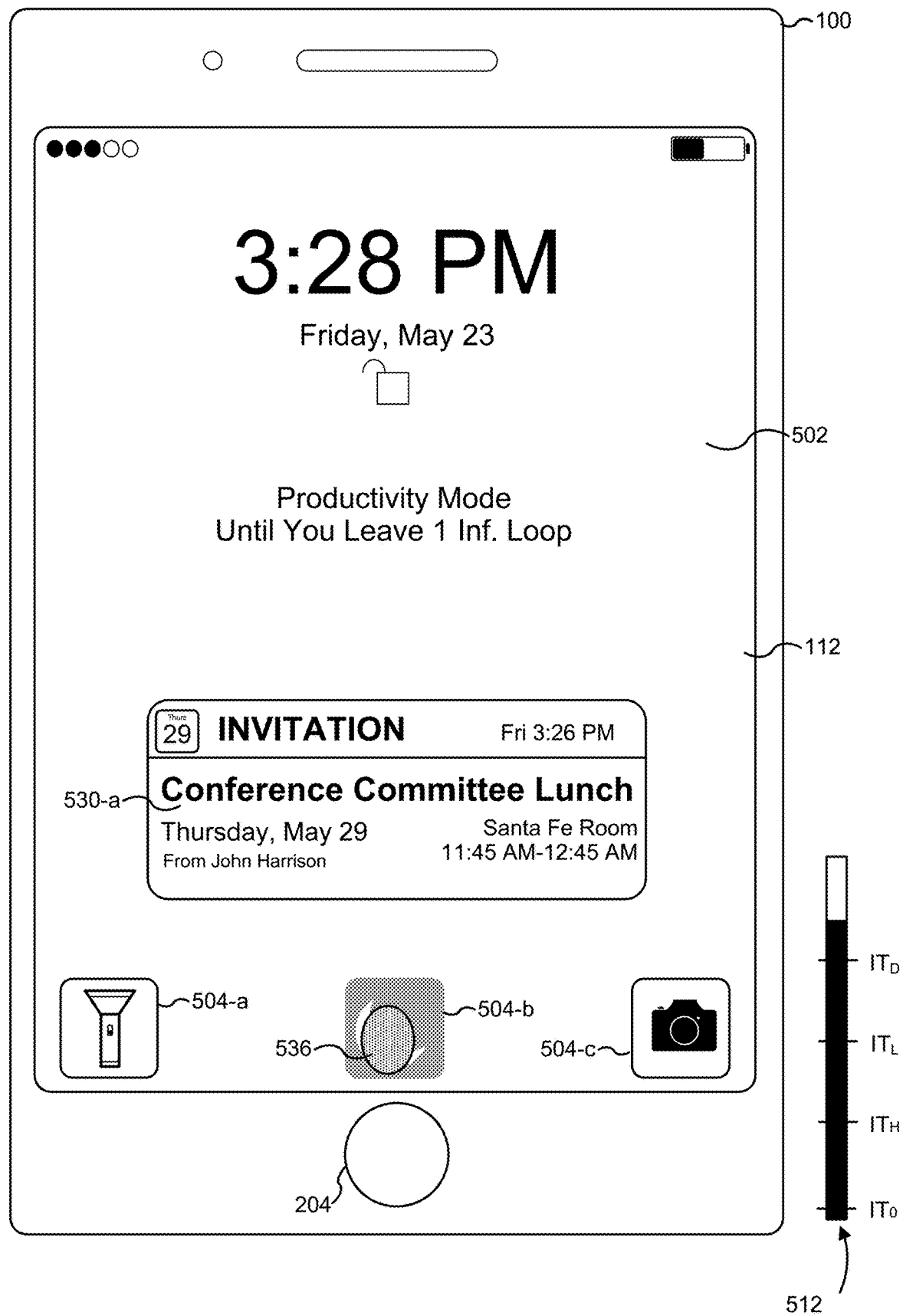

FIG. 5U illustrates that, in some embodiments, when the user returns from the notifications user interface 534 (FIG. 5T) to the wake screen 502 (e.g., by swiping down on the notifications user interface 534), the whitelisted notifications are once again the only notifications provided.

FIGS. 5V-5Y illustrate user interfaces for changing from one reduced notification mode (e.g., productivity mode) to a different reduced notification mode (e.g., social mode). To that end, in FIG. 5V, productivity mode is active. Device 100 detects a contact 536 that meets criteria for adjusting alert settings of the device (e.g., as described with reference to FIGS. 5A-5R and method 600, FIGS. 6A-6E).

Figure 5W:
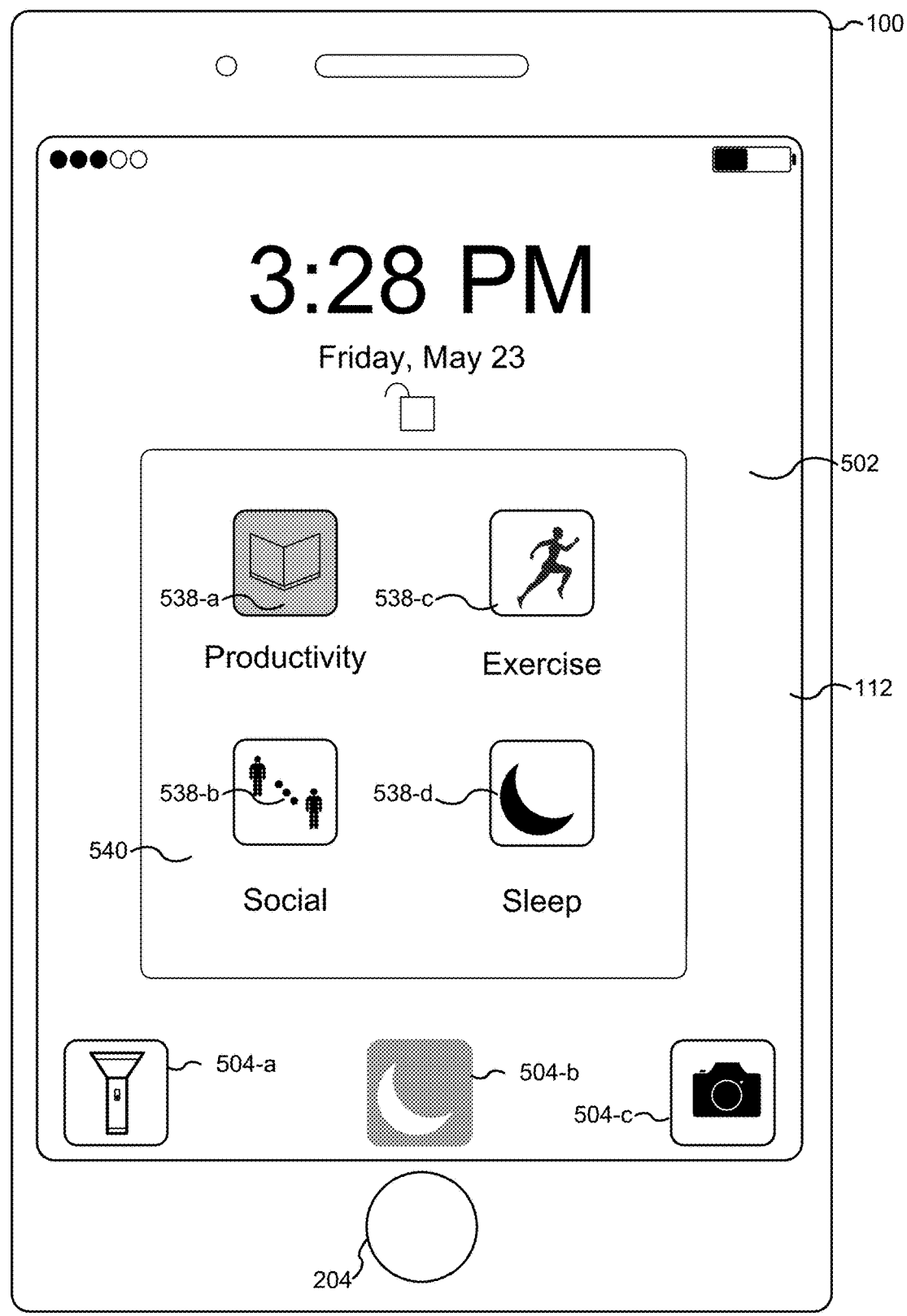
Figure 5X:
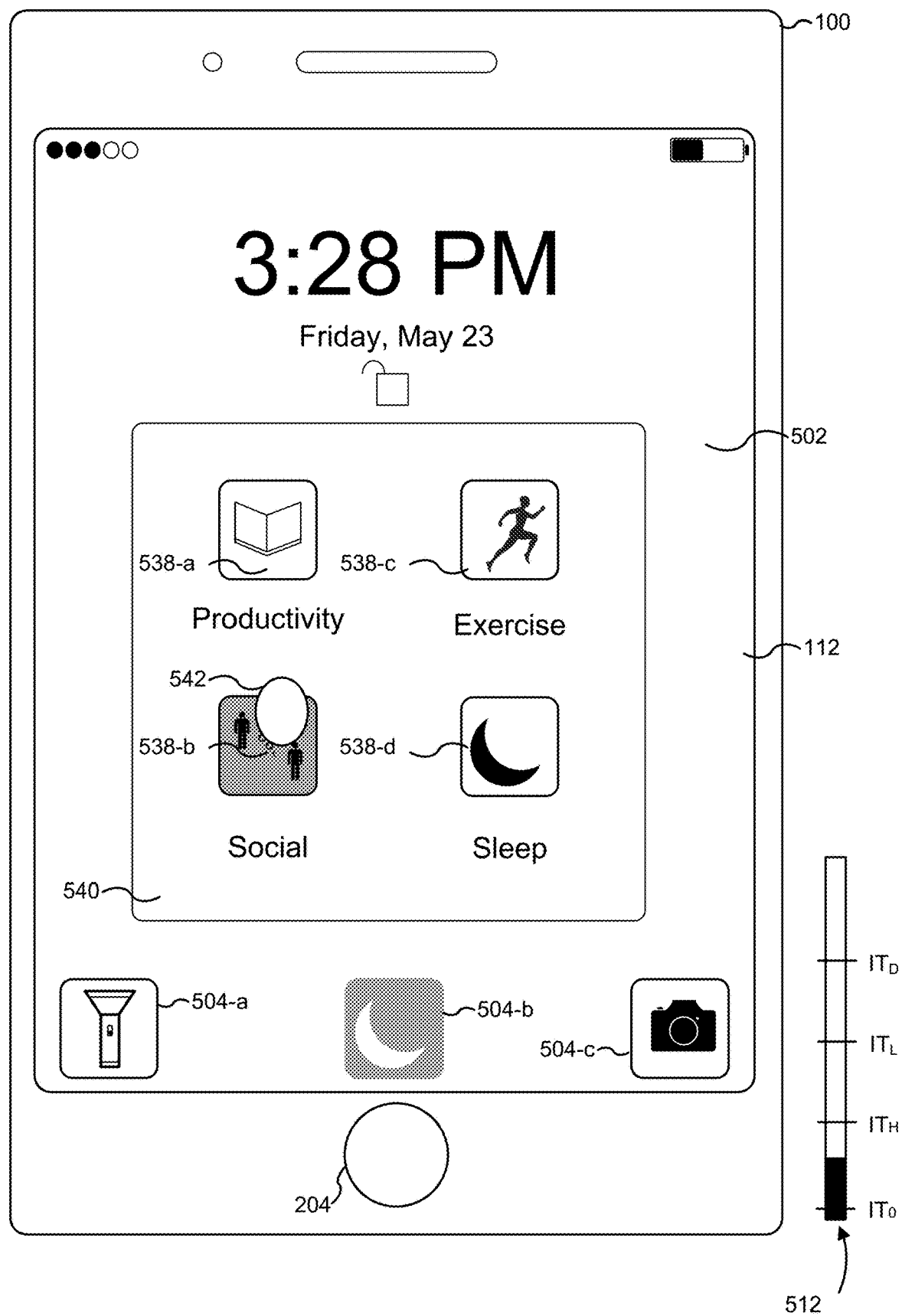
Figure 5Y:

In contrast to FIGS. 5A-5R, which illustrate adjusting auto-expiration settings of an active reduced notification mode, FIG. 5W illustrates an example in which contact 536 (FIG. 5V) initiates display of modification options 538-a through 538-d for selecting a different reduced notification mode (e.g., in a settings menu 540). In FIG. 5X, a contact 542 is detected that selects a "social" reduced notification mode (herein referred to as a social mode) by selecting modification option 538-b. In response, as shown in FIG. 5Y, the visual indication 506 shows that the social mode is active rather than the productivity mode (as shown in FIG. 5S).

Figure 5Z:
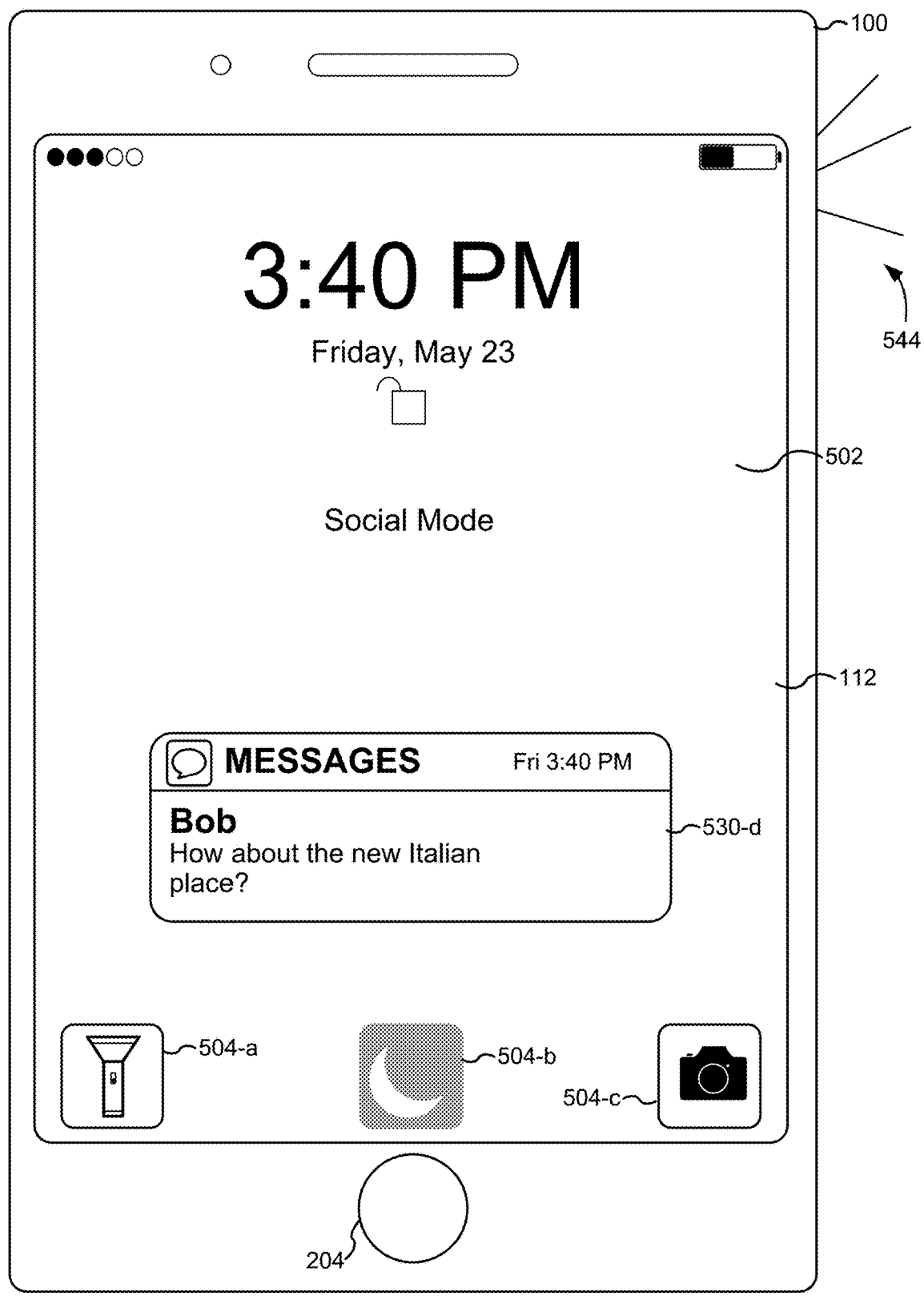
Figure 5A:
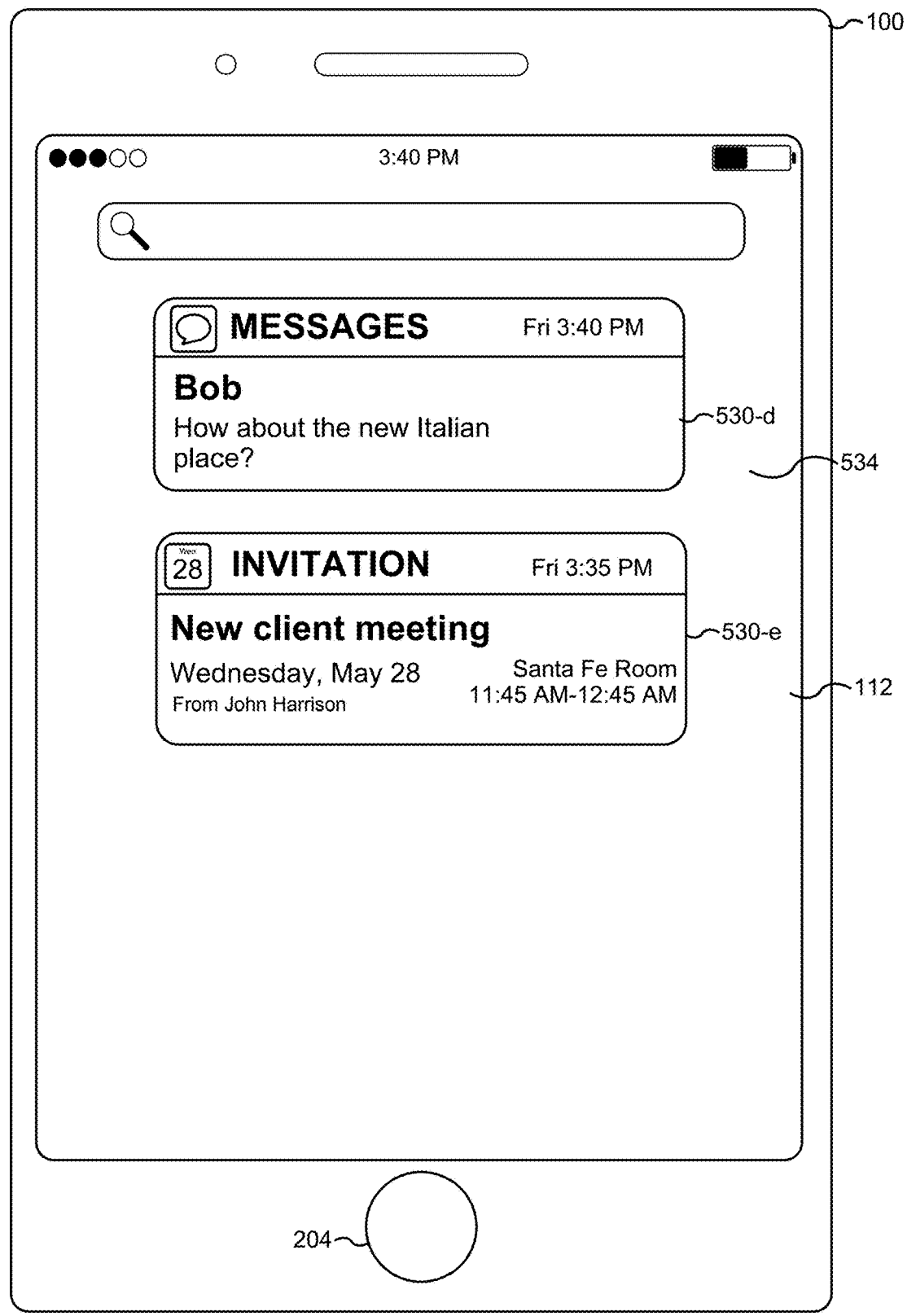
Figure 5A:
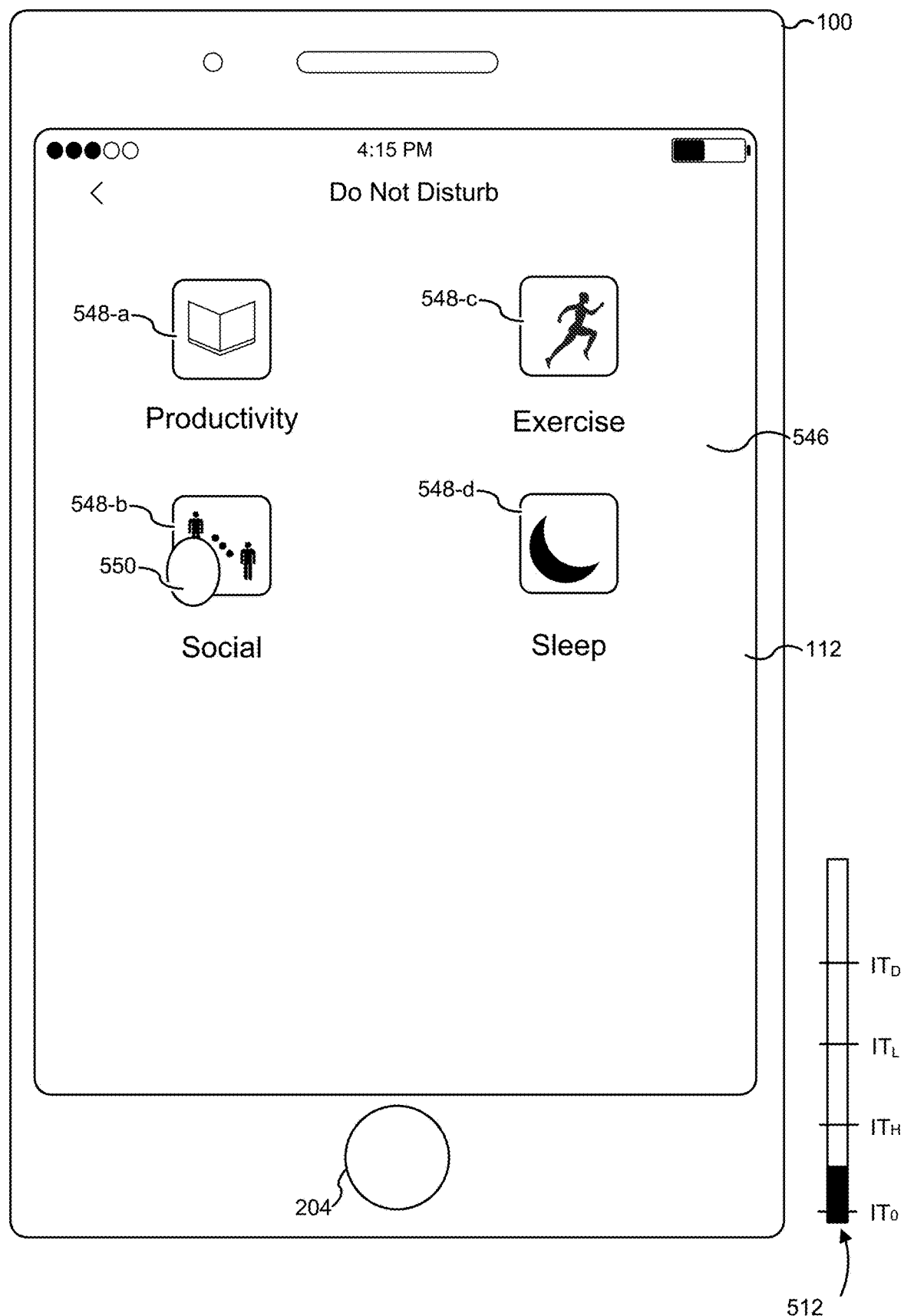
Figure 5A:
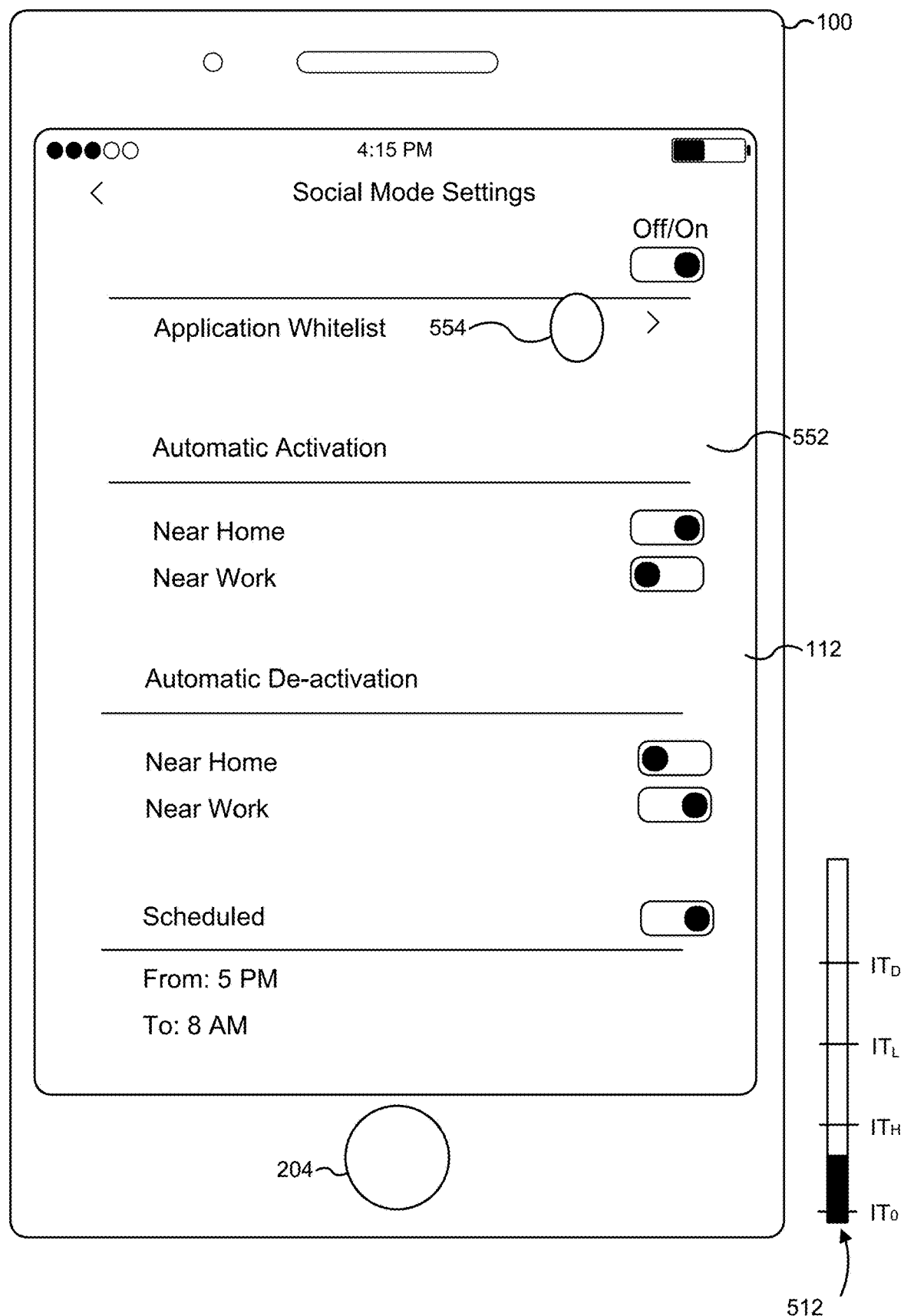
Figure 5A:
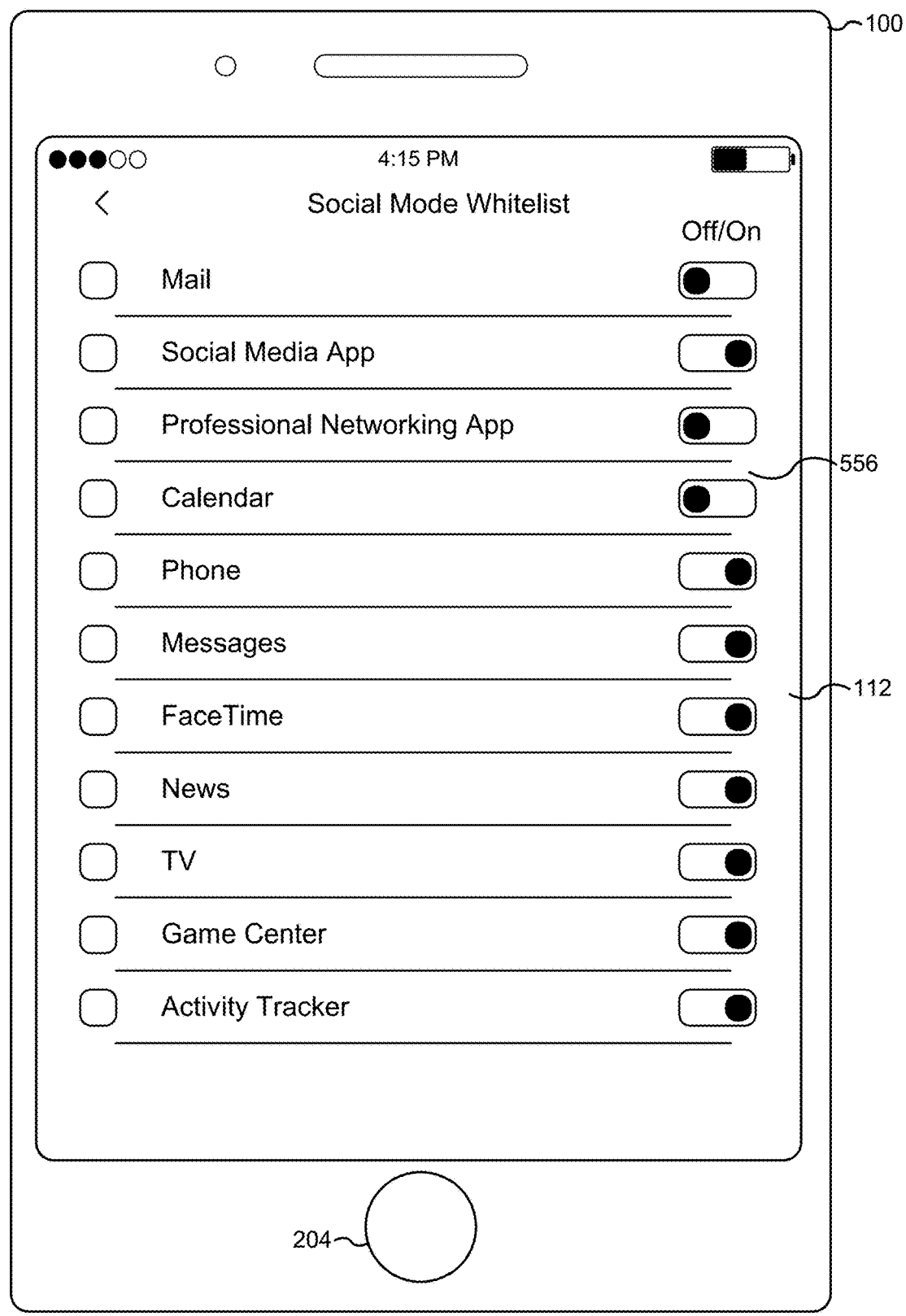
Figure 5A:
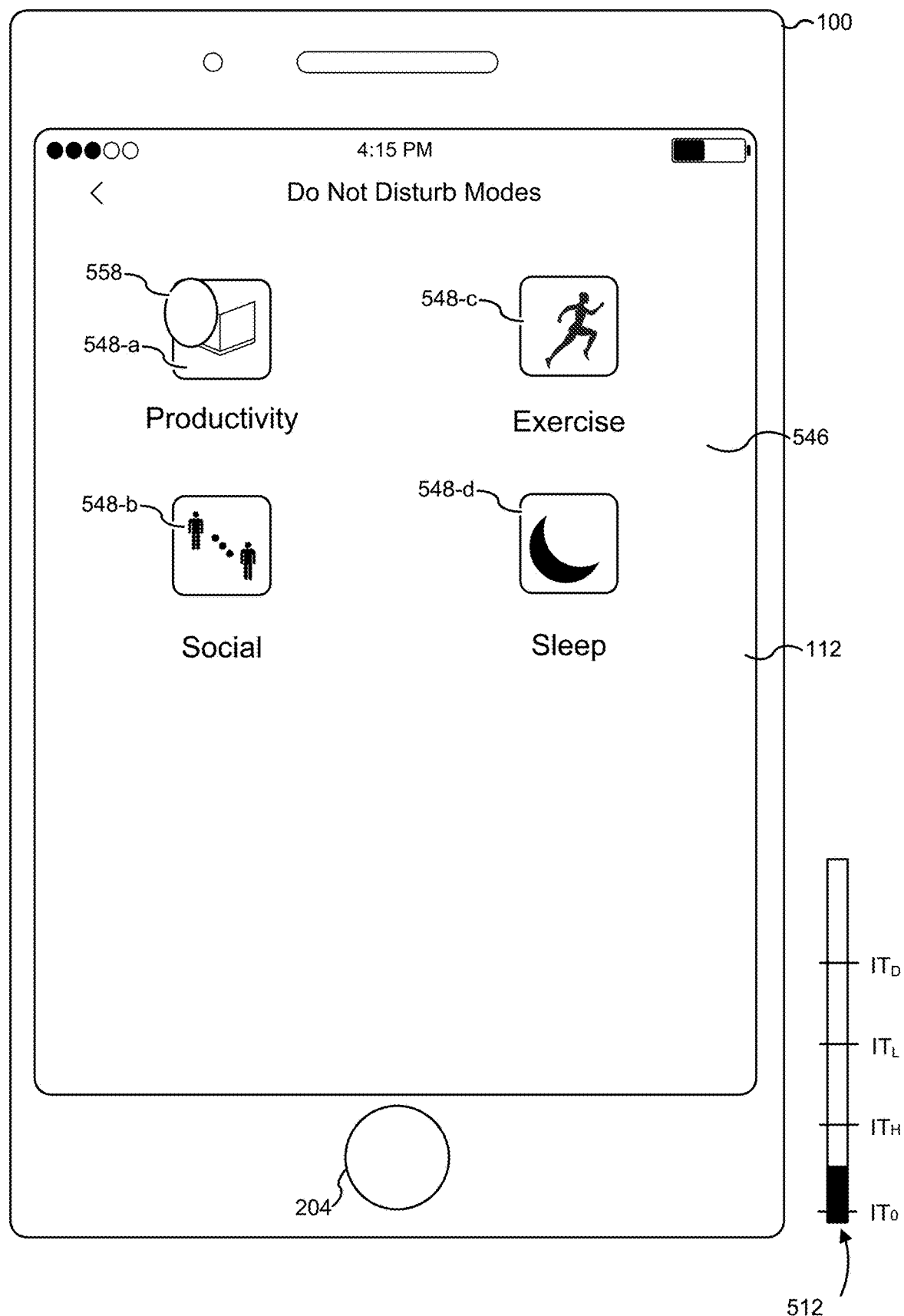
Figure 5A:
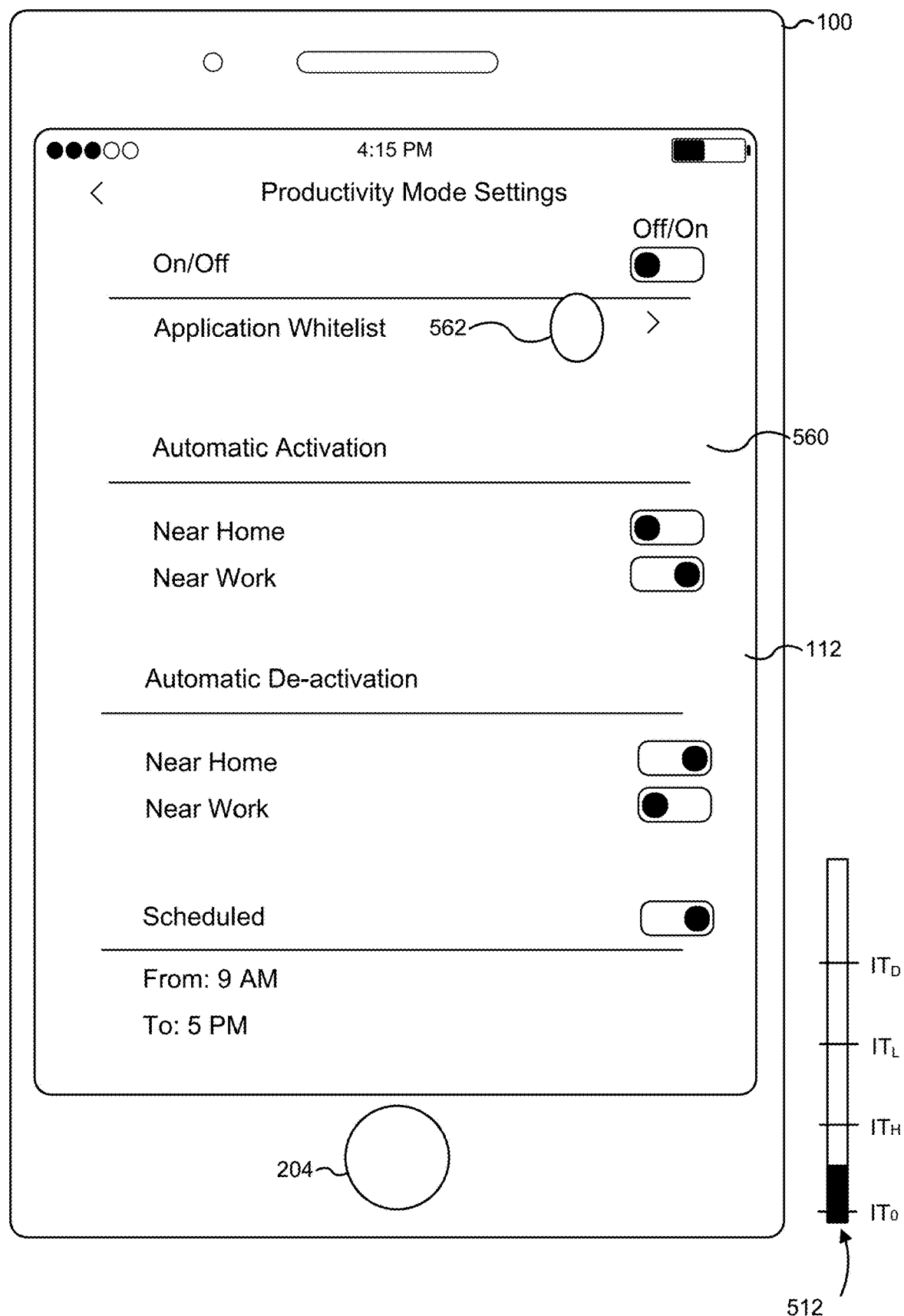
Figure 5A:
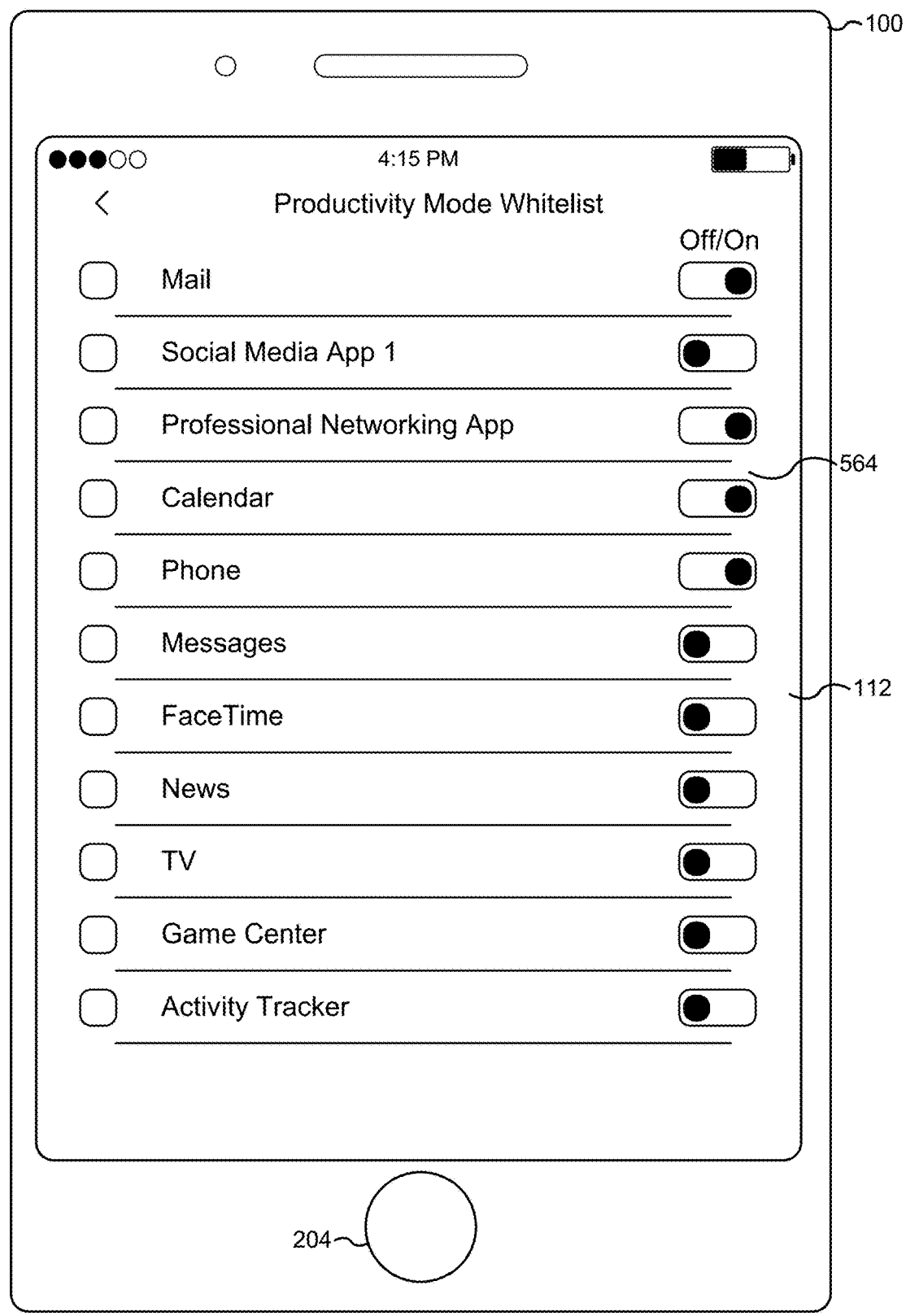
Figure 5A:
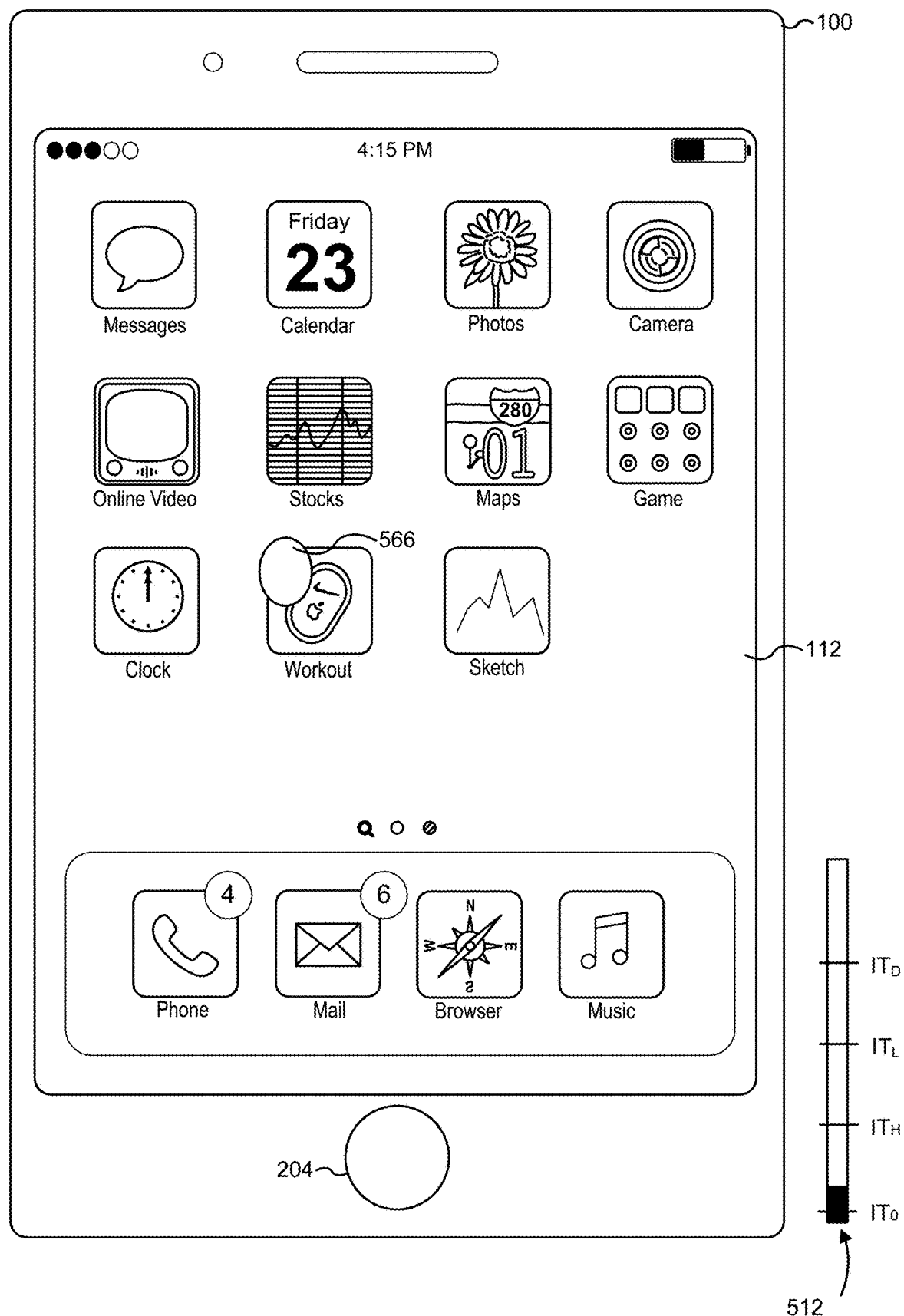
Figure 5A:
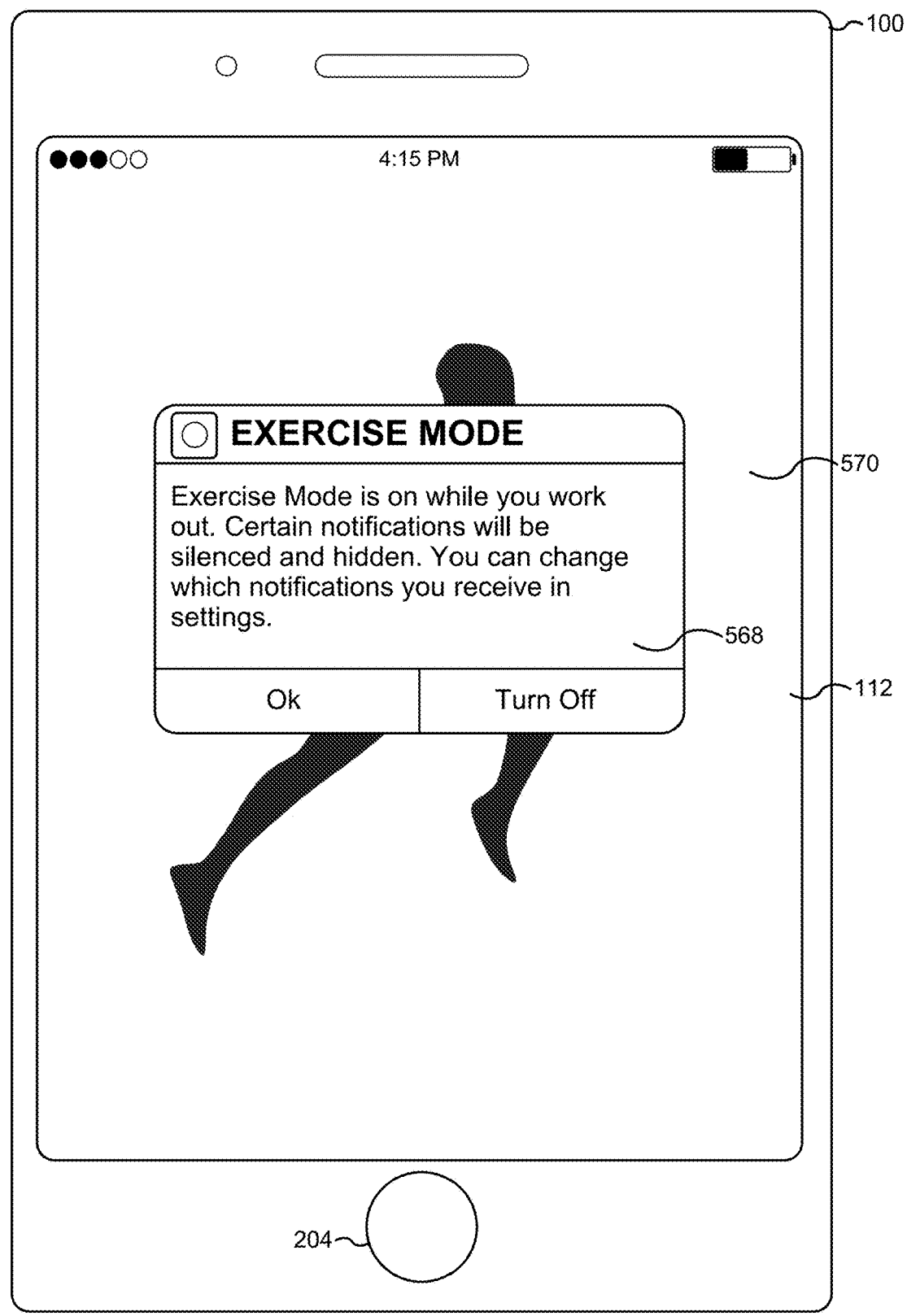
Figure 5A:
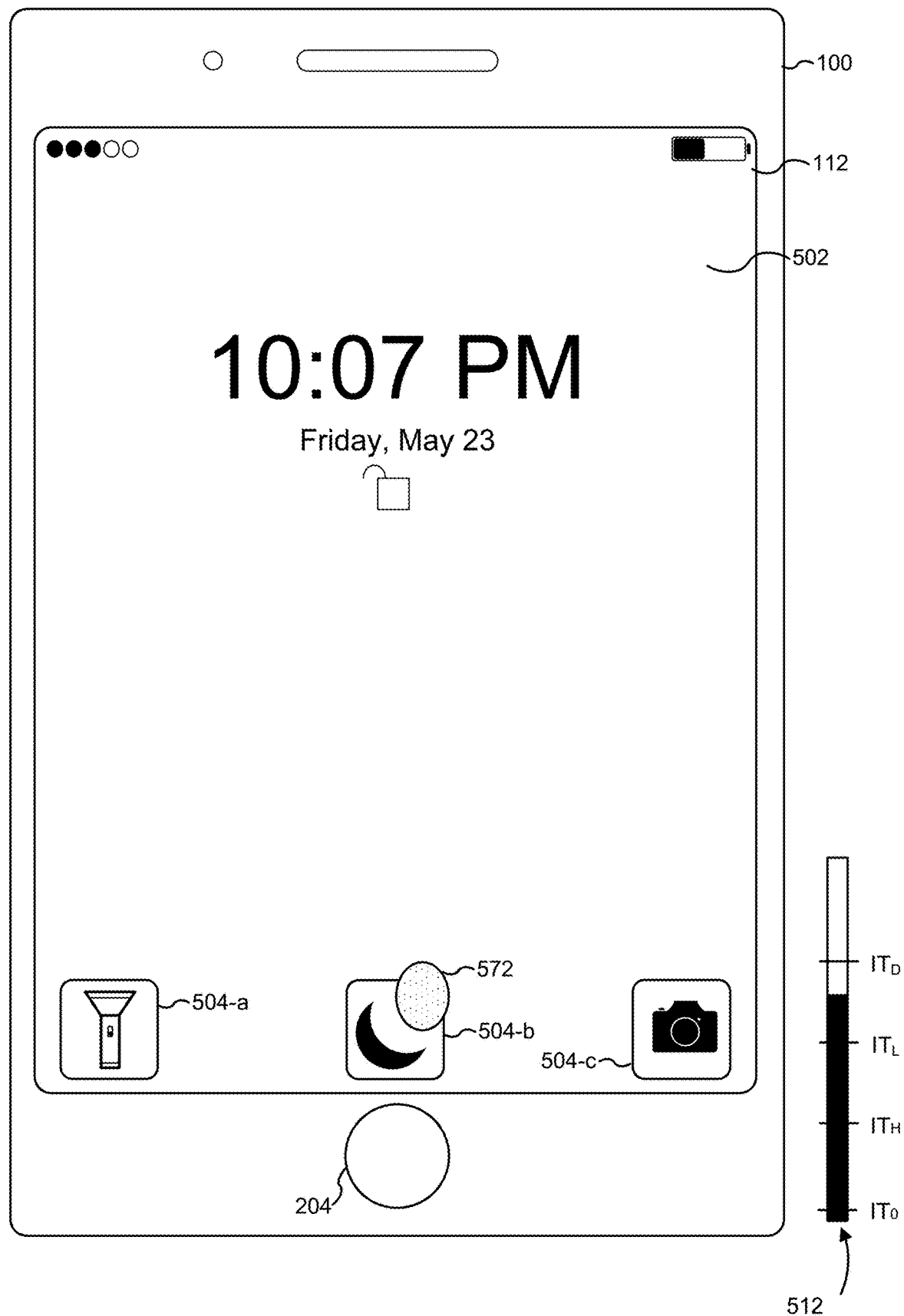
Figure 5A:
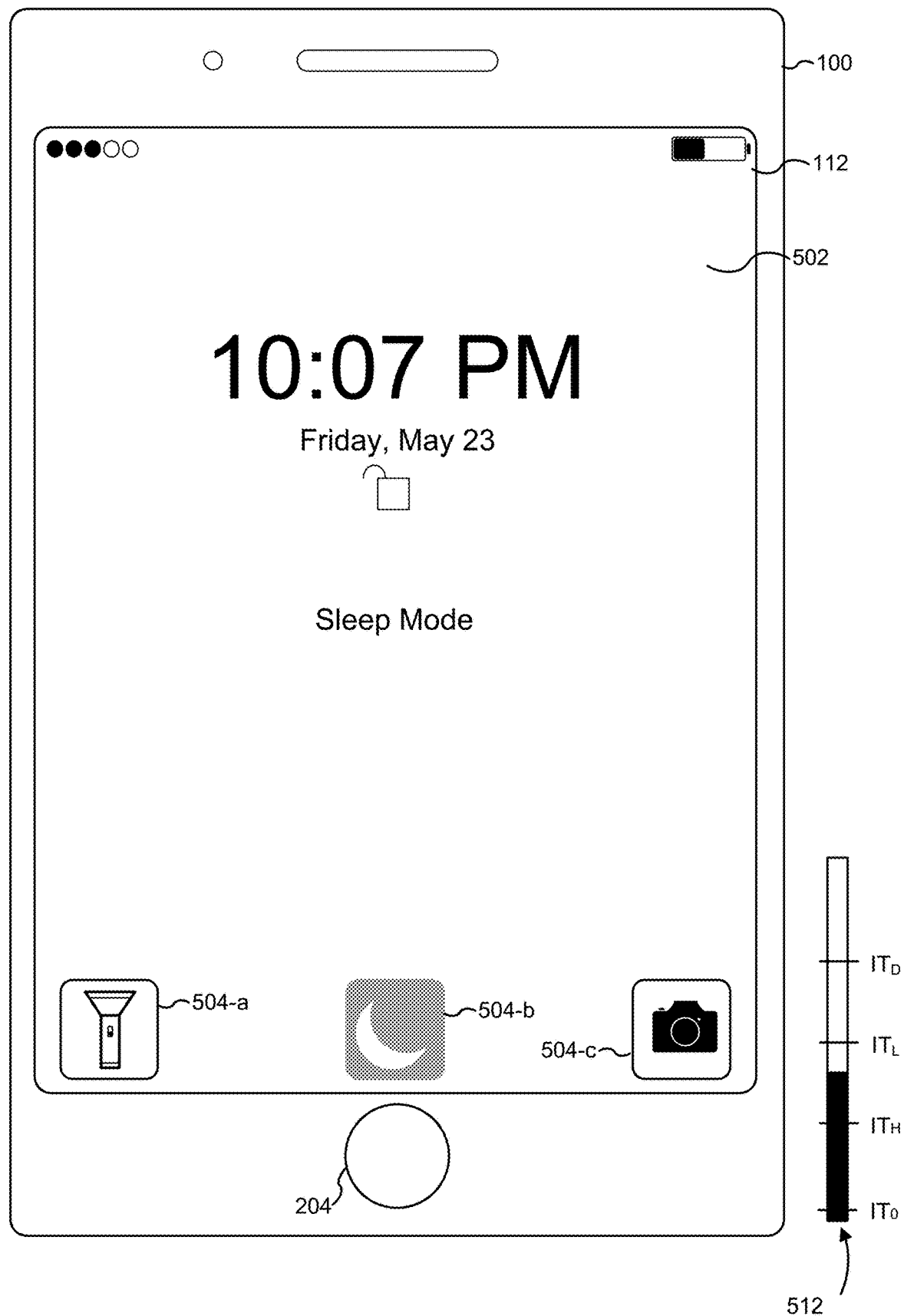
Figure 5A:
Figure 5A:
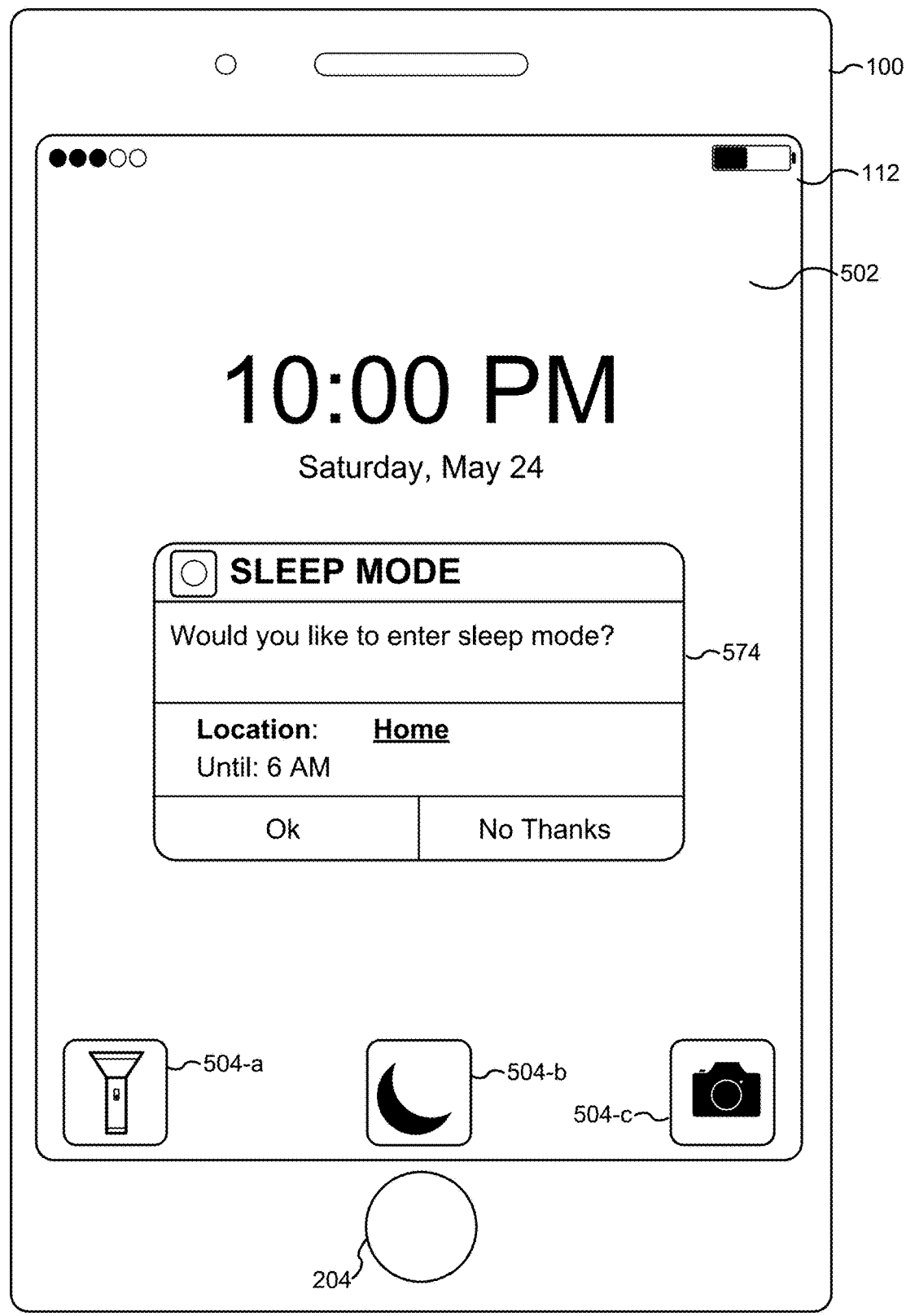
Figure 5A:
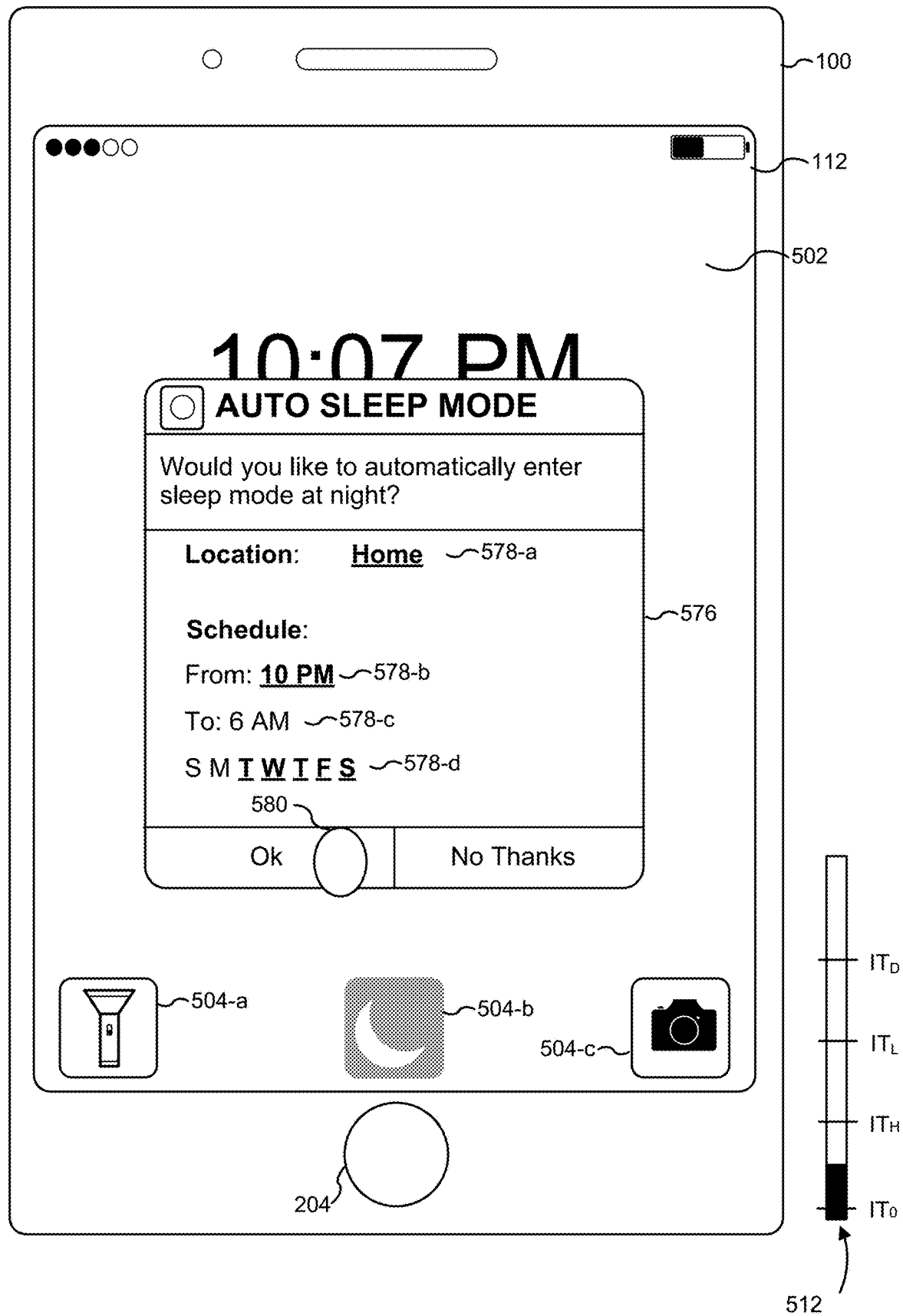
Figure 5A:
Figure 5A:
Figure 5A:
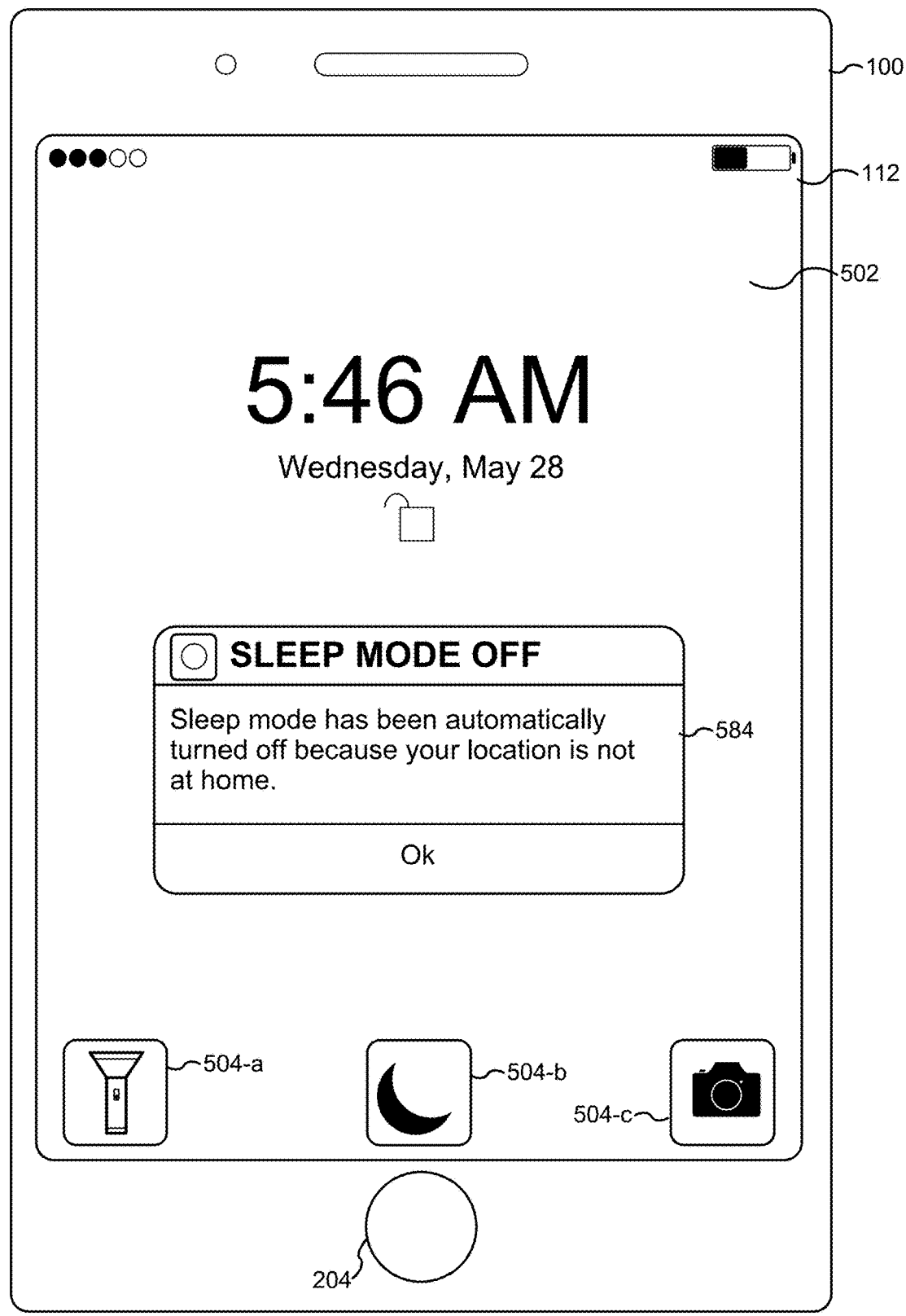
Figure 5A:
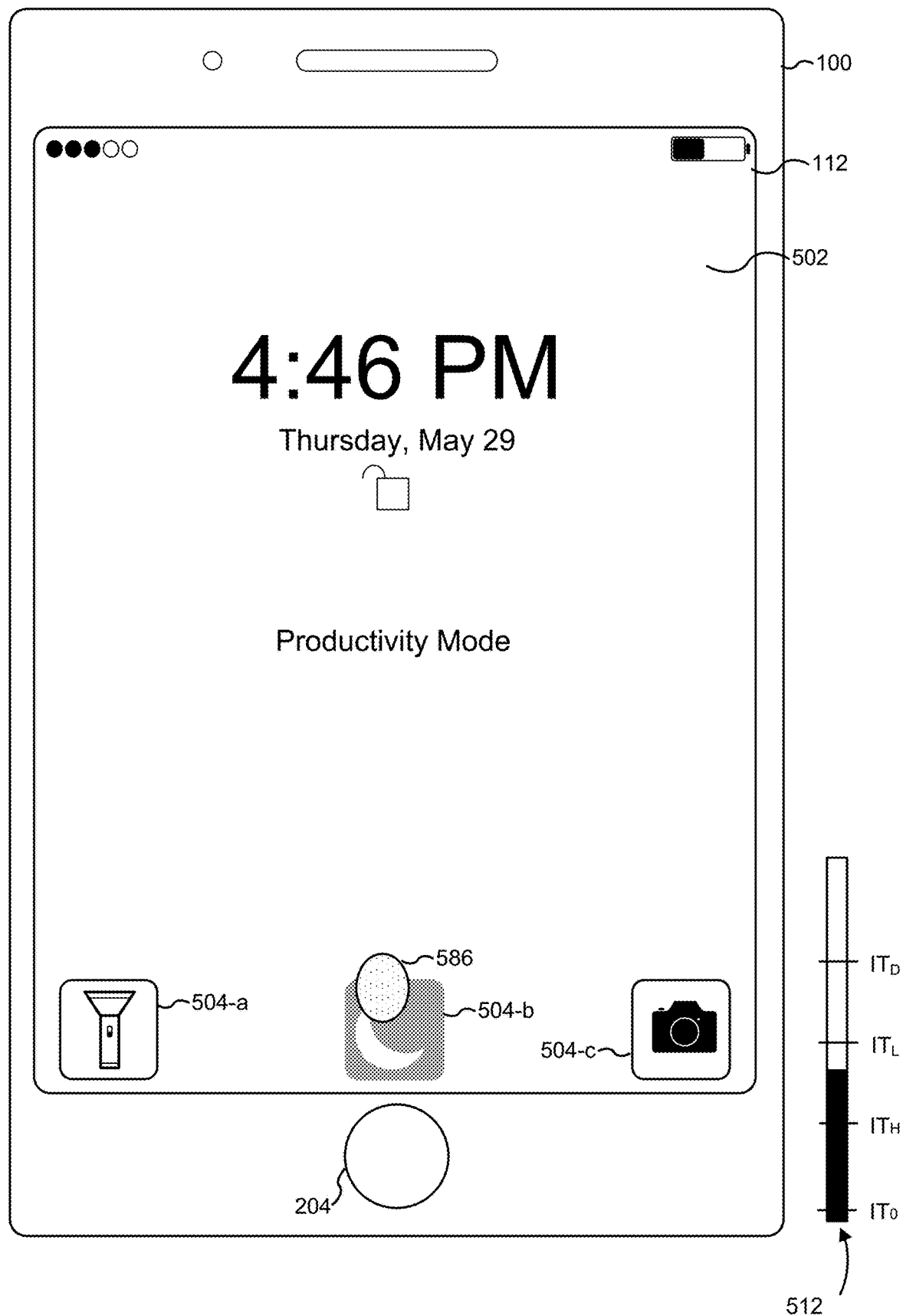
Figure 5A:
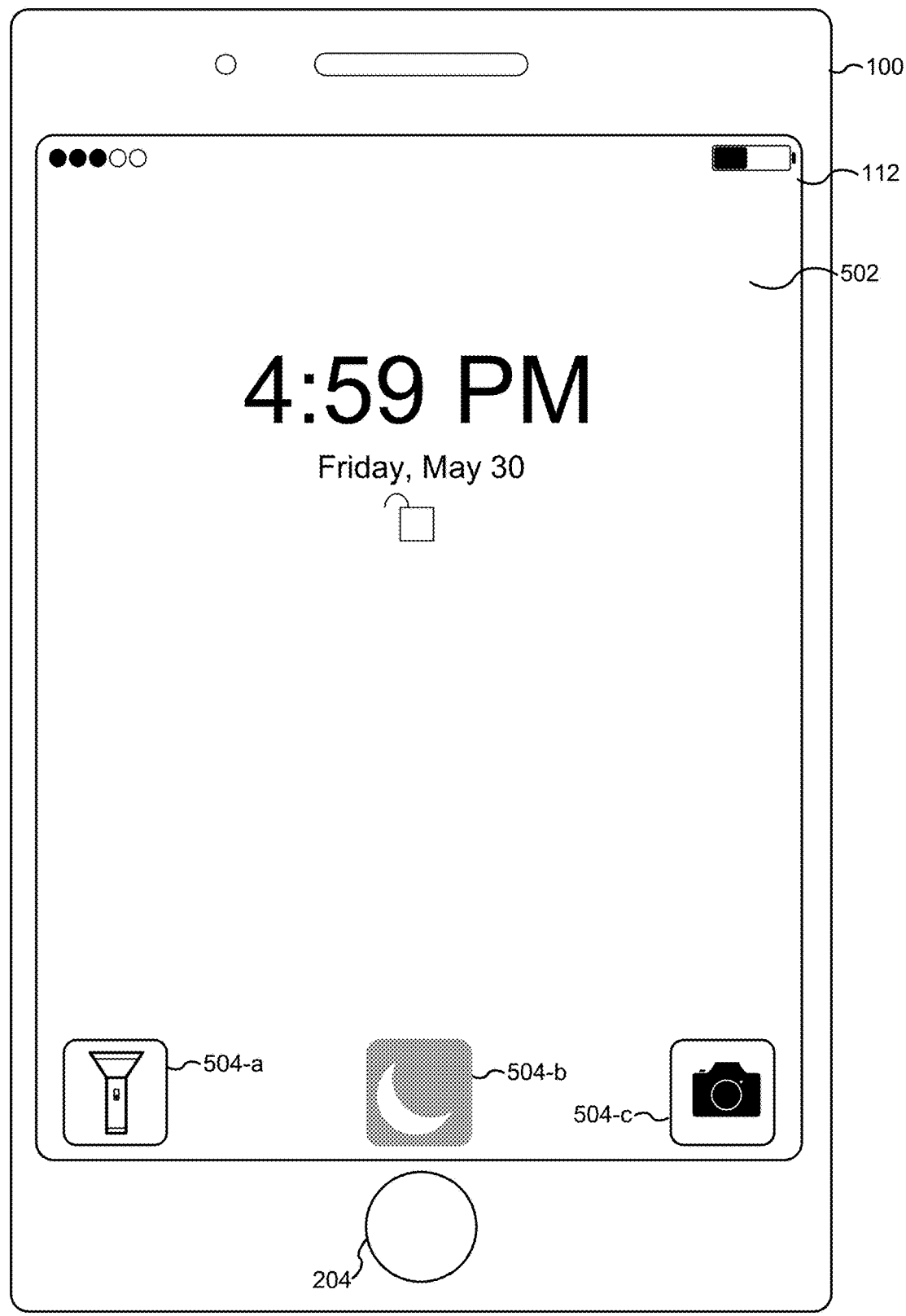
Figure 5A:
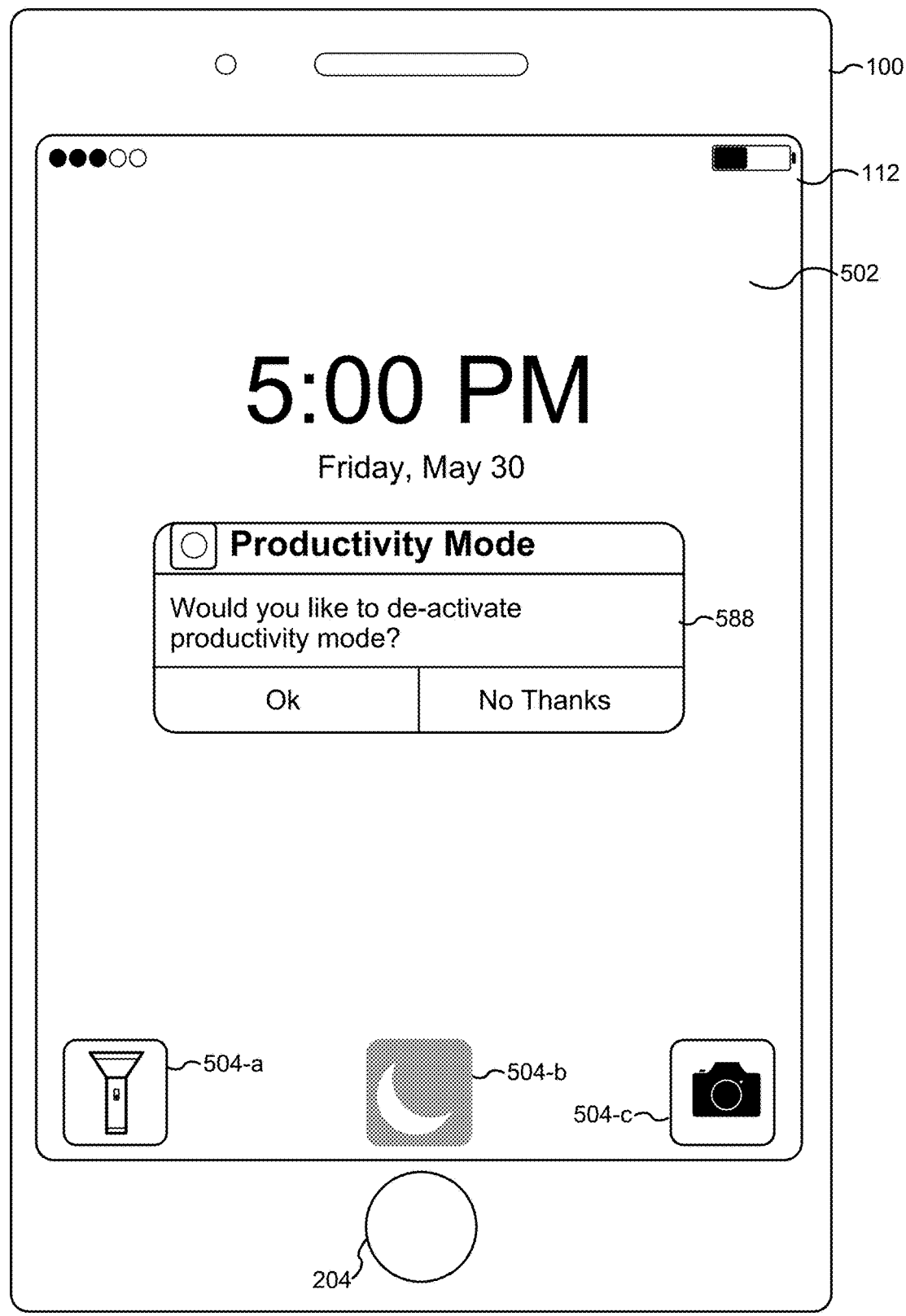
Figure 5A:
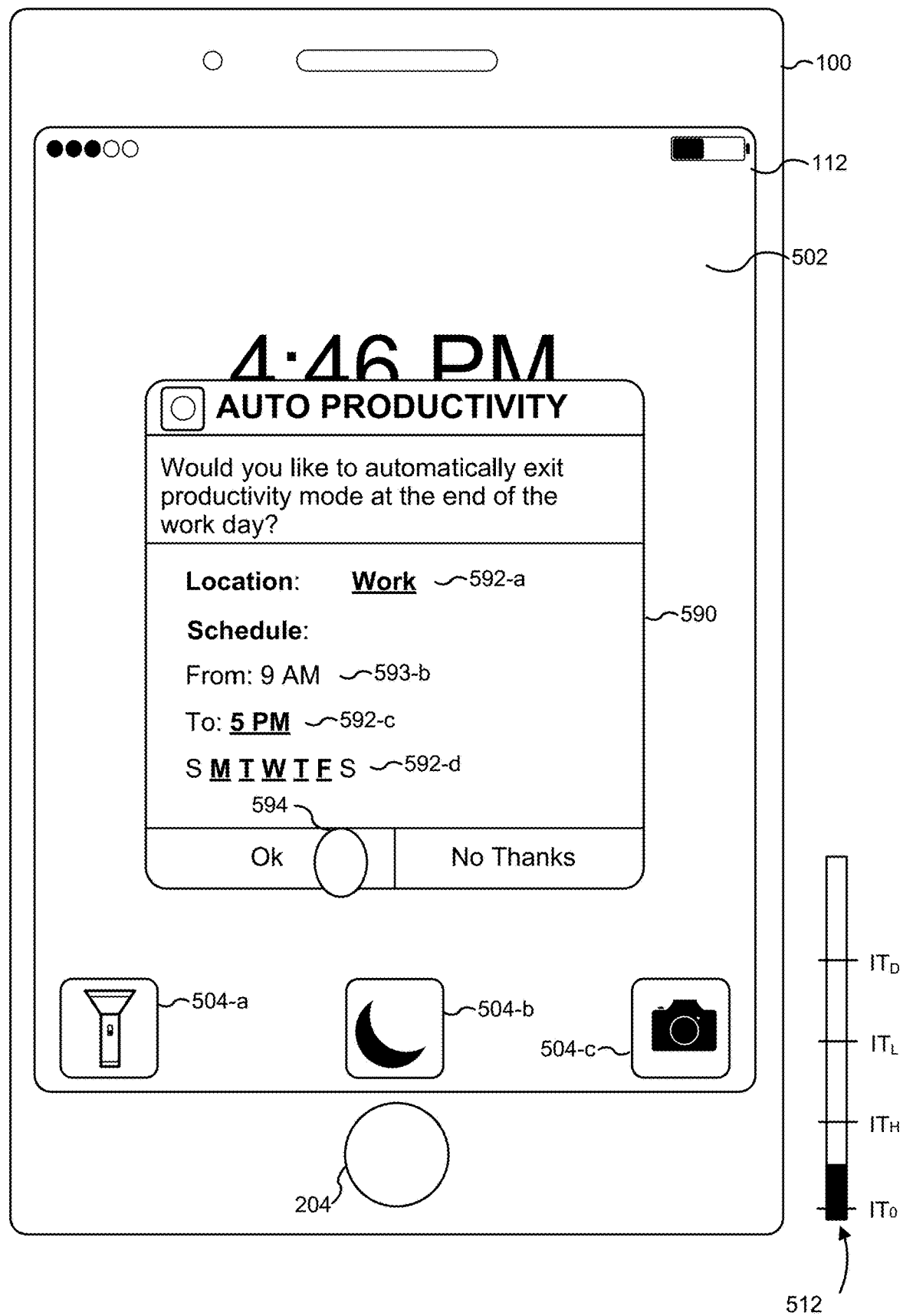
Figure 5A:
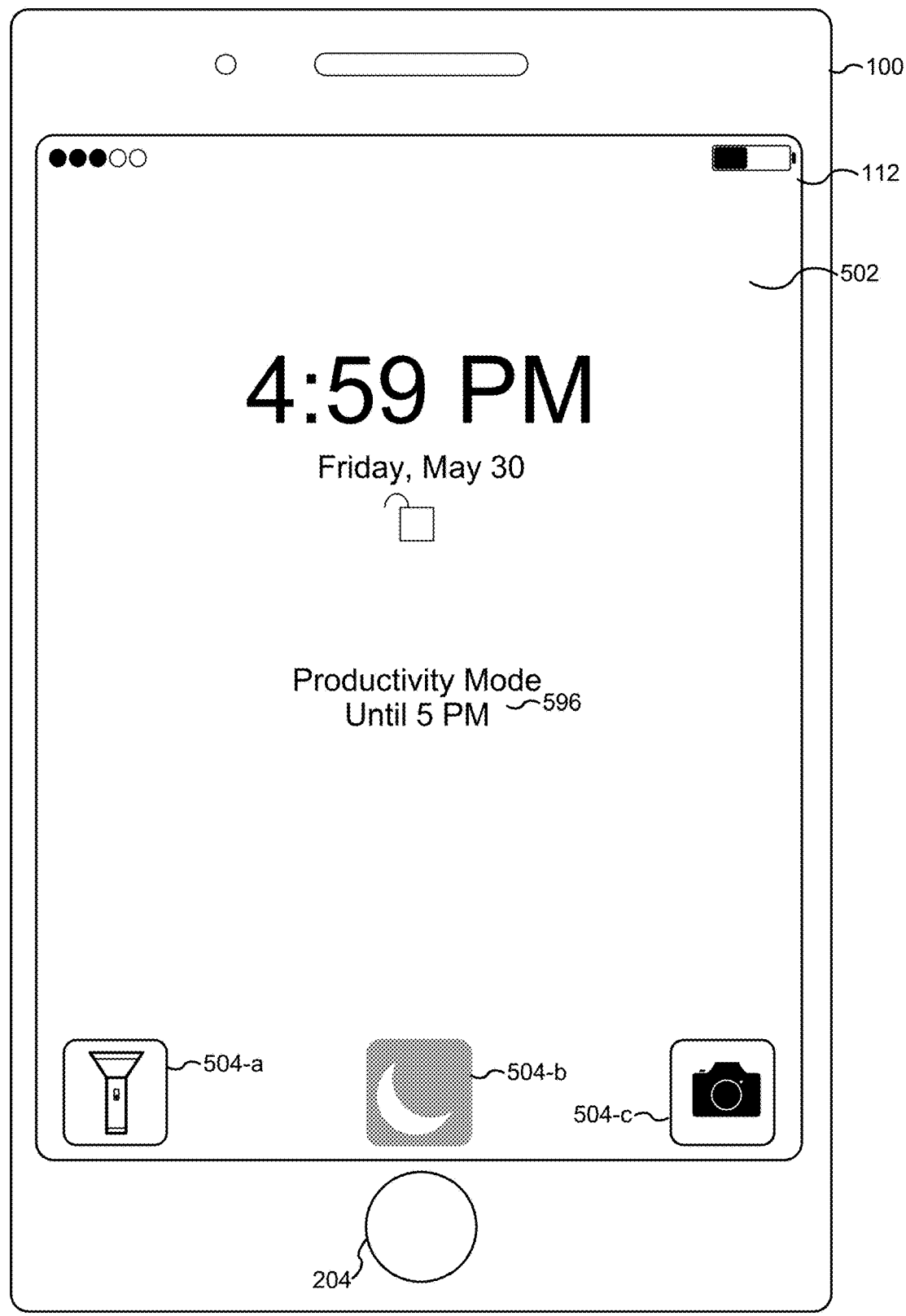
Figure 5A:
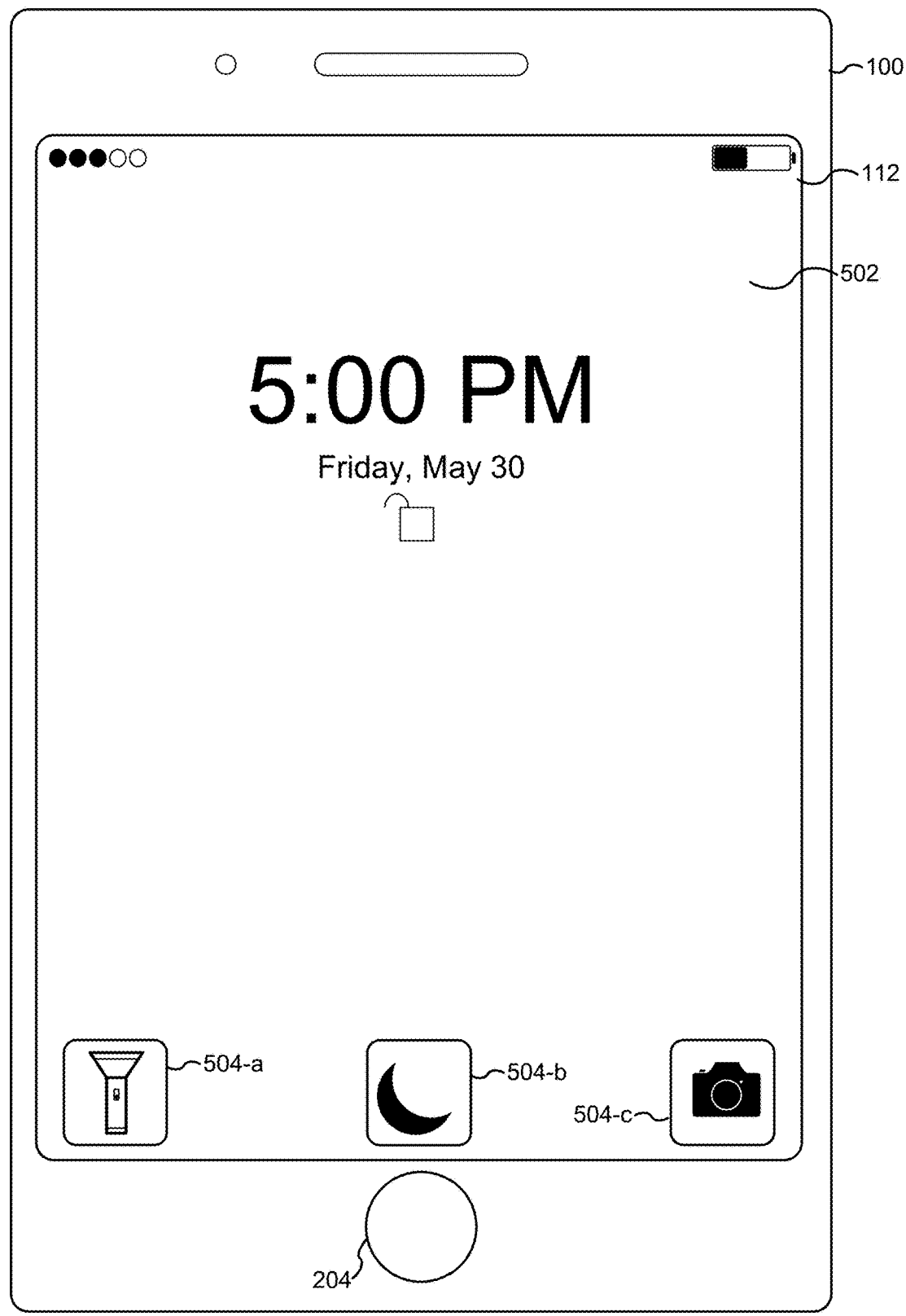
Figure 5A:
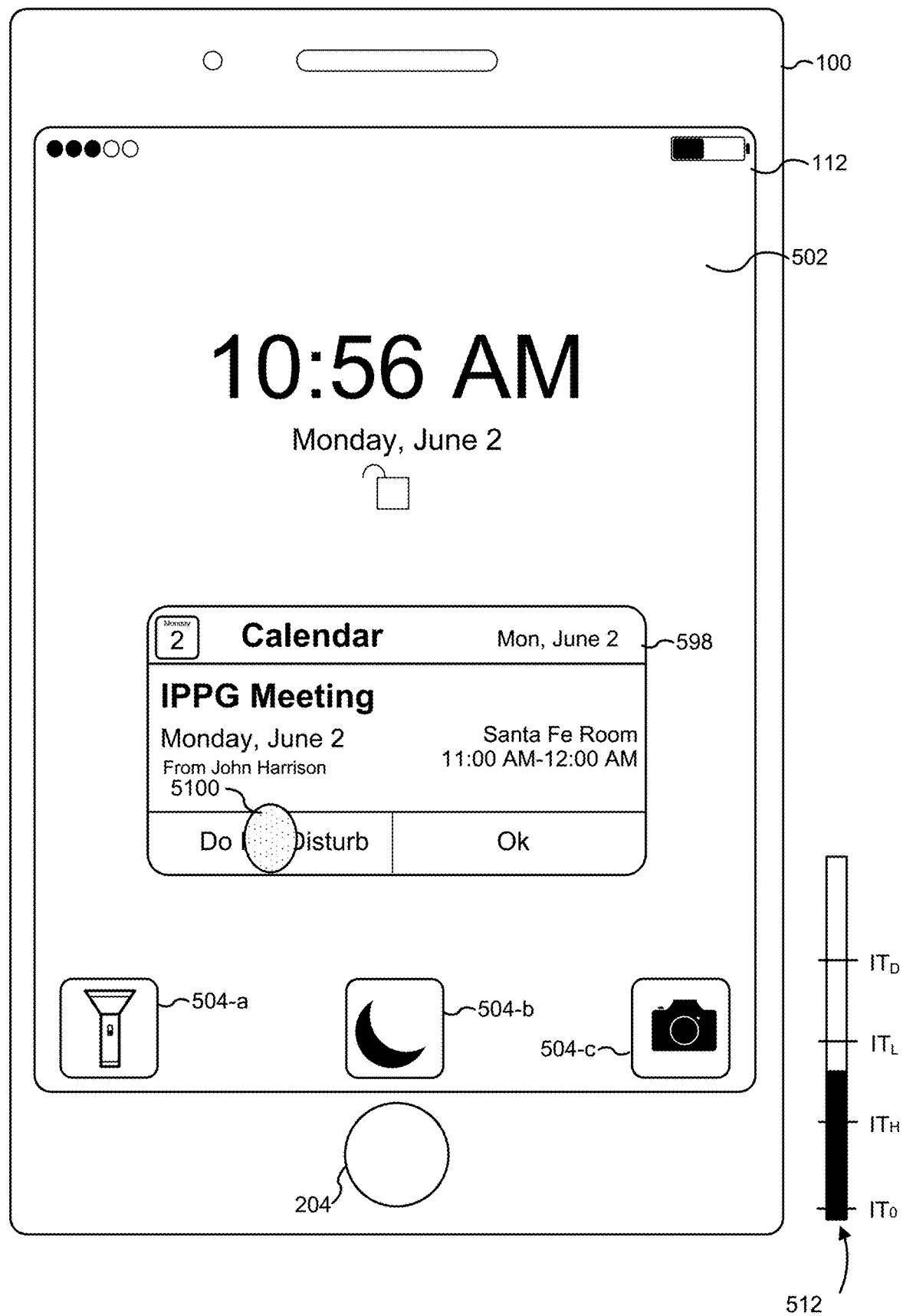
Figure 5A:
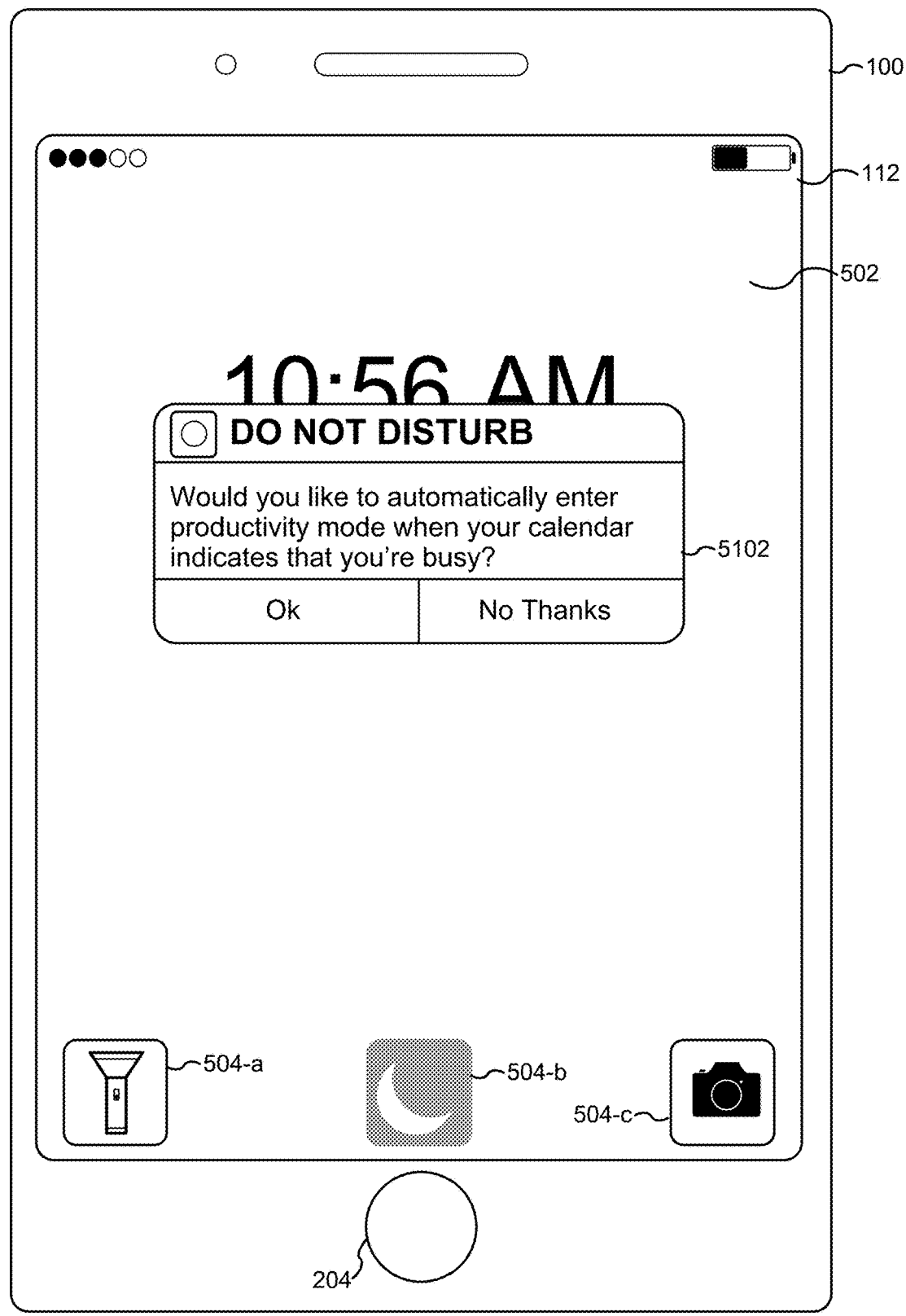
Figure 5A:
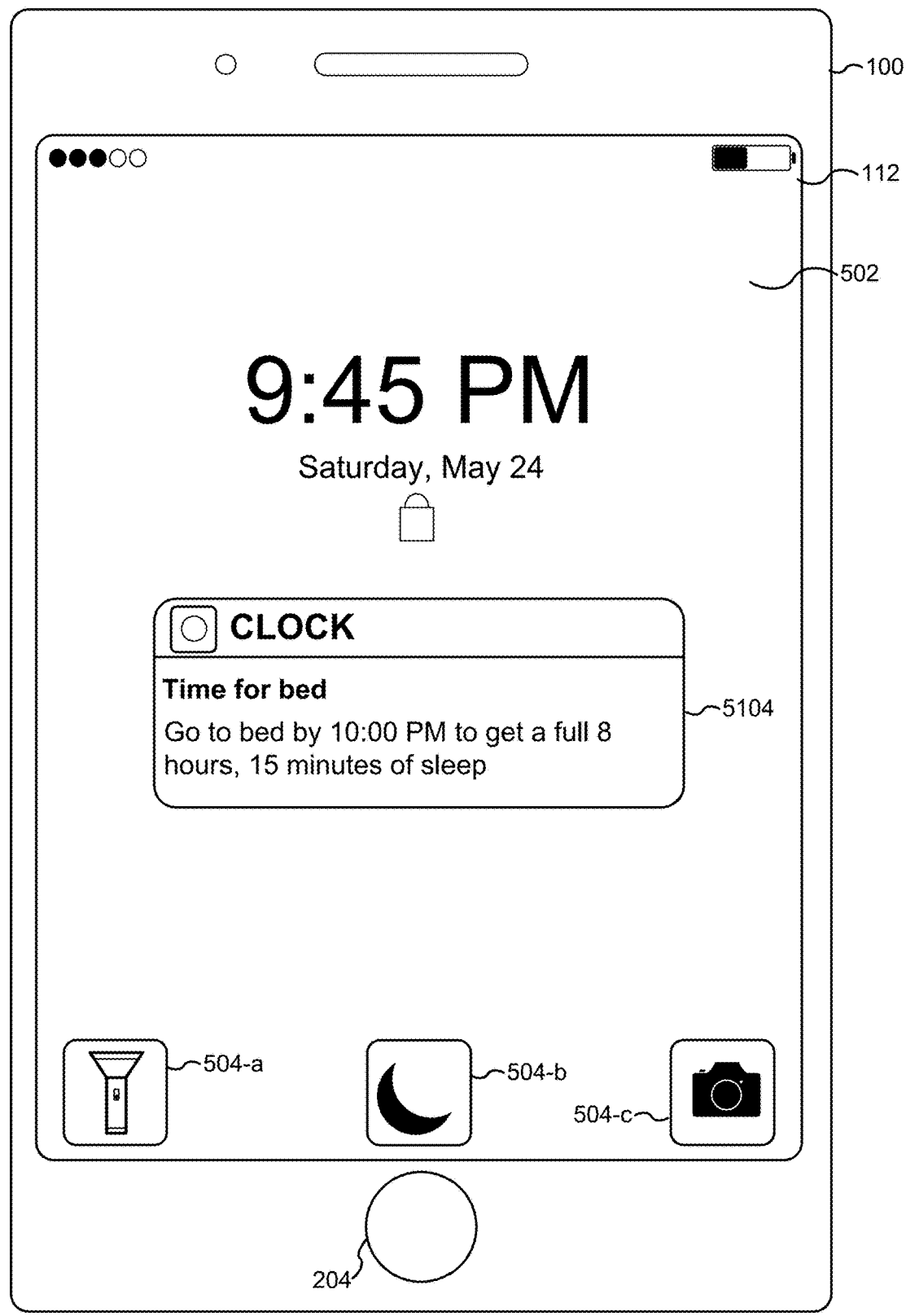
Figure 5B:
Figure 5B:
Figure 5B:
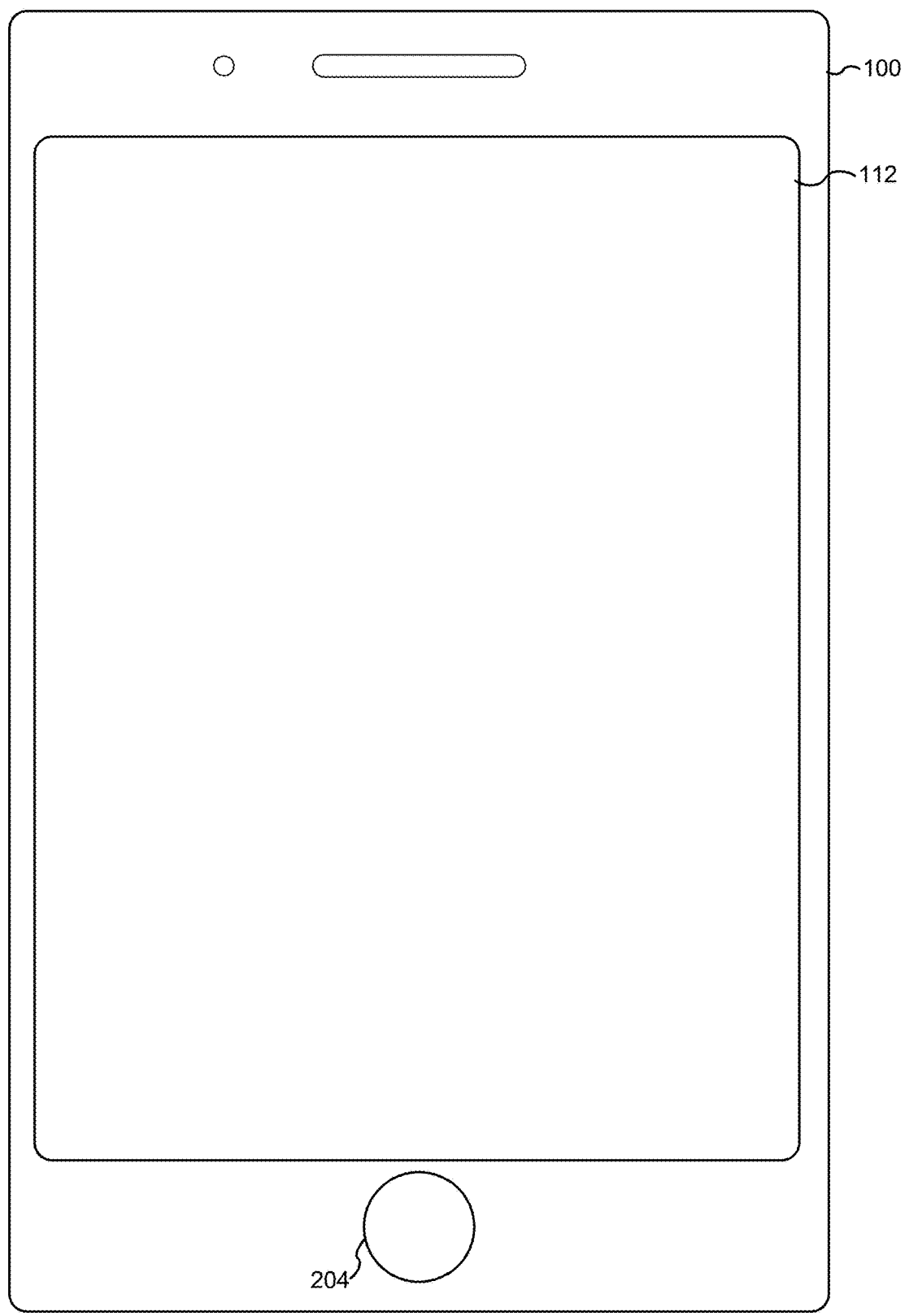
Figure 5B:
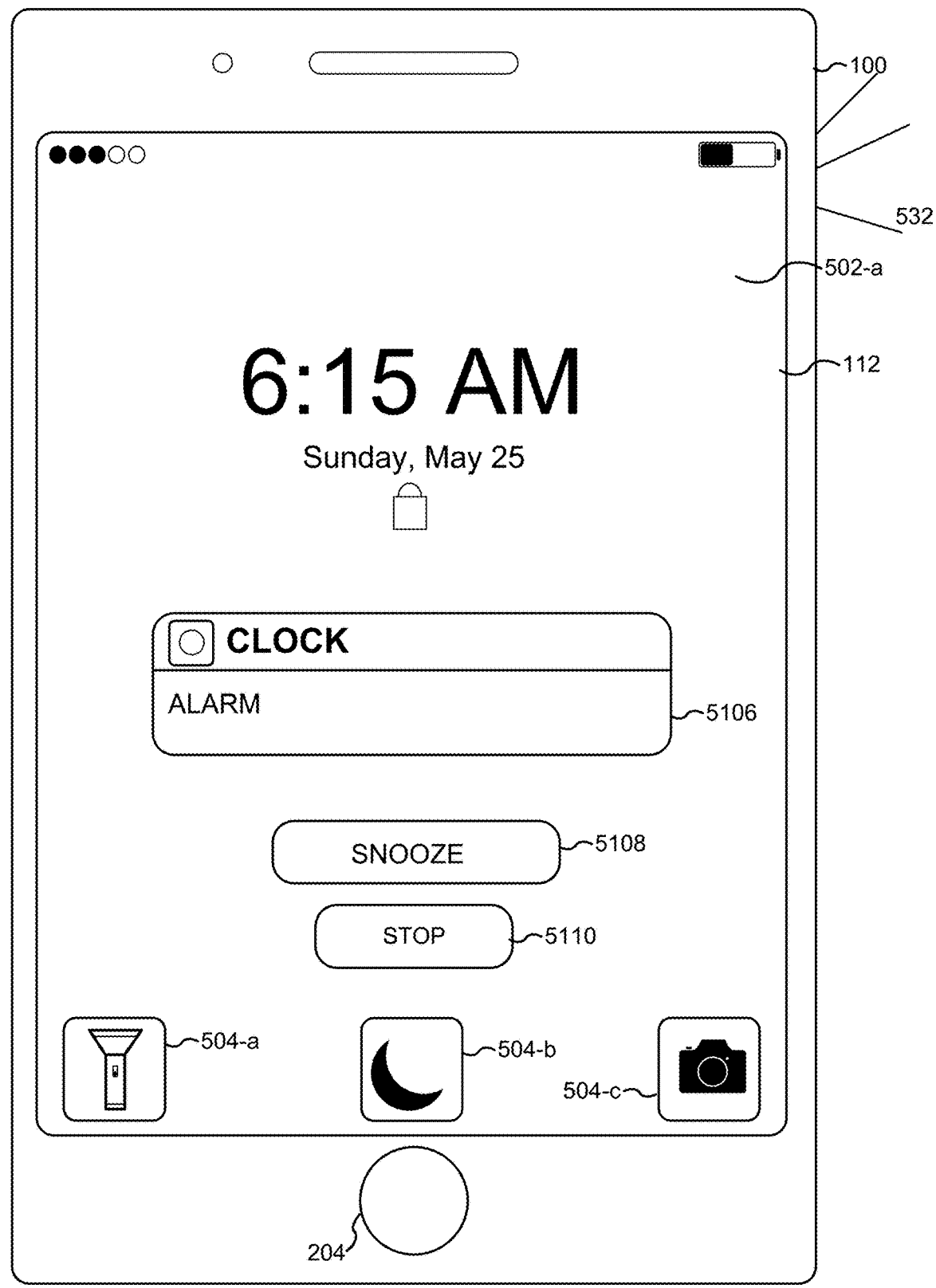
Figure 5B:
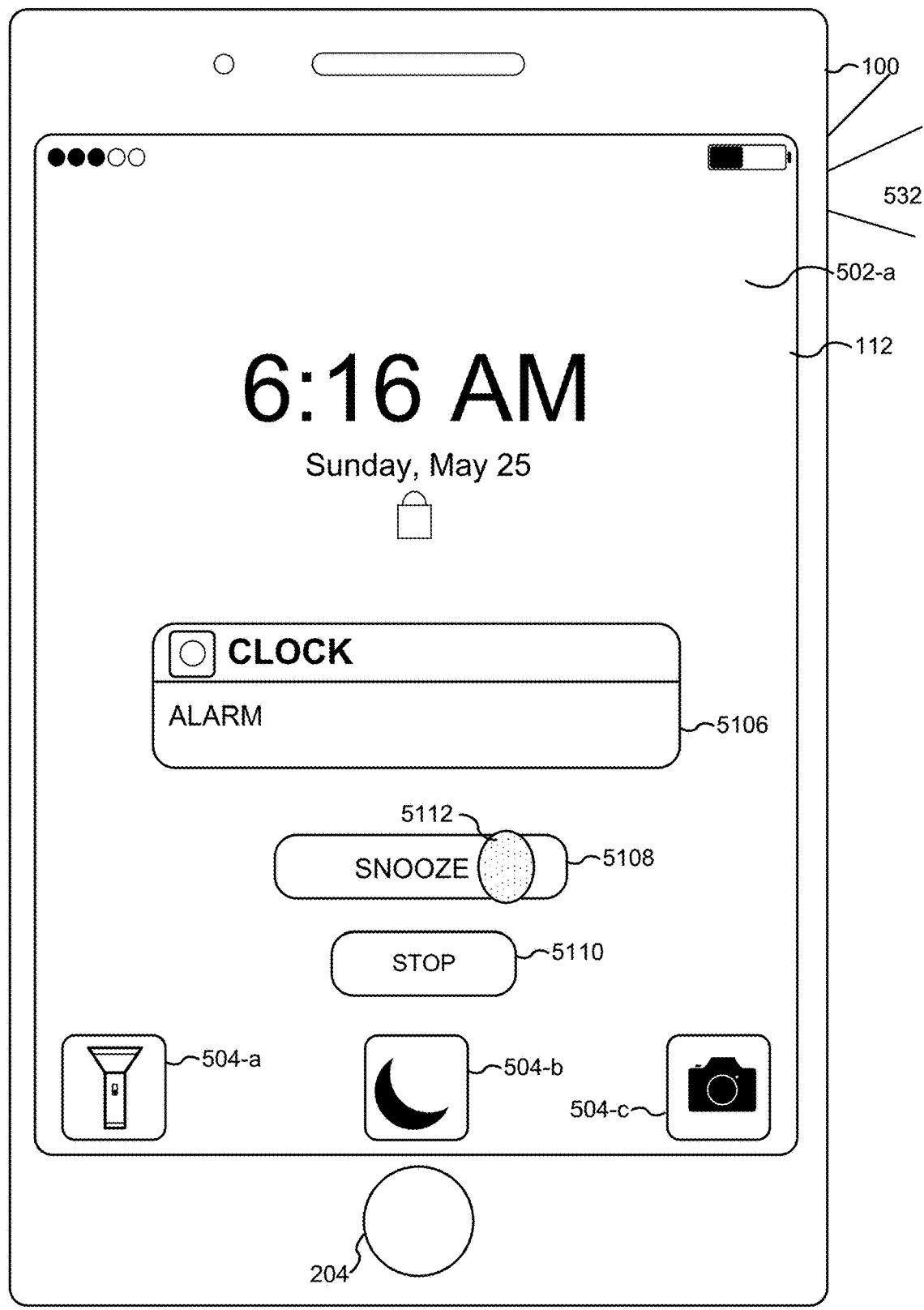
Figure 5B:
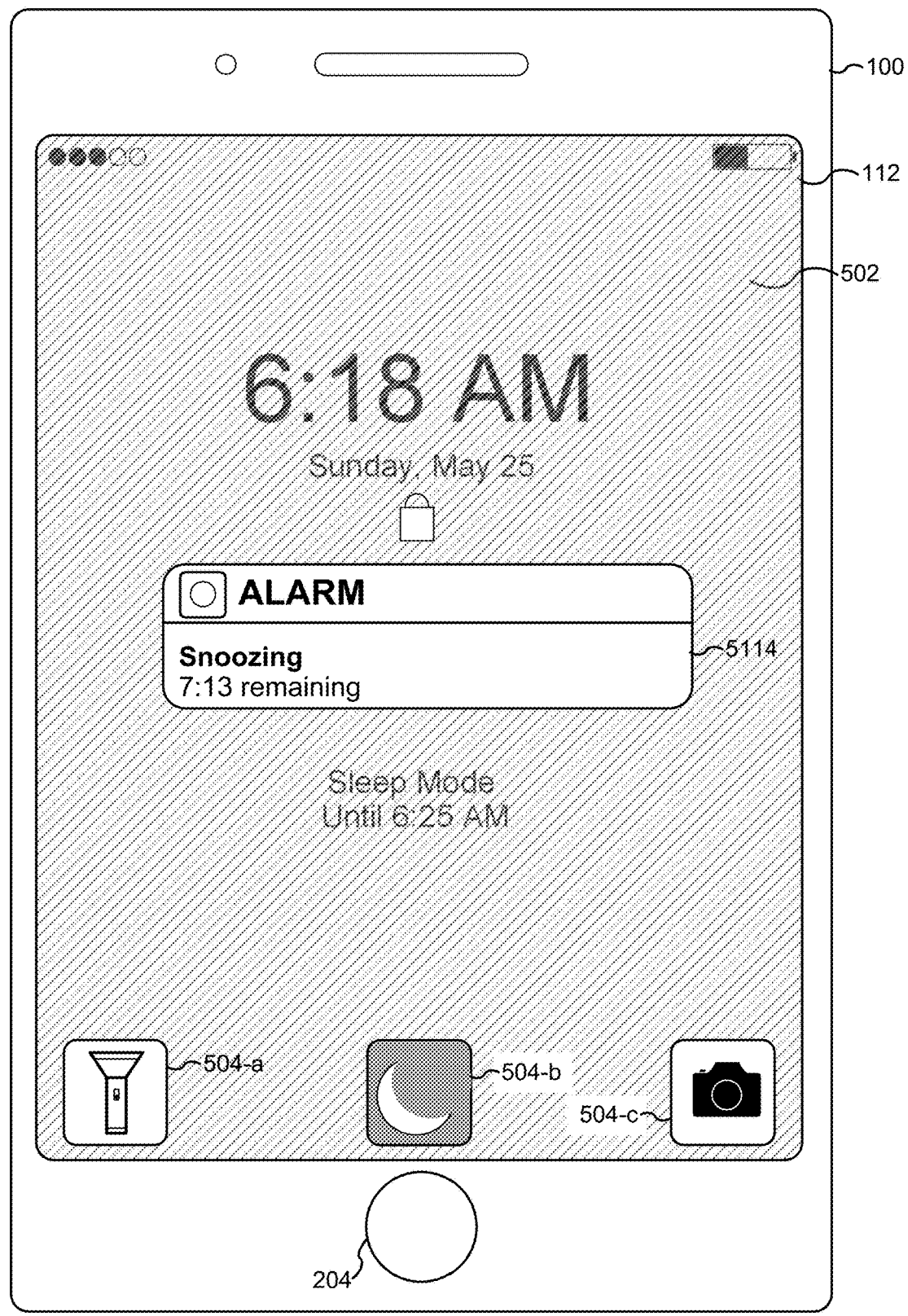
Figure 5B:
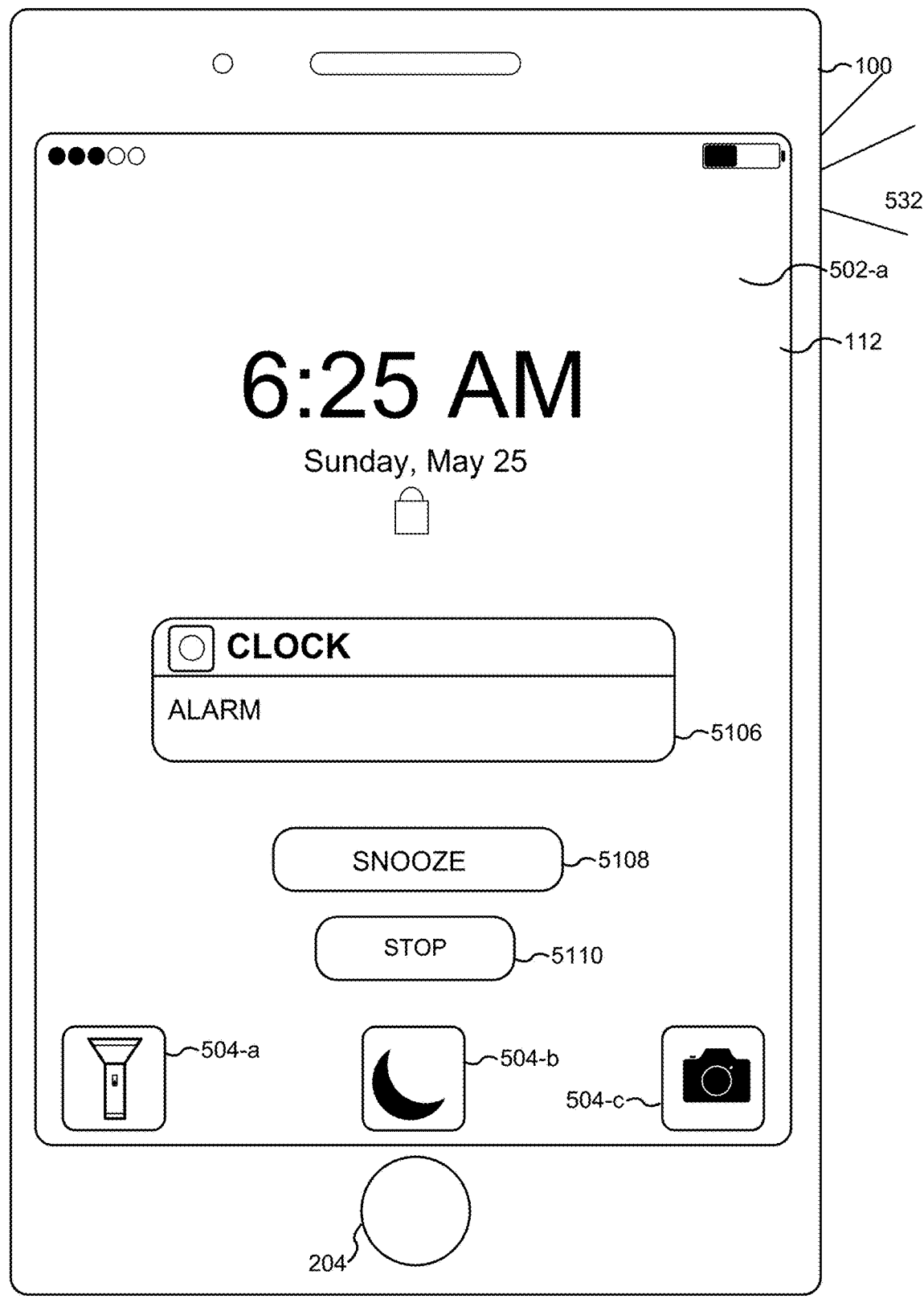
Figure 5B:
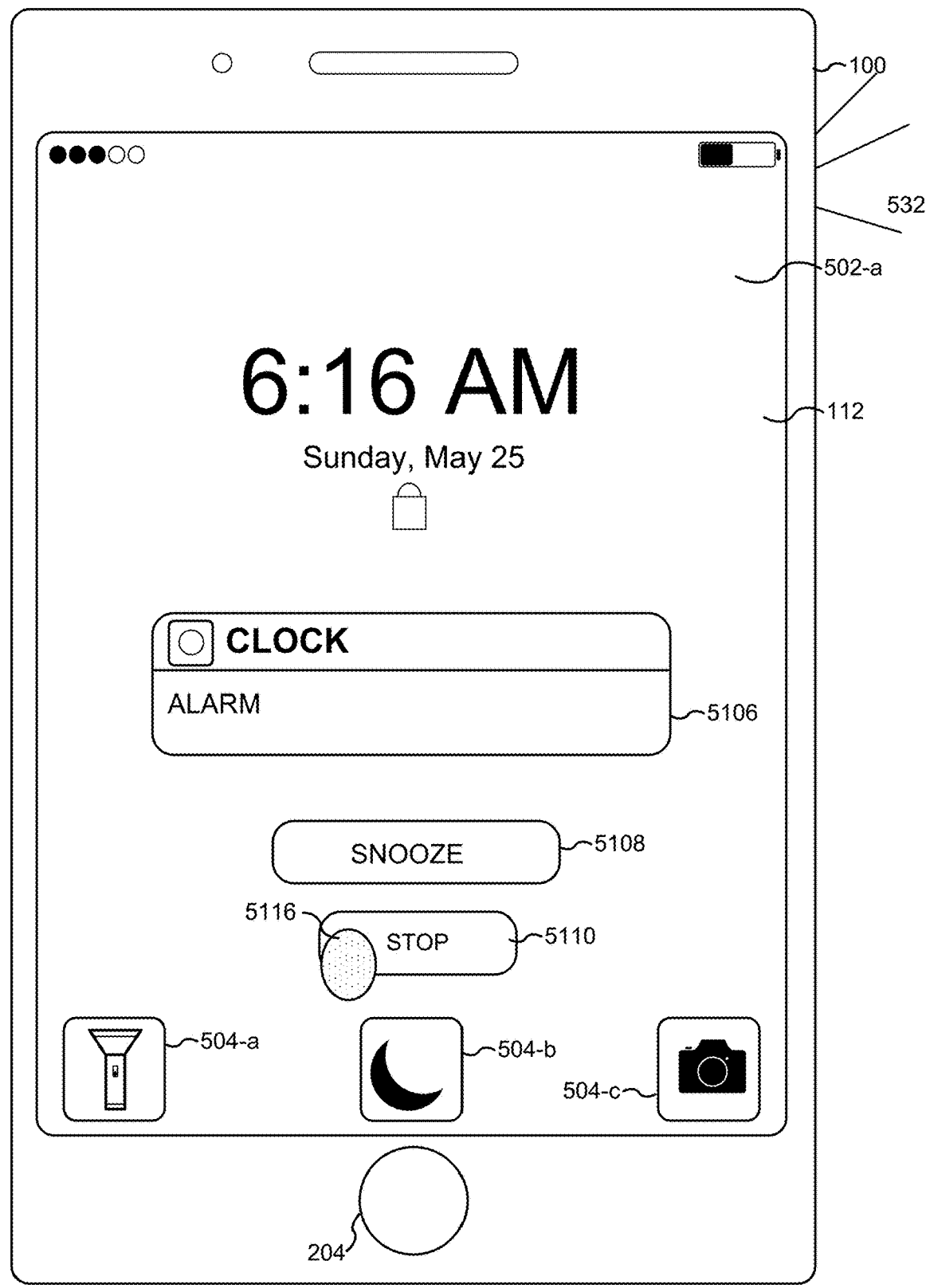
Figure 5B:
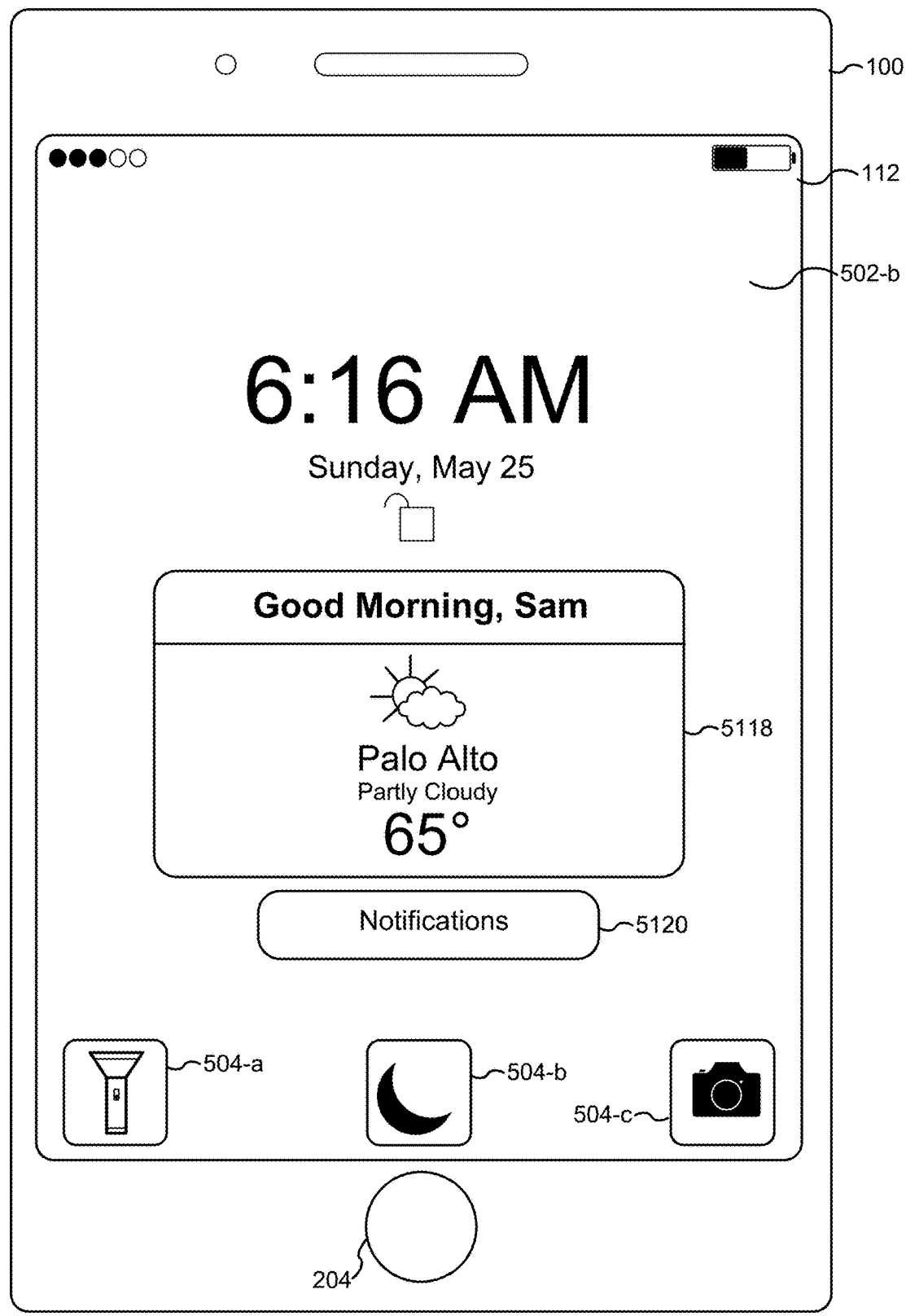
Figure 5B:
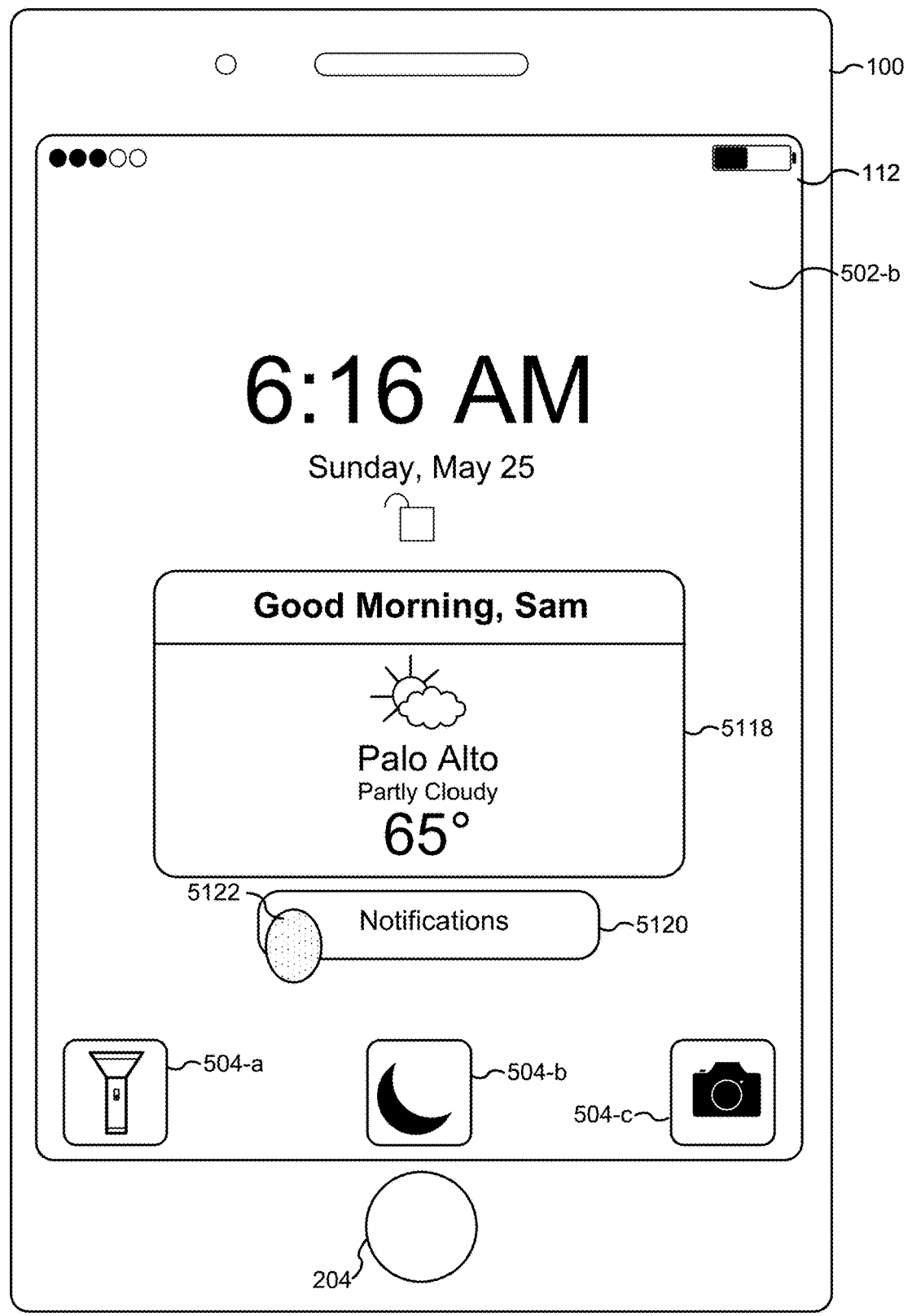
Figure 5B:
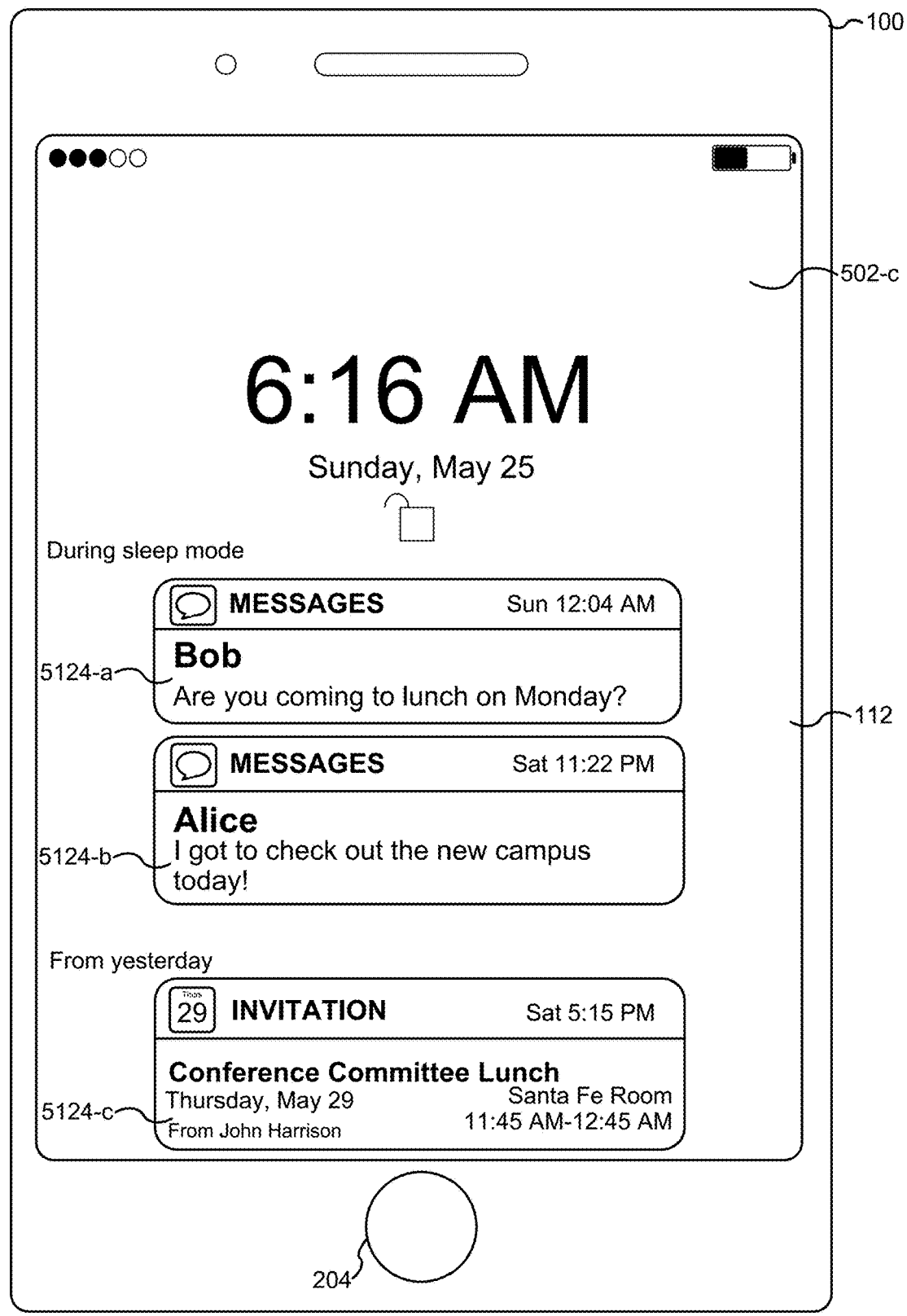
Figure 5B:
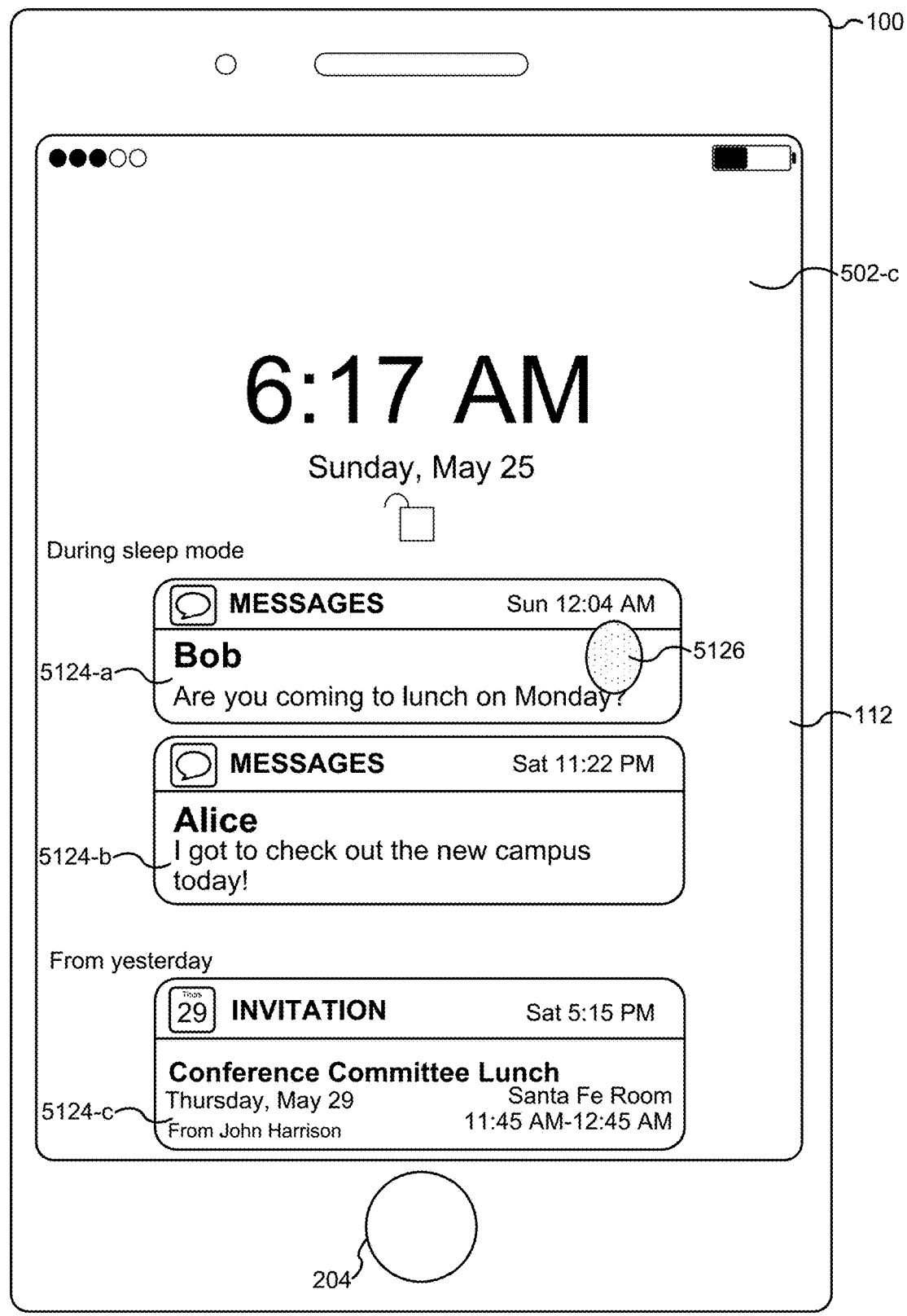
Figure 5B:
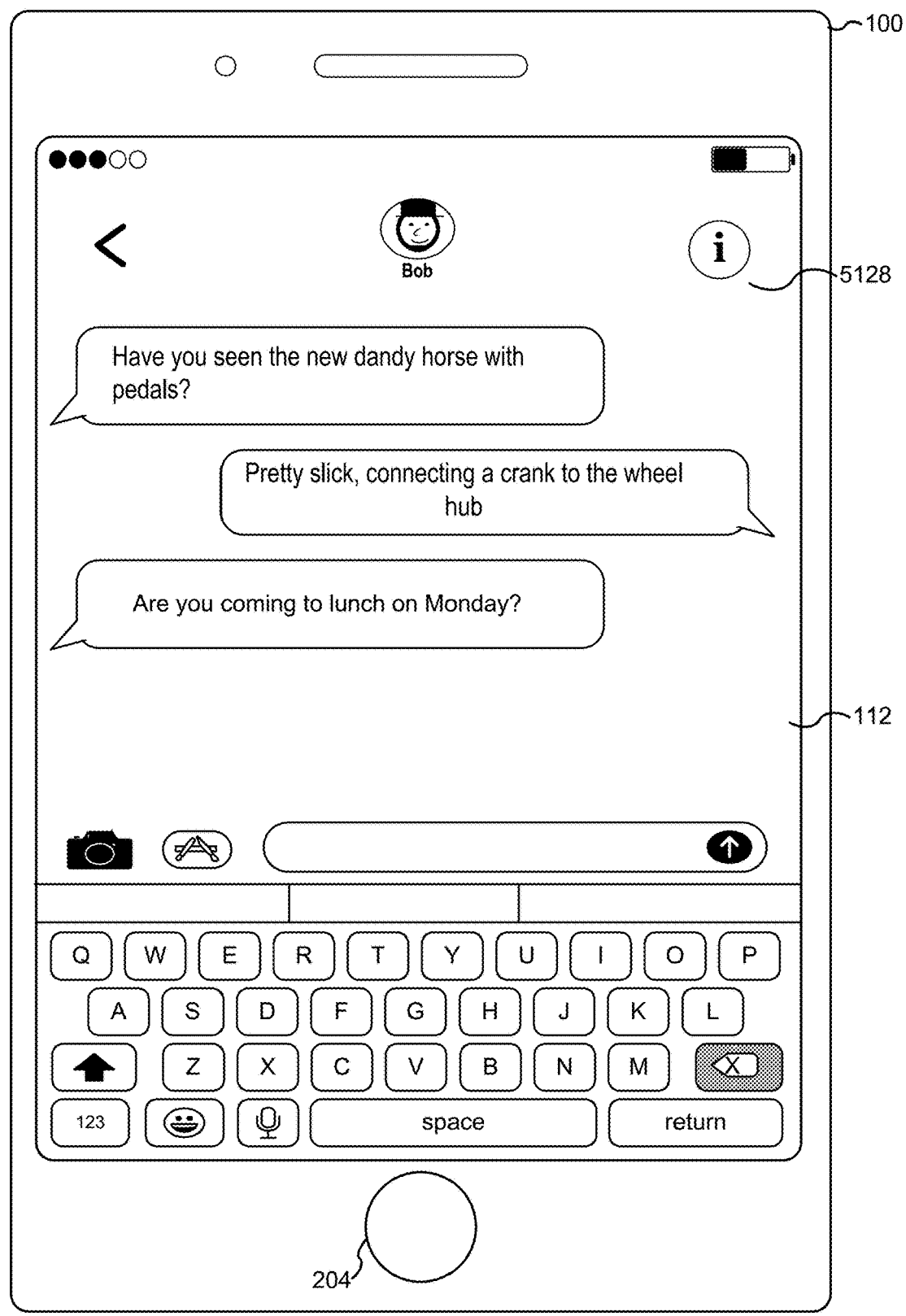
Figure 6A:
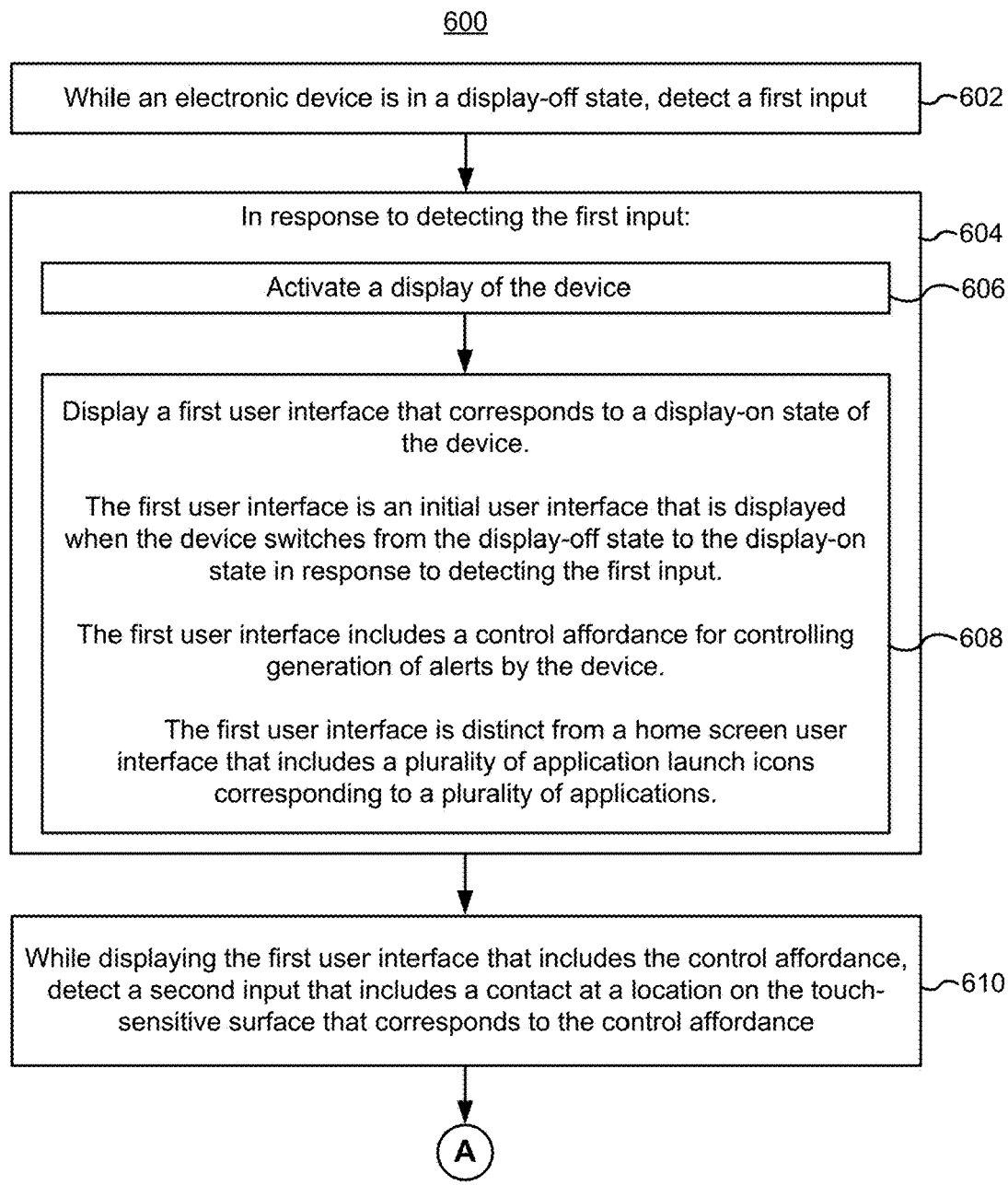
Figure 6B:
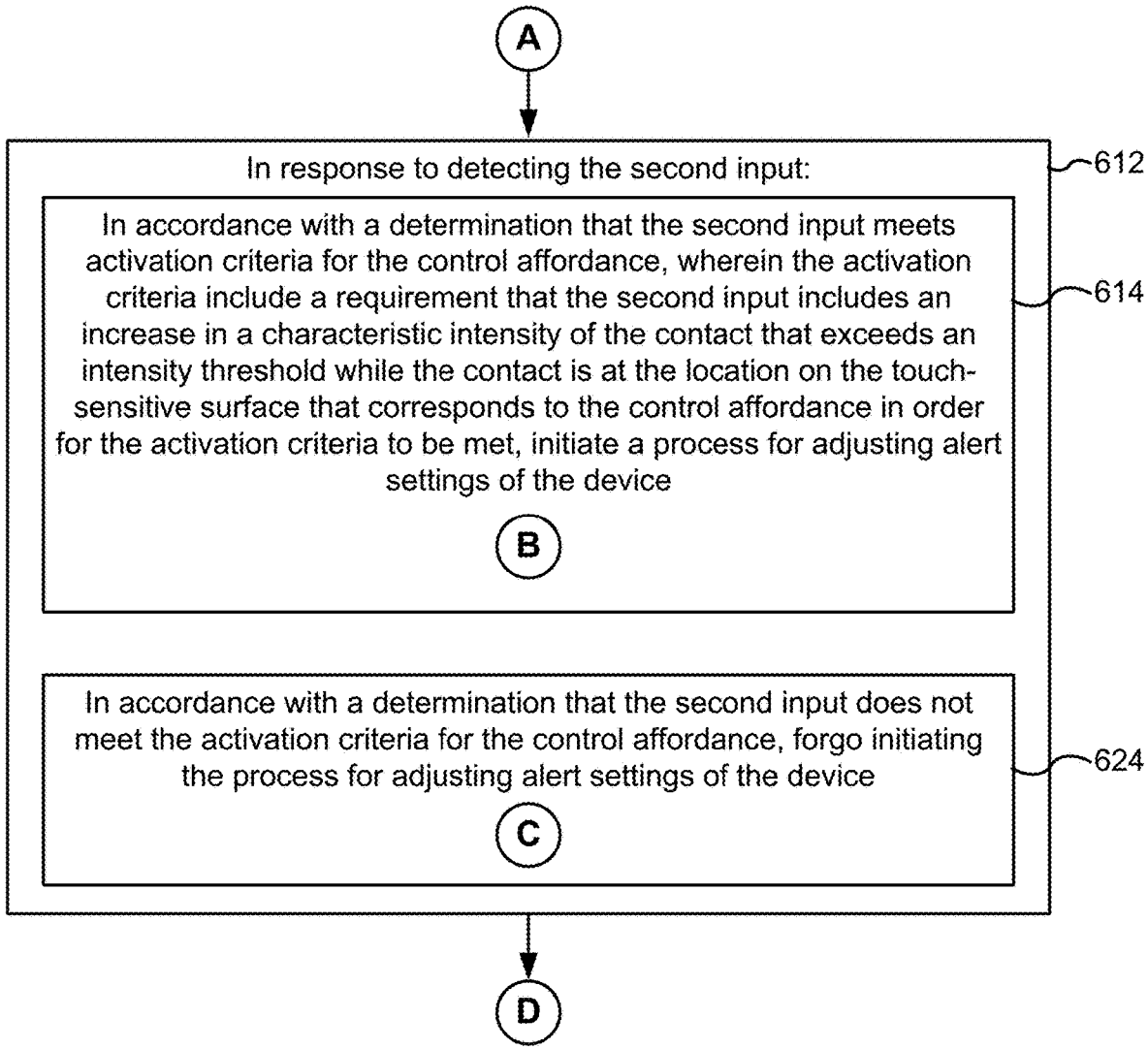
Figure 6C:
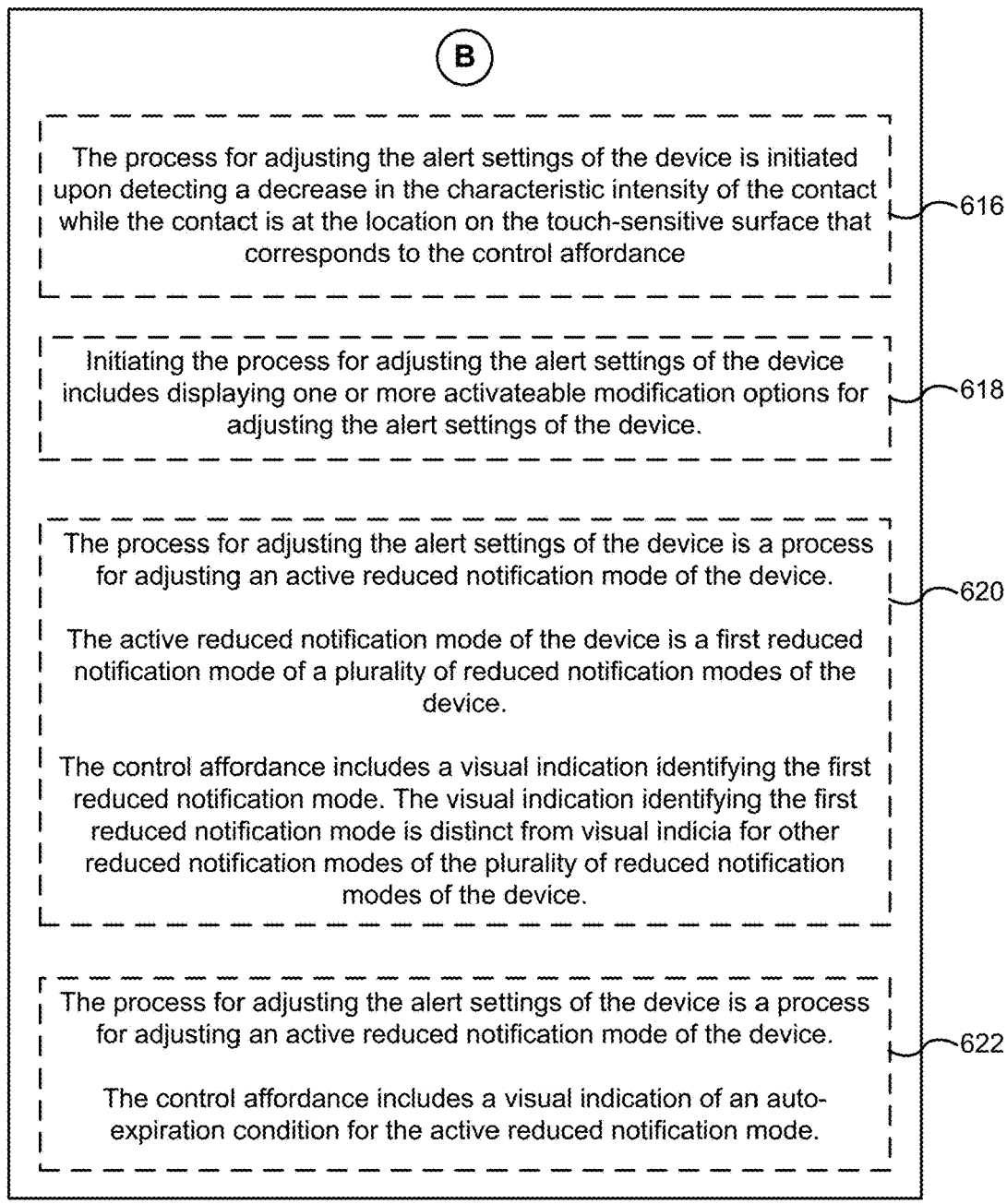

As an example, FIGS. 5Z-5AA illustrate provision of notifications from initial user interface 502 (e.g., the wake screen) while device 100 is in the social mode. In some embodiments, the social mode is initialized with a default whitelist of applications. The whitelist for the social mode can include, for example, applications that are tagged by their developers or by users in an application store as relating to rest, relaxation, social media, entertainment, and the like. As described later, in some embodiments, a user can modify the default whitelist for the social mode. In this example, it is assumed that the calendar application is not whitelisted in the productivity mode and that the messages (e.g., "text messaging") application is whitelisted.

As shown in FIG. 5Z, the device receives a message from Bob (e.g., a communication) while in the social mode. In response to receiving the message from the messaging application, device 100 determines that the communication is received from a whitelisted application for the social mode and provides a corresponding notification that includes a displayed notification 530-*d* and a sound alert 544.

FIG. 5AA illustrates notifications user interface 534. For the purposes of this example, notification user interface 534 in FIG. 5AA shows notifications corresponding to all of the communications received while device 100 has been in the social mode. In particular, in addition to displayed notification 530-*d*, notification user interface 534 shows a displayed notification 530-*e* corresponding to a calendar invitation received while device 100 was in the social mode. Displayed notification 530-*e* was not whitelisted and thus not provided on the wake screen 502 while device was in the social mode. In addition, in some embodiments, no sound or haptic alert was provided when the communications corresponding to displayed notifications 530-*e* was received.

Thus, as seen by comparing FIGS. 5S-5T with FIGS. 5Z-5AA, device 100 provides functionality that mirrors the user's life through different reduced notification modes for different contexts. For example, as with the user's life, the social mode and the productivity mode are, in some senses, complementary (e.g., the productivity mode includes at least one application on its whitelist that is not on the whitelist for the social mode, and vice versa).

FIGS. 5AB-5AD illustrate user interfaces for adjusting settings (e.g., including a whitelist of applications) of a social reduced notification mode.

FIG. 5AB illustrates a "Do Not Disturb" settings user interface 546 (e.g., a settings interface for reduced notification modes, which are sometimes colloquially referred to herein as "Do Not Disturb" modes). The setting user interface 546 includes virtual buttons 548 corresponding to each of the plurality of reduced notification modes (e.g., virtual buttons 548-*a* through 548-*d*). As shown in FIG. 5AB, device 100 detects a contact 550 on the virtual button 548-*b* corresponding to the social mode.

In response, as shown in FIG. 5AC, device 100 displays a social mode settings user interface 552. The social mode settings user interface, for example, allows the user to toggle the social mode on/off, provides geographical auto-activation conditions (e.g., the social mode is set to auto-activate when device 100 is near the user's home, which for the sake of this example is assumed to be stored in device 100's memory), provides geographical auto-deactivation conditions (e.g., the social mode is set to auto-de-activate when device 100 is near the user's work, which for the sake of this example is assumed to be stored in the device 100's memory), and allows the user to schedule set times when the social mode is active (e.g., the user has set the social mode to be active from 5 PM to 8 AM, which the user can modify by selecting the options with, e.g., a touch input).

FIG. 5AC continues the example by illustrating user selection of the application whitelist in the social mode settings user interface 552 (e.g., via a tap gesture by contact 554).

In response, as shown in FIG. 5AD, device 100 displays a social mode application whitelist user interface 556. The application whitelist shown in the social mode application whitelist user interface 556 (e.g., those applications toggled to "on" in user interface 556) is an initial default whitelist for the social mode (e.g., comprising the device 100's "best guess" as to which applications should be whitelisted in the social mode, based on, for example, attributes tagged by the developers of the applications or other users of the applications). For example, to name a few, the application whitelist for the social mode includes a social media application, a television (TV) application, a game center, etc. A mail application, professional networking application, and calendar application are not whitelisted in the initial default list of whitelisted applications for the social mode because such applications are more likely to be relevant to the user's work life. The user can add or remove applications from the social mode whitelist by toggling the "off/on" toggle for each application in the social mode application whitelist user interface 556.

FIGS. 5AE-5AG illustrate user interfaces for adjusting settings (e.g., including a whitelist of applications) of a productivity reduced notification mode.

FIG. 5AE illustrates the "Do Not Disturb" settings user interface 546 and is analogous to FIG. 5AB except that, in FIG. 5AE, the user selects (e.g., via a tap gesture by contact 558) the virtual button 548-*a* corresponding to the productivity mode, instead of virtual button 548-*b* corresponding to the social mode (FIG. 5AB).

In response, as shown in FIG. 5AF, device 100 displays a productivity mode settings user interface 560, which is analogous to social mode settings user interface 546 except that the user interface 560 is for the productivity reduced notification mode rather than the social reduced notification mode.

FIG. 5AF continues the example by illustrating user selection of the application whitelist in the productivity mode settings user interface 560 (e.g., via a tap gesture by contact 562).

In response, as shown in FIG. 5AG, device 100 displays a productivity mode application whitelist user interface 564. The application whitelist shown in the productivity mode application whitelist user interface 564 (e.g., those applications toggled to "on" in user interface 564) is an initial default whitelist for the productivity mode (e.g., comprising the device 100's "best guess" as to which applications should be whitelisted in the productivity mode, based on, for example, attributes tagged by the developers of the applications or other users of the applications). For example, to name a few, the application whitelist for the productivity mode includes the calendar application, a professional networking application, and the mail application. The social media application, game center application, and TV application are not whitelisted in the initial default list of whitelisted applications for the productivity mode because such applications are not likely to be relevant to the user's work. The user can add or remove applications from the whitelist of applications for the productivity mode by toggling the "off/on" toggle for each application in the productivity mode application whitelist user interface 564.

In some embodiments, different reduced notification modes have different automatic activation conditions (e.g., as shown in FIGS. 5AC and 5AF, the user can configure distinct automatic activation conditions for different reduced notification modes). As another example, FIGS. 5AH-5AI illustrate embodiments in which a particular reduced notification mode is automatically activated when a related application in a predefined set of applications is running in a foreground of the device. In particular, FIGS. 5AH-5AI illustrate an example in which a user input activating an exercise application (e.g., a tap gesture by a contact 566 on an exercise application icon in a home screen, FIG. 5AH) causes the exercise application 570 to run in the foreground of the device. In response to detecting that the exercise application 570 is running in the foreground of the device, the device automatically activates an exercise reduced notification mode and notifies the user (e.g., via notification 568, FIG. 5AI).

FIGS. 5AJ-5AY illustrate example user interfaces for devices that automatically suggest activation of a reduced notification mode based on a plurality of manual activations of the reduced notification mode. In some embodiments, a device associates a set of conditions with individual manual activations of a reduced notification mode. For example, a device detects that the user has manually activated a productivity mode five times around 9 AM when the user arrives at work. After the plurality of manual activations, the device outputs an activation suggestion for the productivity reduced notification mode. In some embodiments, the activation suggestion is a suggestion, provided upon a manual activation of the reduced notification mode, to automatically activate the reduced notification mode whenever the device detects a similar set of conditions (e.g., "Would you like to automatically activate the productivity mode whenever you arrive at work in the morning?"). In some embodiments, the activation suggestion is a suggestion, provided when the device detects a similar set of conditions, to activate the reduced notification mode (e.g., "You've arrived at work! Would you like to activate productivity mode?")

FIG. 5AJ illustrates wake screen 502 having virtual buttons 504, as described with reference to FIG. 5B, including virtual button 504-*b* corresponding to a reduced notification mode. In FIG. 5AJ, the reduced notification mode is not active (e.g., as indicated by the fact that virtual button 504-*b* is not shaded). However, in FIG. 5AJ, device 100 detects contact 572 that meets toggle criteria for the virtual button 504-*b*. Thus, in FIG. 5AK, which follows FIG. 5AJ, the reduced notification mode is active (as indicated by the shading of virtual button 504-*b*).

For the sake of this example, the manual activation of the reduced notification mode shown in FIGS. 5AJ-5AK is assumed to be one of a plurality of manual activations of the reduced notification mode, the rest of which occurred at other times in similar circumstances (e.g., similar times of day, days of the week, locations, etc.). For example, the user, in the past week, activated the reduced notification mode at the following times on respective nights while at home: 9:44 PM, 10:23 PM, 10:01 PM, and 10:07 PM (as shown in FIGS. 5AJ-5AK). From those manual activations, device 100 determines a set of conditions: the user activates the reduced notification mode (1) while at home and (2) around 10 PM (e.g., determined by taking the mean of the manual activation times and rounding to the nearest quarter of an hour).

FIGS. 5AL-5AM follow FIGS. 5AJ-5AK and illustrate an example in which device 100 outputs a suggestion, based on the plurality of manual activations of the reduced notification mode, to activate the reduced notification mode, in accordance with some embodiments. For example, FIG. 5AL illustrates that the next night, when the user is at home, the reduced notification mode is not active at 9:59 PM. As shown in 5AM, when the clock strikes 10 PM, because of the previous plurality of manual activations of the reduced notification mode, device 100 outputs an activation suggestion 574 to activate sleep mode (e.g., device 100 detects the set of conditions corresponding to the previous manual activations of the sleep mode and, upon detecting the set of conditions, outputs a suggestion to activate the sleep mode).

FIGS. 5AN-5AQ illustrate an example in which device 100 outputs a suggestion, based on the plurality of manual activations of the reduced notification mode, to automatically activate the reduced notification mode when the set of conditions corresponding to the manual activation is detected, in accordance with some embodiments. That is, FIGS. 5AN-5AQ follow FIG. 5AJ and illustrate an alternative response of device 100 as compared with FIGS. 5AL-5AM.

FIG. 5AN illustrates that upon detecting the manual activation (via contact 572, FIG. 5AJ), device 100 outputs a suggestion 576 to automatically activate the reduced notification mode the next time the set of conditions is detected (e.g., and upon subsequent detections of the set of conditions). In some embodiments, the suggestion 576 to activate the reduced notification mode the next time the set of conditions is detected is a suggestion to set-up automatic conditions for the reduced notification mode (including automatic activation and de-activation conditions). In some embodiments, the suggestion 576 includes affordances for modifying activation/expiration options 578 corresponding to automatic activation and/or expiration conditions (e.g., modification option 578-*a* is a location expiration option that corresponds to a condition that the reduced notification mode should automatically turn off, notwithstanding the schedule, if the user is not home; modification option 578-*b* is a scheduled begin activation option that corresponds to a condition that the reduced notification mode should automatically turn on at a set time; modification option 578-*c* is a scheduled end expiration option that corresponds to a condition that the reduced notification mode should automatically turn off at a set time; modification option 578-*d* corresponds to a condition that the schedule should apply on certain days of the week). In some embodiments, the values (e.g., conditions) for the modification options 578 can be changed or de-activated (when appropriate) by the user (e.g., by selecting an option with a touch input, such as a tap gesture).

In this example, modification options whose conditions (e.g., values) are automatically determined by the device based on manual activations/de-activations are visually distinguished from those which are not. For example, the "home" condition for modification option 578-*a*, the "10 PM" scheduled begin condition for modification option 578-*b*, and the days for which the schedule applies (modification option 578-*d*) are assumed, for the sake of this example, to have been determined automatically by the device as a set of conditions corresponding to manual activations of the reduced notification mode, and thus are visually distinguished.

As shown in FIG. 5AN, device 100 detects a contact 580 which accepts the set of conditions (e.g., including automatic activation and de-activation conditions).

FIG. 5AO follows FIG. 5AN (e.g., shows the device the next night, with the set of automatic activation conditions active after the user has accepted the suggestion 576). In particular, 5AO illustrates that, at 9:59 PM the next night, the reduced notification mode is not active. FIG. 5AP follows FIG. 5AO and illustrates that, when the clock strikes 10 PM, the device automatically activates the reduced notification mode without user intervention (in FIGS. 5AO-5AP the device is assumed to be located at the user's home so that all of the automatic activation conditions are met). Device 100 also displays a visual indication 582 of an automatic expiration condition (e.g., that the reduced notification mode (e.g., sleep mode) will remain active until 6

AM). The automatic expiration condition is based on the user's acceptance of suggestion 576 (FIG. 5AN).

Note that, in some embodiments, the automatic activation of the reduced notification mode includes a geographical/location based criterion (e.g., the reduced notification mode automatically activates and remains active, according to the schedule, if the user is at home). As shown in FIG. 5AQ, in some embodiments, device 100 automatically de-activates the reduced notification mode (e.g., sleep mode) if the device 100 detects that its location does not meet the geographical/location based criteria (e.g., the device is no longer at home). For example, in FIG. 5AQ, the user left home early to go to the airport. As a result, device 100 automatically, without user intervention, de-activates the reduced notification mode and displays a notification 584 notifying the user.

FIGS. 5AR-5AW illustrates wake screen 502 having virtual buttons 504, as described with reference to FIG. 5B, including virtual button 504-b corresponding to a reduced notification mode. In FIG. 5AR, the reduced notification mode is active (e.g., as indicated by the fact that virtual button 504-b is shaded). However, in FIG. 5AR, device 100 detects a gesture by contact 586 that meets toggle criteria for the virtual button 504-b.

For the sake of this example, the manual de-activation of the reduced notification mode shown in FIG. 5AR is assumed to be one of a plurality of manual de-activations of the reduced notification mode, the rest of which occurred at other times in similar circumstances (e.g., similar times of day, days of the week, locations, etc.). For example, the user, in the past week, de-activated the reduced notification mode at the following times on respective afternoons: 5:08 PM, 5:15 PM, 4:59 PM, and 4:46 PM (as shown in FIG. 5AR). From those manual de-activations, device 100 determines a set of conditions: the user de-activates the reduced notification mode around 5 PM (e.g., determined by taking the mean of the manual de-activation times and rounding to the nearest quarter of an hour).

FIGS. 5AS-5AT follow FIG. 5AR and illustrate an example in which device 100 outputs a suggestion, based on the plurality of manual de-activations of the reduced notification mode, to de-activate the reduced notification mode, in accordance with some embodiments. In FIG. 5AS, the next afternoon (as compared to FIG. 5AR) the reduced notification mode is active (as indicated by the shading of virtual button 504-b. As shown in 5AT, when the clock strikes 5 PM, because of the previous plurality of manual de-activations of the reduced notification mode, the device outputs a de-activation suggestion 588 to de-activate productivity mode (e.g., the device detects the set of conditions corresponding to the previous manual de-activations of the productivity mode and, upon detecting the set of conditions, outputs a suggestion to de-activate the sleep mode).

FIGS. 5AU-5AW illustrate an example in which device 100 outputs a suggestion, based on the plurality of manual de-activations of the reduced notification mode, to automatically de-activate the reduced notification mode when the set of conditions corresponding to the manual de-activation is detected, in accordance with some embodiments. That is, FIGS. 5AU-5AW follow FIG. 5AR and illustrate an alternative response of the device as compared with FIGS. 5AS-5AT.

FIG. 5AU illustrates that upon detecting the manual de-activation (via contact 586, FIG. 5AR), device 100 outputs a suggestion 590 to automatically de-activate the reduced notification mode the next time the set of conditions is detected (e.g., and upon subsequent detections of the set of conditions). In some embodiments, the suggestion 590 to de-activate the reduced notification mode the next time the set of conditions is detected is a suggestion to set-up automatic conditions for the reduced notification mode (including automatic activation and de-activation conditions). In some embodiments, the suggestion 590 includes affordances for modifying activation/expiration options 592 corresponding to automatic activation and/or expiration conditions (e.g., modification option 592-a is a location expiration option that corresponds to a condition that the reduced notification mode should automatically turn off, notwithstanding the schedule, if the user is not home; modification option 592-b is a scheduled begin activation option that corresponds to a condition that the reduced notification mode should automatically turn on at a set time; modification option 592-c is a scheduled end expiration option that corresponds to a condition that the reduced notification mode should automatically turn off at a set time; modification option 592-d corresponds to a condition that the schedule should apply on certain days of the week). In some embodiments, the values (e.g., conditions) for the modification options 592 can be changed or deactivated (when appropriate) by the user (e.g., by selecting an option with a touch input).

In this example, modification options whose conditions (e.g., values) are automatically determined by device 100 based on manual activations/de-activations are visually distinguished from those who are not. For example, the "work" condition for modification option 592-a, the "5 PM" scheduled begin condition for modification option 592-b, and the days for which the schedule applies (modification option 592-d) are assumed, for the sake of this example, to have been determined automatically by the device as a set of conditions corresponding to prior manual activations of the reduced notification mode, and are thus visually distinguished.

As shown in FIG. 5AU, device 100 detects a contact 594 which accepts the set of conditions (e.g., including automatic activation and de-activation conditions).

FIG. 5AV follows FIG. 5AU (e.g., shows the device the next afternoon, with the set of automatic activation conditions active after the user has accepted the suggestion 590). In particular, 5AV illustrates that, at 4:59 PM the next afternoon, the reduced notification mode is active. Device 100 also displays a visual indication 596 of an automatic expiration condition (e.g., that the reduced notification mode (e.g., productivity mode) will remain active until 5 PM). The automatic expiration condition is based on the user's acceptance of suggestion 590 (FIG. 5AU).

FIG. 5AW follows FIG. 5AV and illustrates that, when the clock strikes 5 PM, the device automatically de-activates the reduced notification mode without user intervention.

FIGS. 5AX-5AY illustrate an example in which the device 100 outputs an activation suggestion for a reduced notification mode in response to one or more (e.g., a plurality of) manual activations of the reduced notification mode with a corresponding calendar condition. For example, in FIG. 5AX, device 100 outputs a notification 598 reminding the user of a calendar appointment. The notification offers the user the option to activate the reduced notification mode, which the user accepts via a tap gesture by contact 5100 (thus manually activating the reduced notification mode). FIG. 5AY illustrates that, in response to and upon the receiving the gesture by contact 5100 accepting the suggestion to activate the reduced notification mode, device 100 outputs an activation suggestion 5102 that the device enter the reduced notification mode whenever the user's calendar indicates that the user is busy. If the user accepts the suggestion (e.g., by pressing "ok") the device 100 automatically enters the reduced notification (e.g., productivity) mode automatically, without user intervention, whenever the user's calendar indicates that the user is busy.

FIGS. 5AZ-5BM illustrate example user interfaces for providing notifications when a reduced notification mode (e.g., a sleep mode) is deactivated.

FIG. 5AZ illustrates an initial user interface 502 (e.g., a wake screen). As described with reference to FIG. 5B, the initial user interface 502 includes virtual buttons 504-a, 504-b, and 504-c. The initial user interface 502 further includes a displayed notification 5104 (e.g., a reminder to go to bed) that indicates that the reduced notification mode will be activated at a user-defined future time. For example, FIG. 5AZ shows a notification 5104 at 9:45 PM that alerts the user that it will be "time for bed" at 10 PM (e.g., at which point the reduced notification mode will automatically activate). In some embodiments, the notification 5104 is accompanied by an audio output and/or a tactile output (e.g., a sound and/or vibration).

In some embodiments, the reduced notification mode (e.g., a "do-not-disturb" mode) corresponds to a bedtime mode (e.g., sleep mode). For example, in some circumstances, the reduced notification automatically activates at a user-defined bed time (e.g., "time for bed") and deactivates at a user-defined wake-up time (e.g., the alarm time). For example, the user sets "time for bed" to be 10 PM, sets the notification 5104 to be displayed 15 minutes before it is "time for bed," and sets her alarm to go off at 6:15 AM. Alternatively, in some circumstances, a default setting is used to set the "time for bed" and the alarm time. In the following example, sleep mode is set to begin at 10 PM on Saturday, and the alarm is set to go off at 6:15 AM on Sunday. In various circumstances, the user stops the alarm (e.g., by pressing a stop button) or snoozes the alarm (e.g., by pressing a snooze button). In the case of snoozing the alarm, sleep mode remains active until the snooze period is over and a second alarm goes off, at which point the user may press snooze again (e.g., for an additional 10 minutes) or stop the alarm to deactivate sleep mode.

FIG. 5BA illustrates the initial user interface 502 before the reduced notification mode is activated. Continuing with the example in FIG. 5AZ, the reduced notification mode (e.g., corresponding to "time for bed") is set to activate at 10 PM. At 9:59 PM, the initial user interface 502 is shown at a predefined brightness corresponding to the device not being in the reduced notification mode. FIG. 5BB illustrates the automatic activation of the reduced notification mode. In some embodiments, the reduced notification mode limits the notifications (e.g., alerts) the device displays while the reduced notification mode is active. In some embodiments, the reduced notification mode also reduces the brightness of the display while the reduced notification mode is active. In some embodiments, reducing the brightness of the display includes reducing a background of a displayed user interface and maintaining the brightness of one or more foreground user interface objects.

In this example, at 10 PM, the device forgoes displaying incoming notifications to the user and the brightness of the initial user interface 502 is reduced in accordance with the activation of the reduced notification mode. As noted above, this reduction of brightness corresponds to the "sleep mode" such that the screen remains at the reduced brightness. during the predefined time that sleep mode is active (e.g., 10 PM to 6:15 AM) even when the user is using the device (e.g., in some embodiments, the display turns off after a predefined amount of time when the user is not using the device).

In some embodiments, objects in the foreground of the user interface 502 maintain their respective brightness while the reduced notification mode is active. In some embodiments, only the brightness of the background of the user interface 502 is reduced. For example, in some embodiments, the time and date displayed in the user interface 502 are considered objects in the foreground. Thus, in some embodiments, the time and date are maintained at the same brightness when the reduced notification mode is active as compared to when the reduced notification mode is not active. In some embodiments, the virtual buttons 504-a, 504-b and 504-c are considered objects in the foreground. In some embodiments, the virtual buttons 504-a, 504-b and 504-c are not considered objects in the foreground (e.g., are part of the background) and thus the brightness of the virtual buttons 504 is reduced in accordance with activation of the reduced notification mode.

In some embodiments, objects in the foreground of the user interface 502 reduce their respective brightness while the reduced notification mode is active, but the reduction in brightness of the objects in the foreground is less than the reduction in brightness of the background. Thus, in some embodiments, the time and date are reduced in brightness when the reduced notification mode is active as compared to when the reduced notification mode is not active, but the time and date do not become as dim as the background.

FIG. 5BC illustrates device 100 with display 112 in a display off state. In some embodiments, the display 112 remains in the display off state until device 100 detects an input for waking up device 100. For example, while the reduced notification mode is active, if the user provides an input for waking the device (e.g., by movement of the device 100 or by actuation of any physical button on the device 100), the display 112 displays user interface 502 (e.g., or another user interface) at the reduced brightness. If the user uses device 100 during "sleep mode" (e.g., if the user wakes up in the middle of the night), the display 100 activates at the reduced brightness. Thus, in some embodiments, the device remains in "sleep mode" even if the user provides inputs to the device at any point during the time "sleep mode" is active (e.g., 10 PM to 6:15 AM).

In some embodiments, detecting an input to wake-up the device includes detecting movement of the device 100 (e.g., device 100 detects vertical movement or shaking of the device using one or more accelerometers), detecting actuation of any physical button on the device, or detecting a voice command asking the device to wake-up. In some embodiments, the device 100 wakes up in response to an internal event (e.g., an alarm going off, a communication being received). In some embodiments, if no user input is received, the display 112 remains in the display off state until the device detects an alert condition for the reduced notification mode (e.g., the device detects that it is time for the sleep mode alarm to go off).

FIG. 5BD shows the response of device 100 to the sleep mode alarm going off. In some embodiments, in response to the sleep mode alarm going off (e.g., when it is 6:15 AM), a user interface 502-a is displayed. User interface 502-a includes an "alarm" alert 5106, a "snooze" affordance 5108 (e.g., virtual button) and/or a "stop" affordance 5110. The virtual buttons 504-a, 504-b, and 504-c shown in FIG. 5BD are optionally displayed on the user interface 502-a.

In some embodiments, user interface 502-a is an updated user interface from user interface 502. For example, in some embodiments, the user interface background and/or one or more of the user interface objects displayed in user interface 502-*a* (e.g., virtual buttons 504) are the same as those in user interface 502. In some embodiments, user interface 502-*a* is updated to include additional elements, such as affordances, or other overlays. Alternatively, in some embodiments, user interface 502-*a* is a distinct user interface from user interface 502.

In addition to displaying the "alarm" alert 5106, and affordances 5108 and 5110, in some circumstances, device 100 outputs audio output and/or a tactile output (e.g., sound alert 532). Thus, in some embodiments, the device 100 outputs a sound in addition to displaying the first user interface 502-*a*.

In some embodiments, the user interface 502-*a* is presented at a reduced brightness (e.g., to appear dimmed, in an analogous fashion to user interface 502 in FIG. 5BB). In some embodiments, the user interface 502-*a* is displayed with different color tones (e.g., warmer tones corresponding to less blue light) as compared with the color tones of the user interface 502. For example, device 100 displays the user interface 502-*a* at the reduced brightness corresponding to the reduced notification mode. Note that depending on which elements are considered in the foreground and the background, affordances and icons displayed in user interface 502-*a* also appear at the reduced brightness, or appear at a brightness corresponding to a brightness of the device when the device is not in the reduced notification mode.

In some embodiments, the user can select either affordance 5108 to snooze the alarm or affordance 5110 to turn off the alarm. FIGS. 5BE-5BG illustrate a first example in which device 100 delays deactivation of (e.g., snoozes) the reduced notification mode after displaying a first user interface in response to detecting an alert condition for the reduced notification mode.

For example, as shown in FIG. 5BE, the user provides an input 5112 on the "snooze" affordance 5108. In some embodiments, in response to activation of the "snooze" affordance, the device 100 remains in the reduced notification mode. In some embodiments, in response to activation of the "snooze" affordance, the device no longer displays user interface 502-*a*, and instead displays user interface 502 (e.g., at the reduced brightness). In some embodiments, as shown in FIG. 5BF, the device 100 further displays an indication 5114 indicating that the deactivation of the reduced notification mode is delayed (e.g., shows the alarm is snoozing for another 7 minutes and 13 seconds). Also note an indication displayed on the initial user interface that states "Sleep Mode Until 6:25 AM," is displayed to indicate delay of deactivation of the reduced notification mode. In some embodiments, the indication 5114 is an object in the foreground and thus, even during reduced notification mode, maintains a brightness that corresponds to a brightness of the display when not in the reduced notification mode. Alternatively, in some embodiments, the indication 5114 is considered as part of the background of the initial user interface and is displayed at a reduced brightness while in the reduced notification mode. In some embodiments, activation of the "snooze" affordance delays the deactivation of the reduced notification mode by a predefined amount of time.

FIG. 5BG illustrates expiration of the delay caused by activating the "snooze" affordance. As shown, at expiration of the "snooze" status (e.g., which expires 10 minutes after the first display of the first user interface), the device displays the user interface 502-*a*.

As explained above, in some embodiments, the user interface 502-*a* is presented at a reduced brightness (e.g., to appear dimmed) corresponding to the reduced notification mode or is presented at a brightness corresponding to a brightness of the device when the device is not in the reduced notification mode.

FIGS. 5BH-5BM illustrate a second example in which device 100 deactivates the reduced notification mode in response to detecting a first input on a first affordance (e.g., "stop" button 5110). That is, FIGS. 5BH-5BM follow FIG. 5BD and illustrate an alternative response of device 100 as compared with FIGS. 5BE-5BG.

FIG. 5BH illustrates an input 5116 on "stop" affordance 5110. In response to detecting the input 5116 that activates the affordance 5110, the device 100 deactivates the reduced notification mode. As shown in FIG. 5BI, in response to the activation of affordance 5110, the device also displays a user interface 502-*b*. In some embodiments, the user interface 502-*b* is an updated user interface 502. For example, in some embodiments, background elements and/or icons from user interface 502 are displayed in user interface 502-*b*. Alternatively, in some embodiments, the user interface 502-*b* is a distinct user interface from user interface 502.

The device also ceases the audio output and/or tactile output (e.g., turns the alarm sounds and/or vibrations off) in response to activation of "stop" affordance 5110. The user interface 502-*b* optionally includes location-based information 5118 (e.g., local weather). In some embodiments, he user interface 502-*b* includes a "notifications" affordance 5120. Note that second user interface 502-*b* does not display content from notifications received while the device was in sleep mode. For example, if a call or a message was received by device 100 while device 100 was in sleep mode, the information related to the call or the message is not displayed on the user interface 502-*b*. In this way, a user is able to deactivate the reduced notification mode (e.g., sleep mode) by turning off the alarm (e.g., selecting the "stop" affordance), and is optionally presented with some information (e.g., local weather) without overloading the user with notifications that may have been missed during the reduced notification mode.

FIG. 5BJ illustrates an input 5122 that activates the "notifications" affordance 5120. As shown in FIG. 5BK, in response to the input 5122, the device displays notifications for the user on a user interface 502-*c* (e.g., notifications that include content from communications that were received while the device 100 was in the reduced notification mode, as well as notifications from earlier). For example, as shown in FIGS. 5BK-5BL, notifications are displayed, including a message 5124-*a* from Bob that was received at 12:04 AM the same day (e.g., while the reduced notification mode was active), a message 5124-*b* from Alice that was received at 11:22 PM the previous day (e.g., while the reduced notification mode was active) and a calendar invitation 5124-*c* that was received at 5:15 PM the previous day. In some embodiments, the notifications that were received while the reduced notification mode was active (e.g., "during sleep mode") are displayed on a portion of the user interface that is separate from the notifications that were received before sleep mode (e.g., "from yesterday"). In some embodiments, the notifications are displayed in a time order (e.g., with the most recent notifications displayed toward the top). For example, the messages from Bob and Alice are displayed in a top portion of the user interface under the heading "during sleep mode" because they were received while the reduced notification mode was active, while the calendar invitation is displayed separately under the heading "from yesterday" because it was received before the reduced notification mode was active. In some embodiments, the notifications are selectable by a user. For example, user selection of a notification results in the device providing more information (e.g., detail) regarding the selected notification.

For example, FIG. 5BL shows an input 5126 that selects message notification 5124-a from Bob. In various circumstances, the input 5126 is a swipe gesture, a touch input, a voice command, or any other user input performed by a user of the device. As shown in FIG. 5BM, in response to selection of the message notification, the device displays a user interface 5128. In some embodiments, the user interface 5128 corresponds to the notification that was selected. For example, a messaging application user interface that displays messages with Bob is displayed in response to the user selecting the message notification 5124-a from Bob.

FIGS. 6A-6E are flow diagrams depicting a method 600 of adjusting alert settings on an electronic device, in accordance with some embodiments. Although some of the examples which follow will be given with reference to inputs on a touch-sensitive display in which a touch-sensitive surface and a display are combined, in some embodiments, the device detects inputs on a touch-sensitive surface 451 that is separate from the display 450, as shown in FIG. 4B.

In some embodiments, method 600 is performed by an electronic device (e.g., portable multifunction device 100, FIG. 1A) and/or one or more components of the electronic device (e.g., I/O subsystem 106, operating system 126, etc.). In some embodiments, method 600 is governed by instructions that are stored in a non-transitory computer-readable storage medium and that are executed by one or more processors of a device, such as the one or more processors 122 of device 100 (FIG. 1A). For ease of explanation, the following describes method 600 as performed by device 100. In some embodiments, with reference to FIG. 1A, the operations of method 600 are performed by or use, at least in part, operating system 126, communication module 128, and/or graphics module 132, as well as a touch-sensitive display (e.g., touch screen 112). Some operations in method 600 are, optionally, combined and/or the order of some operations is, optionally, changed.

As described below, method 600 (and associated interfaces) provides an intuitive way to adjust alert settings on an electronic device, accessible from an initial user interface that is displayed when the device switches from a display-off state to a display-on state (e.g., a wake screen). Providing device-alert setting controls from a wake screen makes it easy to adjust these alert settings, such as reduced-notification settings. By triggering the device-alert setting controls using intensity-based activation criteria, method 600 reduces the risk that a user will accidentally change a setting. The method reduces the number, extent, and/or nature of the inputs from a user when adjusting alert settings, thereby creating a more efficient human-machine interface. For battery-operated electronic devices, enabling a user to adjust alert settings faster and more efficiently conserves power and increases the time between battery charges.

While an electronic device is in a display-off state, device 100 detects (602) a first input (e.g., an input to wake the device from a display-off state). In some embodiments, detecting the first input includes detecting movement of the device (e.g., an inertial input). In some embodiments, detecting the first input includes detecting movement of the device along a predefined axis (e.g., an axis of the device or an axis measured with respect to gravity). For example, the first input includes vertical movement of the device (e.g., lifting the device). In some embodiments, detecting the first input includes detecting pressing of a physical button on the device (e.g., pressing any button on the device wakes the device from the display-off state). FIG. 5A illustrates an example of the electronic device in the display-off state.

In response to detecting the first input (604), device 100 activates (606) a display of device 100 (e.g., wakes the device from the display-off state) and displays (608) a first user interface that corresponds to a display-on state of the device (e.g., wake screen 502, FIG. 5B). The first user interface is an initial user interface that is displayed when the device switches from the display-off state to the display-on state in response to detecting the first input (e.g., a wake screen). In some embodiments, the first user interface displays a visual indicator that changes when the electronic device changes from a locked mode to an unlocked mode. For example, in FIGS. 5B-5C, in response to a valid authentication input (such as a passcode, fingerprint, and/or facial recognition input), a lock indicator 510 changes from indicating that the device is locked (FIG. 5B) to indicating that the device is unlocked (FIG. 5C).

The first user interface includes a control affordance for controlling generation of alerts by the device. For example, in FIGS. 5B-5C, the user interface includes a reduced notification control affordance 504-b. For example, in FIG. 5R, visual indication 506 is a control affordance that also displays information indicating which of a plurality of reduced notification modes is active and what auto-expiration conditions are active. In some embodiments, the control affordance is displayed in the first user interface when the device is in a reduced notification state (e.g., a reduced notification mode is active), but the control affordance is not shown if the device is not in a reduced notification state (e.g., no reduced notification mode is active).

The first user interface (e.g., the wake screen) is distinct from a home screen user interface that includes a plurality of application launch icons corresponding to a plurality of applications (e.g., wake screen 502 is distinct from the home screen user interface shown in FIG. 4A). For example, when the device is in an unlocked state, the user optionally navigates from the first user interface to the home screen by pressing a home button (e.g., home button 204, FIGS. 5A-5BM).

While displaying the first user interface that includes the control affordance, device 100 detects (610) a second input that includes a contact at a location on the touch-sensitive surface that corresponds to the control affordance. For example, the display is a touch-sensitive display that includes the touch-sensitive surface (e.g., the display is a touchscreen) and the contact is over the control affordance on the touch-sensitive display (e.g., contact 514, FIG. 5D). As another example, the display is separate from the touch-sensitive surface and a contact is detected on the touch-sensitive surface while a cursor is over the control affordance.

In response to detecting the second input (612), in accordance with a determination that the second input meets activation criteria (e.g., reduced notification activation criteria) for the control affordance, device initiates (614) a process for adjusting alert settings of the device (e.g., by displaying settings for controlling generation of alerts). The activation criteria (e.g., control activation criteria) include a requirement that the second input includes an increase in a characteristic intensity of the contact that exceeds an intensity threshold (e.g., an intensity threshold greater than a nominal contact detection threshold, such as intensity threshold $IT_D$ or intensity threshold $IT_L$) while the contact is at the location on the touch-sensitive surface that corresponds to the control affordance in order for the activation criteria to be met (e.g., in FIG. 5E, contact 514 has increased in intensity, exceeding $IT_D$, while over virtual button 504-b). In some embodiments, a user input that meets the activation criteria triggers additional functionality beyond toggling the control affordance, whereas the device toggles the reduced notification mode on or off when toggle criteria are met (described below). In some embodiments, device 100 determines whether the second input meets the activation criteria.

In some embodiments, the process for adjusting the alert settings of the device is (616) initiated upon detecting a decrease in the characteristic intensity of the contact (e.g., crossing below an intensity threshold, such as $IT_D$ or a lower intensity threshold) while the contact is at the location on the touch-sensitive surface that corresponds to the control affordance (e.g., the display is a touch-sensitive display that includes the touch-sensitive surface and the contact is over the control affordance on the touch-sensitive display when the decrease in intensity is detected). In some embodiments, the process for adjusting the alert settings of the device is initiated upon detecting the increase in the characteristic intensity of the contact above the intensity threshold (e.g., $IT_D$) while the contact is over the control affordance. In some embodiments, the process for adjusting the alert settings of the device is initiated upon detecting lift-off of the contact while the contact is at the location on the touch-sensitive surface that corresponds to the control affordance.

Initiating the process for adjusting the alert settings of the device upon detecting a decrease in the characteristic intensity of the contact allows additional intensity-based thresholds to be used (e.g., toggle criteria, as discussed with reference to FIGS. 5J-5K) and allows for an unintended input to be canceled (e.g., as discussed with reference to FIGS. 5L-5N). Reducing the number of inputs needed to perform an operation enhances the operability of the device and makes the user-device interface more efficient (e.g., by helping the user provide proper inputs and reducing user mistakes when operating/interacting with the device).

In some embodiments, initiating the process for adjusting the alert settings of device 100 includes (618) displaying one or more activateable modification options for adjusting the alert settings of device 100 (e.g., displaying a reduced notification settings menu that includes the one or more activation modification options for a reduced notification mode). For example, as described with reference to FIGS. 5E-5H, in some embodiments, the one or more activateable modification options include one or more auto-expiration options corresponding to auto-expiration conditions. When the device is in a reduced notification mode and an active auto-expiration condition occurs (e.g., a time, location, or calendar condition), the device automatically, without user intervention, de-activates the reduced notification mode.

Providing activateable modification options for adjusting the alert settings of the device, accessible from the wake screen, makes it easy to adjust the corresponding options for the alert settings. Reducing the number of inputs needed to perform an operation enhances the operability of the device and makes the user-device interface more efficient (e.g., by helping the user provide proper inputs and reducing user mistakes when operating/interacting with the device).

In some embodiments, the process for adjusting the alert settings of the device is (620) a process for adjusting an active reduced notification mode of device 100. The active reduced notification mode of the device is a first reduced notification mode of a plurality of reduced notification modes of the device (e.g., each option corresponds to a respective reduced notification mode, as shown in FIGS. 5W-5X). The control affordance includes a visual indication identifying the first reduced notification mode. The visual indication identifying the first reduced notification mode is distinct from visual indicia for other reduced notification modes of the plurality of reduced notification modes of the device. For example, FIG. 5R illustrates an example in which the visual indication/virtual button 506 includes the text "Productivity Mode," whereas virtual button 506 would say, e.g., "Social Mode" if a social reduced notification mode were active instead of the productivity reduced notification mode.

Providing a visual indication identifying which reduced notification mode is active allows a user to know which types of alerts will be provided. Providing improved visual feedback to the user enhances the operability of the device and makes the user-device interface more efficient (e.g., by helping the user provide proper inputs and reducing user mistakes when operating/interacting with the device).

In some embodiments, the process for adjusting the alert settings of the device is (622) a process for adjusting an active reduced notification mode of the device. The control affordance includes a visual indication of an auto-expiration condition for the active reduced notification mode. In some embodiments, the auto-expiration condition is an end time after which the reduced notification mode will no longer be active (e.g., visual indication/virtual button 506, FIG. 5R, includes the text "Until 5 PM" which indicates that the active productivity mode will automatically be de-activated at 5 PM). In some embodiments, the auto-expiration condition is a different end condition which, when met, causes the device to de-activate the reduced notification mode (e.g., a location-based end condition). In some embodiments, the auto-expiration condition is a remaining duration for the reduced notification mode (e.g., a countdown timer for the reduced notification mode stating, e.g., "Productivity Mode for another 2:37"). In some embodiments, rather than the control affordance including the visual indication of the auto-expiration condition for the reduced notification mode, the visual indication of the auto-expiration condition is displayed separately from (e.g., adjacent to) the control affordance in the first user interface (e.g., the visual indication is displayed in the first user interface but is not activateable for initiating the process for adjusting the alert settings of the device, as shown in FIG. 5B, which shows non-activateable text that says "Productivity Mode Until 5 PM"). In some embodiments, the visual indication of the auto-expiration condition is displayed in a control bar (e.g., the set of virtual buttons 504, FIG. 5B, is a control bar).

Providing a visual indication of an auto-expiration condition for the active reduced notification mode allows a user to know the current auto-expiration condition (e.g., without having to navigate to a settings user interface). Providing improved visual feedback to the user enhances the operability of the device and makes the user-device interface more efficient (e.g., by helping the user provide proper inputs and reducing user mistakes when operating/interacting with the device).

In response to detecting the second input (612), in accordance with a determination that the second input does not meet the activation criteria for the control affordance, device forgoes (624) initiating the process for adjusting alert settings of the device. In some embodiments, forgoing initiating the process for adjusting the alert settings of the device includes maintaining display of the first user interface that includes the control affordance for the reduced notification mode.

In some embodiments, after detecting the increase in the characteristic intensity of the contact that exceeds the intensity threshold while the contact is at the location on the touch-sensitive surface that corresponds to the control affordance: device 100 detects (626) movement of the contact to a location on the touch-sensitive surface that does not correspond to the control affordance (e.g., movement of contact 524, FIGS. 5L-5N). While the contact is at the location on the touch-sensitive surface that does not correspond to the control affordance, device 100 detects lift-off of the contact (e.g., the intensity of the contact drops below a minimum detection threshold). In response to detecting lift-off of the contact while the contact is at the location on the touch-sensitive surface that does not correspond to the control affordance, device 100 forgoes initiating the process for adjusting the alert settings of the device (e.g., does not initiate or cancels initiating the process for adjusting the alert settings of the device).

As another example, in some embodiments, after detecting the increase in the characteristic intensity of the contact that exceeds the intensity threshold while the contact is at the location on the touch-sensitive surface that corresponds to the control affordance: device 100 detects (628) movement of the contact to a location on the touch-sensitive surface that does not correspond to the control affordance (e.g., movement of contact 524, FIGS. 5L-5N). While the contact is at the location on the touch-sensitive surface that does not correspond to the control affordance, device 100 detects a decrease in the characteristic intensity of the contact (e.g., below the intensity threshold or a lower intensity threshold that is distinct from and higher than the minimum detection threshold for detecting a contact). In response to detecting the decrease in the characteristic intensity of the contact while the contact is at the location on the touch-sensitive surface that does not correspond to the control affordance, device 100 forgoes initiating the process for adjusting the alert settings of device 100 (e.g., does not initiate or cancels initiating the process for adjusting the alert settings of the device).

Providing ways to forgo initiating the process for adjusting the alert settings of the device allows the user to cancel an unintended input that would have otherwise resulted in initiating the process for adjusting the alert settings of the device. This helps users avoid accidental or unintended adjusting of the alert settings, reducing the number of inputs needed to undo such actions. Providing additional control options without cluttering the user interface enhances the operability of the device and makes the user-device interface more efficient (e.g., by helping the user to provide proper inputs and reducing user mistakes when operating/interacting with the device).

In some embodiments, while displaying the first user interface that includes the control affordance, device 100 detects (630) a third input that includes detecting a respective contact at a location on the touch-sensitive surface that corresponds to the control affordance. In response to detecting the third input, in accordance with a determination that the third input meets toggle criteria for the control affordance, device 100 toggles the alert settings of the device. The toggle criteria do not include a requirement that the third input has an increase in a characteristic intensity of the respective contact that exceeds the intensity threshold (e.g., $IT_D$) while the respective contact is at the location on the touch-sensitive surface that corresponds to the control affordance in order for the toggle criteria to be met. For example, for a device with a touch-sensitive display, in response to a tap gesture on the control affordance, a previously selected reduced notification mode of the device is toggled from on to off, or from off to on.

In some embodiments, the toggle criteria include a requirement that a respective input includes an increase in a characteristic intensity of a contact above a first intensity threshold (e.g., $IT_L$) (higher than a minimum detection threshold) while the contact is at the location on the touch-sensitive surface that corresponds to the control affordance in order for the toggle criteria to be met (as described with reference to FIGS. 5J-5K). The activation criteria include a requirement that the respective input includes an increase in the characteristic intensity of the contact above a second intensity threshold (e.g., $IT_D$) (e.g., higher than the first intensity threshold) while the contact is at the location on the touch-sensitive surface that corresponds to the control affordance in order for the activation criteria to be met (e.g., as described with reference to FIGS. 5D-5F).

Disambiguating between an input directed to the control affordance that meets toggle criteria and an input directed to the control affordance that meets activation criteria for adjusting alert settings of the device increases the operability of the control affordance (e.g., allows the user to choose between a toggle switch versus a more fine-grained control based on the characteristics of a single input (such as an intensity of a single contact) on the control affordance). Providing additional control options without cluttering the user interface enhances the operability of the device and makes the user-device interface more efficient (e.g., by helping the user to provide proper inputs and reducing user mistakes when operating/interacting with the device).

In some embodiments, the control affordance is (632) a first control affordance of a plurality of control affordances in the first user interface (e.g., virtual buttons 504, FIG. 5B). For each control affordance of the plurality of control affordances, a respective control affordance is activated when corresponding activation criteria are met. The corresponding activation criteria include a requirement that an input directed to the respective control affordance includes an increase in characteristic intensity of a respective contact that exceeds an intensity threshold while the respective contact is at a location on the touch-sensitive surface that corresponds to the respective control affordance in order for the corresponding activation criteria to be met. In some embodiments, the plurality of control affordances is displayed in a predefined control area, such as a control bar. In some embodiments, the plurality of control affordances includes a camera affordance for activating a camera and a flashlight affordance for activating a flashlight.

Providing the plurality of control affordances on the wake screen increases the operability of the wake screen (e.g., provides greater functionality from an initial screen displayed after the display turns on). Providing additional control options enhances the operability of the device and makes the user-device interface more efficient (e.g., by helping the user to provide proper inputs and reducing user mistakes when operating/interacting with the device).

It should be understood that the particular order in which the operations in FIGS. 6A-6E have been described is merely one example and is not intended to indicate that the described order is the only order in which the operations could be performed. One of ordinary skill in the art would recognize various ways to reorder the operations described herein. In some embodiments, one or more operations of method 600 are combined, supplemented, or replaced with one or more operations of other methods described herein (e.g., method 700 and/or method 800 and/or method 900).

FIGS. 7A-7C are flow diagrams depicting a method 700 of providing alerts (e.g., notifications) on an electronic device, in accordance with some embodiments. Although some of the examples which follow will be given with reference to inputs on a touch-sensitive display in which a touch-sensitive surface and a display are combined, in some embodiments, the device detects inputs on a touch-sensitive surface 451 that is separate from the display 450, as shown in FIG. 4B.

In some embodiments, method 700 is performed by an electronic device (e.g., portable multifunction device 100, FIG. 1A) and/or one or more components of the electronic device (e.g., I/O subsystem 106, operating system 126, etc.). In some embodiments, method 700 is governed by instructions that are stored in a non-transitory computer-readable storage medium and that are executed by one or more processors of a device, such as the one or more processors 122 of device 100 (FIG. 1A). For ease of explanation, the following describes method 700 as performed by device 100. In some embodiments, with reference to FIG. 1A, the operations of method 700 are performed by or use, at least in part, operating system 126, communication module 128, and/or graphics module 132, as well as a touch-sensitive display (e.g., touch screen 112). Some operations in method 700 are, optionally, combined and/or the order of some operations is, optionally, changed.

As described below, method 700 (and associated interfaces) provides different reduced notification modes (e.g., with different whitelists) for different contexts (e.g., a productivity mode for work, and a social mode for rest and relaxation), which increases the operability of the device. Providing different reduced notification modes for different contexts makes the device more useful because a user can continue to use the device for needed (or wanted) tasks without being distracted by unwanted notifications, which may otherwise cause the user to turn all alerts off. Thus, for a given context, method 700 reduces the risk that a user will accidentally miss needed (or wanted) notifications in that context, while also preventing unwanted alerts in that context. The method reduces the number, extent, and/or nature of the inputs from a user by obviating the need for the user to frequently adjust settings for controlling generation of alerts by the device, thereby creating a more efficient human-machine interface. For battery-operated electronic devices, reducing the need for frequent settings adjustments conserves power and increases the time between battery charges.

Device 100 receives (702) a communication at an electronic device. In some embodiments, the communication is received from a source remote from the electronic device (e.g., a server, a cell phone tower, another electronic device). For example, the communication is a text or multimedia message received from another user's device. Alternatively, the communication is a phone call. Alternatively, the communication is a news item received from a news outlet. In some embodiments, the communication is received from an application running on the device. For example, the communication may correspond to an alarm or a reminder set by the user of the electronic device.

In response to receiving the communication (704), device 100 performs operations 706 through 720.

In accordance with a determination that a first mode (e.g., a first reduced notification mode) is active on the electronic device (706), and in accordance with a determination that the communication meets whitelisting criteria for the first mode, device 100 outputs (708), at the device, a notification that corresponds to the communication in a first manner (e.g., the notification is provided in the first manner upon receiving the communication). In some embodiments, device 100 determines whether the communication meets the whitelisting criteria for the first mode in response to receiving the communication. In some embodiments, the first manner includes, upon receiving the communication, displaying a notification corresponding to the communication on the display. In some embodiments, the first manner includes, upon receiving the communication, providing a sound or haptic alert corresponding to the communication. For example, in FIG. 5S, notification 530-*a* is displayed and a sound is provided because the calendar application is whitelisted for the active productivity mode.

In some embodiments, the first notification is (710) received for (e.g., from) a first application and the whitelisting criteria for the first mode include a criterion that is met when the first application is in a predefined list of applications for the first mode (e.g., notification 530-*a*, FIG. 5S, is received from a calendar application which is included in a whitelist of applications for the productivity mode, as shown in FIG. 5AG).

Providing a whitelist of applications for the first mode obviates the need for users to frequently navigate to a settings user interface to change individual notification settings or to check needed applications for recent notifications. Performing an operation when a set of conditions has been met without requiring further user input enhances the operability of the device and makes the user-device interface more efficient (e.g., by helping the user to provide proper inputs and reducing user mistakes when operating/interacting with the device).

In accordance with a determination that a first mode is active on the electronic device (706), and in accordance with a determination that the communication does not meet the whitelisting criteria for the first mode, device 100 forgoes (712) outputting the notification that corresponds to the communication in the first manner. In some embodiments, in accordance with a determination that a first mode is active on the electronic device, and in accordance with a determination that the communication does not meet the whitelisting criteria for the first mode, device 100 outputs the notification that corresponds to the communication in a second manner, different from the first manner. For example, in some embodiments, the second manner includes, upon receiving the communication, displaying a notification but without providing a sound or haptic alert. In some embodiments, when device 100 forgoes outputting the notification in the first manner, device 100 does not provide the notification at all upon receiving the communication (e.g., the user has to provide one or more inputs to see the notification, such as a swipe up on interface 502, FIG. 5S to reach notifications interface 534 in FIG. 5T).

In accordance with a determination that a second mode (e.g., a second reduced notification mode) is active on the electronic device (714), and in accordance with a determination that the communication meets whitelisting criteria for the second mode, different from the whitelisting criteria for the first mode, device 100 outputs (716), at the device, the notification that corresponds to the communication in the first manner (e.g., or in a third manner different from the first manner and the second manner). In some embodiments, the electronic device determines whether the communication meets the whitelisting criteria for the second mode in response to receiving the communication.

In some embodiments, the whitelisting criteria for the second mode include (718) a criterion that is met when the first application is in a predefined list of applications for the second mode. The predefined list of applications for the second mode includes one or more applications that are not in the predefined list of applications for the first mode. In some embodiments, the predefined list of applications for the first mode includes one or more applications that are not in the predefined list of applications for the second mode (e.g., the first mode and the second mode are complementary reduced notification modes). For example, as shown in FIG. 5Z, the device outputs a message 530-*d* in the social mode (e.g., the messaging application is whitelisted for the social mode) that would not have been output in the same manner in the productivity mode (e.g., the messaging application is not whitelisted in the productivity mode).

In some embodiments, the predefined list of applications for the second mode includes a plurality of applications that are not in the predefined list of applications for the first mode and vice versa. In some embodiments, none of the applications in the predefined list of applications for the first mode are in the predefined list of applications for the second mode, and none of the applications in the predefined list of applications for the second mode are in the predefined list of applications for the first mode.

In some embodiments, the first reduced notification mode and the second reduced notification mode are respective modes of a plurality of reduced notification modes (e.g., more than two reduced notification modes, such as a productivity mode, a sleep mode, a social mode, and an exercise mode). Each respective reduced notification mode has a corresponding predefined list of applications. In some embodiments, each reduced notification mode has its own whitelist of applications. In some embodiments, the predefined list of applications for a given mode is distinct from the predefined list of applications for other modes.

Providing different whitelists of applications for different modes helps customize each mode to its context, obviating the need for users to frequently navigate to a settings user interface to change individual notification settings or to check needed applications for recent notifications. Performing an operation when a set of conditions has been met without requiring further user input enhances the operability of the device and makes the user-device interface more efficient (e.g., by helping the user to provide proper inputs and reducing user mistakes when operating/interacting with the device).

In accordance with a determination that a second mode is active on the electronic device (714), and in accordance with a determination that the communication does not meet the whitelisting criteria for the second mode, device 100 forgoes (720) outputting the notification that corresponds to the communication in the first manner (e.g., outputs the notification that corresponds to the communication in the second manner or a fourth manner different from the first, second, and third manners).

In some embodiments, while the first mode is active on the electronic device, device 100 detects (722) de-activation of the first mode. In response to detecting de-activation of the first mode, device outputs (724) (e.g., by displaying), at the device, notifications that correspond to communications received while the device was in the first mode that were not presented while the device was in the first mode (e.g., or not presented in the first manner). For example, the device provides blocked notifications (e.g., notifications which were blocked while in the first mode) on a wake screen after the first mode ends (e.g., as shown in FIGS. 5J-5K). In some embodiments, the device receives a plurality of communications while in a particular reduced notification mode, and, in response to detecting de-activation of the particular reduced notification mode, presents notifications corresponding to each (or at least some) of the communications received while the device was in the particular reduced notification mode.

Providing notifications after a reduced notification mode has been de-activated, which were not presented while in the reduced notification mode, obviates the need for the user to manually look for notifications that were not provided while the reduced notification mode was active. Automatically providing such notifications upon de-activation of the reduced notification mode also reduces the risk that a user will miss an important notification. Performing an operation when a set of conditions has been met without requiring further user input enhances the operability of the device and makes the user-device interface more efficient (e.g., by helping the user to provide proper inputs and reducing user mistakes when operating/interacting with the device).

In some embodiments, the first mode is (726) a productivity mode, and the second mode is a social mode, distinct from the productivity mode (e.g., having different application whitelists). Device 100 initiates (728) the predefined list of applications for the productivity mode to include applications relating to productivity and initiates (730) the predefined list of applications for the social mode to include social media applications. In some embodiments, initiating the predefined list of applications for a given mode includes displaying an initial list of applications in a user interface that allows a user to edit the initial list of applications for the mode (e.g., user interfaces 556 and 564 in FIGS. 5AD and 5AG, respectively). For example, when the user first sets up the productivity mode, the device displays an initial list of applications by automatically populating the list with suggested applications that relate to productivity (e.g., an email application, a calendar application). In some embodiments, the predefined list of applications for the productivity mode is a default list of applications. In some embodiments, the default list of applications includes applications that are tagged with one or more predefined attributes (e.g., category attributes, e.g., tagged by the developer of the application). In some embodiments, the default list of applications includes applications in a respective sub-directory on the device (e.g., within a productivity folder). In some embodiments, the default list of applications includes one or more applications automatically installed on the device (e.g., an email application, a calendar application).

Initiating different whitelists of applications for different reduced notification modes simplifies the process of setting up each of the modes. Performing an operation when a set of conditions has been met without requiring further user input enhances the operability of the device and makes the user-device interface more efficient (e.g., by helping the user to provide proper inputs and reducing user mistakes when operating/interacting with the device).

In some embodiments, device 100 receives (732) an input to add (or remove) a respective application to the predefined list of applications for the first mode (or the second mode). In response to receiving the input, device 100 adds (or removes) (734) the respective application to the predefined list of applications for the first mode. In some embodiments, the device displays a user interface for editing the whitelist of applications for each reduced notification mode (e.g., the user interfaces shown in FIG. 5AD and FIG. 5AG). In some embodiments, the input is a voice command to the device (e.g., the user can state, to a personal assistant running on the device, "Please give me my email notifications" or, in response to receiving an unwanted notification, can state, "Please hide those notifications from me".)

Providing a way for the user to modify whitelists for different reduced notification modes makes the various reduced notification modes more effective for a user. Providing additional control options enhances the operability of the device and makes the user-device interface more efficient (e.g., by helping the user to provide proper inputs and reducing user mistakes when operating/interacting with the device).

In some embodiments, the first mode is (736) associated with a first set of activation conditions (e.g., activation conditions for the first mode). In some embodiments, the activation conditions are automatic activation conditions to automatically activate the first mode when the electronic device detects the set of conditions. For example, in response to detecting the first set of activation conditions, the device automatically, without user intervention, activates the first mode (e.g., as described with reference to FIG. 5AJ and FIGS. 5AN-5AP). In some embodiments, the activation conditions are conditions which, when met, cause the device to provide a suggestion (e.g., a displayed suggestion or an audially output suggestion) to activate the first mode (e.g., additional user intervention is required to accept the suggestion and activate the first mode, as described with reference to FIGS. 5AJ-5AM).

In some embodiments, the second mode is associated with a second set of activation conditions (e.g., automatic activation conditions for the second mode), different from the first set of activation conditions. In response to detecting the second set of activation conditions, the device automatically, without user intervention, activates the second mode. In some embodiments, the activation conditions are conditions which, when met, cause the device to provide a suggestion (e.g., a displayed suggestion or an audially output suggestion) to activate the second mode (e.g., additional user intervention is required to accept the suggestion and activate the second mode).

In some embodiments, each activation condition in the first (or second) set of activation conditions must be met for the first (or second) set of activation conditions to be met. In some embodiments, the first set of activation conditions and the second set of activation conditions are mutually exclusive (e.g., both sets of activation conditions cannot simultaneously be met). For example, the first set of activation conditions includes an activation condition that is met when the device detects its physical location within a first geo-fenced area (e.g., the first mode is a social mode/relaxation mode and the first geo-fenced area is an area surrounding the user's home) and the second set of activation conditions is met when the device detects its physical location within a second geo-fenced area that does not geographically overlap with the first geo-fenced area (e.g., the second mode is a productivity/work mode and the second geo-fenced area is an area surrounding the user's place of work). As another example, the first set of activation conditions includes an activation condition that is met during a first set of hours (e.g., daytime hours or work hours) and the second set of activation conditions includes an activation condition that is met during a second set of hours (e.g., nighttime hours), where the first set of hours and the second set of hours are non-overlapping.

Providing different activation conditions for different reduced notification modes obviates the need for the user to manually activate an appropriate reduced notification mode. Performing an operation when a set of conditions has been met without requiring further user input enhances the operability of the device and makes the user-device interface more efficient (e.g., by helping the user to provide proper inputs and reducing user mistakes when operating/interacting with the device).

In some embodiments, the first set of activation conditions for the first mode includes (738) a condition that is met when a respective application in a predefined set of applications is running in a foreground of the device. For example, a fitness application running in the foreground automatically triggers an "exercise" reduced notification mode on the electronic device (e.g., as described with reference to FIGS. 5AH-5AI). In some embodiments, the activation conditions are met when any application in the predefined set of applications is running in the foreground of the device (e.g., when the first mode is an exercise mode, any exercise application running in the foreground is sufficient to activate the first mode or cause output of a suggestion to activate the first mode). In some embodiments, the predefined set of applications includes a group (e.g., a plurality) of applications (e.g., a group of health or fitness applications). In some embodiments, the predefined set of applications are grouped by attribute (e.g., the applications are tagged as health or fitness applications by the developer or user). In some embodiments, the predefined set of applications comprises applications in a respective sub-directory of the device (e.g., within a health or fitness folder on an application springboard).

Automatically activating a reduced notification mode when a predefined application is "foregrounding" obviates the need for the user to manually activate the appropriate reduced notification mode. Performing an operation when a set of conditions has been met without requiring further user input enhances the operability of the device and makes the user-device interface more efficient (e.g., by helping the user to provide proper inputs and reducing user mistakes when operating/interacting with the device).

In some embodiments, the first mode is (740) associated with a first set of expiration conditions (e.g., automatic expiration conditions for the first mode, such as the auto-expiration condition "Until 5 PM" for the productivity mode shown in FIG. 5E). In response to detecting the first set of expiration conditions, the device automatically, without user intervention, de-activates the first mode. In some embodiments, the second mode is associated with a second set of expiration conditions (e.g., automatic expiration conditions for the second mode, such as Near Work" for the social mode) different from the first set of expiration conditions. In response to detecting the second set of expiration conditions, the device automatically, without user intervention, de-activates the second mode.

Providing different auto-expiration conditions for the different reduced notification modes obviates the need for the user to manually de-activate an activated reduced notification mode). Automatically de-activating a reduced notification mode also reduces the risk that a user will forget to de-activate the reduced notification mode and will miss an important notification. Performing an operation when a set of conditions has been met without requiring further user input enhances the operability of the device and makes the user-device interface more efficient (e.g., by helping the user to provide proper inputs and reducing user mistakes when operating/interacting with the device).

It should be understood that the particular order in which the operations in FIGS. 7A-7C have been described is merely one example and is not intended to indicate that the described order is the only order in which the operations could be performed. One of ordinary skill in the art would recognize various ways to reorder the operations described herein. In some embodiments, one or more operations of method 700 are combined, supplemented, or replaced with one or more operations of other methods described herein (e.g., method 600 and/or method 800 and/or method 900).

FIGS. 8A-8E are flow diagrams depicting a method 800 of activating a reduced notification mode (e.g., a "do-not-disturb" mode) of an electronic device, in accordance with some embodiments. Although some of the examples which follow will be given with reference to inputs on a touch-sensitive display in which a touch-sensitive surface and a display are combined, in some embodiments, the device detects inputs on a touch-sensitive surface 451 that is separate from the display 450, as shown in FIG. 4B.

In some embodiments, method 800 is performed by an electronic device (e.g., portable multifunction device 100, FIG. 1A) and/or one or more components of the electronic device (e.g., I/O subsystem 106, operating system 126, etc.). In some embodiments, method 800 is governed by instructions that are stored in a non-transitory computer-readable storage medium and that are executed by one or more processors of a device, such as the one or more processors 122 of device 100 (FIG. 1A). For ease of explanation, the following describes method 800 as performed by device 100. In some embodiments, with reference to FIG. 1A, the operations of method 800 are performed by or use, at least in part, operating system 126, communication module 128, and/or graphics module 132, as well as a touch-sensitive display (e.g., touch screen 112). Some operations in method 800 are, optionally, combined and/or the order of some operations is, optionally, changed.

As described below, method 800 (and associated interfaces) provides a suggestion to a user for activation of a reduced notification mode when a set of conditions are met after the user has repeatedly and manually activated a particular reduced notification mode under the same or similar conditions. For example, based on a plurality of manual activations, a device will output a suggestion to activate a reduced notification mode or provide a suggestion to setup an auto-activation of the reduced notification mode. Providing such suggestions reduces the number, extent, and/or nature of the inputs from a user (e.g., by obviating the need for the user to manually create or activate a reduced notification mode under the same or similar conditions), thereby creating a more efficient human-machine interface.

Device 100 detects (802) a plurality of manual activations of a first mode (e.g., a reduced notification mode, sometimes called a do-not-disturb mode) on an electronic device (e.g., by toggling virtual button 504-*b*). The first mode, while active, prevents (or reduces) output of notifications when communications of a first type are received (e.g., non-whitelisted notifications). In some embodiments, the device detects and stores/logs the time and/or device location (e.g., geographical location) when a given manual activation of the reduced notification mode occurs.

After detecting the plurality of manual activations of the first mode (804): device 100 automatically determines, based on the plurality of manual activations of the first mode, a set of conditions that correspond to manual activations of the first mode, and outputs, at the device, a suggestion for activation of the first mode at the electronic device.

In some embodiments, the set of conditions includes (806) a time-of-day condition. For example, the device detects that the user has repeatedly turned on a reduced notification mode during "nighttime" or "daytime" and suggests a reduced notification period of appropriate length (e.g., 8, 10, 12 hours). In some embodiments, the set of conditions includes a location condition. In some embodiments, the set of conditions includes a calendar condition. For example, when the device detects a predetermined number of manual activations (e.g., five) of the reduced notification mode over a predetermined period of time (e.g., two weeks), and the manual activations meet grouping criteria (e.g., the manual activations were within an hour of the same time each night), the device determines a time condition (e.g., a mean of the manual activation times rounded to the nearest quarter of an hour) and, optionally, associates a location condition with the manual activations (e.g., a modal location of the device during the manual activations).

Providing automatic reduced notification activation conditions, as described below, based on time-of-day, location, and/or a user's calendar increases the flexibility of the automatic reduced notification functionality (e.g., the functionality is useful in a broader array of contexts). Providing automatic reduced notification activation conditions based on time-of-day, location, and/or a user's calendar also obviates the need for the user to manually activate the reduced notification mode in a broader array of contexts. Performing an operation when a set of conditions has been met without requiring further user input and reducing the number of inputs needed to perform an operation enhances the operability of the device and makes the user-device interface more efficient (e.g., by helping the user to provide proper inputs and reducing user mistakes when operating/interacting with the device).

After outputting the suggestion, device 100 receives (808) a response that accepts the suggestion for activation of the first mode (e.g., a gesture on an "accept" or "ok" affordance or a voice command) (e.g., an input on the "Ok" affordance, FIG. 5AM, or by contact 580, FIG. 5AN).

In response to receiving the response that accepts the suggestion (e.g., after receiving the response that accepts the suggestion), device 100 changes (809) settings at the device that are associated with the first mode.

In some embodiments, the suggestion for activation of the first mode at the electronic device is a suggestion to activate the first mode that is provided in response to detecting the set of conditions (e.g., as shown in FIG. 5AM). In some embodiments, the suggestion is output upon detecting the set of conditions. In some embodiments, changing the settings at the device that are associated with the first mode includes activating the first mode (e.g., upon acceptance of the suggestion). In some embodiments, the electronic device automatically suggests the reduced notification mode whenever the electronic device subsequently detects the automatic reduced notification mode conditions.

Providing a suggestion to activate a reduced notification mode when a set of conditions are met (e.g., after the user has repeatedly and manually activated a particular reduced notification mode under the same or similar conditions) obviates the need for the user to manually schedule a reduced notification mode for the same or similar conditions. Performing an operation when a set of conditions has been met without requiring further user input enhances the operability of the device and makes the user-device interface more efficient (e.g., by reducing user mistakes when operating/interacting with the device).

In some embodiments, the set of conditions are automatic reduced notification mode conditions. In some embodiments, the suggestion for activation of the first mode is (810) a suggestion to automatically activate the first mode, without user intervention, when the electronic device detects the set of conditions (e.g., as described with reference to FIGS. 5AJ and 5AN-5AP). In some embodiments, the suggestion is provided upon detecting a respective manual activation of the reduced notification mode. In some embodiments, changing the settings at the device that are associated with the first mode includes setting the device to automatically activate the first mode when the electronic device detects the set of conditions that correspond to the manual activations of the first mode. In some embodiments, after receiving the response that accepts the suggestion and while the device is not in the first mode, device 100 detects (812) the set of conditions. In some embodiments, in response to detecting the set of conditions, device 100 automatically, without user intervention, activates (814) the first mode (e.g., as described with reference to FIGS. 5AN-5AP).

In some embodiments, after receiving the response that accepts the suggestion, the electronic device automatically activates the reduced notification mode whenever the electronic device subsequently detects the automatic reduced notification mode conditions (e.g., until the user disables the automatic activation of the do-not-disturb mode).

Automatically activating a reduced notification mode when a set of conditions are met (e.g., after the user has repeatedly and manually activated a particular reduced notification mode under the same or similar conditions) obviates the need for the user to manually create a reduced notification mode under the same or similar conditions. Performing an operation when a set of conditions has been met without requiring further user input enhances the operability of the device and makes the user-device interface more efficient (e.g., by reducing user mistakes when operating/interacting with the device).

In some embodiments, after detecting the set of conditions and while the device is in the first mode (e.g., after receiving the response that accepts the suggestion), device 100 detects (816) that the set of conditions is no longer met. In response to detecting that the set of conditions is no longer met, device 100 automatically, without user intervention, de-activates (818) the first mode (e.g., as described with reference to FIG. 5AQ).

Automatically deactivating the reduced notification mode when the set of conditions is no longer met obviates the need for the user to manually de-activate the reduced notification mode. Automatically deactivating the reduced notification mode also reduces the risk that a user will miss an important notification. Reducing the number of inputs needed to perform an operation enhances the operability of the device and makes the user-device interface more efficient (e.g., by helping the user to provide proper inputs and reducing user mistakes when operating/interacting with the device).

In some embodiments, after receiving the response that accepts the suggestion for activation of the first mode, device 100 outputs (820) expiration options that correspond to expiration conditions for automatically de-activating the first mode (e.g., automatic expiration conditions for the first mode). In some embodiments, the set of expiration conditions includes a single expiration condition (e.g., "turn reduced notification mode off in 1 hour", "turn reduced notification mode off when I leave this location", or "turn reduced notification mode off at the end of this calendar appointment"). In some embodiments, the set of expiration conditions includes a plurality of user-selectable expiration conditions (e.g., each expiration condition has a corresponding user-selectable displayed affordance). In some embodiments, the expirations options are output in response to receiving the response that accepts the suggestion to automatically activate the first mode when the electronic device detects the set of conditions.

In some embodiments, the expiration options output in operation 820 include at least one expiration option having an expiration condition determined from a plurality of manual de-activations of the first mode (e.g., activation/expiration options 578-*a*, 578-*b*, and 578-*d*, FIG. 5AN). For example, device 100 detects (822) a plurality of manual de-activations of the first mode on the electronic device. Device 100 automatically determines, based on the plurality of manual de-activations of the first mode, a condition that corresponds to manual de-activations of the first mode. The expiration options include an option corresponding to the condition.

Automatically determining and suggesting a deactivation condition for the reduced notification mode simplifies the setup of the suggested reduced notification mode once the suggested mode is accepted. Performing an operation when a set of conditions has been met without requiring further user input and reducing the number of inputs needed to perform an operation enhances the operability of the device and makes the user-device interface more efficient (e.g., by helping the user to provide proper inputs and reducing user mistakes when operating/interacting with the device).

In some embodiments, outputting the expiration options includes (824) displaying the expiration options in a user interface for modifying expiration options for the first mode. And the option that is based on manual de-activations of the first mode is visually distinguished from other expiration options for the first mode displayed in the user interface for modifying expiration options for the first mode (e.g., activation/expiration options 578-*a*, 578-*b*, and 578-*d*, FIG. 5AN, are shown in bold and underlined).

Visually distinguishing expirations options that are based on the plurality of manual de-activations of the reduced notification mode aides a user's selection of an appropriate auto-expiration condition for the suggested mode. Providing improved feedback enhances the operability of the device and makes the user-device interface more efficient (e.g., by helping the user to provide proper inputs and reducing user mistakes when operating/interacting with the device).

In some embodiments, outputting the expiration options includes (826) displaying the expiration options in a user interface for modifying expiration options for the first mode (e.g., a user interface for setting up the automatic reduced notification mode, including auto-activate and auto-de-activate options, as shown and discussed with reference to FIG. 5AN). And the option based on manual de-activations of the first mode is automatically set to the condition that corresponds to manual de-activations of the first mode in the user interface for modifying the expiration options for the first mode (e.g., expiration options 578-*a*, 578-*b*, and 578-*d*, FIG. 5AN, are initially set to the automatically determined conditions, where the automatically determined conditions are determined based on the plurality of manual activations/de-activations).

Auto-setting the expiration options that are based on the plurality of manual de-activations of the reduced notification mode aides a user's selection of an appropriate auto-expiration condition. Performing an operation when a set of conditions has been met without requiring further user input and reducing the number of inputs needed to perform an operation enhances the operability of the device and makes the user-device interface more efficient (e.g., by helping the user to provide proper inputs and reducing user mistakes when operating/interacting with the device).

In some embodiments, after outputting the expiration options, device 100 receives (828) a response (e.g., a gesture on an "accept" or "ok" affordance or a voice command) that accepts a first expiration option corresponding to an expiration condition for automatically de-activating the first mode. After receiving the response that accepts the first expiration option, device 100 detects (830) that the corresponding first expiration condition is met. In response to detecting that the first expiration condition is met, device 100 automatically, without user intervention, de-activates (832) the first mode (e.g., as described with reference to FIGS. 5AU-5AW).

With reference to operations 820-832, automatically displaying de-activation conditions for the reduced notification mode simplifies the setup of the suggested reduced notification mode once the suggested mode is accepted. Performing an operation when a set of conditions has been met without requiring further user input and reducing the number of inputs needed to perform an operation enhances the operability of the device and makes the user-device interface more efficient (e.g., by helping the user to provide proper inputs and reducing user mistakes when operating/interacting with the device).

In some embodiments, device 100 detects (834) a plurality of manual activations of a second mode on the electronic device. The second mode, while active, prevents (or reduces) output of notifications when communications of a second type are received. In some embodiments, the first mode is a first reduced notification mode that has a first set of whitelisting criteria for allowing output of notifications when communications are received (e.g., communications not of the first type) and the second mode is a second reduced notification mode, different from the first, that has a second set of whitelisting criteria for allowing output of notifications when communications are received (e.g., communications not of the second type).

In some embodiments, after detecting the plurality of manual activations of the second mode: device 100 automatically determines (836), based on the plurality of manual activations of the second mode, a second set of conditions that correspond to manual activations of the second mode; and, outputs, at the device, a second suggestion for activation of the second mode at the electronic device. For example, different reduced notification modes (e.g., social mode and productivity mode) can have different auto-activation/auto-deactivation conditions, or different activation/de-activation suggestion conditions, as described with reference to FIGS. 5AJ-5AQ ("sleep mode" conditions) and FIGS. 5AR-5AY ("productivity mode" conditions).

In some embodiments, after outputting the second suggestion, device 100 receives (838) a response that accepts the second suggestion for activation of the second mode. Subsequently, in response to detecting the second set of conditions, device 100 changes (840) settings at the device that are associated with the second mode (e.g., activates the second mode upon receiving the response or sets the device to automatically activate the second mode upon detecting the set of conditions).

Providing a suggestion to a user to configure the device to automatically activate a particular reduced notification mode when a particular set of conditions are met (e.g., after the user has repeatedly and manually activated a particular reduced notification mode under the same or similar conditions) obviates the need for the user to manually activate a particular reduced notification mode under the same or similar conditions. Performing an operation when a set of conditions has been met without requiring further user input and reducing the number of inputs needed to perform an operation enhances the operability of the device and makes the user-device interface more efficient (e.g., by helping the user to provide proper inputs and reducing user mistakes when operating/interacting with the device).

In some embodiments, device 100 detects (842) a plurality of manual de-activations of the first mode on the electronic device (e.g., by toggling virtual button 504-*b*, as described with reference to FIGS. 5J-5K).

In some embodiments, after detecting the plurality of manual de-activations of the first mode: device 100 automatically determines (844) based on the plurality of manual de-activations of the first mode, a third set of conditions that correspond to the manual de-activations of the first mode; and, outputs, at the device, a third suggestion for de-activation of the first mode. In some embodiments, after outputting the third suggestion, device 100 receives (846) a response that accepts the third suggestion for de-activation of the first mode. Subsequently, in response to detecting the third set of conditions, device 100 automatically, changes (848) settings at the device associated with de-activating the first mode (e.g., as described with reference to FIGS. 5AR-5AW).

Automatically determining and suggesting a set of automatic deactivation conditions for the reduced notification mode obviates the need for the user to manually de-activate the reduced notification mode. Performing an operation when a set of conditions has been met without requiring further user input and reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

It should be understood that the particular order in which the operations in FIGS. 8A-8E have been described is merely one example and is not intended to indicate that the described order is the only order in which the operations could be performed. One of ordinary skill in the art would recognize various ways to reorder the operations described herein. In some embodiments, one or more operations of method 8A-8E are combined, supplemented, or replaced with one or more operations of other methods described herein (e.g., method 600 and/or method 700 and/or method 900).

FIGS. 9A-9D are flow diagrams illustrating a method 900 of providing notifications when a reduced notification mode of an electronic device is deactivated, in accordance with some embodiments. Although some of the examples which follow will be given with reference to inputs on a touch-sensitive display in which a touch-sensitive surface and a display are combined, in some embodiments, the device detects inputs on a touch-sensitive surface 451 that is separate from the display 450, as shown in FIG. 4B.

In some embodiments, method 900 is performed by an electronic device (e.g., portable multifunction device 100, FIG. 1A) and/or one or more components of the electronic device (e.g., I/O subsystem 106, operating system 126, etc.). In some embodiments, method 900 is governed by instructions that are stored in a non-transitory computer-readable storage medium and that are executed by one or more processors of a device, such as the one or more processors 122 of device 100 (FIG. 1A). For ease of explanation, the following describes method 900 as performed by device 100. In some embodiments, with reference to FIG. 1A, the operations of method 900 are performed by or use, at least in part, operating system 126, communication module 128, and/or graphics module 132, as well as a touch-sensitive display (e.g., touch screen 112). Some operations in method 900 are, optionally, combined and/or the order of some operations is, optionally, changed.

As described below, method 900 provides a more efficient, less intrusive way to provide notifications to users after they have been sleeping. Providing content from individual notifications (e.g., the identity of the sender and/or text from the corresponding communications) to waking users only after displaying an initial wake screen without content from individual notifications enhances the operability of the device and makes the user-device interface more efficient (e.g., by helping the user to provide proper inputs and reducing user mistakes—such as misreading, overlooking, or otherwise mishandling notifications about communications received while sleeping—when operating/interacting with the device upon waking). For battery-operated electronic devices, enabling a user to handle notifications more efficiently upon waking conserves power and increases the time between battery charges.

In some embodiments, prior to the electronic device being in a reduced notification mode (e.g., a sleep mode), device 100 displays (902) a third user interface, such as user interface 502 shown in FIG. 5AZ-5BA, that includes: a background and one or more user interface objects displayed in a foreground of the third user interface. While displaying the third user interface, device 100 detects activation of the reduced notification mode. For example, the device 100 automatically (e.g., without user input) activates a sleep mode in accordance with detection of an activation condition that was previously set for the sleep mode. Before detecting the activation of the reduced notification mode, the background of the third user interface is displayed (904) at a predefined brightness that corresponds to the device not being in the reduced notification mode. Automatically reducing the brightness of the user interface in the reduced notification mode conserves power and increases the time between battery charges.

In some embodiments, in response to detecting the activation of the reduced notification mode, device 100 reduces (906) a brightness of the background of the third user interface, as shown in FIG. 5BB (which illustrates the background of user interface 502 with shading to indicate a reduced brightness). In some embodiments, before detecting activation of the reduced notification mode, the background of the third user interface is displayed with a first brightness (e.g., user interface 502 in FIGS. 5AZ and 5BA are displayed at the first brightness). After detecting activation of the reduced notification mode, the background of the third interface is displayed at a second brightness that is less bright than the first brightness (e.g., user interface 502 in FIG. 5BB upon activation of "Sleep Mode" at 10:00 PM is displayed at the second brightness).

In some embodiments, in response to detecting the activation of the reduced notification mode, device 100 maintains (908) a brightness of the one or more user interface objects displayed in the foreground of the third user interface. In some embodiments, before detecting activation of the reduced notification mode, the foreground of the third user interface is displayed with the first brightness. After detecting activation of the reduced notification mode, the foreground of the third user interface (e.g., user interface 502) is maintained at the first brightness. In some embodiments, the foreground of user interface 502 includes a time and/or date indication, and/or virtual buttons 504-a to 504-c. Maintaining the brightness of other of foreground objects allows the device to be used while the background brightness is reduced, which conserves power and increases the time between battery charges.

In some embodiments, the reduced notification mode is set up automatically by setting an alarm (e.g., the time of the set alarm corresponds to an alert condition for the reduced notification mode). In some embodiments, the device allows the user to set a sleep time and a wake time for one or more days of the week. For example, between the sleep time (e.g., 10 PM in FIG. 5BB) and the wake time (e.g., 6:15 AM in FIG. 5BD), the reduced notification mode is automatically (or by default) activated.

While the electronic device (e.g., device 100) is in the reduced notification mode, device 100 receives (910) one or more communications. In some embodiments, the one or more communications are received prior to detecting the alert condition for the reduced notification mode.

In some embodiments, in response to receiving the one or more communications while the device is in the reduced notification mode, device 100 stores (912) the one or more communications without displaying, on the display, notifications with content from any one of the one or more communications. Storing the one or more communications, without providing notifications, enhances the operability of the device by facilitating a less intrusive way to provide notifications to users after they have been sleeping. This makes the user-device interface more efficient (e.g., by helping the user to provide proper inputs and reducing user mistakes—such as misreading, overlooking, or otherwise mishandling notifications—when operating/interacting with the device upon waking).

For example, in some embodiments, the content includes the identity of the sender (e.g., or contact information of the sender) and/or text/audio messages from the corresponding communications. For example, as described with reference to FIGS. 5AZ-5BM, the device 100 received messages from Bob (at 11:22 PM on Saturday) and Alice (at 12:04 AM on Sunday) while the device is in the reduced notification mode (from 10 PM on Saturday until 6:15 AM on Sunday), and thus stores the one or more communications (e.g., messages) without displaying notifications with content while the device is in the reduced notification mode.

After receiving the one or more communications (e.g., messages from Bob and Alice), device 100 detects (914) an alert condition for the reduced notification mode. For example, the device 100 detects a wake time (e.g., an alarm time) that was previously set for the sleep mode.

In some embodiments, when communications of a first type are received while the electronic device is in the reduced notification mode, device 100 prevents (916) output of notifications that correspond to the communications of the first type. Forgoing display of notifications received while the reduced notification mode is active avoids disturbing the user at times when the user does not want to be disturbed. Providing notifications at appropriate times enhances the operability of the device by making the user-device interface more efficient (e.g., by helping the user to provide proper inputs and reducing user mistakes—such as misreading, overlooking, or otherwise mishandling notifications about communications received at inopportune times).

In some embodiments, communications of the first type are communications that are not whitelisted in the reduced notification mode. In some embodiments, when communications of a second type are received while the electronic device is in the reduced notification mode, the electronic device outputs notifications corresponding to the communications of the second type (e.g., upon receiving the communications of the second type). As an example of the second type of communication, in some embodiments, certain applications are whitelisted for various reduced notification modes. As another example of the second type of communication, the user of the electronic device may set the device to provide notifications of calls and/or messages from specific user contacts (e.g., "Favorites") even while the reduced notification is active. For example, the user sets the device to allow calls and/or messages from his or her family, or allow calls and/or messages when a single contact calls multiple times within a predefined time window (e.g., in response to a non-favorite friend calling 3 times within 3 minutes, the device provides a notification).

In response to detecting the alert condition for the reduced notification mode, device 100 displays (918) a first user interface that includes a first affordance which, when activated, causes the deactivation of the reduced notification mode of the electronic device. For example, device 100 displays an alarm screen (e.g., user interface 502-*a*) that includes a "stop" button (e.g., affordance 5110).

In some embodiments, the first user interface (e.g., user interface 502-*a*) does not display (920), on the display, content from any one of the one or more communications received while in the reduced notification mode. Providing content from individual notifications (e.g., the identity of the sender and/or text from the corresponding communications) to waking users after displaying an alarm screen without content from individual notifications enhances the operability of the device and makes the user-device interface more efficient (e.g., by helping the user to provide proper inputs and reducing user mistakes—such as misreading, overlooking, or otherwise mishandling notifications—when operating/interacting with the device upon waking).

In some embodiments, the first user interface displays an indicia of the number of communications received while in the reduced notification mode, without displaying content (e.g., the identity of the sender and/or text/audio from the corresponding communications) from any one of the one or more communications. For example, the user interface 502-*a* (e.g., an "alarm" user interface) provides an indication that there are "2 notifications available" (e.g., a message from Bob and Alice received during the reduced notification mode). In some embodiments, the indicia of the number of communications further includes outstanding notifications that were received prior to the device being in the reduced notification mode. For example, the user interface 502-*a* indicates that there are "3 notifications available," including the two missed notifications (from Bob and Alice) during the reduced notification mode, and the outstanding (e.g., not yet dismissed) notification from the previous day (e.g., a calendar invitation).

In some embodiments, the first user interface includes (922) a second affordance (e.g., "snooze" affordance 5108) which, when activated, causes delay of the deactivation of the reduced notification mode.

In some embodiments, in response to detecting the alert condition for the reduced notification mode, device 100 provides (924) an audio output and/or a tactile output that indicates that the alert condition has been met.

While displaying the first user interface, device 100 detects (926) a first input that activates the first affordance. For example, device 100 detects a tap gesture (e.g., input 5116) on the "stop" icon on the alarm screen, as shown in FIG. 5BH.

In some embodiments, in response to detecting the first input that activates the first affordance (928): in accordance with a determination that location-services are active on the electronic device, device 100 provides location-based information (e.g., local weather information 5118 as shown in FIG. 5BI) in a second user interface (e.g., user interface 502-*b*) and in accordance with a determination that location services are not active on the electronic device, device 100 forgoes providing location-based information in the second user interface. Automatically providing weather or other location-based information to the user in the morning, when available, without user input as soon as the user wakes up provides the user with relevant information for their day without requiring navigation to a specific application. The device performing an operation when a set of conditions has been met without requiring further user input enhances the operability of the device and makes the user-device interface more efficient (e.g., by helping the user to provide proper inputs and reducing user mistakes when operating/interacting with the device).

In some embodiments, in response to detecting the activation of the reduced notification mode, device 100 reduces (930) a brightness of the display (e.g., as explained above with reference to FIG. 5BB). For example, the brightness is reduced from a first brightness level to a second brightness level, where the second brightness level is less bright than the first brightness level. After detecting the alert condition for the reduced notification mode (e.g., after the set time for the alarm is detected at 6:15 AM), device 100 maintains a reduced brightness of the display (e.g., the user interface 502-*a* (alarm screen), shown in FIGS. 5BD, 5BE, 5BG and 5BH, remains at the reduced brightness). For example, after detecting the alert condition for the reduced notification mode, while displaying the first user interface 502-*a*, and before detecting the first input that activates the first affordance, the first user interface is displayed at the second brightness level.

While displaying the first user interface (e.g., user interface 502-*a*) that includes the first affordance (e.g., "stop" affordance 5110) and the second affordance (e.g., "snooze" affordance 5108), device 100 detects a third input (e.g., input 5112, FIG. 5BE) that activates the second affordance (e.g., activates the "snooze" affordance). In response to detecting the third input, device 100 delays the deactivation of the reduced notification mode, while maintaining the reduced brightness of the display (e.g., at the second brightness level), as shown in FIG. 5BF. In response to detecting the first input (e.g., input 5116, FIG. 5BH) that activates the first affordance (e.g., activates "stop" affordance 5110), device 100 increases the brightness of the display (e.g., from the second brightness level to the first brightness level that is greater than the second brightness level). For example, after activation of the "stop" affordance, the reduced notification mode is deactivated and the brightness of the display is increased to the first brightness level (e.g., the first brightness level of the display in FIGS. 5AZ and 5BA).

In some embodiments, after (e.g., in response to) detecting the alert condition for the reduced notification mode, device 100 displays (932) the first user interface (e.g., user interface 502-*a*) at a first brightness level. In some embodiments, the first brightness level is selected by the user or is set to a default first brightness level. While displaying the first user interface that includes the first affordance (e.g., "stop" affordance 5110) and the second affordance (e.g., "snooze" affordance 5108) at the first brightness level, device 100 detects a third input (e.g., input 5112, FIG. 5BE) that activates the second affordance. In response to detecting the third input, device 100 reduces the brightness of the first user interface to a second brightness level that is less than the first brightness level. Upon expiration of a predefined delay time (e.g., 10 minutes), device 100 increases the brightness of the first user interface to the first brightness level. For example, the second brightness level is represented by shading in FIG. 5BF, and at the expiration of the predefined time (e.g., at 6:25 AM) shown in FIG. 5BG, the brightness of the display is no longer shaded, representing an increase in brightness from the display in FIG. 5BF. Maintaining the reduced brightness while the deactivation of the reduced notification mode is delayed conserves power and increases the time between battery charges.

In response to detecting the first user input (e.g., input 5116, FIG. 5BH) that activates the first affordance (934), device 100 deactivates the reduced notification mode, and displays, on the display, a second user interface (e.g., user interface 502-b), wherein the second user interface does not display content from any of the one or more communications. In some embodiments, the second user interface displays an indicia of the number of communications received while in the reduced notification mode (e.g., displayed as text "2 notifications" on user interface 502-b or as part of the "notifications" icon 5120 in FIG. 5BI), without displaying content (e.g., the identity of the sender and/or text) from any one of the one or more communications.

In some embodiments, the second user interface includes (936) a second affordance (e.g., "notifications" affordance 5120, FIG. 5BI) which, when activated, causes display of notifications (e.g., as shown in FIG. 5BK) for at least some of the one or more communications received while in the reduced notification mode.

While the second user interface (e.g., user interface 502-b) is displayed, device 100 detects (938) a second input (e.g., input 5122, FIG. 5BJ). In some embodiments, the second input activates (940) the second affordance (e.g., the "Notifications" affordance 5120). For example, a tap gesture on the "notifications" icon in FIG. 5BJ would activate the "notifications" affordance. Alternatively, in some embodiments, the second input is a vertical swipe gesture, such as a vertically upward swipe gesture from the bottom of the display (e.g., the gesture does not start on an affordance). Providing an affordance which causes display of notifications from an initial screen that does not include content from notifications reduces the cognitive burden on the user while providing easy access to notifications. Reducing the number of inputs needed to perform an operation enhances the operability of the device and makes the user-device interface more efficient (e.g., by helping the user to provide proper inputs and reducing user mistakes when operating/interacting with the device).

In response to detecting the second input, device 100 displays (942) notifications (e.g., notifications 5124-a through 5124-c) that include content (e.g., identity of the sender and/or text) for at least some of the one or more communications received while the electronic device was in the reduced notification mode. For example, device 100 displays notifications in user interface 502-c. As described above, in some embodiments, user interface 502-c is an updated version of user interface 502 (e.g., updated with overlays including the notifications), or is a distinct user interface.

In some embodiments, before activation of the reduced notification mode, device 100 receives (944) a first plurality of communications (e.g., including calendar invitation notification 5124-c received Saturday at 5:15 PM, before activation of the reduced notification mode on Saturday at 10:00 PM). While the reduced notification mode is active (e.g., between 10:00 PM and 6:15 AM), device 100 receives a second plurality of communications (e.g., messages from Bob and Alice). After (e.g., in response to) receiving the second input (e.g., input 5122 or the vertical swipe gesture), device 100 displays (e.g., in user interface 502-c) notifications that correspond to the first plurality of communications separately from displaying notifications that correspond to the second plurality of communications.

In some embodiments, device 100 displays (946), in a first portion of the second user interface (e.g., the "From yesterday" portion shown in FIG. 5BK), notifications corresponding to the first plurality of communications (e.g., calendar notification 5124-c). In some embodiments, device 100 displays, in a second portion of the second user interface (e.g., the "During sleep mode" portion shown in FIG. 5BK), visually distinct from the first portion of the second user interface, notifications corresponding to the second plurality of communications (e.g., notifications 5124-a and 5124-b).

Displaying notifications that were received at different times allows a user to easily navigate between notifications that were missed while in the reduced notification mode and notifications that they may have seen previously before the device was in reduced notification mode. Separately displaying individual notifications to waking users enhances the operability of the device and makes the user-device interface more efficient (e.g., by helping the user to provide proper inputs and reducing user mistakes—such as misreading, overlooking, or otherwise mishandling notifications—when operating/interacting with the device upon waking).

In some embodiments, before activation of the reduced notification mode, device 100 displays (948) the notifications corresponding to the first plurality of communications. For example, the device 100 displays notification 5124-c (from FIG. 5BK) on user interface 502 in FIG. 5AZ, before activation of the reduced notification mode. In response to activation of the reduced notification mode, device 100 removes from the display the notifications corresponding to the first plurality of communications. For example, device 100 ceases display of notification 5124-c in FIG. 5BB, after (e.g., in response to) activation of the reduced notification mode.

It should be understood that the particular order in which the operations in FIGS. 9A-9D have been described is merely one example and is not intended to indicate that the described order is the only order in which the operations could be performed. One of ordinary skill in the art would recognize various ways to reorder the operations described herein. In some embodiments, one or more operations of method 9A-9D are combined, supplemented, or replaced with one or more operations of other methods described herein (e.g., methods 600, 700 and/or 800).

The operations described above with reference to FIGS. 6A-6E, 7A-7C, 8A-8E and 9A-9D are, optionally, implemented by components depicted in FIGS. 1A-1B. For example, detecting operation 602 and/or detecting operation 610 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
    at an electronic device with a display:
        while the electronic device is in a reduced notification mode:
            receiving one or more communications;
            after receiving the one or more communications, detecting an alert condition for the reduced notification mode;
            in response to detecting the alert condition for the reduced notification mode, displaying a first user interface that includes a first affordance which, when activated, causes deactivation of the reduced notification mode of the electronic device; and
            while displaying the first user interface, detecting a first input that activates the first affordance;
        in response to detecting the first input that activates the first affordance:
            deactivating the reduced notification mode, and
            displaying, on the display, a second user interface, wherein the second user interface does not display, on the display, content from any one of the one or more communications;
        while the second user interface is displayed, detecting a second input; and,
        in response to detecting the second input, displaying notifications that include content for at least some of the one or more communications received while the electronic device was in the reduced notification mode.

2. The method of claim 1, including, in response to receiving the one or more communications while the electronic device is in the reduced notification mode, storing the one or more communications without displaying, on the display, notifications with content from any one of the one or more communications.

3. The method of claim 1, wherein, when communications of a first type are received while the electronic device is in the reduced notification mode, the electronic device prevents output of notifications that correspond to the communications of the first type.

4. The method of claim 1, wherein the first user interface does not display, on the display, content from any of the one or more communications received while in the reduced notification mode.

5. The method of claim 1, including:
    in response to detecting the first input that activates the first affordance:
        in accordance with a determination that location-services are active on the electronic device, providing location-based information in the second user interface; and,
        in accordance with a determination that location-services are not active on the electronic device, forgoing providing location-based information in the second user interface.

6. The method of claim 1, wherein:
    the second user interface includes a second affordance which, when activated, causes display of notifications for at least some of the one or more communications received while in the reduced notification mode; and
    the second input activates the second affordance.

7. The method of claim 1, including:
    in response to detecting the alert condition for the reduced notification mode, providing an audio and/or a tactile output that indicates that the alert condition has been met.

8. The method of claim 1, including:
    prior to the electronic device being in the reduced notification mode, displaying a third user interface that includes:
        a background, and
        one or more user interface objects displayed in a foreground of the third user interface;
    while displaying the third user interface, detecting activation of the reduced notification mode; and
    in response to detecting the activation of the reduced notification mode, reducing a brightness of the background of the third user interface.

9. The method of claim 8, including, in response to detecting the activation of the reduced notification mode, maintaining a brightness of the one or more user interface objects displayed in the foreground of the third user interface.

10. The method of claim 8, wherein, before detecting the activation of the reduced notification mode, the background of the third user interface is displayed at a predefined brightness that corresponds to the electronic device not being in the reduced notification mode.

11. The method of claim 1, wherein:
    the first user interface includes a second affordance which, when activated, causes delay of the deactivation of the reduced notification mode of the electronic device; and
    the method includes:
        in response to detecting activation of the reduced notification mode, reducing a brightness of the display;
        after detecting the alert condition for the reduced notification mode, maintaining a reduced brightness of the display;
        while displaying the first user interface that includes the first affordance and the second affordance, detecting a third input that activates the second affordance;
        in response to detecting the third input, delaying the deactivation of the reduced notification mode of the electronic device, while maintaining the reduced brightness of the display; and,
        in response to detecting the first input that activates the first affordance:
            increasing the brightness of the display.

12. The method of claim 1, wherein:
the first user interface includes a second affordance which, when activated, causes delay of the deactivation the reduced notification mode of the electronic device; and
the method includes:
  after detecting the alert condition for the reduced notification mode, displaying the first user interface at a first brightness level;
  while displaying the first user interface that includes the first affordance and the second affordance at the first brightness level, detecting a third input that activates the second affordance;
  in response to detecting the third input, reducing the brightness of the first user interface to a second brightness level that is less than the first brightness level; and,
  upon expiration of a predefined delay time, increasing the brightness of the first user interface to the first brightness level.

13. The method of claim 1, including:
before activation of the reduced notification mode, receiving a first plurality of communications;
while the reduced notification mode is active, receiving a second plurality of communications; and
after receiving the second input, displaying notifications that correspond to the first plurality of communications separately from displaying notifications that correspond to the second plurality of communications.

14. The method of claim 13, including:
displaying, in a first portion of the second user interface, notifications corresponding to the first plurality of communications; and
displaying, in a second portion of the second user interface, visually distinct from the first portion of the second user interface, notifications corresponding to the second plurality of communications.

15. The method of claim 13, including:
before activation of the reduced notification mode, displaying the notifications corresponding to the first plurality of communications, and
in response to activation of the reduced notification mode, removing from the display the notifications corresponding the first plurality of communications.

16. An electronic device, comprising:
a display;
one or more processors;
memory; and
one or more programs, wherein the one or more programs are stored in the memory and configured to be executed by the one or more processors, the one or more programs including instructions for:
while the electronic device is in a reduced notification mode:
  receiving one or more communications;
  after receiving the one or more communications, detecting an alert condition for the reduced notification mode;
  in response to detecting the alert condition for the reduced notification mode, displaying a first user interface that includes a first affordance which, when activated, causes deactivation of the reduced notification mode of the electronic device; and
  while displaying the first user interface, detecting a first input that activates the first affordance;
  in response to detecting the first input that activates the first affordance:
    deactivating the reduced notification mode, and
    displaying, on the display, a second user interface, wherein the second user interface does not display, on the display, content from any one of the one or more communications;
  while the second user interface is displayed, detecting a second input; and,
  in response to detecting the second input, displaying notifications that include content for at least some of the one or more communications received while the electronic device was in the reduced notification mode.

17. The electronic device of claim 16, wherein the one or more programs include instructions for, in response to receiving the one or more communications while the electronic device is in the reduced notification mode, storing the one or more communications without displaying, on the display, notifications with content from any one of the one or more communications.

18. The electronic device of claim 16, wherein, when communications of a first type are received while the electronic device is in the reduced notification mode, the electronic device prevents output of notifications that correspond to the communications of the first type.

19. The electronic device of claim 16, wherein the first user interface does not display, on the display, content from any one of the one or more communications received while in the reduced notification mode.

20. The electronic device of claim 16, wherein the one or more programs include instructions for:
in response to detecting the first input that activates the first affordance:
  in accordance with a determination that location-services are active on the electronic device, providing location-based information in the second user interface; and,
  in accordance with a determination that location-services are not active on the electronic device, forgoing providing location-based information in the second user interface.

21. The electronic device of claim 16, wherein:
the second user interface includes a second affordance which, when activated, causes display of notifications for at least some of the one or more communications received while in the reduced notification mode; and
the second input activates the second affordance.

22. The electronic device of claim 16, wherein the one or more programs include instructions for:
in response to detecting the alert condition for the reduced notification mode, providing an audio and/or a tactile output that indicates that the alert condition has been met.

23. The electronic device of claim 16, wherein the one or more programs include instructions for:
prior to the electronic device being in the reduced notification mode, displaying a third user interface that includes:
  a background, and
  one or more user interface objects displayed in a foreground of the third user interface;
while displaying the third user interface, detecting activation of the reduced notification mode; and
in response to detecting the activation of the reduced notification mode, reducing a brightness of the background of the third user interface.

24. The electronic device of claim 23, wherein the one or more programs include instructions for, in response to detecting the activation of the reduced notification mode, maintaining a brightness of the one or more user interface objects displayed in the foreground of the third user interface.

25. The electronic device of claim 23, wherein, before detecting the activation of the reduced notification mode, the background of the third user interface is displayed at a predefined brightness that corresponds to the electronic device not being in the reduced notification mode.

26. The electronic device of claim 16, wherein:
the first user interface includes a second affordance which, when activated, causes delay of the deactivation of the reduced notification mode of the electronic device; and
the one or more programs include instructions for:
in response to detecting activation of the reduced notification mode, reducing a brightness of the display;
after detecting the alert condition for the reduced notification mode, maintaining a reduced brightness of the display;
while displaying the first user interface that includes the first affordance and the second affordance, detecting a third input that activates the second affordance;
in response to detecting the third input, delaying the deactivation of the reduced notification mode of the electronic device, while maintaining the reduced brightness of the display; and,
in response to detecting the first input that activates the first affordance:
increasing the brightness of the display.

27. The electronic device of claim 16, wherein:
the first user interface includes a second affordance which, when activated, causes delay of the deactivation the reduced notification mode of the electronic device; and
the one or more programs include instructions for:
after detecting the alert condition for the reduced notification mode, displaying the first user interface at a first brightness level;
while displaying the first user interface that includes the first affordance and the second affordance at the first brightness level, detecting a third input that activates the second affordance;
in response to detecting the third input, reducing the brightness of the first user interface to a second brightness level that is less than the first brightness level; and,
upon expiration of a predefined delay time, increasing the brightness of the first user interface to the first brightness level.

28. The electronic device of claim 16, wherein the one or more programs include instructions for:
before activation of the reduced notification mode, receiving a first plurality of communications;
while the reduced notification mode is active, receiving a second plurality of communications; and
after receiving the second input, displaying notifications that correspond to the first plurality of communications separately from displaying notifications that correspond to the second plurality of communications.

29. The electronic device of claim 28, wherein the one or more programs include instructions for:
displaying, in a first portion of the second user interface, notifications corresponding to the first plurality of communications; and
displaying, in a second portion of the second user interface, visually distinct from the first portion of the second user interface, notifications corresponding to the second plurality of communications.

30. The electronic device of claim 28, wherein the one or more programs include instructions for:
before activation of the reduced notification mode, displaying the notifications corresponding to the first plurality of communications, and
in response to activation of the reduced notification mode, removing from the display the notifications corresponding the first plurality of communications.

31. A non-transitory computer-readable storage medium storing one or more programs, the one or more programs comprising instructions which, when executed by an electronic device with a display, cause the electronic device to:
while the electronic device is in a reduced notification mode:
receive one or more communications;
after receiving the one or more communications, detect an alert condition for the reduced notification mode;
in response to detecting the alert condition for the reduced notification mode, display a first user interface that includes a first affordance which, when activated, causes deactivation of the reduced notification mode of the electronic device; and
while displaying the first user interface, detect a first input that activates the first affordance;
in response to detecting the first input that activates the first affordance:
deactivate the reduced notification mode, and
display, on the display, a second user interface, wherein the second user interface does not display, on the display, content from any one of the one or more communications;
while the second user interface is displayed, detect a second input; and,
in response to detecting the second input, display notifications that include content for at least some of the one or more communications received while the electronic device was in the reduced notification mode.

32. The non-transitory computer-readable storage medium of claim 31, wherein the one or more programs comprise instructions which, when executed by the electronic device, cause the electronic device to, in response to receiving the one or more communications while the electronic device is in the reduced notification mode, store the one or more communications without displaying, on the display, notifications with content from any one of the one or more communications.

33. The non-transitory computer-readable storage medium of claim 31, wherein, when communications of a first type are received while the electronic device is in the reduced notification mode, the electronic device prevents output of notifications that correspond to the communications of the first type.

34. The non-transitory computer-readable storage medium of claim 31, wherein the first user interface does not display, on the display, content from any one of the one or more communications received while in the reduced notification mode.

35. The non-transitory computer-readable storage medium of claim 31, wherein the one or more programs comprise instructions which, when executed by the electronic device, cause the electronic device to:
in response to detecting the first input that activates the first affordance:

in accordance with a determination that location-services are active on the electronic device, provide location-based information in the second user interface; and, in accordance with a determination that location-services are not active on the electronic device, forgoing provide location-based information in the second user interface.

36. The non-transitory computer-readable storage medium of claim 31, wherein:

the second user interface includes a second affordance which, when activated, causes display of notifications for at least some of the one or more communications received while in the reduced notification mode; and the second input activates the second affordance.

37. The non-transitory computer-readable storage medium of claim 31, wherein the one or more programs comprise instructions which, when executed by the electronic device, cause the electronic device to:

in response to detecting the alert condition for the reduced notification mode, provide an audio and/or a tactile output that indicates that the alert condition has been met.

38. The non-transitory computer-readable storage medium of claim 31, wherein the one or more programs comprise instructions which, when executed by the electronic device, cause the electronic device to:

prior to the electronic device being in the reduced notification mode, display a third user interface that includes:

a background, and one or more user interface objects displayed in a foreground of the third user interface;

while displaying the third user interface, detect activation of the reduced notification mode; and in response to detecting the activation of the reduced notification mode, reduce a brightness of the background of the third user interface.

39. The non-transitory computer-readable storage medium of claim 38, wherein the one or more programs comprise instructions which, when executed by the electronic device, cause the electronic device to, in response to detecting the activation of the reduced notification mode, maintain a brightness of the one or more user interface objects displayed in the foreground of the third user interface.

40. The non-transitory computer-readable storage medium of claim 38, wherein, before detecting the activation of the reduced notification mode, the background of the third user interface is displayed at a predefined brightness that corresponds to the electronic device not being in the reduced notification mode.

41. The non-transitory computer-readable storage medium of claim 31, wherein:

the first user interface includes a second affordance which, when activated, causes delay of the deactivation of the reduced notification mode of the electronic device; and the one or more programs comprise instructions which, when executed by the electronic device, cause the electronic device to:

in response to detecting activation of the reduced notification mode, reduce a brightness of the display;

after detecting the alert condition for the reduced notification mode, maintain a reduced brightness of the display;

while displaying the first user interface that includes the first affordance and the second affordance, detect a third input that activates the second affordance;

in response to detecting the third input, delay the deactivation of the reduced notification mode of the electronic device, while maintaining the reduced brightness of the display; and, in response to detecting the first input that activates the first affordance:

increase the brightness of the display.

42. The non-transitory computer-readable storage medium of claim 31, wherein:

the first user interface includes a second affordance which, when activated, causes delay of the deactivation the reduced notification mode of the electronic device; and the one or more programs comprise instructions which, when executed by the electronic device, cause the electronic device to:

after detecting the alert condition for the reduced notification mode, display the first user interface at a first brightness level;

while displaying the first user interface that includes the first affordance and the second affordance at the first brightness level, detect a third input that activates the second affordance;

in response to detecting the third input, reduce the brightness of the first user interface to a second brightness level that is less than the first brightness level; and, upon expiration of a predefined delay time, increase the brightness of the first user interface to the first brightness level.

43. The non-transitory computer-readable storage medium of claim 31, wherein the one or more programs comprise instructions which, when executed by the electronic device, cause the electronic device to:

before activation of the reduced notification mode, receive a first plurality of communications;

while the reduced notification mode is active, receive a second plurality of communications; and after receiving the second input, display notifications that correspond to the first plurality of communications separately from displaying notifications that correspond to the second plurality of communications.

44. The non-transitory computer-readable storage medium of claim 43, wherein the one or more programs comprise instructions which, when executed by the electronic device, cause the electronic device to:

display, in a first portion of the second user interface, notifications corresponding to the first plurality of communications; and display, in a second portion of the second user interface, visually distinct from the first portion of the second user interface, notifications corresponding to the second plurality of communications.

45. The non-transitory computer-readable storage medium of claim 43, wherein the one or more programs comprise instructions which, when executed by the electronic device, cause the electronic device to:

before activation of the reduced notification mode, display the notifications corresponding to the first plurality of communications, and in response to activation of the reduced notification mode, remove from the display the notifications corresponding the first plurality of communications.

\* \* \* \* \*

UNITED STATES PATENT AND TRADEMARK OFFICE
CERTIFICATE OF CORRECTION

PATENT NO. : 10,904,379 B2  
APPLICATION NO. : 16/142599  
DATED : January 26, 2021  
INVENTOR(S) : Ko et al.

Page 1 of 1

It is certified that error appears in the above-identified patent and that said Letters Patent is hereby corrected as shown below:

In the Claims

Claim 12, Column 75, Line 3, please delete "deactivation the" and insert --deactivation of the--;

Claim 15, Column 75, Lines 42-43, please delete "corresponding the" and insert --corresponding to the--;

Claim 27, Column 77, Line 35, please delete "deactivation the" and insert --deactivation of the--;

Claim 30, Column 78, Lines 11-12, please delete "corresponding the" and insert --corresponding to the--;

Claim 42, Column 80, Line 14, please delete "deactivation the" and insert --deactivation of the--;

Claim 45, Column 80, Lines 64-65, please delete "corresponding the" and insert --corresponding to the--.

Signed and Sealed this  
Twenty-seventh Day of April, 2021

Drew Hirshfeld  
*Performing the Functions and Duties of the*  
*Under Secretary of Commerce for Intellectual Property and*  
*Director of the United States Patent and Trademark Office*